United States Patent
Imaizumi et al.

(10) Patent No.: US 10,124,247 B2
(45) Date of Patent: Nov. 13, 2018

(54) SYSTEM AND DEVICE FOR COMMUNICATING IMAGES

(71) Applicant: Nintendo Co., Ltd., Kyoto (JP)

(72) Inventors: Masahiro Imaizumi, Kyoto (JP); Takako Masaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 14/478,779

(22) Filed: Sep. 5, 2014

(65) Prior Publication Data

US 2014/0375832 A1     Dec. 25, 2014

Related U.S. Application Data

(62) Division of application No. 12/531,586, filed as application No. PCT/JP2008/067864 on Oct. 1, 2008, now Pat. No. 8,848,100.

(51) Int. Cl.
*A63F 13/213*     (2014.01)
*A63F 13/215*     (2014.01)
(Continued)

(52) U.S. Cl.
CPC ............ *A63F 13/213* (2014.09); *A63F 13/10* (2013.01); *A63F 13/215* (2014.09);
(Continued)

(58) Field of Classification Search
CPC ....... H04N 2201/006; H04N 21/43637; H04N 1/00315; H04N 1/00307; H04N 5/23206;
(Continued)

(56) References Cited

U.S. PATENT DOCUMENTS 4,007,469 A     2/1977  Land et al.
4,408,287 A    10/1983  Parisot et al.
(Continued)

FOREIGN PATENT DOCUMENTS

EP     1 267 576     12/2002
EP     1 408 673      4/2004
(Continued)

OTHER PUBLICATIONS

English-language machine translation of JP 2005-303561.
(Continued)

*Primary Examiner* — Nelson D. Hernández Hernández
(74) *Attorney, Agent, or Firm* — Nixon & Vanderhye, P.C.

(57) ABSTRACT

An example system includes at least one a first device and at least one second device. The first device includes a camera; memory for storing user-configurable name information and a picture captured by the camera; and communication circuitry for wirelessly transmitting the name information. The second device includes communication circuitry for wirelessly receiving the name information; a display controller for controlling display of a name based on the received name information; and a user interface for receiving, while the name is displayed, a user-supplied request for picture reception. The communication circuitry of the first device transmits the stored picture to the second device based on the picture reception request and the communication circuitry of the second device receives the transmitted picture.

23 Claims, 93 Drawing Sheets

(51) Int. Cl.

| | | |
|---|---|---|
| *G06F 3/16* | (2006.01) | |
| *H04N 1/21* | (2006.01) | |
| *H04N 5/232* | (2006.01) | |
| *H04N 5/225* | (2006.01) | |
| *G06F 1/16* | (2006.01) | |
| *A63F 13/40* | (2014.01) | |
| *H04N 1/00* | (2006.01) | |
| *G06F 3/0354* | (2013.01) | |
| *G06F 3/0488* | (2013.01) | |
| *A63F 13/2145* | (2014.01) | |
| *A63F 13/95* | (2014.01) | |
| *A63F 13/26* | (2014.01) | |
| *H04B 5/00* | (2006.01) | |
| *H04N 101/00* | (2006.01) | |

(52) U.S. Cl.
CPC .......... *G06F 1/1616* (2013.01); *G06F 1/1643* (2013.01); *G06F 1/1647* (2013.01); *G06F 1/1656* (2013.01); *G06F 1/1677* (2013.01); *G06F 1/1686* (2013.01); *G06F 1/1692* (2013.01); *G06F 3/03545* (2013.01); *G06F 3/0488* (2013.01); *G06F 3/167* (2013.01); *H04B 5/0031* (2013.01); *H04N 1/00965* (2013.01); *H04N 1/2112* (2013.01); *H04N 1/2129* (2013.01); *H04N 1/2158* (2013.01); *H04N 5/225* (2013.01); *H04N 5/2252* (2013.01); *H04N 5/23216* (2013.01); *H04N 5/23293* (2013.01); *A63F 13/2145* (2014.09); *A63F 13/26* (2014.09); *A63F 13/95* (2014.09); *A63F 2300/1081* (2013.01); *A63F 2300/1087* (2013.01); *A63F 2300/204* (2013.01); *A63F 2300/301* (2013.01); *G06F 2200/1632* (2013.01); *H04N 1/00204* (2013.01); *H04N 2101/00* (2013.01); *H04N 2201/0084* (2013.01); *H04N 2201/216* (2013.01); *H04N 2201/3264* (2013.01)

(58) Field of Classification Search
CPC .......... H04N 1/00244; H04N 1/00114; H04N 5/9201; G08B 13/1966; H04W 4/008; H04W 84/12
See application file for complete search history.

(56) References Cited

U.S. PATENT DOCUMENTS

| | | | |
|---|---|---|---|
| 4,853,733 A | 8/1989 | Watanabe et al. | |
| 5,408,287 A | 4/1995 | Winegarden et al. | |
| 5,477,264 A | 12/1995 | Sarbadhikari et al. | |
| 5,491,507 A | 2/1996 | Umezawa et al. | |
| 5,506,951 A | 4/1996 | Ishikawa | |
| 5,615,347 A | 3/1997 | Davis et al. | |
| 5,805,167 A | 9/1998 | Van Cruyningen | |
| 5,923,908 A | 7/1999 | Schrock et al. | |
| 5,982,429 A | 11/1999 | Kamamoto et al. | |
| 6,069,648 A | 5/2000 | Suso et al. | |
| 6,120,379 A | 9/2000 | Tanaka et al. | |
| 6,154,210 A | 11/2000 | Anderson | |
| 6,222,538 B1 | 4/2001 | Anderson | |
| 6,259,597 B1 | 7/2001 | Anzai et al. | |
| 6,466,202 B1 | 10/2002 | Suso et al. | |
| 6,510,325 B1 | 1/2003 | Mack et al. | |
| 6,515,704 B1 | 2/2003 | Sato | |
| 6,567,677 B1 | 5/2003 | Sokoloff | |
| 6,665,015 B1 | 12/2003 | Watanabe et al. | |
| 6,680,749 B1 | 1/2004 | Anderson et al. | |
| 6,680,845 B2 | 1/2004 | Agata et al. | |
| D492,275 S | 6/2004 | Lin et al. | |
| 6,788,887 B2 | 9/2004 | Takeshita et al. | |
| 6,811,492 B1 | 11/2004 | Arakawa et al. | |
| D503,697 S | 4/2005 | Kim | |
| 6,943,841 B2 | 9/2005 | Miyake et al. | |
| 6,954,491 B1 | 10/2005 | Kim et al. | |
| D513,505 S | 1/2006 | Lee | |
| 6,988,097 B2 | 1/2006 | Shirota | |
| 7,034,881 B1 | 4/2006 | Hyodo et al. | |
| 7,110,666 B2 | 9/2006 | Abe et al. | |
| 7,117,450 B1 | 10/2006 | Chaudri | |
| D540,769 S | 4/2007 | Lee et al. | |
| 7,221,330 B2 | 5/2007 | Finke-Anlauff | |
| 7,268,818 B2 | 9/2007 | Karasawa | |
| 7,315,984 B2 | 1/2008 | Crow et al. | |
| 7,460,108 B2 | 12/2008 | Tamura | |
| 7,463,247 B2 | 12/2008 | Berry | |
| 7,471,890 B2 | 12/2008 | Lee et al. | |
| 7,540,011 B2 | 5/2009 | Wixson et al. | |
| 7,606,483 B2 | 10/2009 | Kurosawa | |
| D603,363 S | 11/2009 | Choi et al. | |
| 7,671,916 B2 | 3/2010 | Hashimoto | |
| 7,761,002 B2 | 7/2010 | Akagane | |
| 7,768,573 B2 | 8/2010 | Karasawa | |
| 7,817,142 B2 | 10/2010 | Kuwahara et al. | |
| 7,876,377 B2 | 1/2011 | Wang et al. | |
| 7,884,970 B2 | 2/2011 | Hiroyasu et al. | |
| 8,149,315 B2 | 4/2012 | Matsushima et al. | |
| 8,289,227 B2 | 10/2012 | Imaizumi et al. | |
| 8,291,209 B2 | 10/2012 | Chong et al. | |
| 8,359,547 B2 | 1/2013 | Akifuso et al. | |
| 8,848,100 B2 | 10/2014 | Kuwahara et al. | |
| 8,913,172 B2 | 12/2014 | Matsushima et al. | |
| 8,917,985 B2 | 12/2014 | Kuwahara et al. | |
| 9,135,026 B2 | 9/2015 | Matsushima et al. | |
| 9,256,449 B2 | 2/2016 | Matsushima et al. | |
| 9,264,694 B2 | 2/2016 | Kuwahara et al. | |
| 2001/0005232 A1 | 6/2001 | Yoshioka et al. | |
| 2001/0005454 A1 | 6/2001 | Nishino et al. | |
| 2001/0008412 A1 | 7/2001 | Ando et al. | |
| 2001/0019363 A1 | 9/2001 | Katta et al. | |
| 2001/0038748 A1 | 11/2001 | Onuki | |
| 2002/0024603 A1 | 2/2002 | Nakayama et al. | |
| 2002/0149621 A1 | 10/2002 | Yamaguchi et al. | |
| 2002/0198023 A1* | 12/2002 | Ido ................. | H04N 1/32122 455/557 |
| 2003/0052964 A1 | 3/2003 | Priestman et al. | |
| 2003/0117503 A1 | 6/2003 | Miyashita | |
| 2003/0123859 A1 | 7/2003 | Ikeda | |
| 2003/0163623 A1 | 8/2003 | Yeung | |
| 2003/0197788 A1* | 10/2003 | Parulski ............. | H04M 1/0262 348/211.2 |
| 2003/0220145 A1 | 11/2003 | Erickson et al. | |
| 2004/0012702 A1 | 1/2004 | Ishige | |
| 2004/0072589 A1 | 4/2004 | Hamamura et al. | |
| 2004/0075620 A1 | 4/2004 | Tanaka et al. | |
| 2004/0080518 A1 | 4/2004 | Lee | |
| 2004/0080653 A1 | 4/2004 | Tanaka et al. | |
| 2004/0137958 A1 | 7/2004 | Sawai | |
| 2004/0140971 A1 | 7/2004 | Yamazaki et al. | |
| 2004/0145675 A1 | 7/2004 | Kitada | |
| 2004/0174430 A1 | 9/2004 | Sawahara et al. | |
| 2004/0189826 A1 | 9/2004 | Karasawa | |
| 2004/0204064 A1 | 10/2004 | Ikeda et al. | |
| 2005/0041132 A1 | 2/2005 | Juen et al. | |
| 2005/0134718 A1 | 6/2005 | Honda | |
| 2005/0135792 A1 | 6/2005 | Han | |
| 2005/0153765 A1 | 7/2005 | Shoostine | |
| 2005/0215296 A1 | 9/2005 | Fujihara et al. | |
| 2005/0237424 A1 | 10/2005 | Weekamp et al. | |
| 2005/0270396 A1 | 12/2005 | Miyashita et al. | |
| 2005/0278636 A1 | 12/2005 | Nomoto | |
| 2006/0017833 A1 | 1/2006 | Gong et al. | |
| 2006/0024047 A1 | 2/2006 | Lee | |
| 2006/0038914 A1 | 2/2006 | Hanada et al. | |
| 2006/0044396 A1 | 3/2006 | Miyashita et al. | |
| 2006/0051083 A1 | 3/2006 | Yamamoto | |
| 2006/0064688 A1 | 3/2006 | Tseng | |
| 2006/0072028 A1 | 4/2006 | Hong | |
| 2006/0072769 A1 | 4/2006 | Tanaguchi et al. | |
| 2006/0077165 A1 | 4/2006 | Jang | |
| 2006/0078277 A1 | 4/2006 | Miyazaki | |

(56) References Cited

U.S. PATENT DOCUMENTS

| | | |
|---|---|---|
| 2006/0098112 A1 | 5/2006 | Kelly |
| 2006/0100021 A1 | 5/2006 | Yoshino et al. |
| 2006/0101354 A1 | 5/2006 | Hashimoto et al. |
| 2006/0103633 A1 | 5/2006 | Gioeli |
| 2006/0125946 A1 | 6/2006 | Nishino et al. |
| 2006/0140620 A1 | 6/2006 | Fujii |
| 2006/0140621 A1 | 6/2006 | Misawa |
| 2006/0146174 A1 | 7/2006 | Hagino |
| 2006/0152516 A1 | 7/2006 | Plummer |
| 2006/0183505 A1 | 8/2006 | Willrich et al. |
| 2006/0205438 A1 | 9/2006 | Jung |
| 2006/0214924 A1 | 9/2006 | Kawamoto et al. |
| 2006/0215753 A1 | 9/2006 | Lee et al. |
| 2006/0216022 A1 | 9/2006 | Lee et al. |
| 2006/0256959 A1* | 11/2006 | Hymes .................... H04M 1/26 379/433.04 |
| 2006/0268125 A1 | 11/2006 | Teicher et al. |
| 2007/0019942 A1 | 1/2007 | Kurosawa |
| 2007/0024736 A1 | 2/2007 | Matsuda et al. |
| 2007/0028151 A1 | 2/2007 | Miller et al. |
| 2007/0035616 A1 | 2/2007 | Lee et al. |
| 2007/0057866 A1 | 3/2007 | Lee et al. |
| 2007/0065132 A1 | 3/2007 | Hagino |
| 2007/0091194 A1 | 4/2007 | Kwak |
| 2007/0092141 A1 | 4/2007 | Hagino |
| 2007/0094190 A1 | 4/2007 | Hagino |
| 2007/0115350 A1 | 5/2007 | Currivan et al. |
| 2007/0117636 A1 | 5/2007 | Takahashi et al. |
| 2007/0126877 A1 | 6/2007 | Yang |
| 2007/0164975 A1 | 7/2007 | Lim et al. |
| 2007/0177045 A1 | 8/2007 | Karasawa |
| 2007/0178952 A1 | 8/2007 | Ehara et al. |
| 2007/0182663 A1 | 8/2007 | Biech |
| 2007/0186177 A1 | 8/2007 | Both et al. |
| 2007/0191078 A1 | 8/2007 | Kim |
| 2007/0195173 A1 | 8/2007 | Nozaki et al. |
| 2007/0234236 A1 | 10/2007 | Champion et al. |
| 2007/0249389 A1 | 10/2007 | Hotta |
| 2007/0252901 A1* | 11/2007 | Yokonuma ......... H04N 1/00347 348/231.1 |
| 2007/0254696 A1 | 11/2007 | Kajitani |
| 2007/0280668 A1 | 12/2007 | Kubo et al. |
| 2008/0013754 A1 | 1/2008 | Chuo et al. |
| 2008/0019440 A1 | 1/2008 | Lee et al. |
| 2008/0031607 A1 | 2/2008 | Liao |
| 2008/0050111 A1 | 2/2008 | Lee et al. |
| 2008/0055416 A1 | 3/2008 | Aoki |
| 2008/0070624 A1 | 3/2008 | Hamamura et al. |
| 2008/0165259 A1 | 7/2008 | Nobels |
| 2008/0174556 A1 | 7/2008 | Jo |
| 2008/0174570 A1 | 7/2008 | Jobs et al. |
| 2008/0239133 A1 | 10/2008 | Cazier et al. |
| 2008/0263568 A1 | 10/2008 | Kusuda et al. |
| 2008/0303795 A1 | 12/2008 | Lowles et al. |
| 2009/0033639 A1 | 2/2009 | Oka et al. |
| 2009/0033786 A1 | 2/2009 | Finkelstein et al. |
| 2009/0037722 A1 | 2/2009 | Chong et al. |
| 2009/0059497 A1 | 3/2009 | Kuwahara et al. |
| 2009/0060490 A1 | 3/2009 | Kuwahara et al. |
| 2009/0224999 A1 | 9/2009 | Kuwahara et al. |
| 2009/0278764 A1 | 11/2009 | Kuwahara et al. |
| 2009/0278974 A1 | 11/2009 | Kuwahara et al. |
| 2009/0310889 A1 | 12/2009 | Matsushima et al. |
| 2010/0005420 A1 | 1/2010 | Schneider |
| 2010/0007926 A1 | 1/2010 | Imaizumi et al. |
| 2010/0073518 A1 | 3/2010 | Yeh |
| 2010/0316367 A1 | 12/2010 | Kuwahara et al. |
| 2011/0234857 A1 | 9/2011 | Matsushima et al. |
| 2011/0242361 A1 | 10/2011 | Kuwahara et al. |
| 2013/0314506 A1 | 11/2013 | Imaizumi et al. |
| 2013/0314570 A1 | 11/2013 | Imaizumi et al. |
| 2013/0314577 A1 | 11/2013 | Imaizumi et al. |
| 2013/0314578 A1 | 11/2013 | Imaizumi et al. |
| 2014/0362254 A1 | 12/2014 | Kuwahara et al. |
| 2014/0375832 A1 | 12/2014 | Imaizumi et al. |
| 2014/0375863 A1 | 12/2014 | Imaizumi et al. |
| 2015/0049235 A1 | 2/2015 | Matsushima et al. |

FOREIGN PATENT DOCUMENTS

| | | |
|---|---|---|
| EP | 1 763 243 | 3/2007 |
| EP | 1 785 854 | 5/2007 |
| JP | 01-297986 | 12/1989 |
| JP | 03-182732 | 8/1991 |
| JP | 04-156791 | 5/1992 |
| JP | 05-206767 | 8/1993 |
| JP | 06-276478 | 9/1994 |
| JP | 09-247634 | 9/1997 |
| JP | 10-222168 | 8/1998 |
| JP | 10-240692 | 9/1998 |
| JP | 10-336496 | 12/1998 |
| JP | 10-341388 | 12/1998 |
| JP | 11-041339 | 2/1999 |
| JP | 11-160776 | 6/1999 |
| JP | H11-212726 | 8/1999 |
| JP | 11-331739 | 11/1999 |
| JP | 2000-050117 | 2/2000 |
| JP | 2000-056756 | 2/2000 |
| JP | 2000-066285 | 3/2000 |
| JP | 2000-132561 | 5/2000 |
| JP | 2000-184310 | 6/2000 |
| JP | 2000-222185 | 8/2000 |
| JP | 2000-253113 | 9/2000 |
| JP | 2001-142564 | 5/2001 |
| JP | 2001-196959 | 7/2001 |
| JP | 2001-249664 | 9/2001 |
| JP | 2002-094629 | 3/2002 |
| JP | 2002-125176 | 4/2002 |
| JP | 2002-152624 | 5/2002 |
| JP | 2002-209163 | 7/2002 |
| JP | 2002-374434 | 12/2002 |
| JP | 2003-023479 | 1/2003 |
| JP | 2003-189165 | 7/2003 |
| JP | 2003-274247 | 9/2003 |
| JP | 2003-333149 | 11/2003 |
| JP | 2004-004309 | 1/2004 |
| JP | 2004-015779 | 1/2004 |
| JP | 2004-053699 | 4/2004 |
| JP | 2004-104207 | 4/2004 |
| JP | 2004-120160 | 4/2004 |
| JP | 2004-120290 | 4/2004 |
| JP | 2004-120727 | 4/2004 |
| JP | 2004-260760 | 9/2004 |
| JP | 2004-274304 | 9/2004 |
| JP | 2004-274777 | 9/2004 |
| JP | 2004-282604 | 10/2004 |
| JP | 2004-297251 | 10/2004 |
| JP | 2004-320091 | 11/2004 |
| JP | 2005-065235 | 3/2005 |
| JP | 2005-079910 | 3/2005 |
| JP | 2005-094782 | 4/2005 |
| JP | 2005-101779 | 4/2005 |
| JP | 2005-115536 | 4/2005 |
| JP | 2005-184060 | 7/2005 |
| JP | 2005-184108 | 7/2005 |
| JP | 2005-260879 | 9/2005 |
| JP | 2005-269399 | 9/2005 |
| JP | 2005-301544 | 10/2005 |
| JP | 2005-303561 | 10/2005 |
| JP | 2005-323241 | 11/2005 |
| JP | 2005-535244 | 11/2005 |
| JP | 2005-333591 | 12/2005 |
| JP | 2006-033328 | 2/2006 |
| JP | 2006-039203 | 2/2006 |
| JP | 2006-072466 | 3/2006 |
| JP | 2006-074764 | 3/2006 |
| JP | 2006-080779 | 3/2006 |
| JP | 2006-107063 | 4/2006 |
| JP | 2006-139676 | 6/2006 |
| JP | 2006-140700 | 6/2006 |
| JP | 2006-191490 | 7/2006 |
| JP | 2006-201466 | 8/2006 |
| JP | 2006-230340 | 9/2006 |

(56) References Cited

FOREIGN PATENT DOCUMENTS

| JP | 2006-287288 | 10/2006 |
|---|---|---|
| JP | 2006-311224 | 11/2006 |
| JP | 2006-319561 | 11/2006 |
| JP | 2006-350986 | 12/2006 |
| JP | 2007-028229 | 2/2007 |
| JP | 2007-082223 | 3/2007 |
| JP | 2007-094939 | 4/2007 |
| JP | 2007-104038 | 4/2007 |
| JP | 2007-150898 | 6/2007 |
| JP | 2007-195830 | 8/2007 |
| JP | 2007-201727 | 8/2007 |
| JP | 2007-201825 | 8/2007 |
| JP | 2007-249222 | 9/2007 |
| JP | 2008-124826 | 5/2008 |
| JP | 2008-131597 | 6/2008 |
| JP | 2008-170671 | 7/2008 |
| JP | 2008-217545 | 9/2008 |
| KR | 10-2006-0099197 | 9/2006 |
| WO | 2006/098414 | 9/2006 |
| WO | 2007/072467 | 6/2007 |

OTHER PUBLICATIONS

English-language machine translation of JP 2006-033328.
Nintendo of America, Nintendo DS Lite Instruction Booklet, 2006, pp. 1-27.
Kuwahara et al., U.S. Appl. No. 12/153,898, filed May 27, 2008, now U.S. Pat. No. 8,917,985.
Matsushima et al., U.S. Appl. No. 12/213,695, filed Jun. 23, 2008, non-final office action dated Mar. 6, 2015.
Kuwahara et al., U.S. Appl. No. 12/219,633, filed Jul. 24, 2008, response to office action dated Feb. 9, 2015.
Matsushima et al., U.S. Appl. No. 13/156,529, filed Jun. 9, 2011, now U.S. Pat. No. 8,913,172.
Imaizumi et al., U.S. Appl. No. 13/954,459, filed Jul. 30, 2013, response to office action dated Mar. 6, 2015.
Imaizumi et al., U.S. Appl. No. 13/954,470, filed Jul. 30, 2013, non-final office action dated Oct. 20, 2014.
Imaizumi et al., U.S. Appl. No. 13/954,509, filed Jul. 30, 2013, non-final office action dated Dec. 1, 2014.
Imaizumi et al., U.S. Appl. No. 13/954,491, filed Jul. 30, 2013, RCE dated Mar. 9, 2015.
Kuwahara et al., U.S. Appl. No. 14/466,614, filed Aug. 22, 2014, response to office action dated Feb. 20, 2015.
Matsushima et al., U.S. Appl. No. 14/530,343, filed Oct. 31, 2014, non-final office action dated Feb. 24, 2015.
Imaizumi et al., U.S. Appl. No. 13/954,470, filed Jul. 30, 2013, response to office action dated Mar. 20, 2015.
Imaizumi et al., U.S. Appl. No. 13/954,509, filed Jul. 30, 2013, response to office action dated May 1, 2015.
Imaizumi et al., U.S. Appl. No. 13/954,491, filed Jul. 30, 2013, non-final office action dated Apr. 7, 2015.
Matsushima et al., U.S. Appl. No. 12/213,695, filed Jun. 23, 2008, allowed.
Kuwahara et al., U.S. Appl. No. 12/219,633, filed Jul. 24, 2008, final office action dated May 28, 2015.
Imaizumi et al., U.S. Appl. No. 13/954,459, filed Jul. 30, 2013, final rejection dated Jun. 3, 2015.
Imaizumi et al., U.S. Appl. No. 13/954,470, filed Jul. 30, 2013, final rejection dated Jul. 17, 2015.
Kuwahara et al., U.S. Appl. No. 14/466,614, filed Aug. 22, 2014, final rejection dated Jun. 15, 2015.
Imaizumi et al., U.S. Appl. No. 14/478,779, filed Sep. 5, 2014, awaiting USPTO action.
Imaizumi et al., U.S. Appl. No. 14/478,803, filed Sep. 5, 2014, non-final office action dated Jul. 1, 2015.
English-language machine translation of JP 05-206767.
English-language machine translation of JP 10-240692.
English-language machine translation of JP 10-222168.
English-language machine translation of JP 2000-184310.
English-language machine translation of JP 2001-196959.
English-language machine translation of JP 2002-152624.
English-language machine translation of JP 2004-120160.
English-language machine translation of JP 2008-217545.
FOMA (R) N900i User Manual Application section NTT DoCoMo Apr. 2004, third edition, pp. 251-253, with a partial English translation, 7 pages.
"Future of games seen in latest input devices", Enterbrain Inc., Weekly Famitsu, Jul. 16, 2004, vol. 19 w/ an at least partial English-language translation.
Data for Playstation Portable from Wikipedia (en.Wikipedia.org/wiki/Psp) PSP Model PSP-1000 (Released on 2004).
Verizon shows LG VX9800 EV-DO Communicator Mobileburn, Sep. 20, 2005, archived Nov. 20, 2006 by www.Archive.org.
Sony Playstation Portable (PSP-1001 k), Instruction Manual (2005).
Michael Oryl, Jr., "Verizon Shows LG VX9800 EV-DO Communicator," Mobileburn, Sep. 20, 2005, Archived Nov. 25, 2006 by www.Archive.org, Accessed Jul. 18, 2011, http://web.archive.org/web/20061125160046/http://www.mobileburn.com/review.jsp?Page=2&Id-1656 (4 pages).
Chotto Shoto Edit Software Manual, Sony Computer Entertainment, Oct. 23, 2006, Kenichiro Yasuhara with partial English-language translation.
"Chotto Shoto Camera Instruction Manual", Sony Computer Entertainment Inc., Nov. 2, 2006, 22 pages, with a partial English translation.
Go Edit Functions (Japanese translated to English Document) (2006).
System Still Photography (Chotto Shot) (2006).
LG: KE850 Support, retrieved from the Internet, www.1g.com/uk/support-mobile/1g-KE850#, May 1, 2007 (May 1, 2007), 75 pages.
Go!Edit Quick Start Guide, Sony (2007).
telegraph.co.ukltechnology/3354933/Face-Training-Nintendo-D5-exercises-your-vision-and-face.html (Oct. 25, 2007).
"Other Useful Functions, NTT DoCoMo FOMA SH902i User's Manual," NTT DoCoMo Group, Sharp Corporation, May 2012, First Edition, pp. 413, 425, 426 and partial English translation thereof.
Anonymous: "iPhone(original)", Wikipedia the free encyclopedia, en.wikipedia.org/wiki/IPhone_%28orginal%29, retrieved from the Internet, on Oct. 18, 2012, 6 pages.
English translation of Masaki Honda, i Mode fan Special Addition N504iS Benri Kinou Sousa Manual i Mode fan Special Addition N504iS Handy Manual, i Mode FaN, Japan Mainichi Communications Inc., Dec. 20, 2002, vol. 9, No. 35, pp. 6, 11 and 16.
W61CA by Casio, User Manual, Japan KDDI Corporation, Jan. 2008, pp. 27, 34-37 and 120-121.
Yasuhara, "Chotto Shoto Edit Software Manual" Sony Computer Entertainment, Nov. 2, 2006, 5 pages with partial English-language translation.
Kuwahara et al., U.S. Appl. No. 12/149,461, filed May 1, 2008, on appeal.
Kuwahara et al., U.S. Appl. No. 12/153,898, filed May 27, 2008, allowed.
Matsushima et al., U.S. Appl. No. 12/213,695, filed Jun. 23, 2008, final office action dated Oct. 14, 2014.
Imaizumi et al., U.S. Appl. No. 12/219,316, filed Jul. 18, 2008, now U.S. Pat. No. 8,289,227.
Kuwahara et al., U.S. Appl. No. 12/219,633, filed Jul. 24, 2008, non-final office action dated Oct. 9, 2014.
Matsushima et al., U.S. Appl. No. 12/243,355, filed Oct. 1, 2008, now U.S. Pat. No. 8,149,315.
Kuwahara et al., U.S. Appl. No. 12/426,615, filed Apr. 20, 2009, now U.S. Pat. No. 7,817,142.
Kuwahara et al., U.S. Appl. No. 12/531,586, filed Sep. 16, 2009, now U.S. Pat. No. 8,848,100.
Kuwahara et al., U.S. Appl. No. 12/859,551, filed Aug. 19, 2010, now abandoned.
Matsushima et al., U.S. Appl. No. 13/156,529, filed Jun. 9, 2011, allowed.
Imaizumi et al., U.S. Appl. No. 13/954,459, filed Jul. 30, 2013, non-final office action dated Oct. 6, 2014.

(56) References Cited

OTHER PUBLICATIONS

Imaizumi et al., U.S. Appl. No. 13/954,509, filed Jul. 30, 2013, RCE dated Oct. 20, 2014.
Imaizumi et al., U.S. Appl. No. 13/954,491, filed Jul. 30, 2013, final office action dated Sep. 18, 2014.
Kuwahara et al., U.S. Appl. No. 14/466,614, filed Aug. 22, 2014, non-final office action dated Oct. 20, 2014.
Imaizumi et al., U.S. Appl. No. 14/478,803, filed Sep. 5, 2014, awaiting USPTO action.
Matsushima et al., U.S. Appl. No. 14/530,343, filed Oct. 31, 2014, awaiting USPTO action.
Kuwahara et al., U.S. Appl. No. 12/149,461, filed May 1, 2008, allowed.
Imaizumi et al., U.S. Appl. No. 13/954,459, filed Jul. 30, 2013, allowed.
Imaizumi et al., U.S. Appl. No. 13/954,491, filed Jul. 30, 2013, final office action dated Jan. 13, 2016.
Kuwahara et al., U.S. Appl. No. 14/466,614, filed Aug. 22, 2014, response to office action dated Feb. 22, 2016.
Imaizumi et al., U.S. Appl. No. 14/478,803, filed Sep. 5, 2014, final office action dated Mar. 9, 2016.
Matsushima et al., U.S. Appl. No. 14/986,050, filed Dec. 31, 2015, awaiting USPTO action.
Matsushima et al., U.S. Appl. No. 14/530,343, filed Oct. 31, 2014, now U.S. Pat. No. 9,256,449.
Kuwahara et al., U.S. Appl. No. 12/219,633, filed Jul. 24, 2008, now U.S. Pat. No. 9,264,694.
Service Manual, Nokia 3410, published in 2002.
Kuwahara et al., U.S. Appl. No. 12/149,461, filed May 1, 2008, board decision—examiner reversed Dec. 10, 2016.
Matsushima et al., U.S. Appl. No. 12/213,695, filed Jun. 23, 2008, now U.S. Pat. No. 9,135,026.
Kuwahara et al., U.S. Appl. No. 12/219,633, filed Jul. 24, 2008, now allowed.
Imaizumi et al., U.S. Appl. No. 13/954,459, filed Jul. 30, 2013, amendment and notice of appeal dated Dec. 3, 2015.
Imaizumi et al., U.S. Appl. No. 13/954,470, filed Jul. 30, 2013, pre-appeal brief conference request dated Dec. 17, 2015.
Imaizumi et al., U.S. Appl. No. 13/954,491, filed Jul. 30, 2013, response to office action dated Oct. 7, 2015.
Imaizumi et al., U.S. Appl. No. 13/954,509, filed Jul. 30, 2013, final office action dated Nov. 4, 2015.
Kuwahara et al., U.S. Appl. No. 14/466,614, filed Aug. 22, 2014, non-final office action dated Nov. 20, 2015.
Imaizumi et al., U.S. Appl. No. 14/478,803, filed Sep. 5, 2014, response to office action dated Dec. 1, 2015.
Matsushima et al., U.S. Appl. No. 14/530,343, filed Oct. 31, 2014, allowed.
Matsushima et al., U.S. Appl. No. 14/821,715, filed Aug. 8, 2015, awaiting USPTO action.
English-language machine translation of JP2006-107063.
English-language machine translation of JP2007-094939.
English-language machine translation of JP2007-104038.

\* cited by examiner

FIG.4
(a) 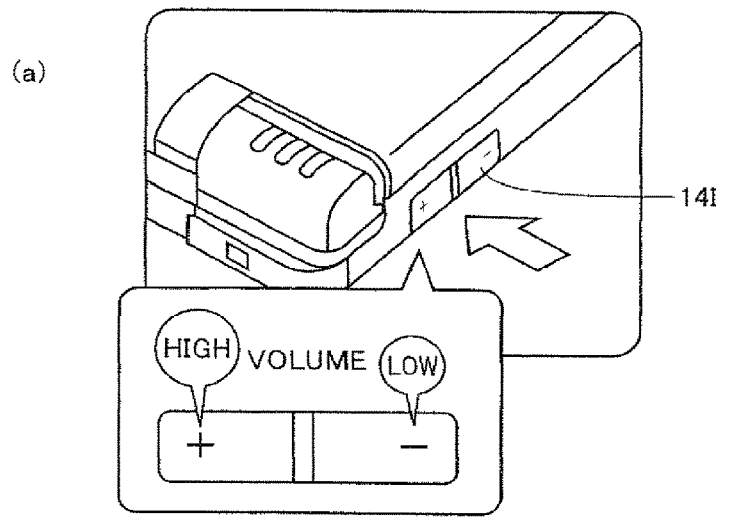
(b) 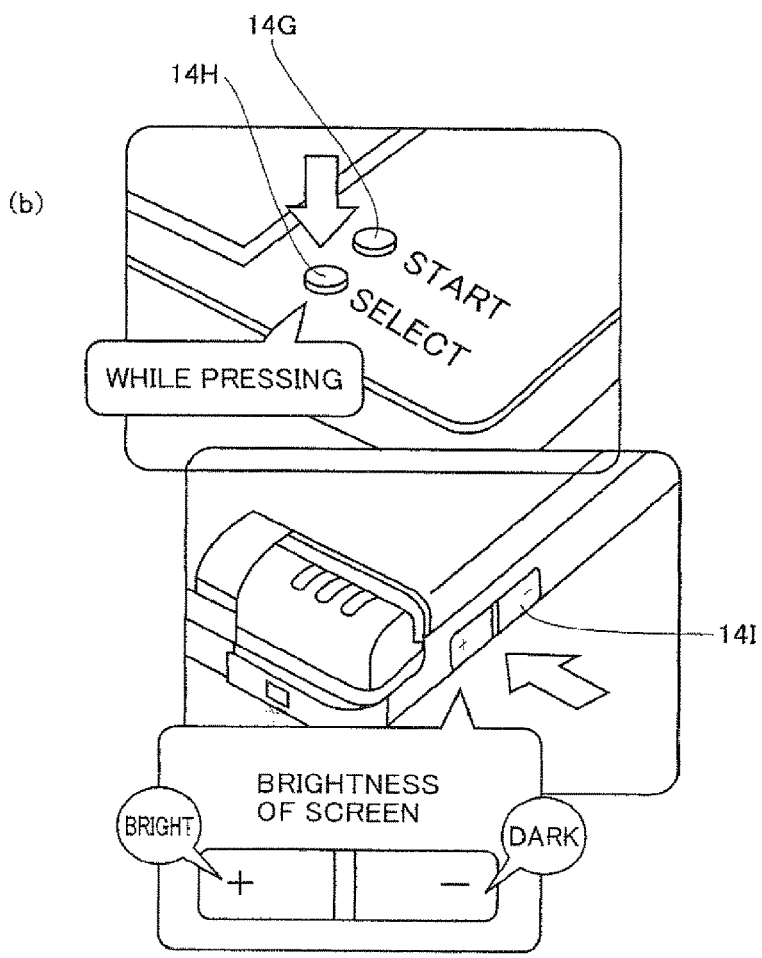

FIG.23
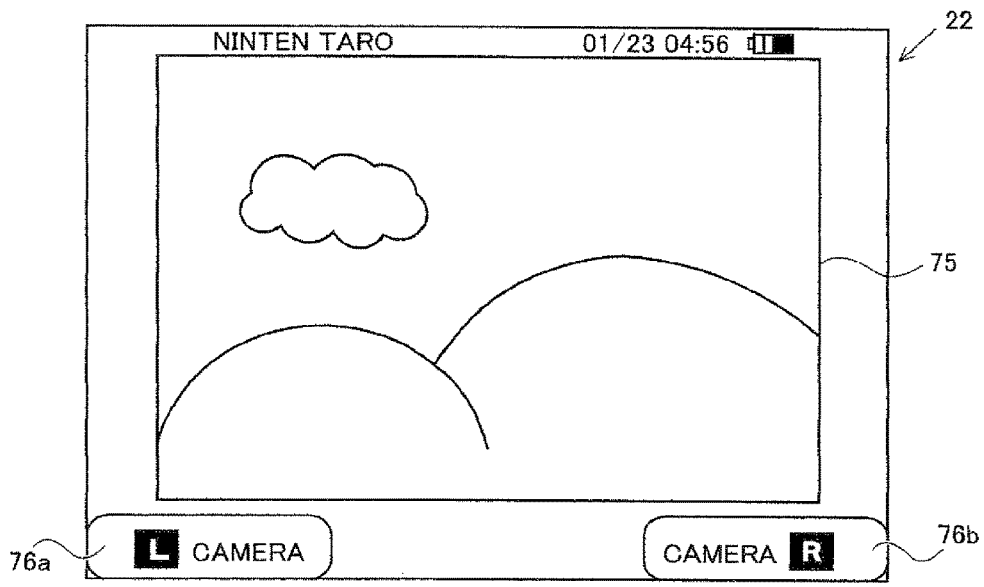
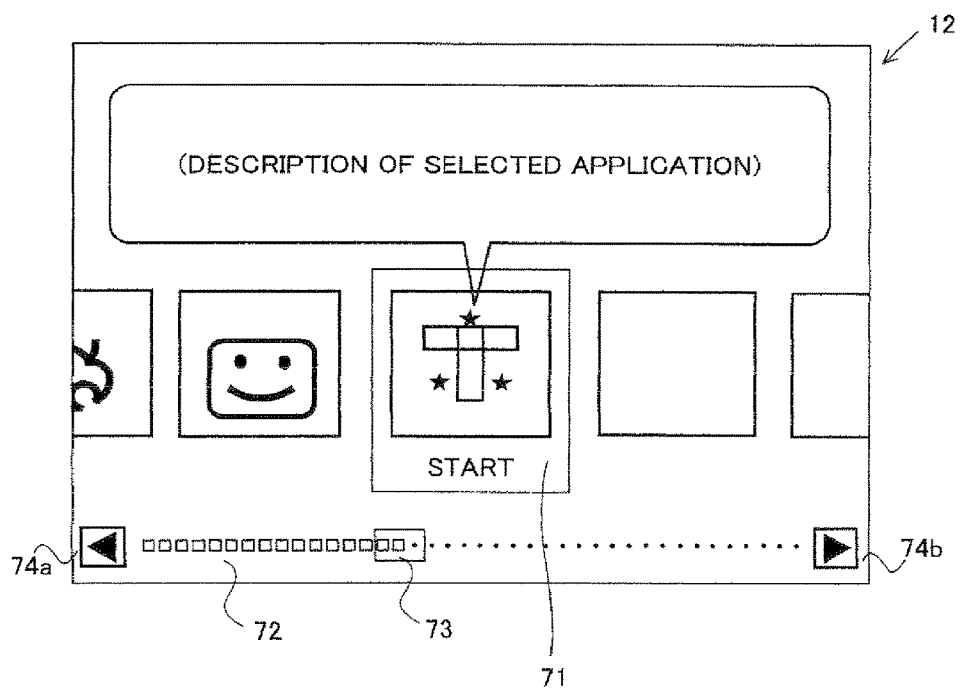

FIG.25
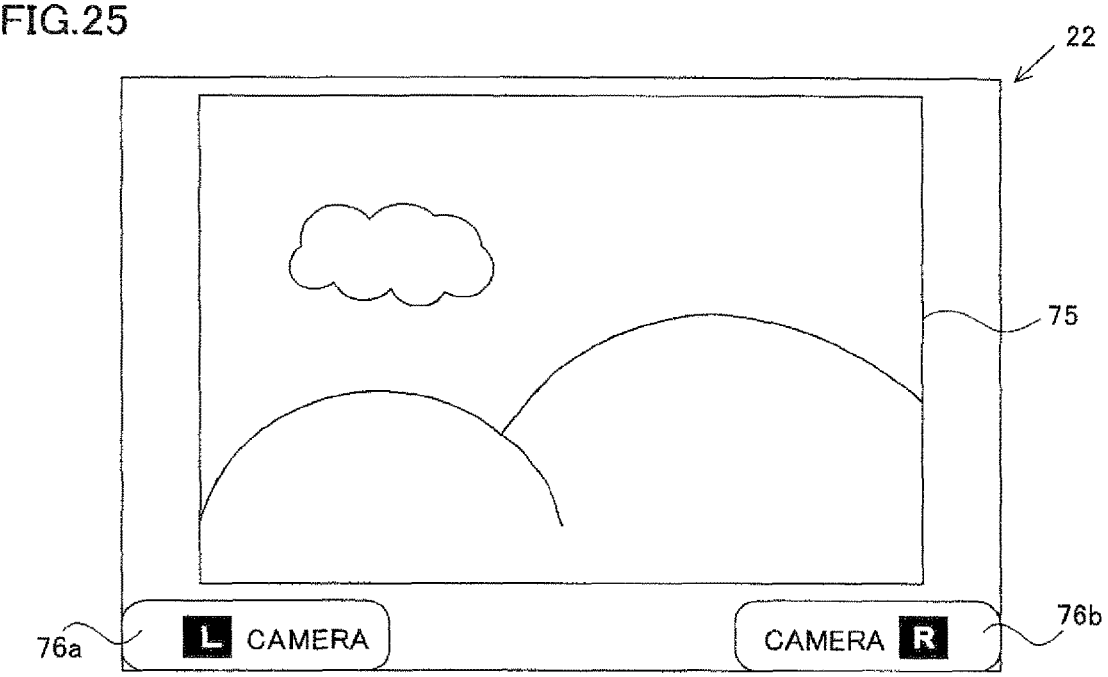
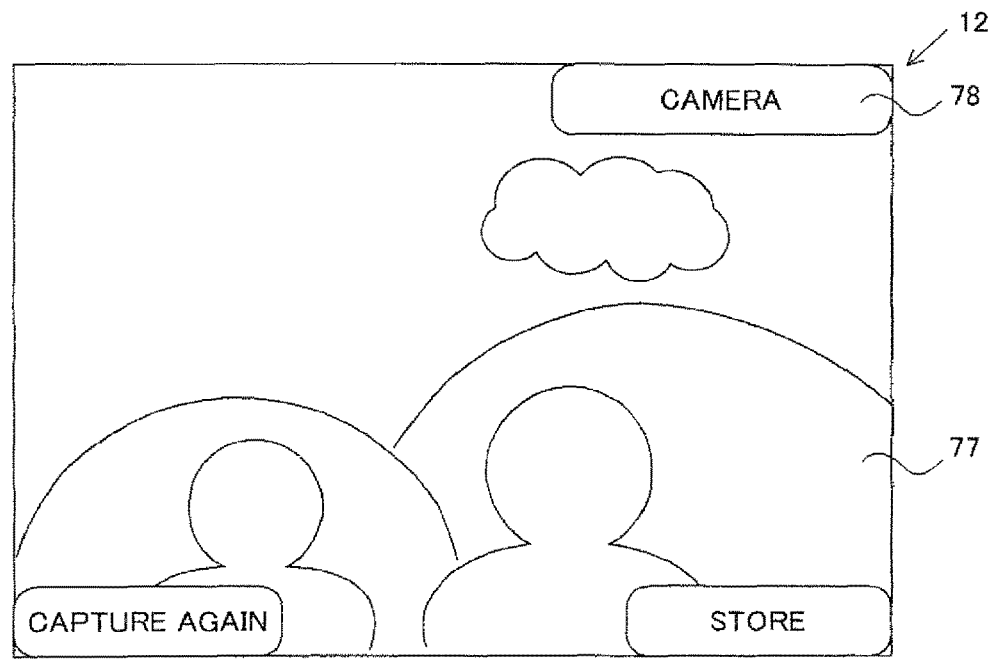

FIG.26
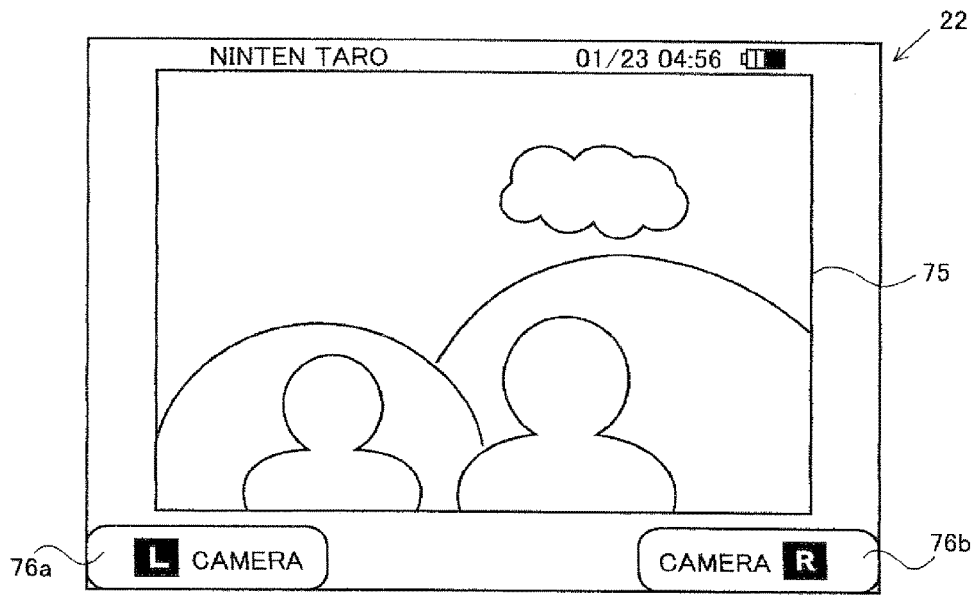
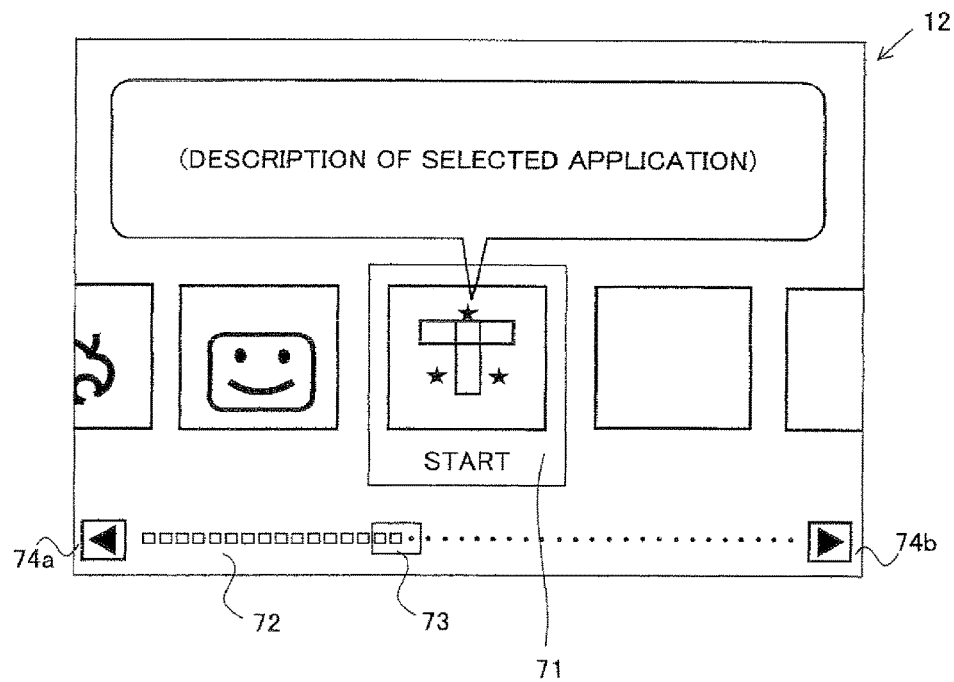

FIG.42
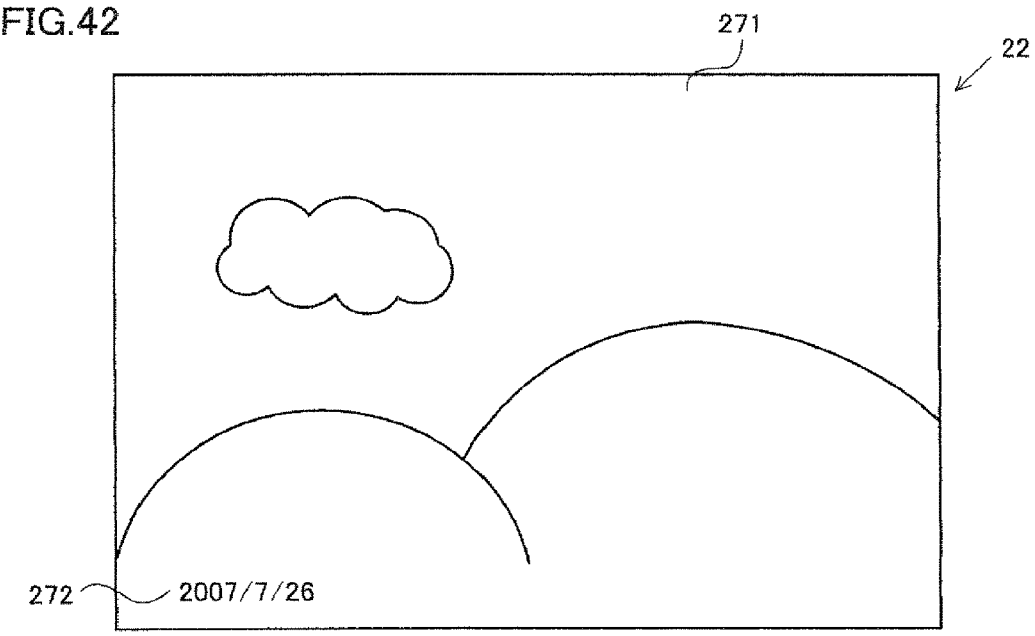
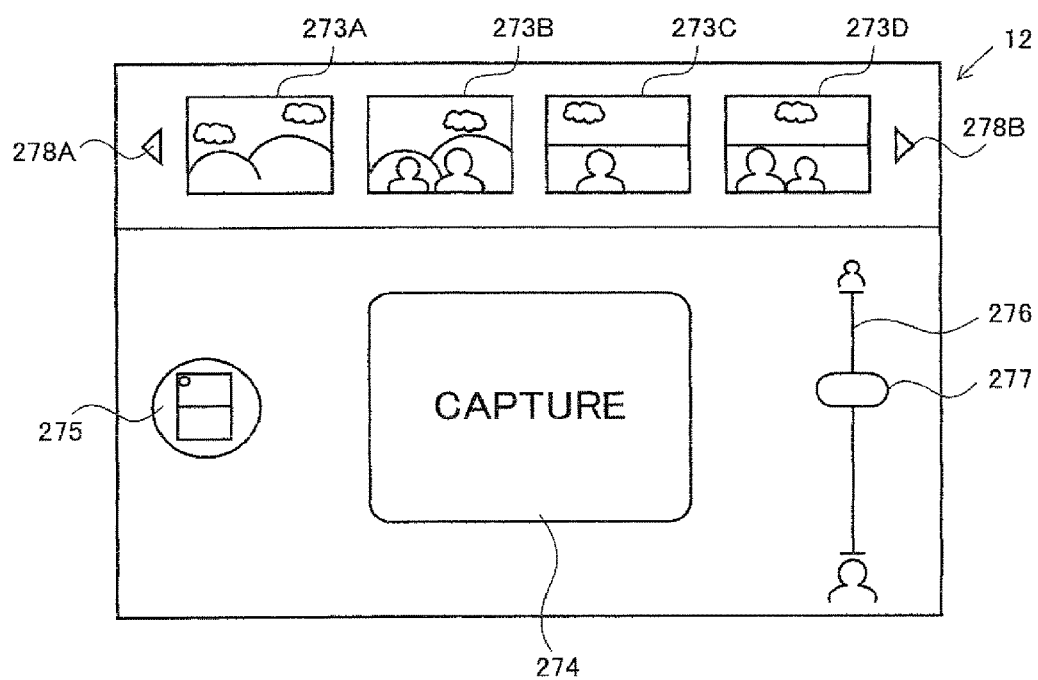

FIG.62
(a)
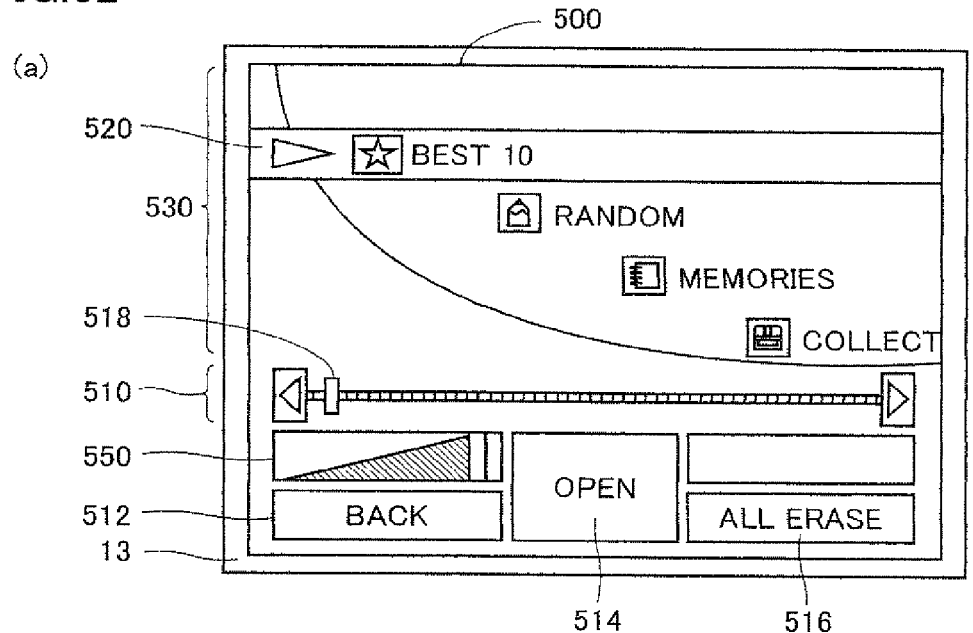
(b)
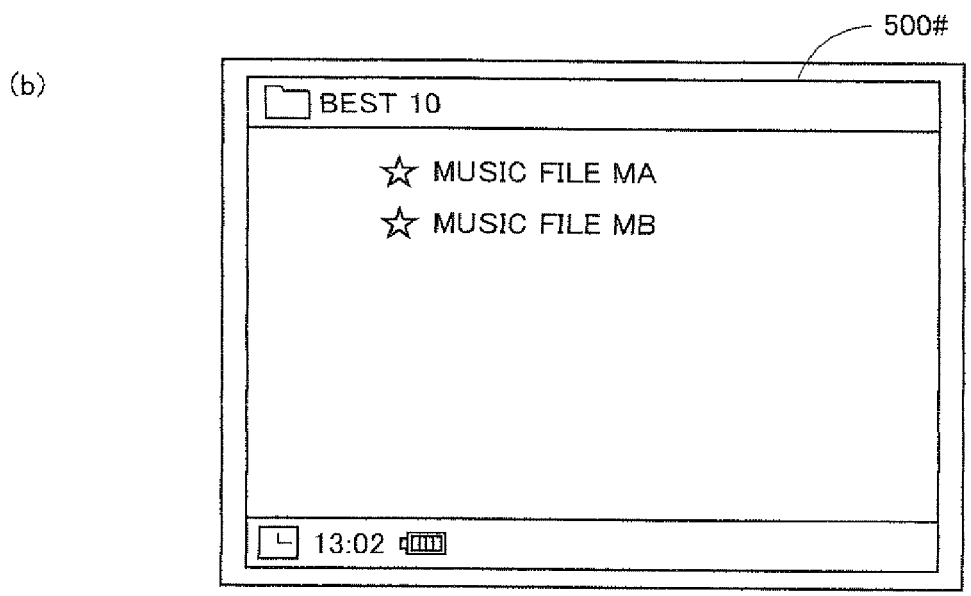

FIG.63
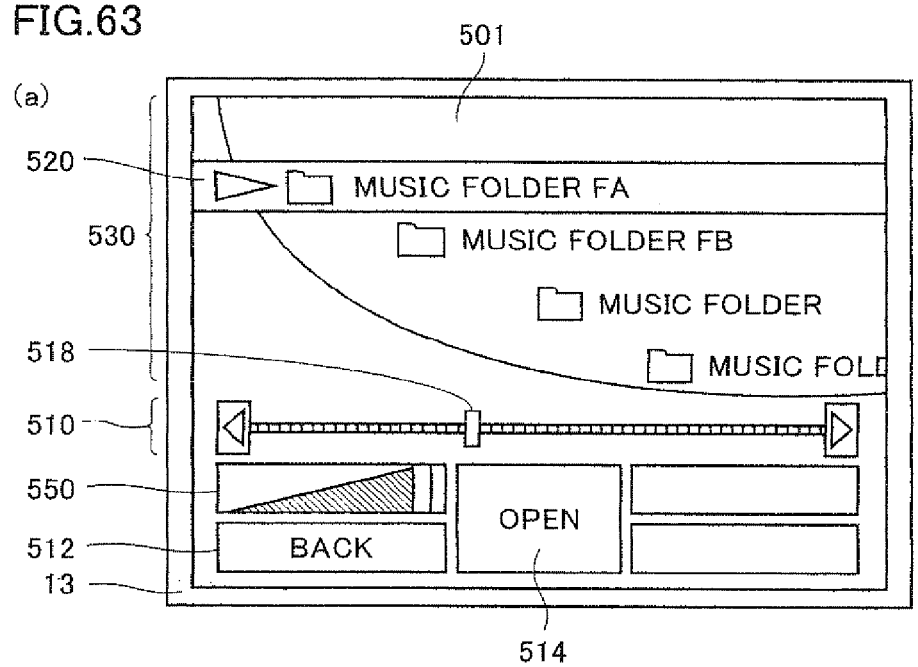
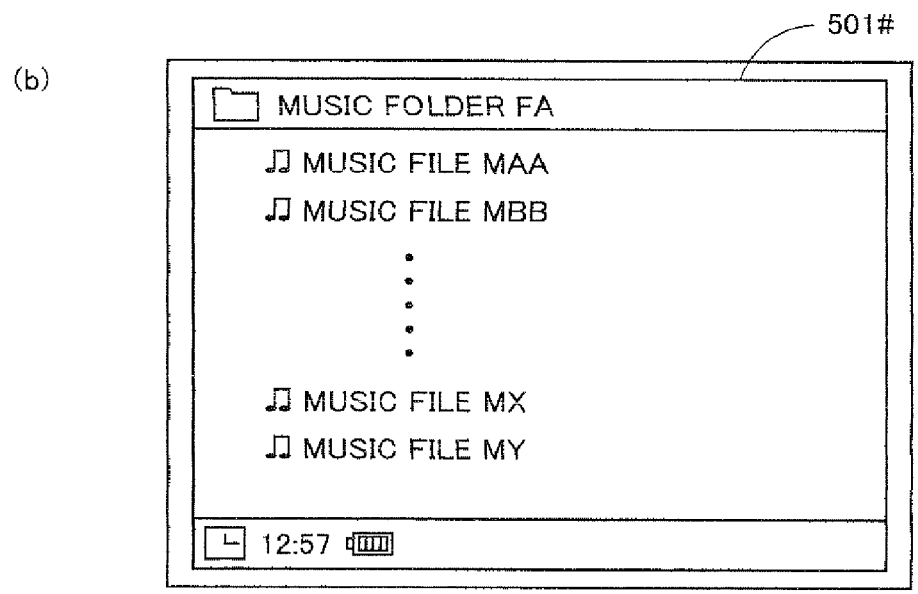

FIG.64
(a)
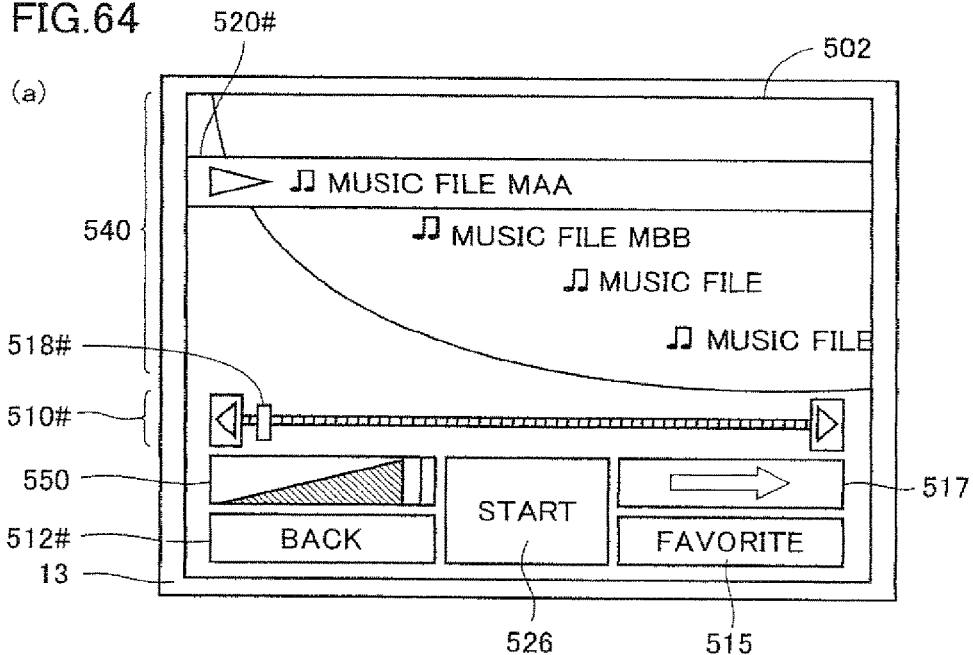
(b)
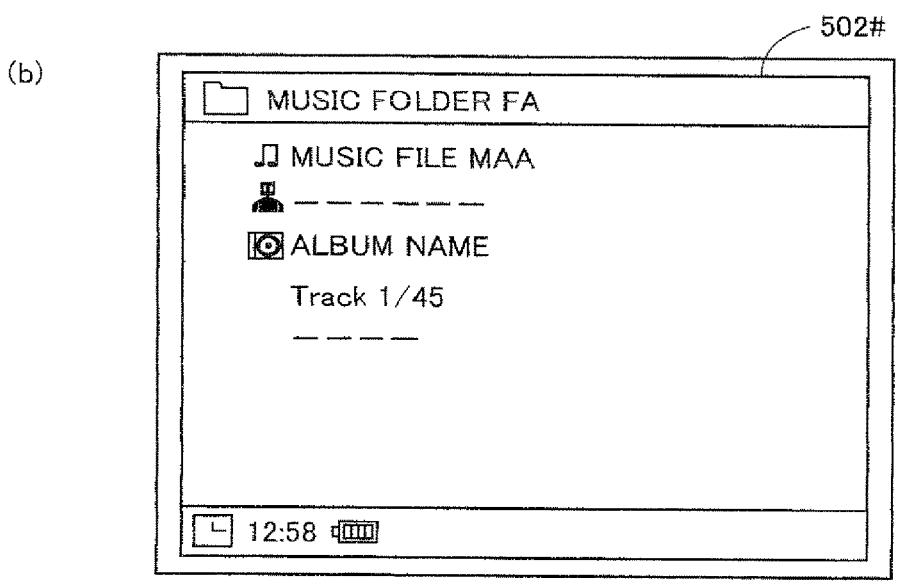

FIG.65
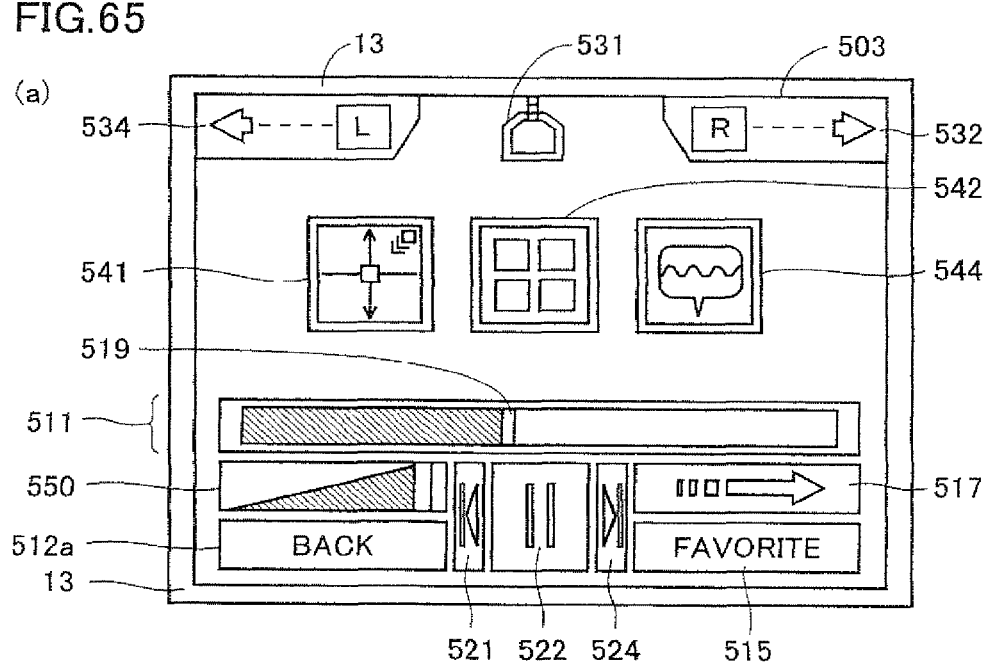
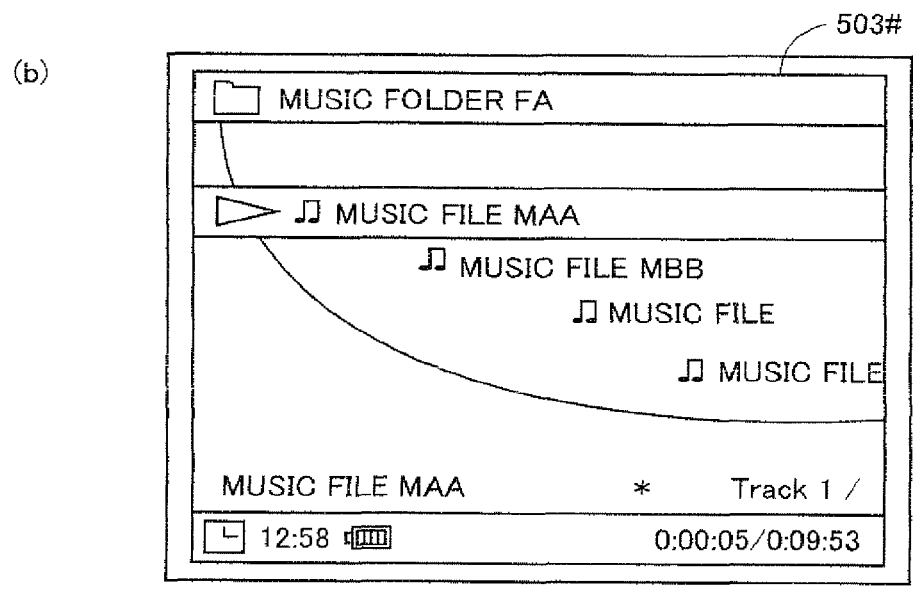

FIG.75
(a)
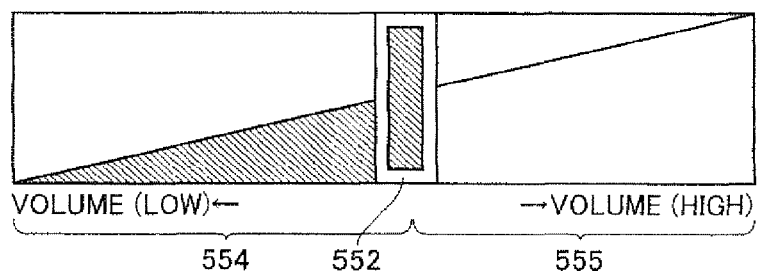
(b)
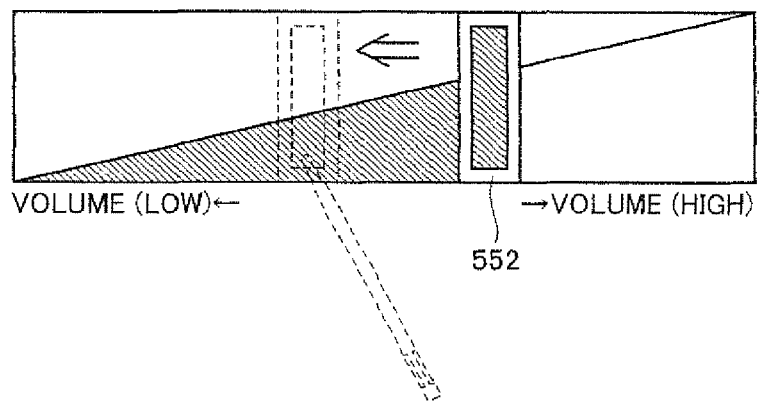

FIG.81
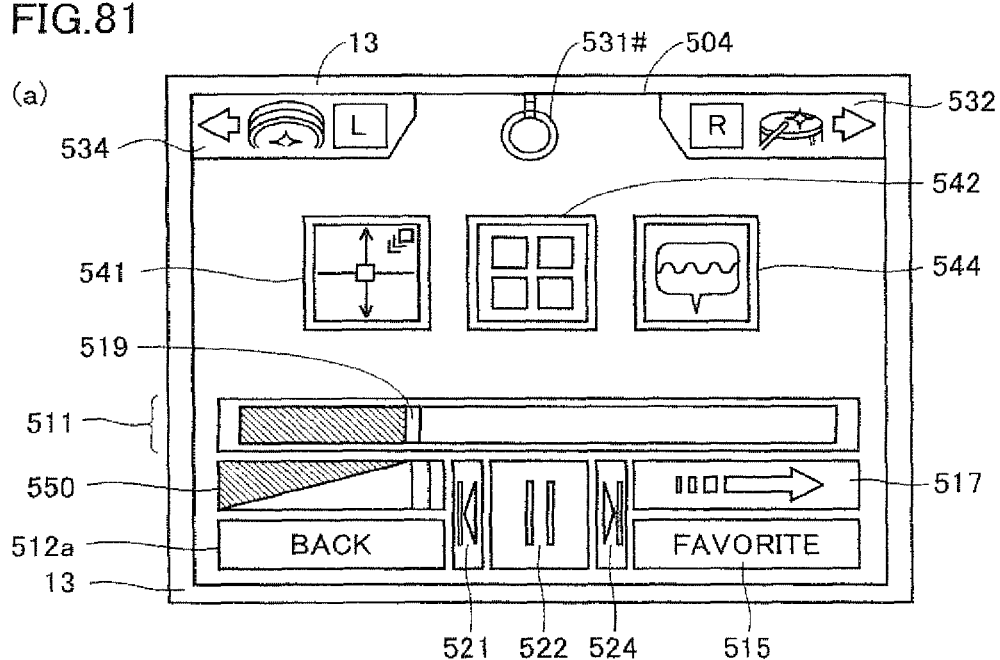
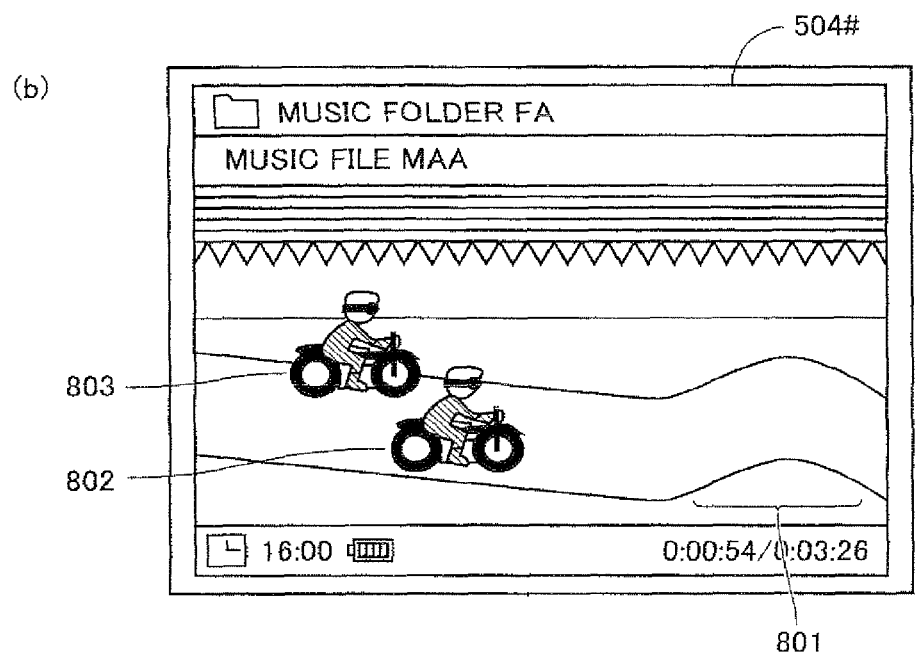

FIG.83
(a)
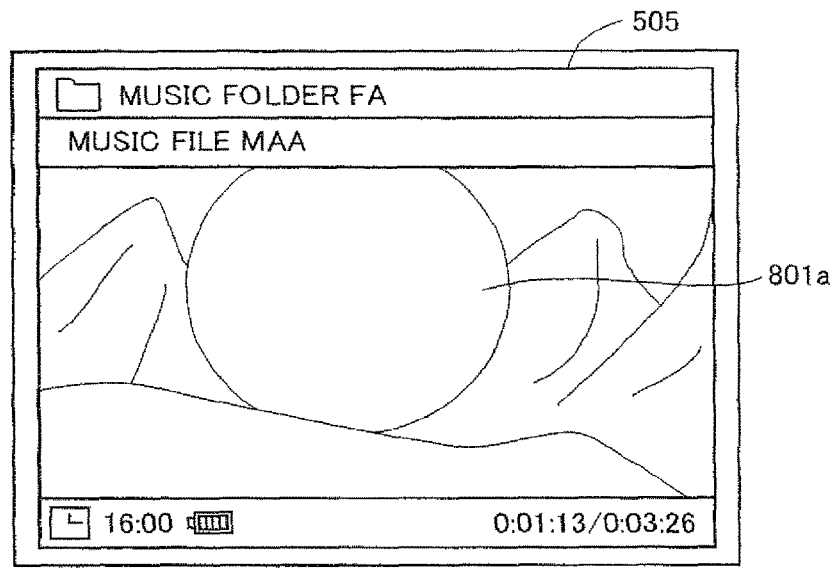
(b)
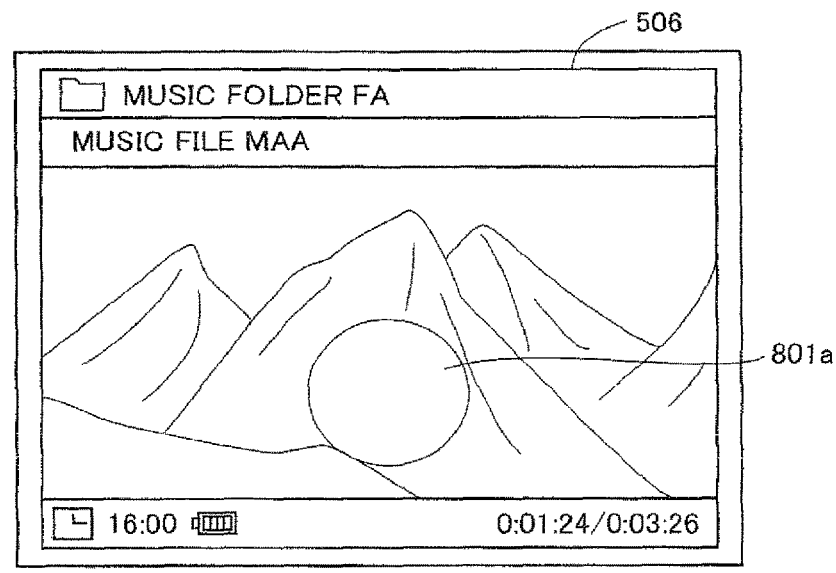

FIG.96
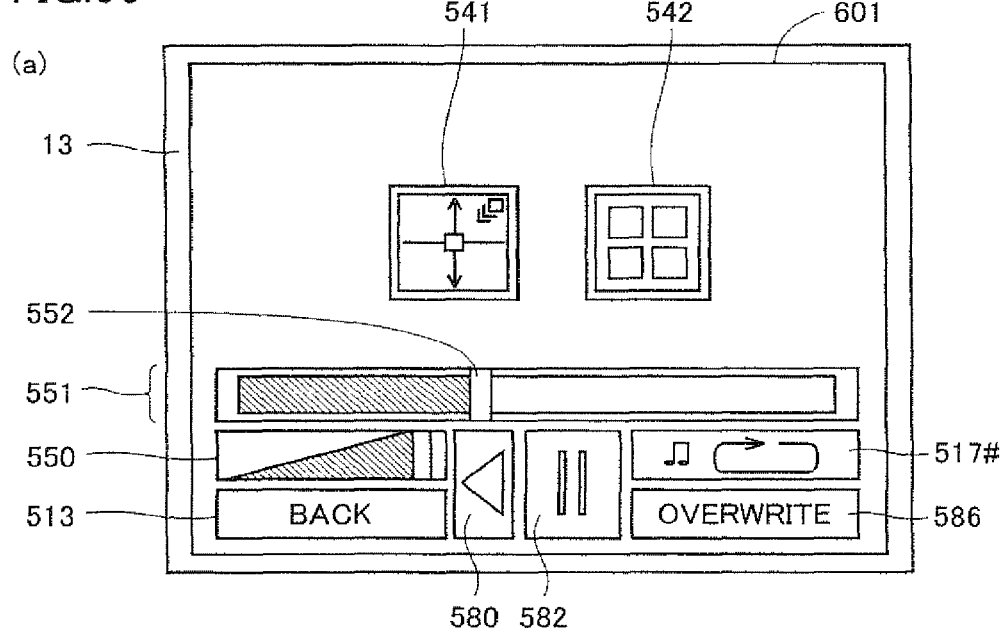
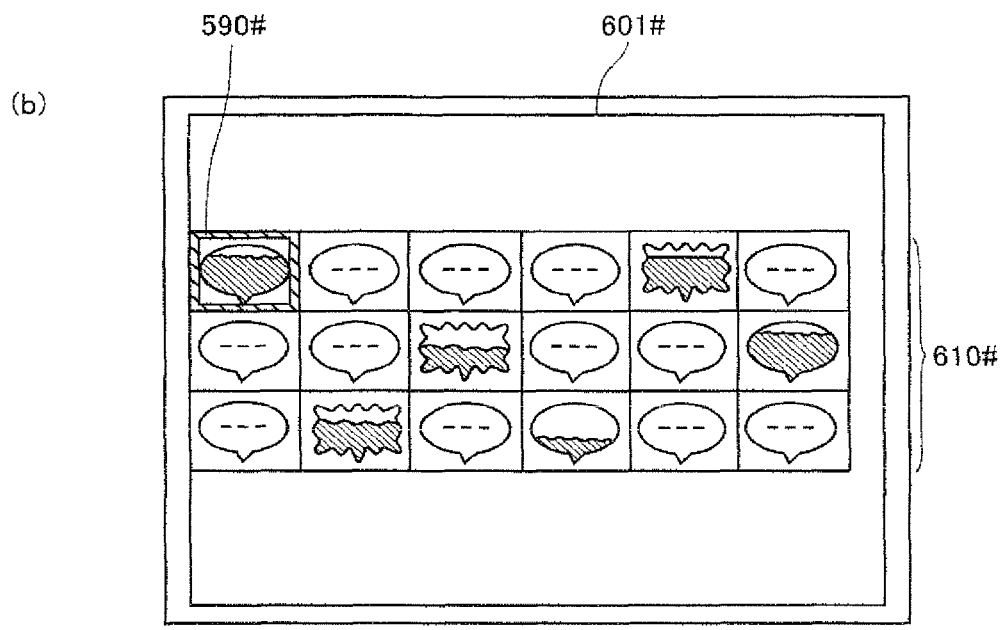

SYSTEM AND DEVICE FOR COMMUNICATING IMAGES

CROSS-REFERENCE TO RELATED APPLICATIONS

This application is a divisional of application Ser. No. 12/531,586, filed Sep. 16, 2009, now U.S. Pat. No. 8,848,100, which is the national phase of PCT/JP2008/067864, filed Oct. 1, 2008 and designating the United States. The contents of each of these applications are incorporated herein in their entirety.

TECHNICAL FIELD

The present invention relates to an information processing device, an information processing system, and a launch program and a storage medium storing the same. More particularly, the present invention relates to a configuration capable of providing a photographing function and/or a voice and sound obtaining function.

BACKGROUND AND SUMMARY

For example, Japanese Patent Laying-Open No. 2006-311224 (Patent Document 1) discloses a portable telephone as a prior portable information processing device having a photographing function. This portable telephone adopts foldable arrangement, in which a display screen is provided on an inner surface of each of two housings. In this portable phone, two cameras serving as image pick-up means are provided in an outer surface and an inner surface of an upper housing, respectively.

In addition, a portable instrument described in Japanese Patent Laying-Open No. 2004-274304 (Patent Document 2) has a camera and a microphone, in which a screen is provided on each of two surfaces of a housing (casing).

Moreover, for example, Japanese Patent Laying-Open No. 2007-195830 (Patent Document 3) also discloses an information processing device including two housings that are foldably connected to each other as a portable information processing device adopting foldable arrangement. This information processing device has a display screen on an inner surface of each housing (which is a surface located inside when the information processing device is folded) (two display screens in total).

Further, Japanese Patent Laying-Open No. 2001-142564 (Patent Document 4) discloses information equipment containing a camera. This information equipment includes a body unit and a display unit pivotably connected to each other by a hinge block. In this information equipment, the camera is arranged in the hinge block.

In addition, prior arts as listed below have been known.
Patent Document 1: Japanese Patent Laying-Open No. 2006-311224
Patent Document 2: Japanese Patent Laying-Open No. 2004-274304
Patent Document 3: Japanese Patent Laying-Open No. 2007-195830
Patent Document 4: Japanese Patent Laying-Open No. 2001-142564
Patent Document 5: Japanese Patent Laying-Open No. 04-156791
Patent Document 6: Japanese Patent Laying-Open No. 06-276478
Patent Document 7: Japanese Patent Laying-Open No. 01-297986
Patent Document 8: Japanese Patent Laying-Open No. 2002-125176
Patent Document 9: Japanese Patent Laying-Open No. 2004-320091
Patent Document 10: Japanese Patent Laying-Open No. 2003-333149
Patent Document 11: Japanese Patent Laying-Open No. 2005-184060
Patent Document 12: Japanese Patent Laying-Open No. 2007-201727
Patent Document 13: Japanese Patent Laying-Open No. 09-247634
Patent Document 14: Japanese Patent Laying-Open No. 10-341388
Patent Document 15: Japanese Patent Laying-Open No. 2000-56756
Non-Patent Document 1: "Chotto Shot Camera Instruction Manual," Sony Computer Entertainment Inc., Nov. 2, 2006

In the portable instruments disclosed in Japanese Patent Laying-Open No. 2006-311224 (Patent Document 1) and Japanese Patent Laying-Open No. 2004-274304 (Patent Document 2), however, the camera serving as the image pick-up means and the microphone serving as the audio input means have not been arranged at positions suitable for the photographing function and the voice and sound obtaining function, respectively.

In addition, the information processing device disclosed in Japanese Patent Laying-Open No. 2007-195830 (Patent Document 3) has not at all taken into account the photographing function, and the information equipment disclosed in Japanese Patent Laying-Open No. 2001-142564 (Patent Document 4) has not at all taken into account the voice and sound obtaining function.

Another problem is as follows. In a configuration to cause a computer to execute various programs, various storage media storing programs have been proposed. Here, none of the prior arts discloses or suggests a concept to execute in coordination a program stored in a storage medium embedded in a computer main body (information processing device) and a program stored in a storage medium attached to the computer.

Yet another problem is as follows. In a configuration to provide a user with a menu screen for selecting a program to be launched from among a plurality of application programs (what is called a launcher function), none of the prior arts discloses or suggests a concept to simultaneously provide a function other than the launcher function.

The present invention was made to solve at least one of these problems. A first object of the present invention is to provide an information processing device having a structure suitable for a photographing function and/or a voice and sound obtaining function. In addition, a second object of the present invention is to provide an information processing system capable of executing in coordination a program stored in a storage medium embedded in a main body and a program stored in an externally attached storage medium. Moreover, a third object of the present invention is to provide a launch program suitable for an information processing device having a photographing function, and a storage medium storing the program.

The present invention adopts the following features in order to solve the problems above. It is noted that reference characters, step numbers, supplementary explanations, and the like in parentheses in this section are merely provided to facilitate understanding of the present invention in relation to embodiments which will be described later, rather than limiting the scope of the present invention in any manner. According to one aspect of the present invention, an information processing device (10) constituted of a plurality of housings (11, 21) so that the device can be opened and closed is provided. The information processing device (10) includes: image pick-up means (23) and audio input means (21C, 42) provided in a coupling portion of the plurality of housings; storage means (34); image pick-up data obtaining means (31, SA50) for obtaining image pick-up data with the image pick-up means; image pick-up data storage control means (31, SA54) for causing the storage means to store the image pick-up data obtained by the data obtaining means; audio data obtaining means (31, SD171) for obtaining audio data through the audio input means; and audio data storage control means (33, SD173) for causing the storage means to store the audio data obtained by the audio data obtaining means.

Here, the image pick-up data includes a still image and a moving image. Moreover, arrangement allowing opening and closing includes not only a foldable type which will be described later but also a sliding type, a rotatable type, and a combination thereof. The information processing device in the subject application can be in various states between a state in which a prescribed surface of at least one housing is hidden by another housing and a state in which the prescribed surface thereof is exposed, as a result of folding, sliding, and rotation. In particular, in an example where a display portion is provided in the prescribed surface, the information processing device may be in various states between a display portion hidden state and a display portion exposed state, as a result of folding, sliding, and rotation.

According to this aspect, the image pick-up means (23) and the audio input means (21C, 42) are provided in the coupling portion of the plurality of housings (11, 21), so that they can maintain substantially the same positional relation without being affected by an angle between the housings. Thus, regardless of usage of the information processing device, relative positional relation of the image pick-up means (23) and the audio input means (21C, 42) with respect to the user is maintained substantially constant, and hence a photographing operation and/or a voice and sound obtaining operation can always be appropriate.

In addition, according to this aspect, as the image pick-up means (23) and the audio input means (21C, 42) are provided in the coupling portion, the user can also perform the photographing operation and/or the voice and sound obtaining operation by holding only any one of the plurality of housings (11, 21) with one hand, or perform the photographing operation and/or the voice and sound obtaining operation in a more stable manner by holding both housings (11, 21) with both hands. Thus, use adapted to a situation for photographing and/or obtaining voice and sound can be achieved.

Preferably, the information processing device (10) further includes image pick-up data reproduction means (31, SA41) for reproducing the image pick-up data stored in the storage means. Thus, the image pick-up data obtained as a result of photographing can immediately be checked.

Preferably, the information processing device (10) further includes image pick-up data edition means (31, SA58) for editing the image pick-up data stored in the storage means. Thus, the user can subject the image pick-up data obtained as a result of photographing to a desired edition operation for fun.

Preferably, the information processing device (10) further includes audio data reproduction means (31, SD76#) for reproducing the audio data stored in the storage means. Thus, the user can immediately check the obtained audio data.

Preferably, the information processing device (10) further includes audio data edition means (31, SD262) for editing the audio data stored in the storage means. Thus, the user can subject the obtained audio data to a desired edition operation for fun.

Preferably, the information processing device (10) further includes: near field communication means (38); image pick-up data transmission control means (31, SC52) for transmitting the image pick-up data stored in the storage means to another information processing device through the near field communication means; and image pick-up data reception control means (31, SC53) for receiving the image pick-up data from another information processing device through the near field communication means and causing the storage means to store the image pick-up data.

According to this preferred aspect, the image pick-up data obtained as a result of photographing can be exchanged among users having information processing devices of the same type. Thus, the same image pick-up data can be shared in a group for fun, or the image pick-up data obtained as a result of photographing can be distributed to another user for fun.

Preferably, the information processing device (10) further includes opening and closing detection means (50) for detecting opening and closing, and each time the opening and closing detection means detects opening and closing, the image pick-up data reproduction means has a picked-up image displayed based on different image pick-up data in the image pick-up data stored in the storage means (SA73). It is noted that the picked-up image is displayed on the display portion that can be in various states between the hidden state and the exposed state as a result of folding, sliding, and rotation.

According to this preferred aspect, each time the information processing device is opened and closed, displayed image pick-up data is varied, so that the user can look forward to an image displayed at the time when he/she opens the information processing device.

Preferably, the storage means further stores an image pick-up data obtaining program (53) causing a computer representing the information processing device to function as the image pick-up data obtaining means and the image pick-up data storage control means, and an audio data obtaining program (57) causing the computer representing the information processing device to function as the audio data obtaining means and the audio data storage control means. The information processing device (10) further includes launch control means (31, SA5 to SA13) for selecting any of at least the image pick-up data obtaining program and the audio data obtaining program and launching the selected program when the information processing device is started up, and the launch control means has a function (31, SA10) to obtain the image pick-up data with the image pick-up means and cause the storage means to store the image-pick-up data.

According to this preferred aspect, in an environment where execution of at least the image pick-up data obtaining program (53) and the audio data obtaining program (57) is permitted, the user can readily select and execute a desired program by using launch control means (31, SA5 to SA13).

In addition, according to this preferred aspect, while the photographing function by photographing processing means is performed, the image pick-up data obtaining program (53) can directly be launched. Namely, as the photographing function provided by the image pick-up data obtaining program (53) can readily be launched from the photographing function provided by the photographing processing means, a user who has experienced the photographing function provided by the photographing processing means can be led to perform the photographing function provided by the image pick-up data obtaining program (53).

Preferably, the information processing device (10) further includes first operation means (14I, 14J) provided on an upper surface of one housing out of the plurality of housings, on a side where another housing out of the plurality of housings is located when the information processing device is opened, and the image pick-up data recording means obtains the image pick-up data with the image pick-up means and causes the storage means to store the image pick-up data when the first operation means is operated.

According to this preferred aspect, the user can perform an operation to obtain image pick-up data by operating the first operation means (14I, 14J) with his/her hand holding the information processing device. Namely, as the user can perform the operation to obtain image pick-up data while he/she holds the information processing device, the user can readily perform the photographing operation. Therefore, arrangement more suitable for a portable information processing device can be provided.

Preferably, the image pick-up means and the audio input means are provided around a center of the coupling portion. Thus, relative positional relation between the information processing device and the user can substantially be the same in an example where the user holds the information processing device only with his/her right hand and in an example where the user holds the information processing device only with his/her left hand.

Further preferably, the image pick-up means is provided in the center of the coupling portion and the audio input means is provided at a position offset from the center of the coupling portion. A range of image pick-up by the image pick-up means is determined depending on a location thereof, whereas a range of sound collection by the audio input means is relatively great. Therefore, by preferentially providing the image pick-up means in the center of the coupling portion, photographing in a more appropriate condition can be carried out.

Preferably, the information processing device (10) further includes display means (12, 22) provided in each housing. Thus, an image or the like picked up by the image pick-up means can also be displayed.

Preferably, the housing is a horizontally long housing. By adopting the horizontally long housing, arrangement is suitable for user's eye movement.

Preferably, the information processing device (10) further includes first and second operation means (14A to 14E) arranged on left and right of the display means respectively in one housing out of the plurality of housings, and first and second audio output means (21D, 45, 47) arranged on left and right of the display means respectively in another housing out of the plurality of housings.

According to this preferred aspect, voice and sound or the like obtained by the voice and sound obtaining means can be output.

Preferably, the information processing device (10) further includes connection means (36, 37) for removably attaching a memory card (28, 29). Thus, the memory card in which various types of programs, image pick-up data, or audio data have been stored can freely be attached, so that the information processing device can display or reproduce the data or arbitrarily store the obtained image pick-up data or audio data. Consequently, a degree of freedom and applications of the information processing device can remarkably be enhanced.

Further preferably, the image pick-up data storage control means can have the image pick-up data selectively stored in the storage means and the memory card.

Alternatively, further preferably, the audio data storage control means can have the audio data selectively stored in the storage means and the memory card.

According to these features, as the image pick-up data and/or the audio data can be stored in any storage medium depending on the number of pieces, a type, a size, and the like thereof, a degree of freedom for the user can be enhanced. In addition, the memory card stores the image pick-up data and/or the audio data, so that the image pick-up data and/or the audio data can also be output to a device different from the information processing device.

Preferably, the information processing device further includes embedded storage means storing a program for causing a computer representing the information processing device to function as the image pick-up data obtaining means and the image pick-up data storage control means, so that the computer representing the information processing device can execute the program. Thus, the information processing device alone can provide the user with the photographing function without external attachment of a memory or the like.

Further preferably, the information processing device reads an application program stored in the memory card, so that a computer representing the information processing device can execute the application program. Thus, the information processing device can selectively execute a wide variety of application programs regardless of a limited capacity of the embedded storage means.

An information processing system according to another aspect of the present invention includes: the information processing device above; and the memory card storing as the application program, a program for causing the computer representing the information processing device to function as the image pick-up data obtaining means and the image pick-up data storage control means, in which data can be written, and the image pick-up data storage control means can have the image pick-up data selectively stored in any of the storage means and the memory card.

According to the information processing system according to this aspect, as the user can have the image pick-up data selectively stored in the embedded storage means and an externally attached memory card, a storage medium in accordance with a situation can be used.

An information processing system according to yet another aspect of the present invention includes: the information processing device above; and the memory card storing as the application program, a program for causing the computer representing the information processing device to function as image pick-up data utilization processing means for utilizing the image pick-up data stored in the storage means.

An information processing system according to yet another aspect of the present invention includes: the information processing device above; and the memory card storing as the application program, a program for causing the computer representing the information processing device to function as image pick-up data utilization processing means for utilizing the image pick-up data stored in the storage means and the memory card.

An information processing system according to yet another aspect of the present invention includes: the information processing device above; and the memory card storing as the application program, a program for causing the computer representing the information processing device to function as the audio data obtaining means and the audio data storage control means, in which data can be written, and the audio data storage control means can have the audio data selectively stored in any of the storage means and the memory card.

According to the information processing system according to this aspect, as the user can have the audio data selectively stored in the embedded storage means and an externally attached memory card, a storage medium in accordance with a situation can be used.

An information processing system according to yet another aspect of the present invention includes: the information processing device above; and the memory card storing as the application program, a program for causing the computer representing the information processing device to function as audio data utilization processing means for utilizing the audio data stored in the storage means.

An information processing system according to yet another aspect of the present invention includes: the information processing device above; and the memory card storing as the application program, a program for causing a computer representing the information processing device to function as audio data utilization processing means for utilizing the audio data stored in the storage means and the memory card.

The information processing device (10) above preferably includes a plurality of connection means for removably attaching a memory card. Thus, a plurality of memory cards of various types can simultaneously be attached, so that the user can select a desired program from among more application programs and execute the selected program.

Further preferably, the connection means includes first connection means for removably attaching a memory card (28) complying with universal specifications and second connection means for removably attaching a memory card (29) complying with dedicated specifications.

According to this preferred aspect, the user can readily exchange image pick-up data and/or audio data with another user through a memory card complying with the universal specifications, or readily transfer the data to another device. On the other hand, an unauthorized operation can be prevented by storing various types of application programs in a memory card complying with the dedicated specifications. In addition, the memory card complying with the dedicated specifications stores image pick-up data and/or audio data, so that information specific to the information device according to the present invention can together be stored and various types of effects or information can also be displayed.

Further preferably, the image pick-up data storage control means can have the image pick-up data selectively stored in the storage means, the memory card complying with the universal specifications, and the memory card complying with the dedicated specifications.

In addition, further preferably, the audio data storage control means can have the audio data selectively stored in the storage means, the memory card complying with the universal specifications, and the memory card complying with the dedicated specifications.

According to these preferred aspects, the user can have the obtained image pick-up data and/or audio data stored in a more appropriate memory card, depending on contents thereof or the like. In addition, efficiency in organization or the like of the image pick-up data and/or the audio data can also be improved.

In addition, further preferably, reading and execution of an application program stored in the memory card complying with the dedicated specifications by the computer representing the information processing device is permitted, while reading and execution of an application program stored in the memory card complying with the universal specifications by the computer representing the information processing device is prohibited. Thus, a problem caused by execution of an unauthorized application program or the like stored in a memory card complying with the universal specifications can be avoided.

An information processing system according to yet another aspect of the present invention includes: the information processing device above; and the memory card complying with the dedicated specifications, for storing as the application program, a program for causing the computer representing the information processing device to function as second image pick-up data obtaining means and second image pick-up data storage control means, and the second image pick-up data storage control means can have the image pick-up data selectively stored in at least one of the storage means, the memory card complying with the universal specifications, and the memory card complying with the dedicated specifications.

An information processing system according to yet another aspect of the present invention includes: the information processing device above; and the memory card complying with the dedicated specifications, for storing as the application program, a program for causing the computer representing the information processing device to function as second audio data obtaining means and second audio data storage control means, and the second audio data storage control means can have the audio data selectively stored in at least one of the storage means, the memory card complying with the universal specifications, and the memory card complying with the dedicated specifications.

According to these aspects, as the user can have image pick-up data and/or audio data selectively stored in the embedded storage means and the externally attached memory card complying with the universal specifications and memory card complying with the dedicated specifications, a storage medium can be used in accordance with a situation.

An information processing system according to yet another aspect of the present invention includes: the information processing device above; and the memory card complying with the dedicated specifications, for storing as the application program, a program for causing the computer representing the information processing device to function as image pick-up data utilization processing means for utilizing the image pick-up data stored in the storage means, the memory card complying with the universal specifications, and the memory card complying with the dedicated specifications.

An information processing system according to yet another aspect of the present invention includes: a memory card (28, 29); and an information processing device (10) capable of reading an application program stored in the memory card and performing processing. The information processing device (10) includes image pick-up means (23), embedded storage means (34), connection means (36, 37) for removably attaching the memory card, and embedded program storage means (901 to 908). The embedded program storage means stores a program for causing a computer representing the information processing device to function as first image pick-up data obtaining means for obtaining image pick-up data with the image pick-up means, and first image pick-up data storage control means for causing the embedded storage means to store the image pick-up data obtained by the image pick-up data obtaining means. The memory card stores as the application program, a program for causing the computer representing the information processing device to function as second image pick-up data obtaining means for obtaining image pick-up data with the image pick-up means, and second image pick-up data storage control means for causing the embedded storage means to store the image pick-up data obtained by the image pick-up data obtaining means.

An information processing system according to yet another aspect of the present invention includes: a memory card (28, 29); and an information processing device capable of reading an application program stored in the memory card and performing processing. The information processing device (10) includes image pick-up means (23), embedded storage means (34), connection means (36, 37) for removably attaching the memory card, and embedded program storage means (901 to 908). The embedded program storage means stores a program for causing a computer representing the information processing device to function as first image pick-up data obtaining means for obtaining image pick-up data with the image pick-up means, and first image pick-up data storage control means for causing the embedded storage means to store the image pick-up data obtained by the image pick-up data obtaining means. The memory card stores as the application program, a program for causing the computer representing the information processing device to function as image pick-up data utilization processing means for utilizing the image pick-up data stored in the embedded storage means.

According to yet another aspect of the present invention, a launch program (51) executed by a computer representing an information processing device (10) having image pick-up means (23) and capable of storing a plurality of application programs, for selectively launching an application program desired by a user from among the plurality of application programs is provided. The launch program (51) causes the computer to function as: first launch operation acceptance means (SA6, SA11) for accepting a first launch operation for selectively launching the plurality of application programs; first launch means (SA12) for reading, when the first launch operation is performed, an application program selected in the first launch operation from among the plurality of application programs into prescribed storage means for storing a program to be executed by the computer and launching that application program; and photographing processing means (SA10) for performing photographing processing for storing an image picked up by the image pick-up means in storage means in accordance with a prescribed photographing operation.

According to this aspect, the user can select an application program to be executed from among the plurality of application programs by performing the first launch operation and also can obtain a picked-up image from photographing means by performing a prescribed photographing operation. Therefore, the user can readily and quickly use the photographing function even in a state prior to launch of an application program. In addition, the photographing processing means can be launched while the photographing function provided by the launch program is being performed.

Preferably, the photographing processing means has a photographing function to store the image picked up by the image pick-up means in the storage means but does not have a function to edit the image taken by using the photographing function.

Preferably, the photographing processing means has a photographing function to store the image picked up by the image pick-up means in the storage means but does not have a function to arbitrarily view an image from among images taken by using the photographing function.

According to these aspects, as the function to edit and/or view an image is not provided by the photographing processing means provided by the launch program, the user will desire use of a photographing application program having these functions. Consequently, the user can be led to use the photographing application program from the photographing processing means.

Preferably, the information processing device (10) stores as the application program, a photographing application program (53) having a photographing function to store an image picked up by the image pick-up means in the storage means. Thus, the user will desire use of a more advanced photographing application program, and the user can be led to use the photographing application program.

Further preferably, the photographing application program further has a function to edit a taken image.

Preferably, the photographing application program further has a function to arbitrarily view an image from among taken images.

Preferably, the photographing application program causes the storage means to store a taken image.

Preferably, the launch program allows exchange of a taken image stored in the storage means with another information processing device.

Preferably, the photographing application program causes the storage means to store a taken image in accordance with the photographing operation.

Preferably, a taken image stored in the storage means is displayed together with an image for selectively launching the plurality of application programs (SA5).

Preferably, after a launched application program ends, a taken image different from a previously displayed image among taken images stored in the storage means is displayed (SA28) together with the image for selectively launching the plurality of application programs as a result of execution of the launch program.

According to these aspects, as the photographing application program can provide the user with a more sophisticated function than the photographing processing means provided by the launch program, appeal of the photographing application program can be enhanced.

According to yet another aspect of the present invention, a storage medium storing the launch program described in any paragraph above is provided.

According to the present invention, an information processing device having a structure suitable for a photographing function and/or a voice and sound obtaining function can be provided. In addition, an information processing system capable of executing in coordination a program stored in a storage medium embedded in a main body and a program stored in an externally attached storage medium can be provided. Moreover, a launch program suitable for an information processing device having a photographing function and a storage medium storing the program can be provided.

BRIEF DESCRIPTION OF THE DRAWINGS

FIG. 4 is a diagram for illustrating an operation of a volume button of the game device according to the present embodiment.

FIG. 23 is a diagram showing an example of a menu screen in the launcher processing in the game device according to the present embodiment.

FIG. 25 is a diagram showing an example of an image displayed after a photographing operation in the flowchart shown in FIG. 22 is performed.

FIG. 26 is a diagram showing an example of an image displayed after simplified photographing processing in the flowchart shown in FIG. 21 is performed.

FIG. 42 is a diagram showing an example of an image displayed in display processing shown in FIG. 41.

FIG. 62 is a diagram illustrating a music reproduction folder list selection screen according to the present embodiment.

FIG. 63 is a diagram illustrating another music reproduction folder list selection screen according to the present embodiment.

FIG. 64 is a diagram illustrating a music file selection screen according to the present embodiment.

FIG. 65 is a diagram illustrating a reproduction operation selection screen according to the present embodiment.

FIG. 75 is an enlarged view of a volume setting icon.

FIG. 81 is a diagram illustrating visualizer display processing according to the present embodiment.

FIG. 83 is a diagram illustrating another visualizer display screen.

FIG. 96 is a diagram illustrating a recording data reproduction operation selection screen.

Figure 1:
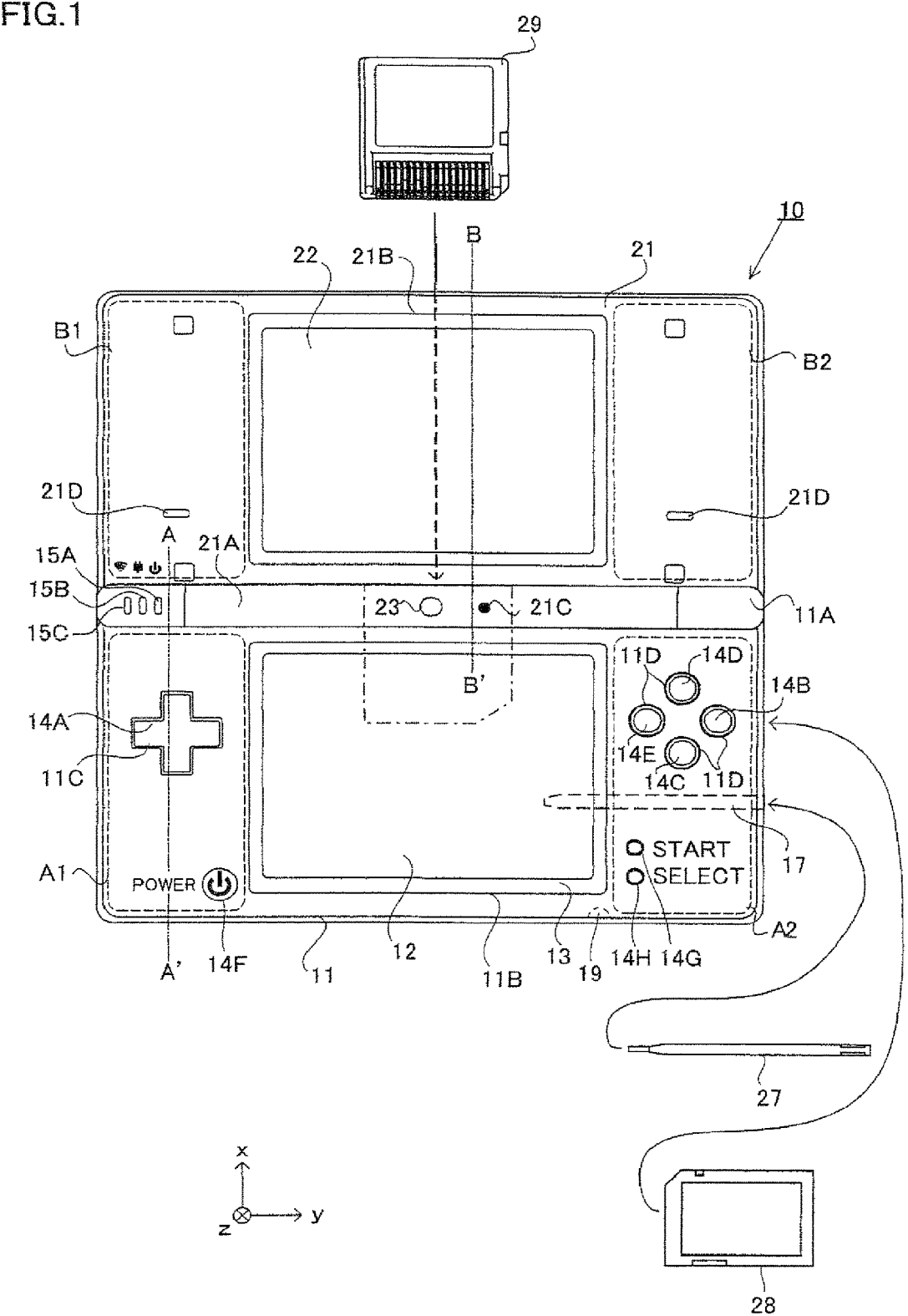
FIG. 1 is a plan view showing appearance of an image pick-up device according to the present embodiment.

DESCRIPTION OF THE REFERENCE SIGNS 10 game device; 11 lower housing; 12 lower LCD; 13 touch panel; 21 upper housing; 22 upper LCD; 23 inner camera; and 25 outer camera.

DETAILED DESCRIPTION OF EXAMPLE EMBODIMENTS

An embodiment of the present invention will be described in detail with reference to the drawings. It is noted that the same or corresponding elements in the drawings have the same reference characters allotted and description thereof will not be repeated.

[1. Overview]

A portable game device 10 according to one embodiment of the present invention will be described hereinafter.

Game device 10 according to the present embodiment has image pick-up means (camera), and functions also as an image pick-up device. Representatively, game device 10 can pick up an image of a subject with the image pick-up means, display the image obtained as a result of image pick-up on a screen, store data of the picked-up image, and transmit to and receive from another device data of the picked-up image.

In addition, game device 10 according to the present embodiment is typically provided as a computer including operation means such as a CPU and a memory, and it can execute various application programs relating to image processing or information processing. By executing such a program, game device 10 also functions as an image processing device or an information processing device. Naturally, game device 10 according to the present embodiment can also execute various game programs.

Namely, though any computer system may execute the program according to the present invention, a configuration in which game device 10 executes the program according to the present invention will be illustrated in the present embodiment. It is noted that functions provided by the program according to the present invention may be implemented by a hardware circuit in a part or in its entirety.

[2. Definition of Terms]

Obtaining image data from the image pick-up means (camera) is herein referred to as "image pick-up," and storage of picked-up image data is referred to as "photographing".

[3. Appearance]

<Overall Appearance>

Figure 2:
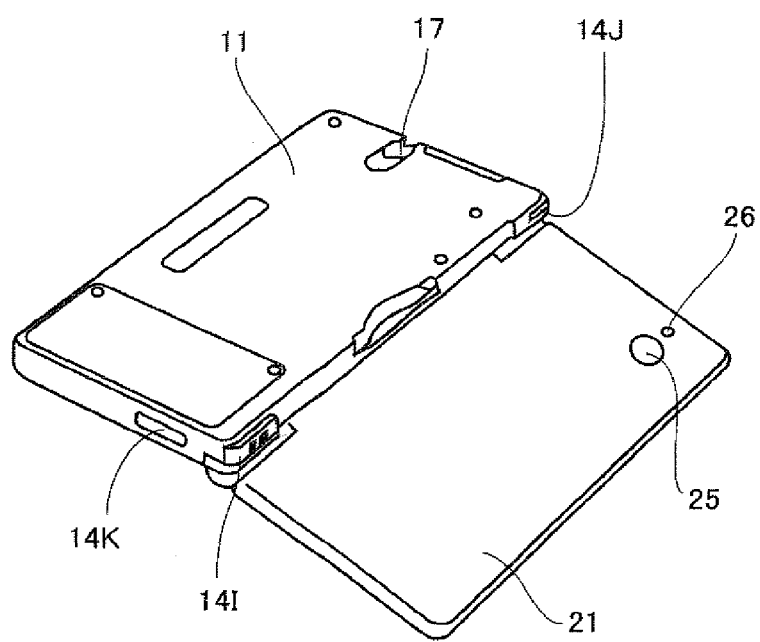
FIG. 2 is a perspective view showing a back side of a game device according to the present embodiment.

FIG. 1 is a plan view showing appearance of game device 10 according to the present embodiment, and FIG. 2 is a perspective view showing a back surface side of game device 10 according to the present embodiment.

Referring to FIGS. 1 and 2, game device 10 according to the present embodiment is representatively a foldable portable game device. FIG. 1 shows a state where game device 10 is opened (opened state). Normally, a user uses game device 10 in the opened state and the user stores game device 10 in a closed state when he/she does not use game device 10. Therefore, game device 10 is preferably configured to have such a size as being held by the user with both hands or one hand, even when game device 10 is opened.

As shown in FIGS. 1 and 2, game device 10 includes two housings of a lower housing 11 and an upper housing 21. Lower housing 11 and upper housing 21 are connected to each other so that the game device can be opened or closed (foldable). In other words, shaft portions 11A shown in FIG. 1 are provided at opposing ends of an upper side (a side on a positive side of an x-axis shown in the drawing) of lower housing 11 in a left-right direction (in a y direction shown in the drawing) (shaft portions 11A are structurally integral with lower housing 11). Further, a shaft portion 21A shown in FIG. 1 is provided in a central portion of a lower side (a side on a negative side of the x-axis shown in the drawing) of upper housing 21 in the left-right direction (in the y direction shown in the drawing) (shaft portion 21A is structurally integral with upper housing 21). Shaft portions 11A and shaft portion 21A are connected to each other by a hinge provided therein in a manner pivotable about an axis in the left-right direction. Thus, lower housing 11 and upper housing 21 are connected to each other in a manner pivotable about the axis in the left-right direction.

In the present embodiment, housings 11 and 21 each have a horizontally long shape (namely, a dimension of each housing in a lateral direction is greater than that in a vertical direction) and typically have a rectangular shape. Further, housings 11 and 21 each have a plate-like shape (namely, a length in a thickness direction is shorter than those in vertical and lateral directions). Further, upper housing 21 and lower housing 11 each have a thin plate-like shape. Preferably, upper housing 21 is smaller in thickness than lower housing 11. Lower housing 11 and upper housing 21 are pivotably connected to each other at long sides thereof.

In an alternative embodiment, game device 10 may be formed of one housing, instead of a foldable type.

As shown in FIG. 1, game device 10 includes two display devices of an upper LCD (Liquid Crystal Display) 22 and a lower LCD 12. Upper LCD 22 is disposed in an inner surface of upper housing 21 (which is a surface located on the inside of game device 10 in a closed state) and lower LCD 12 is disposed in an inner surface of lower housing 11.

Though an LCD is used as a display device in the present embodiment, any other display devices such as a display device using EL (Electro Luminescence) may be used. In addition, game device 10 can include a display device of any resolution. Though a case where game device 10 includes two display devices is described by way of example in the present embodiment, in an alternative embodiment, the number of display devices in the game device is not particularly limited.

<Lower Housing>

A configuration provided in lower housing 11 of game device 10 will now be described.

As described above, game device 10 includes lower LCD 12. Lower LCD 12 has a horizontally long shape, and is arranged such that a long side direction thereof corresponds to a long side direction of lower housing 11. In addition, lower LCD 12 is accommodated in lower housing 11. Further, lower LCD 12 is provided in the inner surface of lower housing 11. Thus, by closing game device 10 when it is not used, a screen of lower LCD 12 can be prevented from getting dirty and being damaged.

The inner surface of lower housing 11 is formed to be substantially planar. At a center of the inner surface of lower housing 11, an opening 11B is formed for exposing lower LCD 12. On the left side of opening 11B (on the negative side of the y-axis shown in the drawing), an opening 11C is formed, and on the right side of opening 11B, openings 11D are formed. Openings 11C and 11D are for exposing key tops (upper surfaces of buttons 14A to 14E). The screen of lower LCD 12 accommodated in lower housing 11 is exposed through opening 11B and the key tops are exposed through openings 11C and 11D.

Thus, in the inner surface of lower housing 11, non-screen areas (dotted-line areas A1 and A2 shown in FIG. 1, specifically, areas for arranging buttons 14A to 14D; button arrangement areas) are provided on opposing sides of opening 11B provided at the center of the inner surface of lower housing 11 for lower LCD 12. Each of the button arrangement areas is designed to have a dimension of 15 mm or more (preferably 20 mm or more, more preferably 30 to 40 mm) in the lateral direction (in the y direction shown in the drawing).

Buttons 14A to 14K and a touch panel 13 are provided as an input device in lower housing 11. As shown in FIG. 1, among buttons 14A to 14K, a direction input button 14A, a button 14B, a button 14C, a button 14D, a button 14E, a power button 14F, a start button 14G, and a select button 14H are provided on the inner surface of lower housing 11. Here, the inner surface means the inner side when upper housing 21 and lower housing 11 are folded.

Direction input button 14A is used, for example, for a selection operation, and buttons 14B to 14E, start button 14G, and select button 14H are used, for example, for an enter operation or a cancel operation. Power button 14F is used for turning on/off the power of game device 10.

Figure 16:
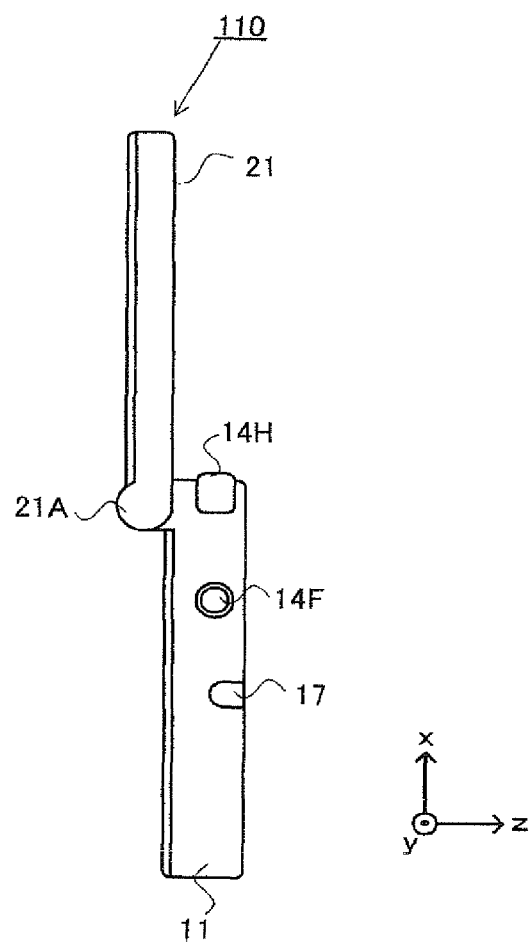
FIG. 16 is a side view in a state where the game device according to the variation of the present embodiment is opened (in an unfolded state).

In the present embodiment, direction input button 14A and power button 14F are provided on one side (left side in FIG. 1) of lower LCD 12 provided around the center of lower housing 11, and buttons 14B to 14E are provided on the other side (right side in FIG. 1) of lower LCD 12. As shown in FIGS. 16 and 17(c), power button 14F may be provided on a right side surface of lower housing 11.

Direction input button 14A has a cross shape, and is about 20 mm in length and width. Direction input button 14A is provided such that a center thereof is located in a position distant from the left end of lower housing 11 by about 20 mm and from the lower end of lower housing 11 by about 40 mm.

Power button 14F has a circular shape, and is provided such that a center thereof is located in a position distant from the left end of lower housing 11 by about 25 mm and from the lower end of lower housing 11 by about 10 mm.

Each of buttons 14B to 14E has a circular shape and a radius of approximately 5 mm. Button 14B is provided such that a center thereof is located in a position distant from the right end of lower housing 11 by about 10 mm and from the lower end of lower housing 11 by about 40 mm. Button 14C is provided such that a center thereof is located in a position distant from the right end of lower housing 11 by about 20 mm and from the lower end of lower housing 11 by about 40 mm. Button 14D is provided such that a center thereof is located in a position distant from the right end of lower housing 11 by about 20 mm and from the lower end of lower housing 11 by about 50 mm. Button 14E is provided such that a center thereof is located in a position distant from the right end of lower housing 11 by about 25 mm and from the lower end of lower housing 11 by about 45 mm.

Direction input button 14A and buttons 14B to 14E are used for performing various operations (which will be described later) on game device 10.

In addition, as shown in FIG. 2, an L button 14I is provided at a left end portion of an upper surface of lower housing 11 and an R button 14J is provided at a right end portion of the upper surface of lower housing 11. L button 14I and R button 14J are used, for example, for performing a photographing instruction operation (shutter operation).

In addition, a volume button 14K is provided on a left side surface of lower housing 11. Volume button 14K is used for adjusting a volume of a speaker included in game device 10. In addition, in the present embodiment, volume button 14K is used also for adjusting brightness of upper LCD 22 and lower LCD 12 by being operated together with select button 14H. Such an operation will be described later.

As shown in FIG. 1, game device 10 further includes touch panel 13 as another input device in addition to operation buttons 14A to 14I. Touch panel 13 is attached to the screen of lower LCD 12. Touch panel 13 may be of any type such as a resistive film type, an optical type (infrared type), or a capacitive coupling type. Touch panel 13 used in the present embodiment has the same resolution (detection accuracy) as that of lower LCD 12, however, resolution of touch panel 13 and resolution of lower LCD 12 may not necessarily be equal to each other. In addition, a touch panel based on any principles may be employed as the touch panel in the present embodiment, so long as such a device can detect a contact coordinate on a screen.

As shown in FIGS. 1 and 2, in the right side surface of lower housing 11, an insertion opening 17 is provided. Insertion opening 17 can accommodate a touch pen 27 used for performing an operation on touch panel 13. An input to touch panel 13 is usually provided by using touch pen 27, however, in addition to touch pen 27, a finger of the user can be used for operating touch panel 13.

In the right side surface of lower housing 11, an insertion opening is provided for accommodating a memory card 28. Inside the insertion opening, a connector (not shown) is provided for electrically connecting game device 10 and memory card 28 to each other. Memory card 28 is removably attached to the connector.

Memory card 28 is based on universal specifications as defined by any standardization organization, and representatively implemented by an SD (Secure Digital) memory card. Memory card 28 contains a non-volatile rewritable memory, and it is used, for example, for storing (saving) an image picked up by game device 10 or for reading an image generated in another device into game device 10. Alternatively, memory card 28, for example, stores in advance a music file which is music data, and reproduction processing can be performed by reading the music file into game device 10. Some kind of program may be stored in memory card 28 through a personal computer or the like, however, such a program cannot be executed in game device 10.

Further, in the upper surface of lower housing 11, an insertion opening (shown with a chain-dotted line in FIG. 1) is provided for accommodating a memory card 29. Inside the insertion opening as well, a connector (not shown) is provided for electrically connecting game device 10 and memory card 29 to each other.

Memory card 29 is preferably based on specifications dedicated for game device 10 according to the present embodiment. Namely, memory card 29 is designed to have a size different from that of a memory card complying with the universal specifications. Memory card 29 is a storage medium storing an image communication program, a game program or the like, and it is removably attached to the insertion opening provided in lower housing 11. In addition, memory card 29 may also store a selected application program which will be described later. An application program stored in memory card 29 is read into a main memory 32 and executed by a CPU 31 when execution of the application program is selected with a method as will be described later with reference to FIG. 23.

Though memory card 29 may contain an ROM and store a program in the ROM, memory card 29 may contain a non-volatile rewritable memory so that data can be written therein by game device 10.

Figure 15:
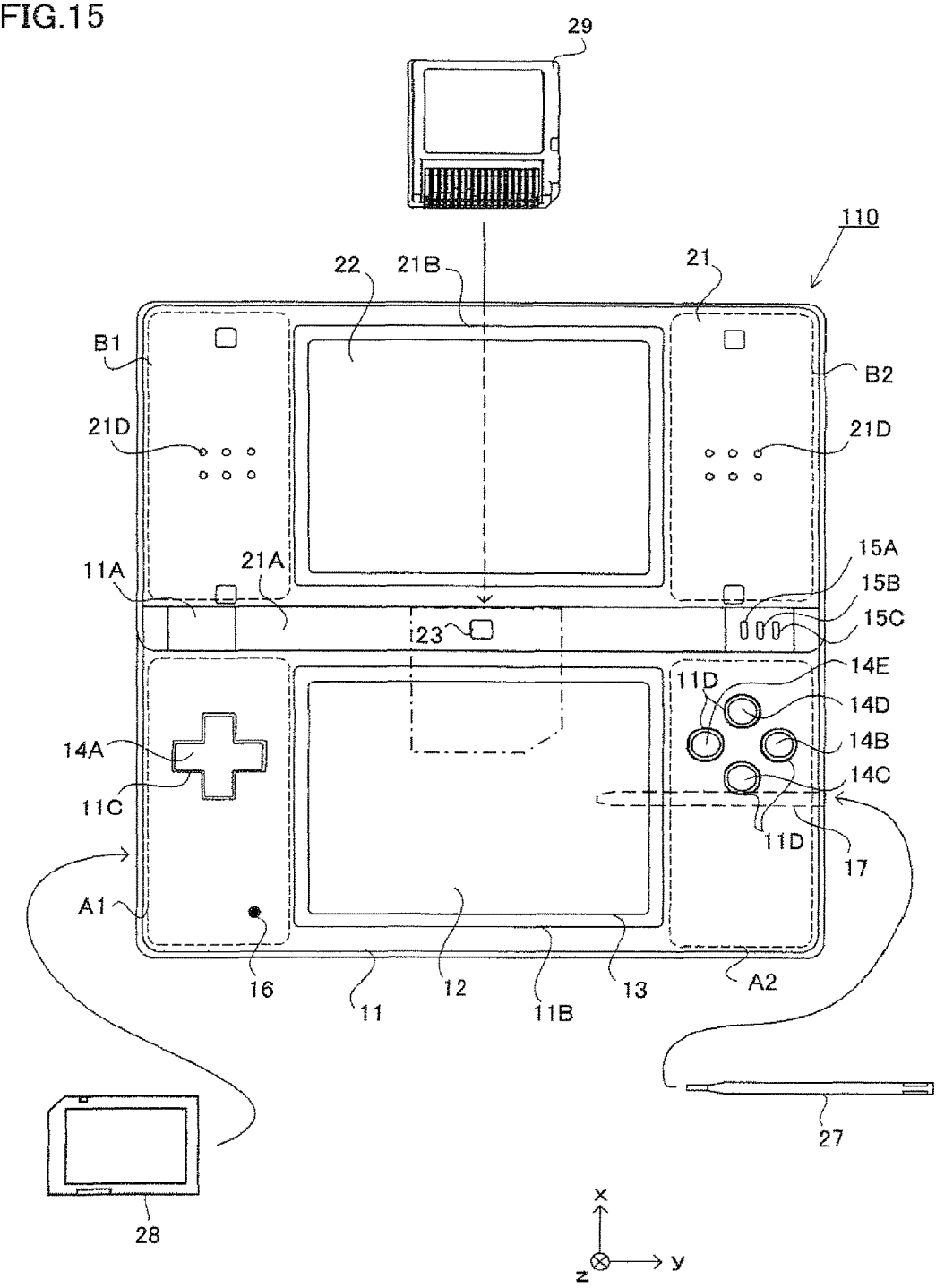
FIG. 15 is a plan view showing appearance of an image pick-up device according to a variation of the present embodiment.

As shown in FIG. 1, three LEDs 15A to 15C are disposed in a left-hand-side portion of shaft portion 11A of lower housing 11 (LEDs 15A to 15C may be disposed in a right-hand-side portion of shaft portion 11A as shown in FIG. 15). An illumination operation of these LEDs 15A to 15C will be described later.

<Upper Housing>

Meanwhile, a feature for picking up an image (a camera) and a feature for displaying the picked-up image (a display device) are provided in upper housing 21. A feature provided in upper housing 21 will be described hereinafter.

As shown in FIG. 1, game device 10 includes upper LCD 22. Upper LCD 22 is accommodated in upper housing 21. Upper LCD 22 has a horizontally long shape, and is arranged such that a long side direction thereof corresponds to a long side direction of upper housing 21. Upper LCD 22 is provided in the inner surface of upper housing 21 (the surface located on the inside of game device 10 in the closed state). Thus, by closing game device 10 when it is not used, a screen of upper LCD 22 can be prevented from getting dirty and being damaged. Similarly to lower LCD 12, a display device of any other type having any resolution may be used instead of upper LCD 22. Though details will be described later, upper LCD 22 mainly displays thereon an image concerning an image pick-up operation, such as an image for explaining a manner of operation to the user. In an alternative embodiment, a touch panel may be provided also on upper LCD 22.

Game device 10 includes two cameras 23 and 25 as image pick-up means. Each of cameras 23 and 25 is accommodated in upper housing 21. As shown in FIG. 1, inner camera 23 is disposed in the inner surface of upper housing 21. On the other hand, as shown in FIG. 2, outer camera 25 is disposed in a surface opposite to the surface in which inner camera 23 is disposed, that is, in the outer surface of upper housing 21 (a surface located on the outside of game device 10 in the closed state).

Though a case where game device 10 includes two cameras as the image pick-up means is described by way of example in the present embodiment, game device 10 may include one camera, or three or more cameras. Further, a camera may be disposed at any position.

As shown in FIG. 2, a fourth LED 26 is disposed in the outer surface of upper housing 21. Fourth LED 26 is disposed around outer camera 25 (on a right side of outer camera 25 in the present embodiment; and above outer camera 25 in the opened state in the example shown in FIG. 17(*b*)). Fourth LED 26 is turned on at the time when photographing by inner camera 23 or outer camera 25 is performed (when the shutter button is pressed). Further, fourth LED 26 illuminates while a moving picture is taken by inner camera 23 or outer camera 25.

Such an operation of fourth LED 26 can notify a subject that photographing is performed (being performed) by game device 10.

In addition, an external audio output terminal 19 (shown with a dashed line in FIG. 1) in which a plug provided in equipment for external audio output (such as a headphone, an earphone and a bone conduction headphone) is to be inserted is provided in a lower surface of lower housing 11. In the inside of this external audio output terminal 19, a jack 62 for electrically connecting game device 1 and the equipment for external audio output with each other is provided. The equipment for external audio output may be equipment for both ears such as a headphone or equipment for one ear such as an earphone, and a plug of the equipment for external audio output is removably attached to a jack. Though a headphone is representatively described hereinafter as the equipment for external audio output, equipment such as an earphone may also be employed.

Game device 10 includes a microphone (a microphone 43 shown in FIG. 18) as an audio input device. Microphone 43 is accommodated in upper housing 21. In the present embodiment, microphone 43 is arranged in shaft portion 21A of upper housing 21. More specifically, the microphone is attached around inner camera 23 (in the drawing, on the side on the y-axis), and further specifically, it is arranged on the side of inner camera 23 at a distance of 10 mm therefrom (in the drawing, on the side in the positive direction of the y-axis).

In addition, in the inner surface of upper housing 21, a microphone hole 21C is provided to allow the microphone to sense sound outside game device 10. Microphone hole 21C is provided in shaft portion 21A of upper housing 21. If microphone hole 21C is provided in a coupling portion of lower housing 11 and upper housing 21, it is preferably provided at a position offset from the center by a prescribed distance.

Alternatively, as shown in FIG. 15, the microphone may be accommodated in lower housing 11. In FIG. 15, a microphone hole 16 is provided in the inner surface of lower housing 11, specifically in a lower left portion of the inner surface of lower housing 11 (a button arrangement area corresponding to a dotted-line area A1). The microphone is arranged in the vicinity of microphone hole 16 in lower housing 11.

A position where microphone 43 is accommodated and a position of microphone hole 16 do not necessarily have to be in the coupling portion above, and for example, microphone 43 may be accommodated in lower housing 11 and microphone hole 16 may be provided in lower housing 11 in correspondence with the position of accommodation of microphone 43. Alternatively, microphone hole 16 may be provided adjacent to external output terminal 19 for insertion of a plug provided in a headphone.

<Indication by Indicator and Operation Example>

Figure 3:
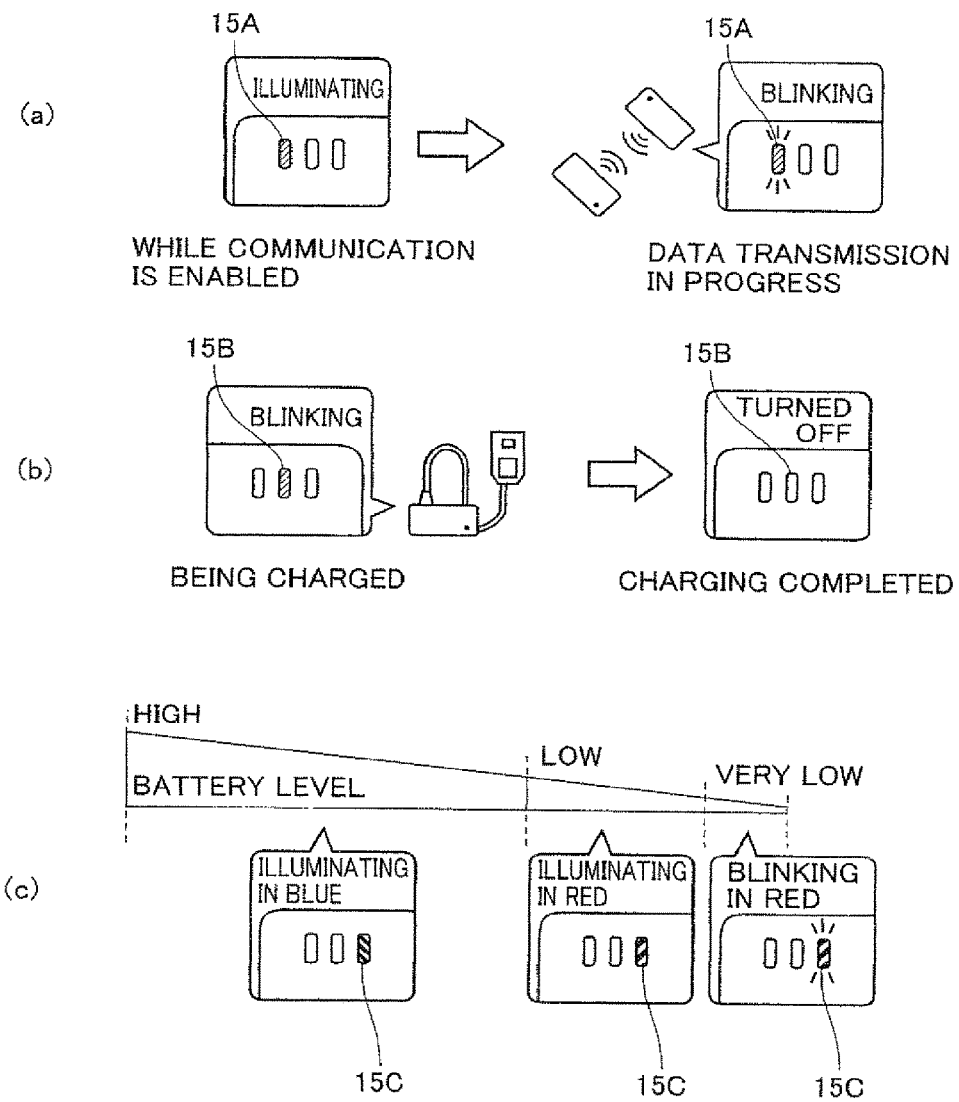
FIG. 3 is a diagram illustrating an illumination operation of an LED of the game device according to the present embodiment.

FIG. 3 is a diagram illustrating an illumination operation of LED 15A to LED 15C of game device 10 according to the present embodiment.

Referring to FIG. 3(*a*), game device 10 can establish wireless communication with other equipment as will be described later, and a first LED 15A illuminates when wireless communication is established. Specifically, first LED 15A illuminates whenever communication with other equipment is enabled. Meanwhile, first LED 15A blinks while communication with other equipment is in progress (or data transmission is in progress).

Referring to FIG. 3(*b*), a second LED 15B illuminates while game device 10 is being charged.

Referring to FIG. 3(*c*), a third LED 15C illuminates when the power of game device 10 is turned on. In addition, an illumination state of third LED 15C is varied depending on a state of charge of a battery (battery pack) mounted on game device 10. Specifically, third LED 15C illuminates in blue when a battery level is relatively high, while it illuminates in red when the battery level is relatively low. In addition, when the battery level is very low, third LED 15C blinks in red.

Thus, three LEDs 15A to 15C can notify the user of a state of communication establishment, a state of charge, a battery level, and a state of power on/off of game device 10.

FIG. 4 is a diagram for illustrating an operation of volume button 14K of game device 10 according to the present embodiment. In game device 10, a volume can be set in a plurality of steps (for example, in five steps), and as shown in FIG. 4(*a*), the volume is increased in a stepwise fashion each time a "+" (plus) side of volume button 14K is pressed. On the other hand, the volume is lowered in a stepwise fashion each time a "−" (minus) side of volume button 14K is pressed.

Meanwhile, sound effect (shutter sound) or the like output from a speaker at the time when photographing by inner camera 23 or outer camera 25 is carried out (when the shutter button is pressed) is preferably set at a prescribed volume, independently of volume setting.

In addition, when game device 100 is in a sleep state which will be described later, only lowering in the volume is preferably permitted with regard to the operation of volume button 14K.

Referring to FIG. 4(*b*), when volume button 14K is operated while select button 14H has been pressed, brightness of upper LCD 22 and lower LCD 12 is changed. Namely, each time the "+" (plus) side of volume button 14K is pressed while select button 14H has been pressed, display on upper LCD 22 and lower LCD 12 becomes brighter in a stepwise fashion. On the other hand, each time the "−" (minus) side of volume button 14K is pressed while select button 14H has been pressed, display on upper LCD 22 and lower LCD 12 becomes darker in a stepwise fashion.

[4. Detailed Structure and Usage]

A more detailed structure of game device 10 according to the present embodiment and usage of game device 10 by the user will be described with reference to FIGS. 5 to 14 in addition to FIGS. 1 and 2 above.

Figure 5:
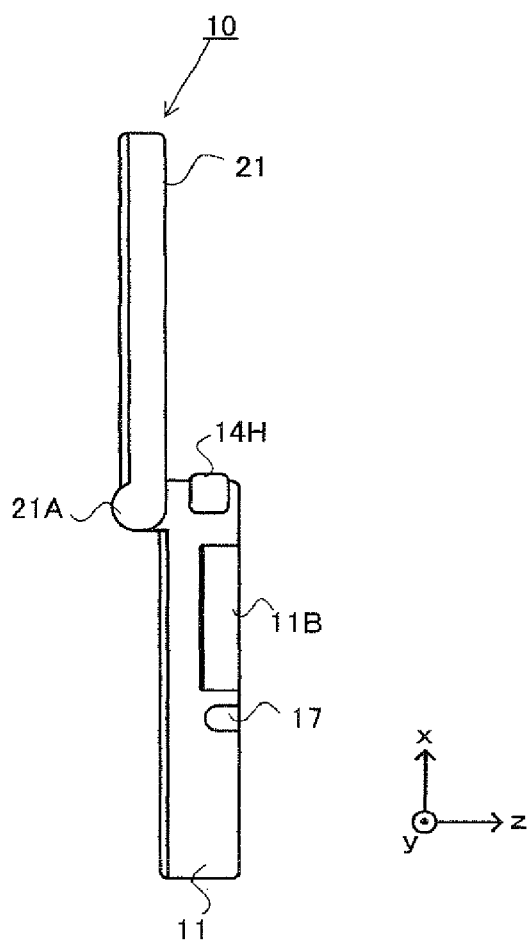
FIG. 5 is a side view in a state where the game device according to the present embodiment is opened (in an unfolded state).
Figure 6:
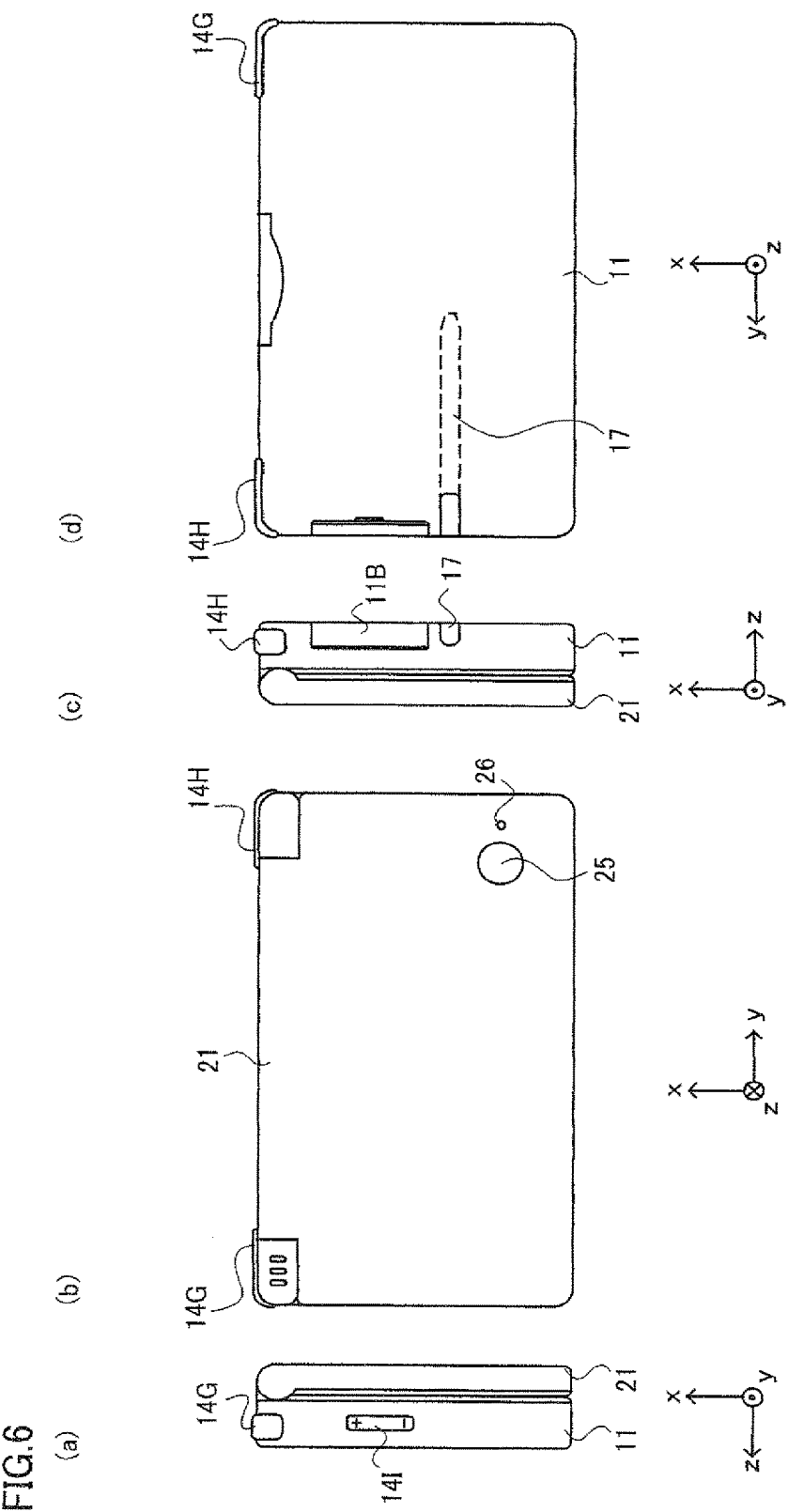
FIG. 6 is a side view in a state where the game device according to the present embodiment is closed (in a folded state).

FIG. 5 shows a side view of game device 10 in the opened state (unfolded state), and FIG. 6 shows four orthogonal views of game device 10 in the closed state (folded state). Namely, FIG. 6(*a*) shows a left side view of game device 10 in the closed state, FIG. 6(*b*) shows a top view of game device 10, FIG. 6(*c*) shows a right side view of game device 10, and FIG. 6(*d*) shows a back view of game device 10.

Game device 10 according to the present embodiment is small enough in size to be held with both hands or one hand in the opened state. For example, game device 10 can approximately be 50 to 100 mm long and 100 to 200 mm wide with a thickness of 10 to 40 mm in the closed state, and can approximately be 100 to 200 mm long in the opened state. It is noted that a direction of length corresponds to the x direction in the drawings, a direction of width corresponds to the y direction in the drawings, and a direction of thickness corresponds to the z direction in the drawings.

More preferably, game device 10 can be 60 to 90 mm long and 100 to 150 mm wide with a thickness of 15 to 30 mm in the closed state, and can approximately be 120 to 160 mm long in the opened state.

Further preferably, game device 10 can be 70 to 80 mm long and 100 to 150 mm wide with a thickness of 15 to 25 mm in the closed state, and can approximately be 135 to 155 mm long in the opened state.

It is noted that the thickness of lower housing 11 is preferably larger than that of upper housing 21. Further, the length of game device 10 in the opened state may be substantially the same as the width thereof. A dimension of lower housing 11 in a direction of length is desirably set such that a second joint of an index finger is located around an upper corner of lower housing 11 when a lower corner of lower housing 11 is supported by a center of a palm.

Figure 7:
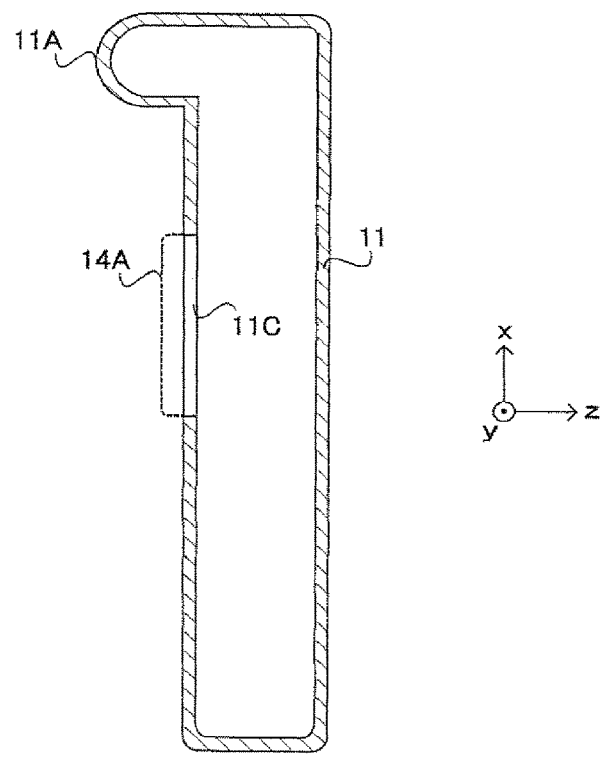
FIG. 7 is a cross-sectional view of a lower housing shown in FIG. 1 which is taken along the line A-A'.
Figure 8:
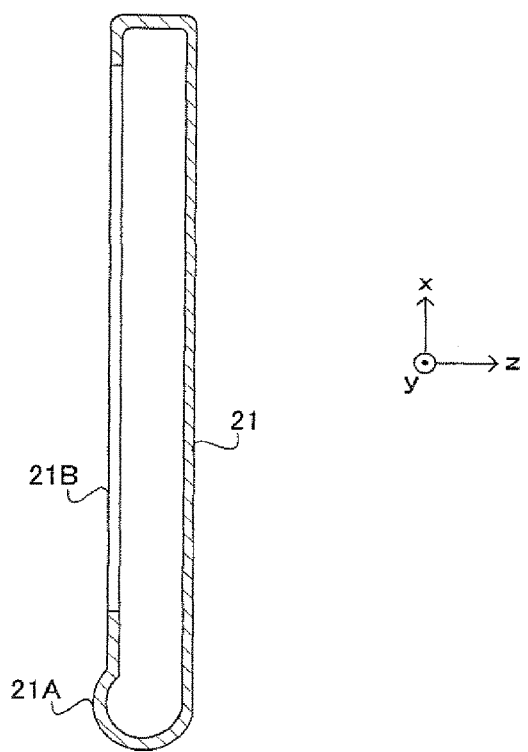
FIG. 8 is a cross-sectional view of an upper housing shown in FIG. 1 which is taken along the line B-B'.

FIG. 7 shows a cross-sectional view of the lower housing shown in FIG. 1 which is taken along the line A-A', and FIG. 8 shows a cross-sectional view of the upper housing shown in FIG. 1 which is taken along the line B-B'. As shown in FIG. 7, on the inner surface of lower housing 11 (the surface located on the inside of game device 10 in the closed state), shaft portion 11A is provided to project in the direction perpendicular to the inner surface (typically, shaft portion 11A is structurally integral with the lower housing). Shaft portions 11A are provided at respective opposing ends in the left-right direction (in the y direction in the drawing) (see FIG. 1). As shown in FIG. 15, each of shaft portions 11A may be provided in a position slightly inward of the end with respect to the left-right direction.

As shown in FIG. 8, in a lower surface of upper housing 21 (a side surface on the negative side of the x-axis in the drawing), shaft portion 21A is provided to project in the direction perpendicular to the lower surface (shaft portion 21A is structurally integral with the upper housing). Shaft portion 21A is provided to project in the direction perpendicular to the lower surface as well as to project also in the direction perpendicular to the inner surface of upper housing 21 (a surface located on the inside of game device 10 in the closed state). Shaft portion 21A is provided at the center of the lower end of upper housing 21 in the left-right direction (see FIG. 1). Shaft portion 11A and shaft portion 21A are pivotably connected to each other by a hinge provided therein, thereby forming an integral projection portion. As constructed above, the projection portion projects from the inner surface of each of housings 11 and 21 (see FIG. 5).

Since shaft portion 11A is provided to project from the inner surface of lower housing 11 and shaft portion 21A is provided to project downwardly from upper housing 21, a step is formed between an outer surface of lower housing 11 (a surface located on the outside of game device 10 in the closed state) and an outer surface of upper housing 21 by the thickness of lower housing 11 in a state where two housings 11 and 21 are connected to each other (see FIG. 5).

As described above, upper housing 21 is pivotably supported by a part of an upper portion of lower housing 11. Thus, game device 10 can be in the closed state (a state where an angle between lower housing 11 and upper housing 21 is about 0° (see FIG. 5)) or in the opened state (a state where the angle between lower housing 11 and upper housing 21 is about 180° (see FIG. 1)). Further, in addition to the closed state and the opened state, game device 10 in the present embodiment can maintain an angle between lower housing 11 and upper housing 21 at any angle ranging between the closed state and the opened state by frictional force generated at the hinge or the like. In other words, upper housing 21 can be stationary at any angle with respect to lower housing 11.

Alternatively, the hinge may have a mechanism for temporarily fixing upper housing 21 and lower housing 11 at a prescribed angle smaller than 180° with click feeling. In other words, upper housing 21 and lower housing 11 may temporarily be fixed in the opened state at a prescribed angle smaller than 180° with click feeling. Specifically, for example, the prescribed angle ranges from 150° to 175°, and is 160° in the present embodiment. In the present embodiment, housings 11 and 21 can be opened up to an angle of 180°, however, in an alternative embodiment, housings 11 and 21 may be opened only up to the prescribed angle above or up to an angle of 180° or greater.

As shown in FIGS. 2, 6(a), and 6(c), volume button 14K is provided on the left side surface of lower housing 11. Volume button 14K is used for adjusting volume of a speaker of game device 10. As shown in FIG. 6(d), button 14J is provided at a right end of an upper surface of lower housing 11. Button 14I is provided at a left end of the upper surface of lower housing 11. Preferably, the right end of button 14J extends to the right end of lower housing 11, however, it does not have to be in that way. In the former case, design is preferably made such that a right side surface of button 14J is substantially flush with the right side surface of lower housing 11. Further, a back end of button 14J preferably extends to reach a back surface of lower housing 11, however, it does not have to be in that way. In the former case, design is preferably made such that the back surface of button 14J is substantially flush with the back surface of lower housing 11. It is noted that the above is also applicable to button 14I.

Specifically, buttons 14J and 14I have a length of about 20 mm in the left-right direction and a width (a length in the thickness direction, that is, a length in the z direction shown in the drawing) of about 10 mm. Each of buttons 14I and 14J is used, for example, for performing a photographing instruction operation (a shutter operation) on game device 10. It is noted that buttons 14J and 14I preferably have a width at least 50% as large as the thickness of lower housing 11.

Both buttons 14I and 14H may function as a shutter button. Here, a right-handed user can use button 14J and a left-handed user can use button 14I. Thus, game device 10 is user-friendly for either user.

In game device 10, buttons 14I and 14J may be set to constantly serve as valid shutter buttons, or alternatively, only button 14J may be set as valid in the case of setting for right-handedness and only button 14I may be set as valid in the case of setting for left-handedness by setting game device 10 to right-handedness or left-handedness (by having the user provide an input for setting through a menu program or the like so that set data is stored). Further, in an alternative embodiment, only a single button for performing a photographing instruction operation may be provided on the upper surface of lower housing 11.

A cover is provided on the right side surface of lower housing 11 in such a manner that it can be opened or closed. Inside this cover, a connector (not shown) is provided for connecting memory card 28.

As described above, in lower housing 11, input devices (touch panel 13 and buttons 14A to 14I) are provided for providing an operation input to game device 10. Thus, in using game device 10, the user can hold lower housing 11 and perform an operation on game device 10.

Figure 9:
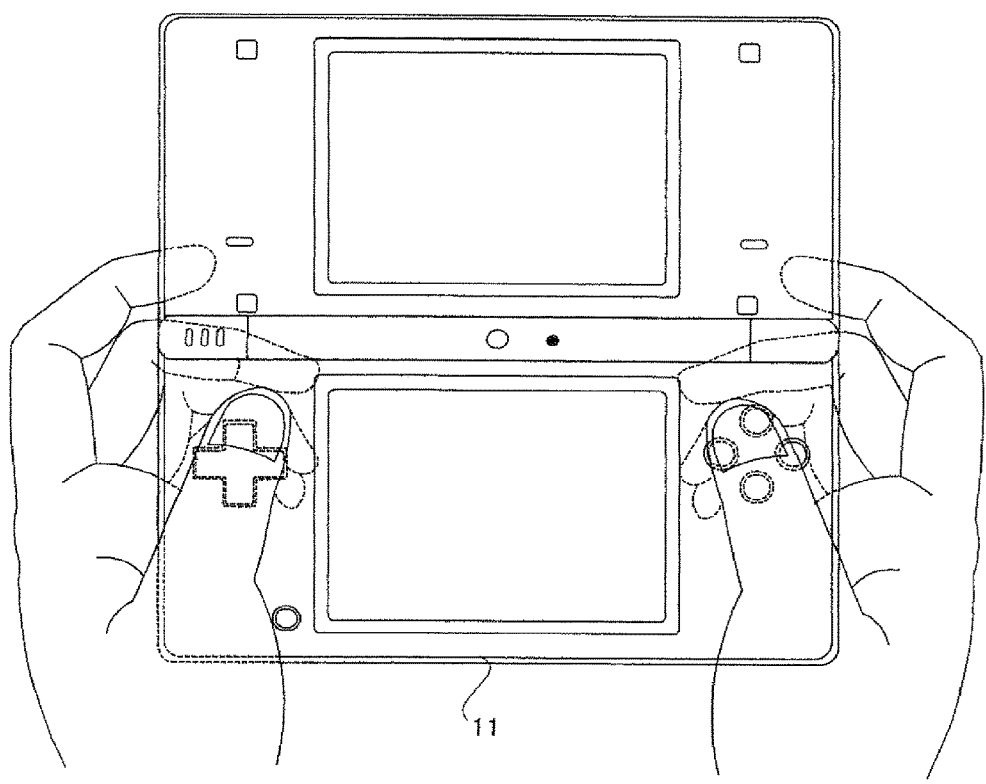
FIG. 9 is a diagram showing a state where a user holds the game device according to the present embodiment with both hands.

FIG. 9 is a diagram showing a state where the user holds game device 10 with both hands. As shown in FIG. 9, the user holds the side surfaces and the outer surface (the surface opposite to the inner surface) of lower housing 11 with palms, middle fingers, ring fingers, and little fingers of both hands in a state where LCDs 12 and 22 face the user. By thus holding the game device, the user can perform an operation of buttons 14A to 14E with thumbs and perform an operation of buttons 14I and 14J with index fingers while holding lower housing 11.

In the present embodiment, lower housing 11 is formed in the horizontally long shape and provided with buttons on both sides of lower LCD 12. Thus, the image pick-up device can easily be held and operated. Further, as described above, the button arrangement areas (dotted-line areas A1 and A2 shown in FIG. 1) are provided to have a dimension of at least 15 mm in the lateral direction thereof. Thus, thumbs can be prevented from being located on lower LCD 12 while lower housing 11 is held.

Figure 10:
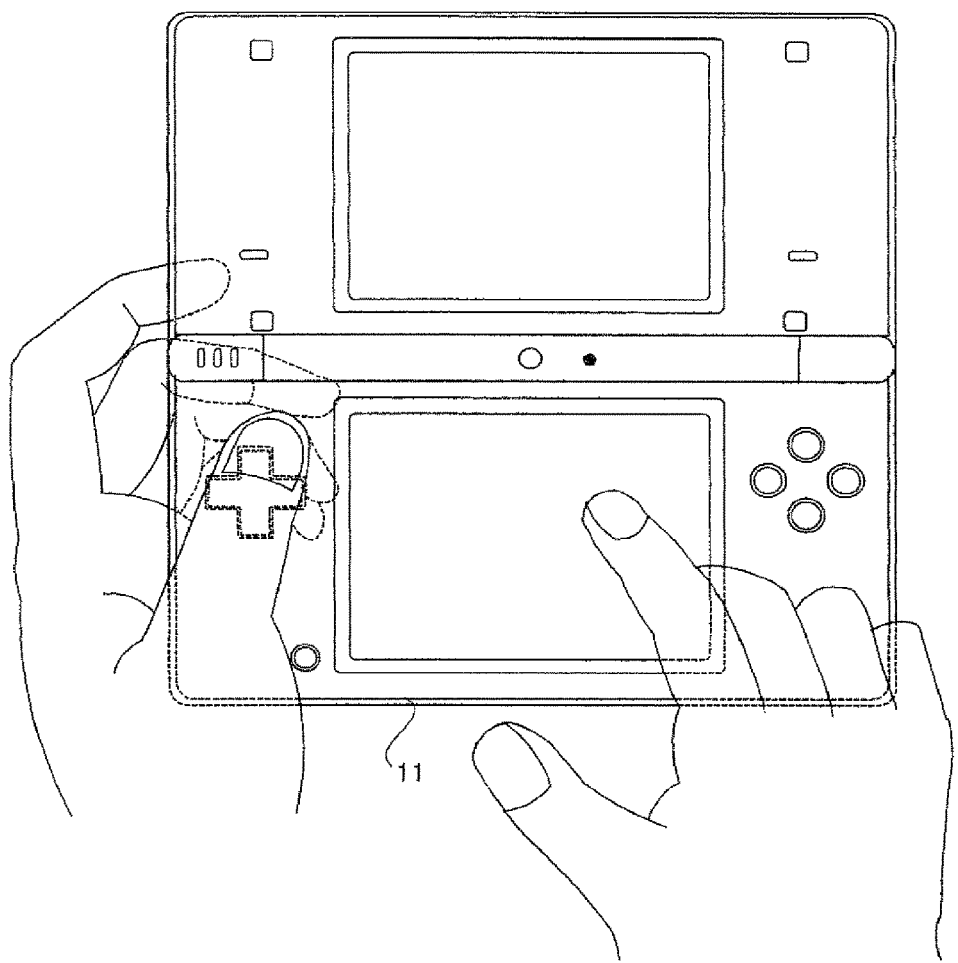
FIG. 10 is a diagram showing a state where the user holds the game device according to the present embodiment with one hand.

FIG. 10 is a diagram showing a state where the user holds game device 10 with one hand. In providing an input to touch panel 13, as shown in FIG. 10, one hand holding lower housing 11 is released from lower housing 11 and lower housing 11 is held only with the other hand, thereby allowing an input to touch panel 13 with that one hand. In this case as well, a thumb holding lower housing 11 can be prevented from being located on lower LCD 12.

Alternatively, while holding lower housing 11 with both hands, the user can provide an input to touch panel 13 with a thumb of one hand (a thumb of a right hand if the user is right-handed). In this case as well, a thumb of the other hand holding lower housing 11 (a thumb of a left hand if the user is right-handed) can be prevented from being located on touch panel 13.

As described above, inner camera 23 is disposed in the inner surface of upper housing 21 (see FIG. 1). On the other hand, outer camera 25 is disposed in the surface opposite to the surface in which inner camera 23 is disposed, that is, in the outer surface of upper housing 21 (the surface located on the outside of game device 10 in the closed state) (see FIGS. 2, 6(b) and the like).

Thus, inner camera 23 is capable of picking up an image in a direction in which the inner surface of upper housing 21 faces and outer camera 25 is capable of picking up an image in a direction opposite to an image pick-up direction of inner camera 23, that is, in a direction in which the outer surface of upper housing 21 faces.

As described above, game device 100 according to the present embodiment is provided with two cameras 23 and 25 such that the image pick-up directions thereof are opposite to each other. Therefore, the user can pick up images in two different directions without changing a manner of holding game device 10. For example, the user can photograph a view seen from game device 10 toward the user with inner camera 23 as well as a view seen from game device 10 in a direction opposite to the user with outer camera 25.

In addition, according to the feature above, a photographing direction of outer camera 25 is opposite to (180° different from) a direction in which the display screen of upper LCD 22 faces and a photographing direction of inner camera 23 is the same as the direction in which the display screen of upper LCD 22 faces. Thus, since a line-of-sight direction of the user looking at the display screen of upper LCD 22 is substantially the same as the photographing direction of outer camera 25 when an image taken by outer camera 25 is displayed on upper LCD 22, it is easy for the user to recognize the photographing direction. Further, since the line-of-sight direction of the user looking at the display screen of upper LCD 22 is substantially opposite to the photographing direction of inner camera 23 when an image taken by inner camera 23 is displayed on upper LCD 22, it is easy for the user to recognize the photographing direction.

Further, inner camera 23 is disposed at a center of shaft portion 21A formed in the lower center portion of upper housing 21. In other words, inner camera 23 is disposed at a center of a portion where two housings 11 and 21 are connected to each other.

Thus, when game device 10 is in the opened state, inner camera 23 is located between two LCDs 12 and 22 (see FIG. 1). In other words, inner camera 23 is arranged around the center of game device 10. It is noted that the "center of game device 10" means a center of an operation surface of game device 10 (including the inner surfaces of housings 11 and 21 in the opened state).

Alternatively, it can also be said that inner camera 23 is arranged around a center in the lateral direction of LCDs 12 and 22.

In the present embodiment, since shaft portion 21A is integral with upper housing 21 and inner camera 23 is arranged in shaft portion 21A in a fixed manner, the photographing direction of inner camera 23 is changed in accordance with opening and closing of upper housing 21. Thus, change in the photographing direction can be achieved without providing an additional mechanism for changing the photographing direction of the camera. Further, since inner camera 23 is arranged in the inner surface of a second housing (on the same side of shaft portion 21A as the inner surface of the second housing), inner camera 23 faces lower housing 11 as a result of closing of upper housing 21. Thus, inner camera 23 can be protected automatically by closing game device 10.

As described above, in the present embodiment, inner camera 23 is provided in shaft portion 21A such that it is arranged around the center of the operation surface of game device 10. In an alternative embodiment, however, inner camera 23 may be provided in a position other than the shaft portion of lower housing 11 or upper housing 21. For example, inner camera 23 may be provided in the inner surface of upper housing 21, between shaft portion 21A and upper LCD 22. When inner camera 23 is provided substantially at the center in the left-right direction of the operation surface of game device 10, the user can easily set a position of game device 10 at least in the left-right direction, for example, in photographing the user himself/herself.

Here, for example, the case where inner camera 23 is arranged at an end of the operation surface of game device 10 (for example, at an upper end of the inner surface of upper housing 21) is considered. In operating a portable instrument such as game device 10, the user usually holds game device 10 such that the user faces game device 10 for better viewing the screen.

In the case where inner camera 23 is arranged at the end of game device 10, however, the user cannot be located within an image pick-up range of inner camera 23 when game device 10 is held in a usual holding position (in a position where the user faces game device 10). For example, in the case where inner camera 23 is arranged at an upper end of the operation surface, the image pick-up range is slightly above the user when the user remains holding game device 10 in the usual holding position, and hence a face of the user cannot successfully be located within the image pick-up range.

Thus, in the case where inner camera 23 is arranged at the end of the operation surface of game device 10, game device 10 has to be moved from the usual holding position such that the user is successfully located within the image pick-up range.

On the other hand, when a view seen from game device 10 toward the user is to be photographed, the line-of-sight direction of the user is opposite to the image pick-up direction of the camera and game device 10 has to be held in a position different from the usual holding position. Therefore, it is difficult for the user to arrange game device 10 such that the user is successfully located within the image pick-up range.

On the other hand, in the present embodiment, when game device 10 is in the opened state, inner camera 23 is located around the center of game device 10. Thus, when photographing the user himself/herself with inner camera 23, the user has only to hold game device 10 in a position in which the user faces game device 10. In other words, by holding the image pick-up device in the usual holding position, the user is located around the center of the image pick-up range, and hence the user is readily located within the image pick-up range. As described above, by arranging inner camera 23 in a position around the center of game device 10 when viewed from the user, the user is readily photographed with the user being successfully located within the image pick-up range.

In addition, as shown in FIG. 6(b), outer camera 25 is arranged in an upper portion of upper housing 21 (in a portion distant from lower housing 11 (more distant from lower housing 11 than a center of upper housing 21)) when game device 10 is in the opened state. This is because the user holds lower housing 11 in using game device 10, and if outer camera 25 is arranged close to lower housing 11, a hand of the user may be located within an image pick-up range of outer camera 25.

In the present embodiment, outer camera 25 is provided such that a center thereof is located in a position distant from a right end of upper housing 21 by about 20 mm and from an upper end of upper housing 21 by about 20 mm when game device 10 is in the opened state. Since outer camera 25 is not for photographing the user holding game device 10, there is a low need for providing outer camera 25 at the center of game device 10. Further, since the user basically holds lower housing 11, it would be easier for the user to hold game device 10 having an appropriate thickness. On the other hand, since portability of game device 10 having a small thickness in the folded state is high, upper housing 21 is preferably as thin as possible. Thus, in the present embodiment, upper LCD 22 is arranged at the center of upper housing 21 in view of visibility and outer camera 25 is arranged in an upper portion of upper housing 21 (that is, in an area on a back side of a non-screen area B2 shown in FIG. 1) avoiding a position where upper LCD 22 is arranged.

Thus, since a position where upper LCD 22 is arranged does not overlap with that of outer camera 25, upper housing 21 can be made thinner. Further, since the user basically holds lower housing 11, by providing outer camera 25 in upper housing 21, a finger holding lower housing 11 can be prevented from being located within the image pick-up range of outer camera 25.

The inner surface of upper housing 21 is formed to be substantially planar. As shown in FIG. 1, at the center of the inner surface of upper housing 21, an opening 21B is formed for exposing upper LCD 22. The screen of upper LCD 22 accommodated in upper housing 21 is exposed through opening 21B. Further, a sound emission hole 21D is formed on each side of opening 21B. A not-shown speaker is accommodated in upper housing 21 in the rear of sound emission hole 21D. Sound emission hole 21D is a hole for emitting sound from the speaker to the outside. These sound emission holes 21D are provided on both of left and right sides of upper LCD 22.

Thus, in the inner surface of upper housing 21, non-screen areas (dotted-line areas B1 and B2 shown in FIG. 1, specifically an area for arranging a speaker; a speaker arrangement area) are provided on respective sides of opening 21B for upper LCD 22 provided at the center of the inner surface of upper housing 21.

Here, in the present embodiment, lower housing 11 and upper housing 21 are equal in lengths (widths) in the left-right direction thereof (in the y direction shown in the drawing). Further, lower LCD 12 and upper LCD 22 are equal in widths in the left-right direction and they are arranged in the same position with respect to the left-right direction. Thus, the speaker arrangement area is provided such that the position thereof in the left-right direction corresponds to the position of the button arrangement area. Similarly to the button arrangement area, the speaker arrangement area is designed to have a dimension of 15 mm or more (preferably 20 mm or more, more preferably approximately 30 to 40 mm; 32 mm in the present embodiment) in the lateral direction.

In the present embodiment, regarding the left-right direction, two sound emission holes 21D are arranged around the centers of the speaker arrangement areas in the left-right direction, respectively. Further, regarding an up-down direction, sound emission hole 21D is arranged in a lower area of the speaker arrangement area (in an area close to lower housing 11). Alternatively, as shown in FIG. 15, the speakers and sound emission holes 21D may be arranged at a position slightly higher than that in FIG. 1. Further, as shown in FIG. 15, a plurality of sound emission holes 21D (six in FIG. 15) may be provided for one speaker.

As described above, in the present embodiment, the non-screen area is provided in lower housing 11 and upper housing 21 in the same position with respect to the left-right direction. Thus, game device 10 is easily held when held sideways as shown in FIG. 9 as well as when held lengthwise (in a state where game device 10 is rotated 90° clockwise or counterclockwise relative to the state shown in FIG. 9).

Figure 11:
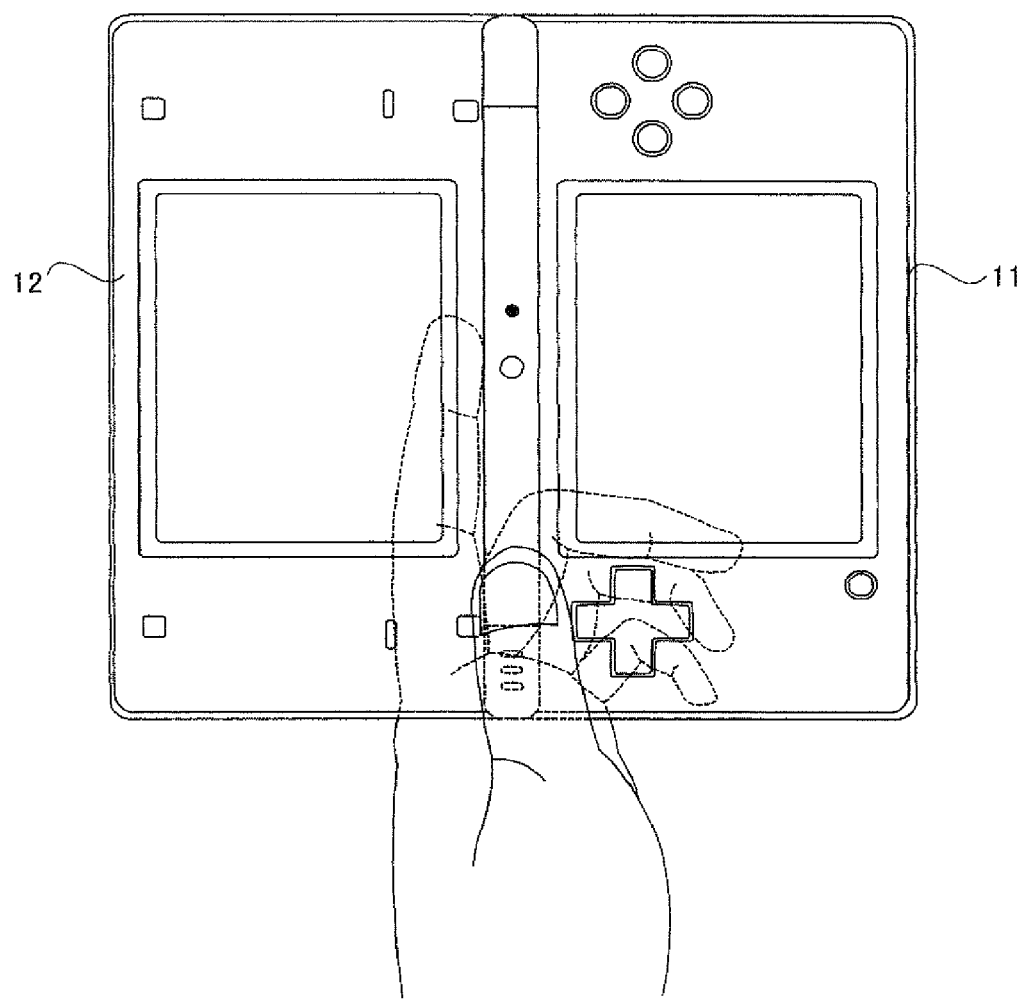
FIG. 11 is a diagram showing a state where the user holds the game device according to the present embodiment lengthwise.
Figure 12:
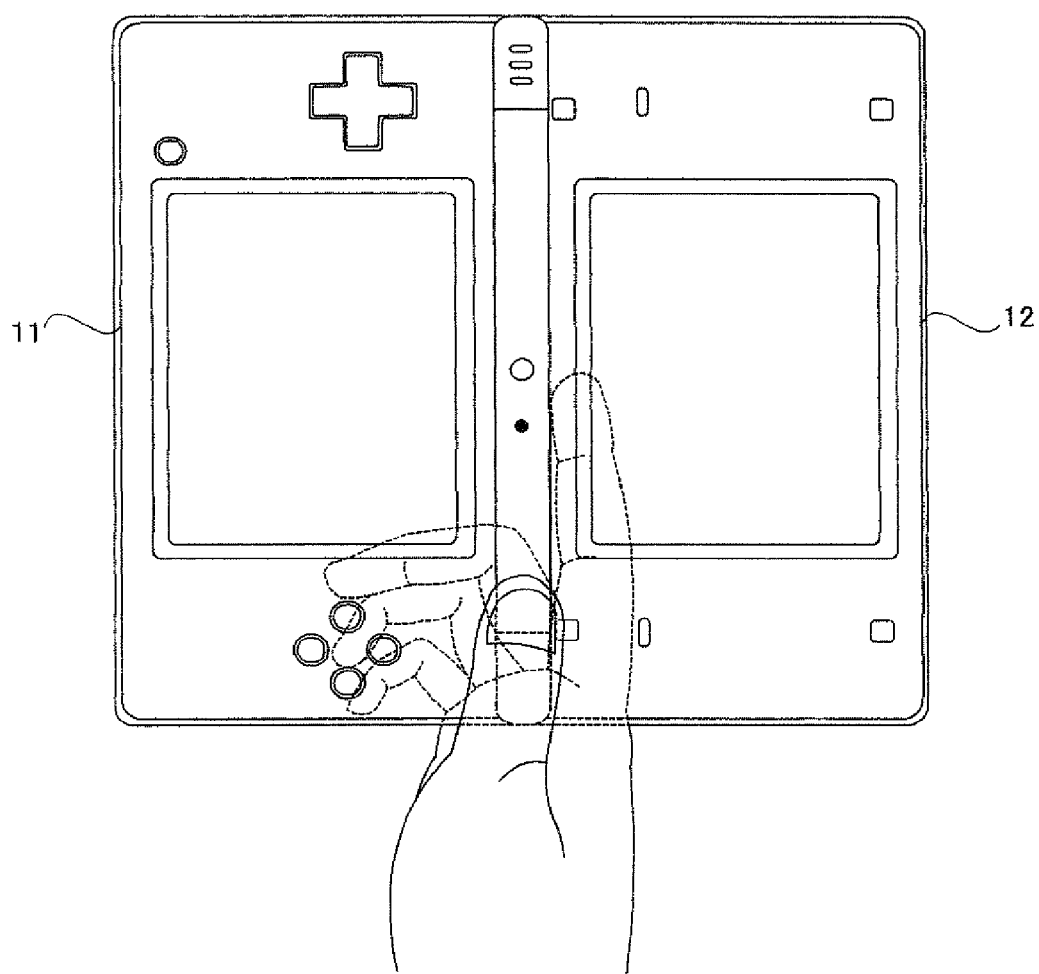
FIG. 12 is a diagram showing a state where the user holds the game device according to the present embodiment lengthwise.

FIGS. 11 and 12 are diagrams showing a state where the user holds game device 10 lengthwise. FIG. 11 shows a state where game device 10 is held with a left hand, and FIG. 12 shows a state where game device 10 is held with a right hand. A right-handed user may rotate game device 10 90° counterclockwise from the state shown in FIG. 9, and hold game device 10 with a left hand as shown in FIG. 11. A left-handed user may rotate game device 10 90° clockwise from the state shown in FIG. 9, and hold game device 10 with a right hand as shown in FIG. 12. In any case, the user can hold game device 10 while touching the projection portion (shaft portions 11A and 21A) with his/her thumb and the upper surface of lower housing 11 with his/her index finger.

As described above, as the step is formed between the outer surface of lower housing 11 and the outer surface of upper housing 21 (see FIG. 5), game device 10 can be held in a stable manner by touching the step with the index finger. In addition, the shutter button (button 14I or 14J) can easily be pressed by a dominant hand not holding game device 10.

Since the non-screen area is provided on each side of LCDs 12 and 22 as described above, a thumb is not located on the screen even when game device 10 is held lengthwise with either hand. In other words, even when game device 10 is held lengthwise, game device 10 is easily held and visibility of the screen and operability of the touch panel are ensured.

Further, as shown in FIG. 7, the projection portion projects from lower housing 11 further than the key tops of buttons 14A to 14E (direction input button 14A in FIG. 7). Thus, even if a thumb holding game device 10 lengthwise is located above a button, the user is less likely to accidentally press the button, and an erroneous input can be prevented.

Further, since game device 10 has a dimension of 100 to 200 mm in length in the opened state, game device 10 held lengthwise has a sufficient width substantially equal to the width of game device 10 held sideways, and hence it is not difficult to hold the game device.

When game device 10 is held lengthwise, the angle between the housings may be set to the prescribed angle smaller than 180°. By setting the angle between the housings to an angle slightly smaller than 180°, the outer surfaces of housings 11 and 21 fit to a shape of a hand, and hence it becomes easier to hold game device 10.

In addition, as described above, in game device 10 according to the present embodiment, cameras 23 and 25 are provided in upper housing 21 and a live image picked up by camera 23 or 25 can be displayed on lower LCD 12 provided in lower housing 11. According to this structure, when game device 10 is held for use or when game device 10 is placed on a desk for use, it is extremely easy to perform an edition operation on a live image while changing a photographing direction as appropriate.

Figure 13:
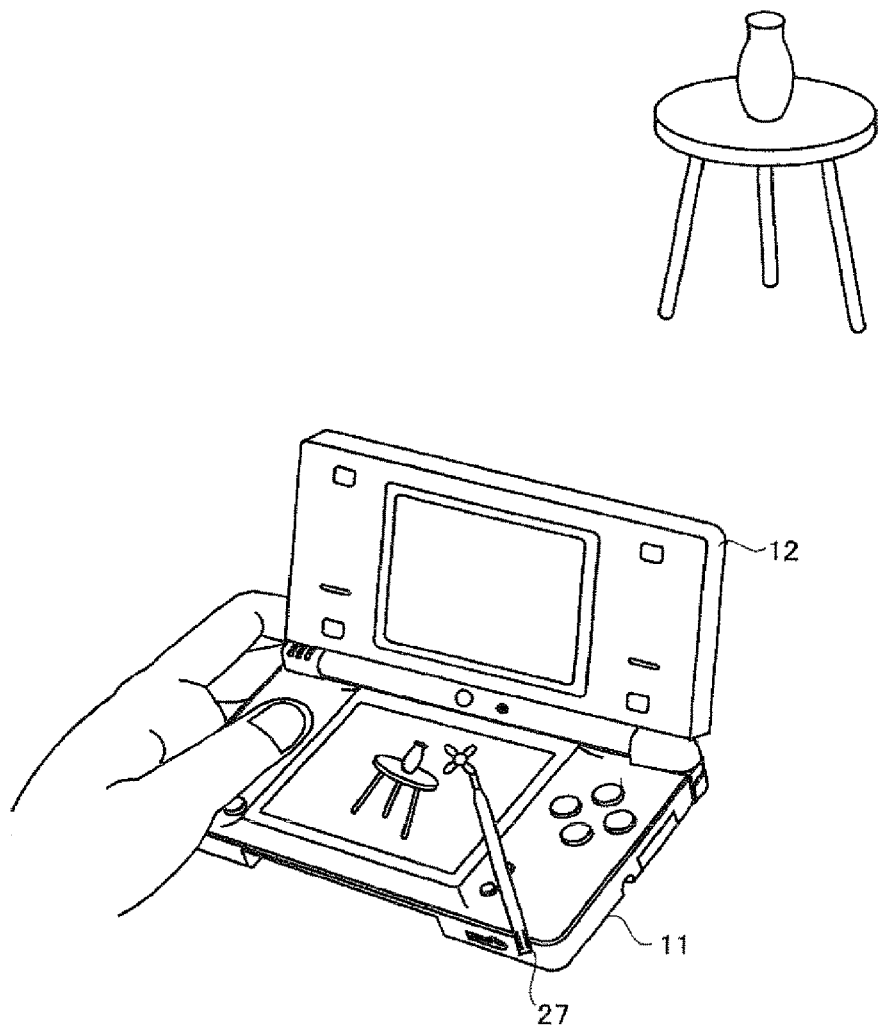
FIG. 13 is a diagram showing a state in which the game device according to the present embodiment is held for use.

FIG. 13 is a diagram showing a state in which game device 10 is held for use. When game device 10 is held for use, as shown in FIG. 13, the user holds lower housing 11 with one hand (a left hand in FIG. 13). Then, as a live image is displayed on lower LCD 12, the user performs an edition operation on the live image using touch pen 27 with the other hand. Here, since an angle of lower housing 11 and an angle of upper housing 21 can individually be changed, the user can hold game device 10 with the angle of lower housing 11 being adjusted such that the user can easily perform an operation on the touch panel, while aiming camera 23 or 25 in upper housing 21 at an image pick-up object.

In addition, since the user holds lower housing 11 with one hand, the user can perform an edition operation through touch panel 13 in a stable manner. As described above, when game device 10 is held for use, it is extremely easy to perform an edition operation on a live image.

In addition, game device 10 is also suitable for photographing in a state where game device 10 is placed on a stand or the like, in addition to photographing in a state where game device 10 is held by the user.

Figure 14:
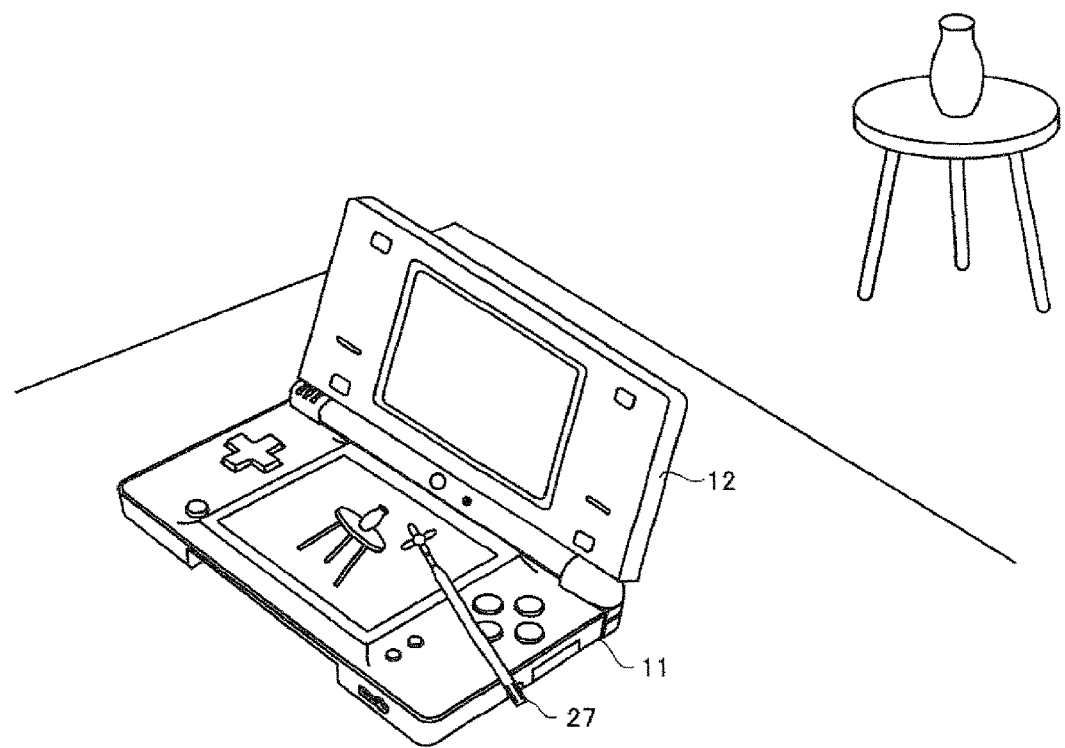
FIG. 14 is a diagram showing a state in which the game device according to the present embodiment is placed for use.

FIG. 14 is a diagram showing a state in which game device 10 is placed for use. Even when game device 10 is placed on a desk or the like for use as shown in FIG. 14, it is easy for the user to operate touch panel 13 because a live image is displayed on lower LCD 12.

In addition, the user can place lower housing 11 on a placement surface and adjust an angle between two housings 11 and 21 such that upper housing 21 is set at a desired angle with respect to lower housing 11. Thus, even when the user places game device 10, the user can perform photographing with upper housing 21 (the photographing direction of the camera) being set at any angle. Thus, even when game device 10 is placed for use, it is extremely easy to perform an edition operation on a live image.

Since game device 10 includes two cameras 23 and 25, photographing in different directions can be performed by changing a photographing camera between inner camera 23 and outer camera 25 without moving game device 10 placed on a stand. It is noted that the photographing direction can be changed by adjusting the angle between two housings 11 and 21 in photographing with either camera. In addition, game device 10 may have a self-timer function with which photographing is performed in a prescribed period of time after the timing of pressing of the shutter button. In photographing with the self-timer function, the user does not hold game device 10. Therefore, ability to set the photographing direction of the camera to any direction as in the present embodiment is particularly convenient.

Further, in the present embodiment, two cameras 23 and 25 for image pick-up in different directions are both provided in upper housing 21. Therefore, even when game device 10 is placed for photographing, both of two cameras 23 and 25 can be used.

Further, in the present embodiment, since lower housing 11 is formed to have a horizontally long shape, stability in placing game device 10 is increased and game device 10 can be less likely to fall down.

In addition, in game device 10, an LCD for displaying a real-time image (a live image) picked-up by camera 23 or 25 may be switched between upper LCD 22 and lower LCD 12, for example, in accordance with a switch instruction from the user. Here, for example, when game device 10 is placed on a stand for use, switching may be made to display a real-time image on lower LCD 12. This is because, when game device 10 is placed on a stand for use, the angle of upper housing 21 should be changed in order to adjust the photographing direction of the camera, and hence the user can easily view a real-time image displayed on lower LCD 12 of lower housing 11 of which angle does not have to be changed.

In an alternative embodiment, a picked-up image may be displayed on upper LCD 22. Since an input device (touch panel 13 and buttons 14A to 14I) for providing an operation input to game device 10 is provided in lower housing 11, in using game device 10, the user can provide an input to the input device while viewing a picked-up image (an image picked up by a camera) displayed on upper LCD 22 and holding lower housing 11.

According to the feature above, game device 10 includes the buttons and the touch panel as input devices. Thus, game device 10 can select an appropriate input device as an input device to be used for performing an input operation depending on a type (characteristic) of an input operation. For example, regarding a shutter operation, preferably, the user has actual feeling of the operation and the operation has a prescribed stroke. Thus, the shutter operation may be performed by using the button. Further, regarding an operation in edition processing which will be described later, an operation is preferably performed by using the touch panel.

In the present embodiment, game device 10 is structured to be foldable by pivotably connecting (coupling) lower housing 11 and upper housing 12 to each other. In an alternative embodiment, lower housing 11 may be coupled to upper housing 12 with another feature or in another manner.

For example, two plate-like housings may be connected to each other such that one of the housings is slidable or pivotable with respect to the other housing with one being in parallel with the other. By doing so, as in the embodiment above, the two housings can be in an opened state and in a closed state.

Alternatively, in the embodiment above, upper housing 21 may be structured such that shaft portion 21A and other portions thereof are pivotable around an axis in the up-down direction. According to this structure, only by providing one camera in upper housing 21, the camera can easily be directed to the line-of-sight direction of the user or a direction opposite thereto.

Figure 17:
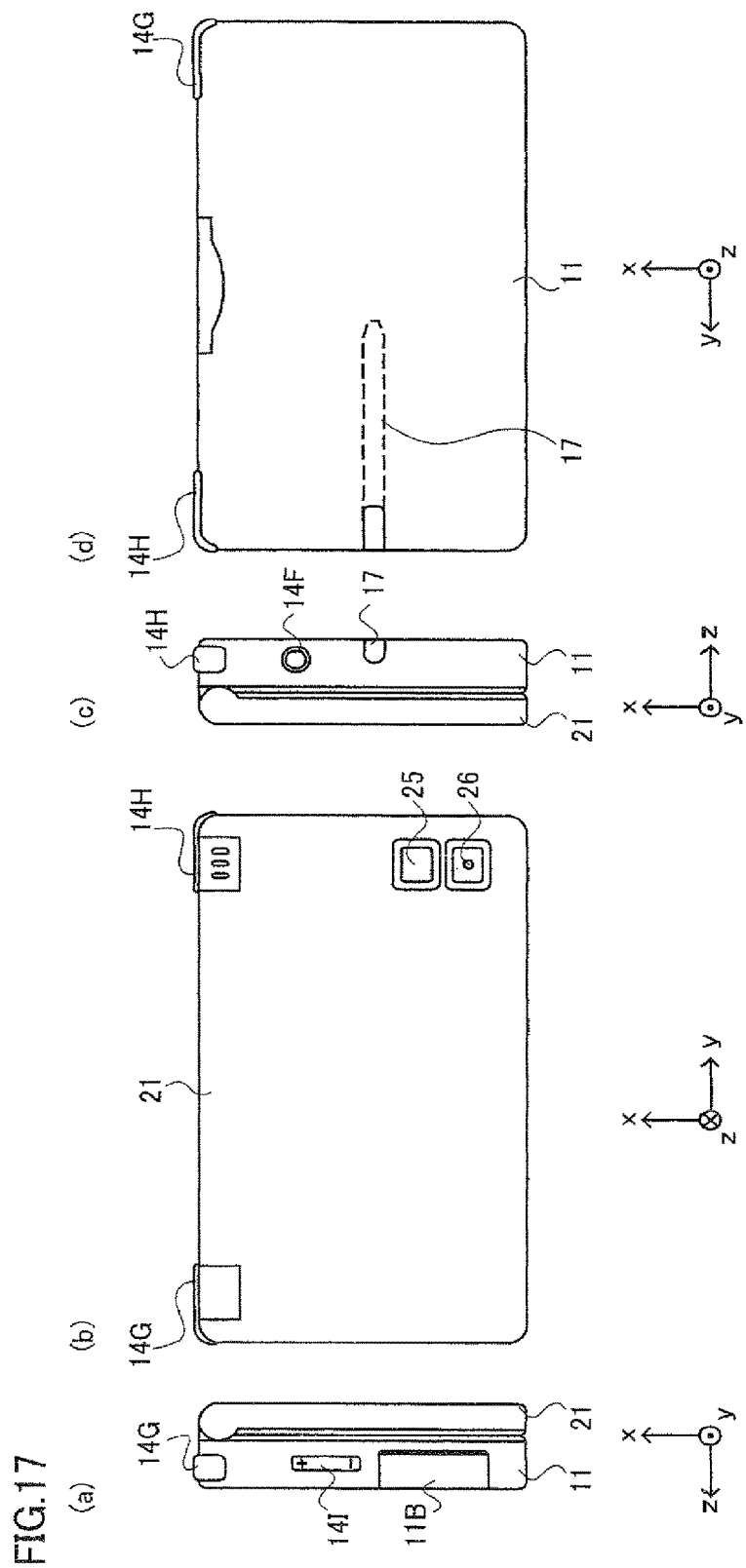
FIG. 17 is a side view in a state where the game device according to the variation of the present embodiment is closed (in a folded state).

An image pick-up device 110 shown in FIGS. 15 to 17 is an image pick-up device obtained by changing arrangement, the number, a shape, or the like of some components of game device 10 according to the present embodiment, and basic functions thereof are the same as those of game device 10.

[5. Internal Configuration of Game Device]

An internal configuration of game device 10 will be described hereinafter with reference to FIG. 18.

Figure 18:
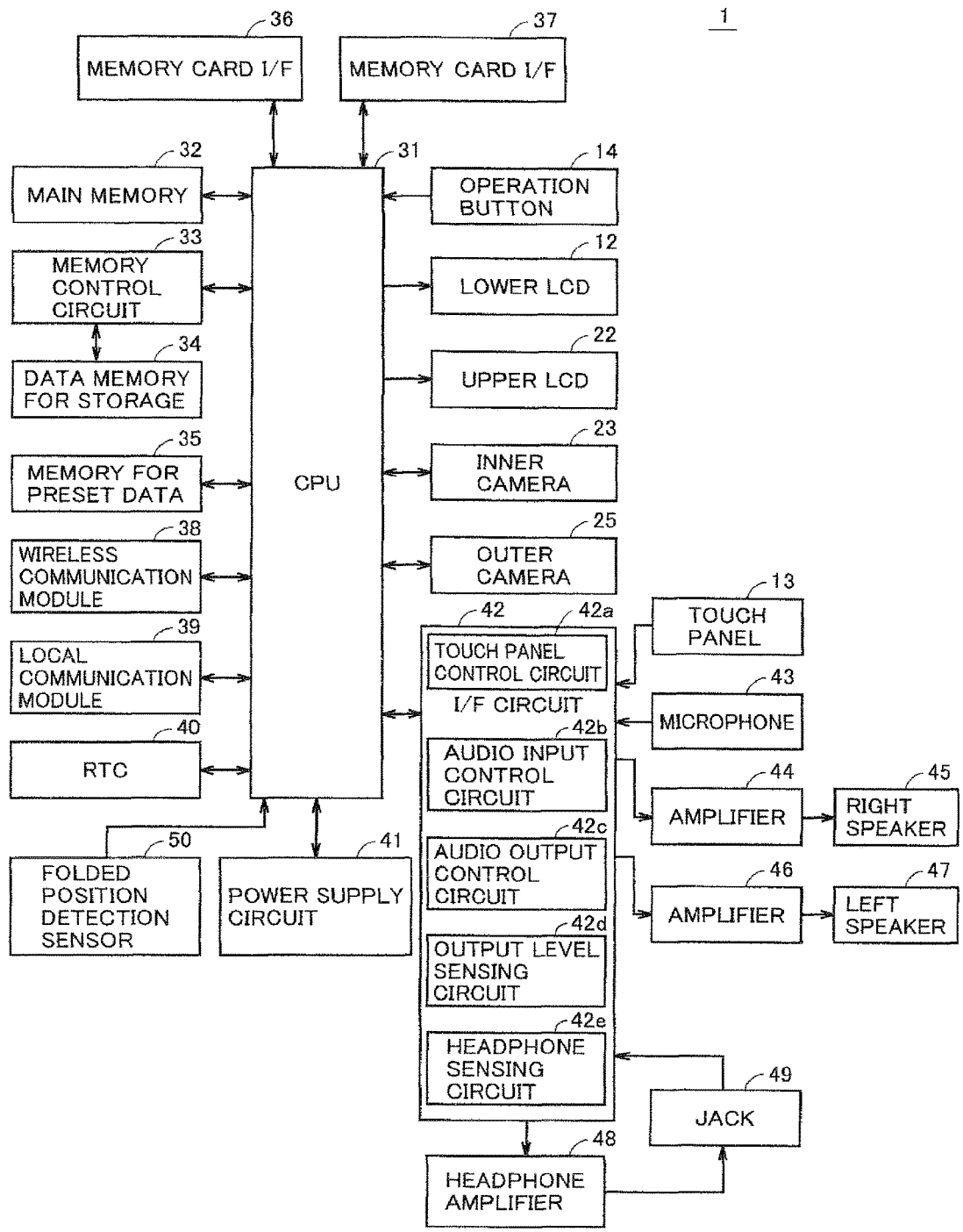
FIG. 18 is a block diagram showing an internal configuration of the game device according to the present embodiment.

FIG. 18 is a block diagram showing the internal configuration of game device 10 according to the present embodiment. As shown in FIG. 18, game device 10 includes such electronic parts as CPU 31, main memory 32, a memory control circuit 33, a data memory 34 for storage, a memory 35 for preset data, memory card interfaces (memory card I/F) 36 and 37, a wireless communication module 38, a local communication module 39, a real time clock (RTC) 40, a power supply circuit 41, an interface circuit (I/F circuit) 42, and a folded position detection sensor 50. These electronic parts are mounted on an electronic circuit board and accommodated in lower housing 11 (or may be accommodated in upper housing 21).

Though various electronic circuits and a battery mounted on game device 10 may be accommodated in either upper housing 21 or lower housing 11, game device 10 is preferably designed such that a weight of lower housing 11 is greater than that of upper housing 21. Specifically, preferably, the weight of lower housing 11 ranges from 100 to 200 g and the weight of upper housing 21 ranges from 50 to 100 g. Further, more preferably, the weight of lower housing 11 ranges from 130 to 150 g and the weight of upper housing 21 ranges from 70 to 90 g.

In the present embodiment, the weight of lower housing 11 is about 150 g and the weight of the upper housing is about 75 g. Further, preferably, a ratio between the weight of lower housing 11 and the weight of upper housing 21 (the weight of lower housing 11):(the weight of upper housing 21) ranges from 1.5:1 to 3:1 (more preferably, 2:1). For example, the battery, the circuit board on which the CPU is mounted, the card connector, and the like are preferably accommodated in lower housing 11.

Further, preferably, minimal parts such as an LCD unit (upper LCD 22 and the like), an image pick-up unit (cameras 23 and 25 and the like), a speaker unit, and the like are accommodated in upper housing 21.

By designing game device 10 such that the weight of lower housing 11 is greater than that of upper housing 21, game device 10 is less likely to fall down when placed on a stand or the like. Further, by making lower housing 11 held by the user heavier than upper housing 21, stability when game device 10 is held is increased and hand movement in photographing can be prevented.

CPU 31 is information processing means for executing various programs (including a launch program, a selected application program, or the like which will be described later). In game device 10 according to the present embodiment, various programs are stored in an embedded memory (for example, data memory 34 for storage) or in memory card 28 and/or 29, and CPU 31 performs various types of processing which will be described later by executing a necessary program. It is noted that the program executed by CPU 31 may be recorded in advance in a memory within game device 10, may be obtained from memory card 28 and/or 29, or may be obtained from another instrument through communication with another instrument.

In addition, the program according to the present invention may be supplied not only to a computer represented by game device 10 through an external storage medium such as memory card 29 but also to a computer through a wired or wireless communication line. Alternatively, the program according to the present invention may be stored in advance in a non-volatile storage device within the computer. A computer-readable storage medium storing such a program is not limited to the non-volatile storage device above, and an optical disc medium such as a CD-ROM, a DVD, or a similar medium may be employed.

Main memory 32, memory control circuit 33 and memory 35 for preset data are connected to CPU 31. In addition, data memory 34 for storage is connected to memory control circuit 33.

Main memory 32 is storage means used as a work area or a buffer area of CPU 31. Namely, main memory 32 stores a program read from the outside (memory card 28, other equipment, and the like), holds a work memory necessary for various types of processing in a non-volatile manner, or store various types of data necessary for various types of information processing. In the present embodiment, for example, a PSRAM (Pseudo-SRAM) is employed as main memory 32.

Data memory 34 for storage is storage means for storing a program executed by CPU 31, data of images picked up by camera 23 or 25, and the like. Data memory 34 for storage is implemented, for example, by a NAND-type flash memory.

Memory control circuit 33 is a circuit controlling reading and writing of data from/to data memory 34 for storage in accordance with an instruction from CPU 31. Memory 35 for preset data is storage means for storing data such as various parameters set in advance in game device 10 (preset data). A flash memory connected to CPU 31 through an SPI (Serial Peripheral Interface) bus may be employed as memory 35 for preset data.

It is noted that an image obtained as a result of image pick-up by camera 23 or 25 can selectively be stored in data memory 34 for storage, memory card 28, memory card 29, or the like.

Memory card I/F 36 is connected to CPU 31. Memory card I/F 36 reads data from memory card 28 attached to the connector or writes data therein in accordance with an instruction from CPU 31. In the present embodiment, data of images picked-up by cameras 23 and 25 is written in memory card 28, and the image data stored in memory card 28 is read from memory card 28 to be stored in data memory 34 for storage. In addition, in the present embodiment, a music file which is music data stored in memory card 28 is read from memory card 28 and stored in main memory 32 or data memory 34 for storage.

A cartridge I/F 37 is connected to CPU 31. Cartridge I/F 37 reads data from memory card 29 attached to the connector or writes data therein in accordance with an instruction from CPU 31. In the present embodiment, an application program executable by game device 10 is read from memory card 29 and executed by CPU 31, or data relating to the application program (including a selected application program which will be described later) (for example, saved data of a game or the like in a case where the application program is a game program) is written in memory card 29.

Wireless communication module 38 has a function to connect to wireless LAN with a scheme complying with the standard of IEEE802.11.b/g. In addition, local communication module 39 has a function to establish wireless communication with game device 10 of the same type with a prescribed communication scheme. Wireless communication module 38 and local communication module 39 are connected to CPU 31. CPU 31 can transmit and receive data to and from other equipment via the Internet through wireless communication module 38, and can transmit and receive data to and from another image pick-up device of the same type through local communication module 39.

In addition, RTC 40 and power supply circuit 41 are connected to CPU 31. RTC 40 counts a time and outputs the time to CPU 31. CPU 31 calculates a current time (date) based on the time counted by RTC 40. Power supply circuit 41 controls electric power from a power supply (the battery; accommodated in lower housing 11) of game device 10 to supply electric power to each part of game device 10.

In addition, folded position detection sensor 50 is connected to CPU 31. Folded position detection sensor 50 detects an angle between lower housing 11 and upper housing 21, and outputs a determination signal indicating the closed state or the opened state to CPU 31 based on a result of detection. Specifically, when the angle between lower housing 11 and upper housing 21 is smaller than a prescribed threshold value, determination as the closed state is made and the determination signal indicating the closed state is output. On the other hand, when the angle between lower housing 11 and upper housing 21 is not smaller than the prescribed threshold value, determination as the opened state is made and the determination signal indicating the opened state is output. For example, when game device 1 is operating, that is, when music data reproduction processing is in progress, receiving input of the determination signal indicating the closed state output from folded position detection sensor 50, CPU 31 stops the operation of the reproduction processing depending on sensing of connection with prescribed external output equipment and sets what is called a sleep state in which data of that state of operation is stored. Regarding processing other than the reproduction processing such as display processing, such processing is stopped and the sleep state is set regardless of sensing of connection with prescribed external output equipment. On the other hand, receiving input of the determination signal indicating the opened state output from folded position detection sensor 50 after game device 1 enters the sleep state, CPU 31 performs processing for recovering from the sleep state to the original state based on the stored data of the state of operation. As a result of this processing, the function set to the sleep state can directly be set to an active state for operation.

In the present example, folded position detection sensor 50 of such a type as detecting an angle between lower housing 11 and upper housing 21 and outputting a determination signal has been described, however, the opened and closed state may be detected based on magnetic force. For example, magnetic force generated by the speaker provided in the upper housing can be measured with a sensor measuring magnetic force provided in the lower housing and the opened and closed state may be detected based on strength of the magnetic force. Alternatively, such a type as optically or electrically detecting the opened and closed state may be adopted as the folded position detection sensor.

Moreover, game device 10 includes microphone 43 and amplifiers 44 and 46. Microphone 43 and amplifiers 44 and 46 are each connected to I/F circuit 42. Microphone 43 senses voice and sound of the user issued toward game device 10 and outputs an audio signal indicating the voice and sound to I/F circuit 42. Amplifier 44 amplifies the audio signal from I/F circuit 42 and causes the audio signal to be output from a right speaker 45. Amplifier 46 amplifies the audio signal from I/F circuit 42 and causes the audio signal to be output from a left speaker 47. I/F circuit 42 is connected to CPU 31. In addition, game device 10 includes a headphone amplifier 48 and a jack 49. Headphone amplifier 48 and jack 49 are each connected to I/F circuit 42.

Headphone amplifier 48 amplifies an audio signal from I/F circuit 42 for output from a not-shown headphone through a plug of the headphone connected to jack 49. I/F circuit 42 senses insertion of the plug of the headphone into the jack by sensing turn-on of a mechanical switch, for example, resulting from insertion of a plug of a headphone into jack 49. Alternatively, I/F circuit 42 senses insertion of the plug of the headphone into the jack by sensing an electrically conducting state resulting from insertion of the plug of the headphone into jack 49.

I/F circuit 42 includes an audio input control circuit 42b receiving input of an audio signal from microphone 43, an audio output control circuit 42c controlling output of an audio signal to amplifiers 44 and 46 (right speaker 45 and left speaker 47) or headphone amplifier 48, a touch panel control circuit 42a controlling touch panel 13, an output level sensing circuit 42d sensing an output level of an audio signal output to amplifiers 44 and 46 (right speaker 45 and left speaker 47) or headphone amplifier 48 (headphone) by audio output control circuit 42c, and a headphone sensing circuit 42e sensing attachment of the headphone.

Audio input control circuit 42b senses an input level of an audio signal from microphone 43, and performs A/D conversion of the audio signal and converts the audio signal to audio data in a prescribed format.

Headphone sensing circuit 42e senses insertion of the plug of the headphone into the jack by sensing turn-on of the mechanical switch resulting from insertion of the plug of the headphone into jack 49 or an electrically conducting state resulting from insertion of the plug of the headphone into jack 49. Then, the result of sensing is output to CPU 31, and CPU 31 receives a signal indicating the result of sensing from headphone sensing circuit 42e and determines that the headphone has been attached. Here, insertion of the plug of the headphone should only be sensed, and a method of sensing is not limited.

When the plug of the headphone is inserted into the jack and headphone sensing circuit 42e senses attachment of the headphone, audio output control circuit 42c switches the output of the audio signal from amplifiers 44, 46 to headphone amplifier 48 in response to an instruction from CPU 31, and adjusts the audio signal to be output to headphone amplifier 48 in accordance with whether the output signal is stereophonic or monaural. In the present example, though only a single headphone amplifier 48 is shown in FIG. 18, stereophonic sound can be heard through a headphone for both ears and hence it is assumed that headphone amplifiers are provided for respective ears.

Touch panel 13 is connected to I/F circuit 42. Touch panel control circuit 42a generates touch position data in a prescribed format based on a signal from touch panel 13 and outputs the data to CPU 31. The touch position data indicates a coordinate of a position where input to an input surface of touch panel 13 was made. Here, the touch panel control circuit performs reading of a signal from touch panel 13 and generation of the touch position data once in a prescribed period of time. CPU 31 can know a position at which an input to touch panel 13 was made by obtaining the touch position data.

Operation button group 14 is constituted of operation buttons 14A to 14K above and connected to CPU 31. Operation data indicating a state of input to each of operation buttons 14A to 14K (whether the button was pressed or not) is output from operation button group 14 to CPU 31. CPU 31 performs processing in accordance with the input to operation button group 14 by obtaining the operation data from operation button group 14.

Inner camera 23 and outer camera 25 are each connected to CPU 31. Inner camera 23 and outer camera 25 pick up an image in accordance with an instruction from CPU 31, and output picked-up image data to CPU 31. For example, CPU 31 gives an image pick-up instruction to any one of inner camera 23 and outer camera 25 and the camera that received the instruction picks up an image and sends image data to CPU 31.

In addition, lower LCD 12 and upper LCD 22 are each connected to CPU 31. Each of lower LCD 12 and upper LCD 22 displays an image thereon in accordance with an instruction from CPU 31. For example, CPU 31 causes one of lower LCD 12 and upper LCD 22 to display an image obtained from any of inner camera 23 and outer camera 25 and causes the other of lower LCD 12 and upper LCD 22 to display an operation guidance picture generated through prescribed processing.

Though not shown, game device 10 has a vibration function to vibrate itself. The vibration function is used, for example, for giving some notification to the user (for example, for notifying the user of error in operation, excess of memory capacity, and the like). In the present embodiment, since it is assumed that the user holds lower housing 11 during use, a device for achieving the vibration function (for example, a vibrator such as a vibration motor or a solenoid) is preferably accommodated in lower housing 11. Thus, vibration can be conveyed to the user's hand holding game device 10 (lower housing 11).

[6. Launcher Processing and Photographing Function]

<Overview>

Game device 100 according to the present embodiment can execute a plurality of application programs as will be described later. In order to facilitate an operation for selection from such a plurality of application programs by the user, game device 100 has a launcher function. In particular, game device 100 can provide a relatively simple photographing function on a screen providing this launcher function.

Processing supporting selective launching of an application by the user will be described hereinafter with reference to FIG. 19.

Figure 19:
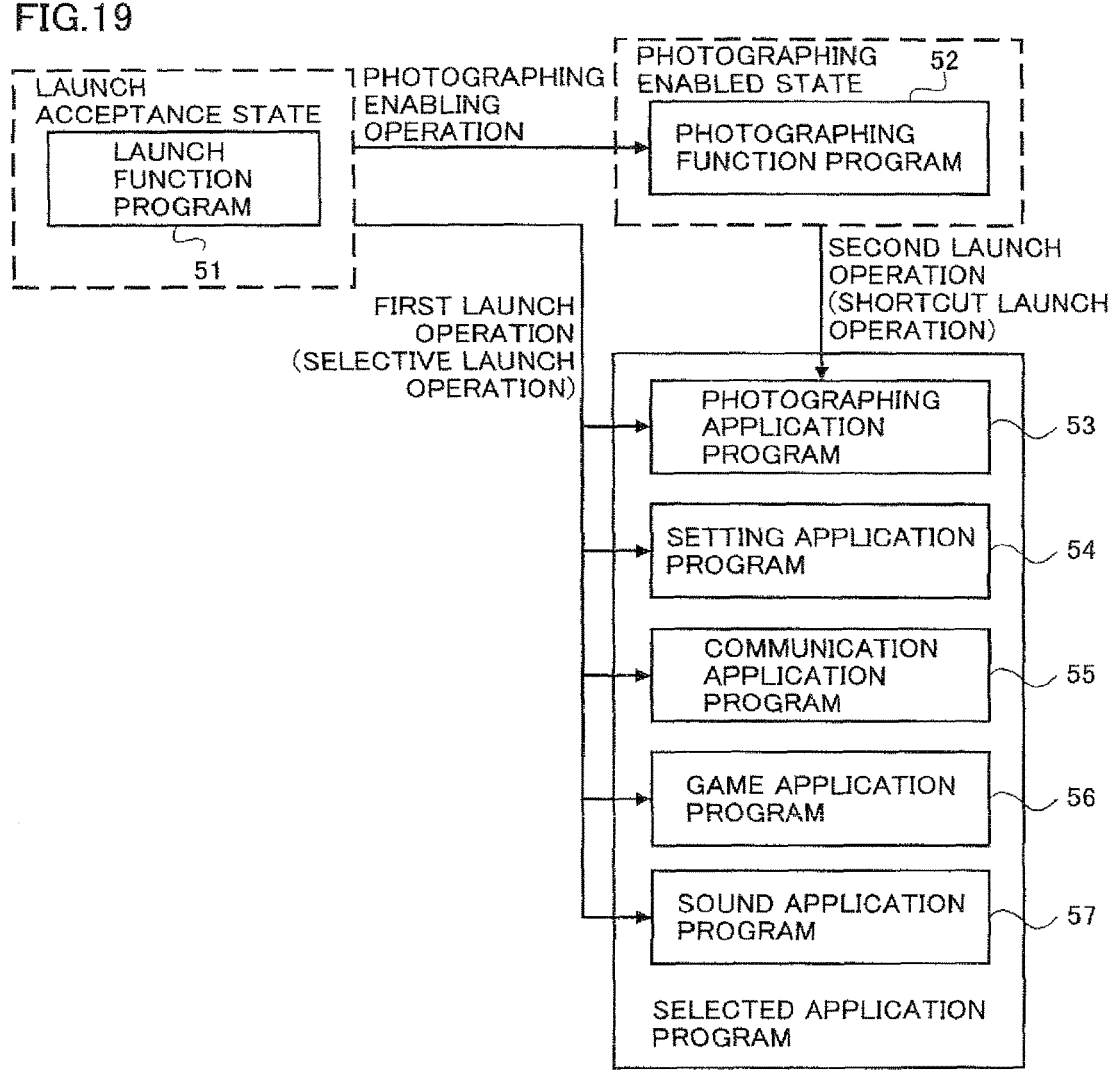
FIG. 19 is a diagram for illustrating a method of launching each application program in the game device according to the present embodiment.

FIG. 19 is a diagram for illustrating a method of launching each application program in game device 10. Game device 10 selectively launches an application program desired by the user among a plurality of application programs 53 to 57. Application programs 53 to 57 to selectively be launched in game device 10 may also be referred to as selected application programs.

The plurality of selected application programs above include a photographing application program 53. Photographing application program 53 is an application program for performing photographing with camera 23 or 25. Photographing application program 53 is typically stored in advance (pre-installed) in game device 10.

Further, the plurality of selected application programs above include application programs having various functions in addition to photographing application program 53 above. In FIG. 19, for example, a setting application program 54 for making various settings of game device 10, a communication application program 55 for game device 10 to establish communication with external equipment, a game application program 56 for playing a prescribed game, and a sound application program 57 for reproducing music or recording voice and sound are included. In the present embodiment, photographing application program 53 and communication application program 55 are implemented as one integrated program.

It is noted that various selected application programs in addition to five selected application programs 53 to 57 shown in FIG. 19 may be stored.

Some or all of the selected application programs above do not have to be pre-installed in game device 10. When executed, for example, a selected application program may be downloaded from another device via a network such as the Internet, or may be read from a removable storage medium such as memory card 28 or memory card 29 into a memory within game device 10.

Further, in the present embodiment, processing for selectively launching selected application programs 53 to 57 is performed by a launch function program 51. Launch function program 51 is a program for selecting a selected application program to be launched from among the plurality of selected application programs 53 to 57. Namely, launch function program 51 is what is called a launcher program. Launch function program 51 is one of programs included in launch programs (a launch program 61 shown in FIG. 20) according to the present embodiment.

Selected application programs 53 to 57 are subjected to a selection operation that can be performed by the user as a result of execution of launch function program 51, and they are executed by being selected in the selection operation.

Detailed contents of processing in photographing application program 53, communication application program 55 and sound application program 57 executed by launch function program 51 in response to a user's selection operation will be described later.

<Control Structure>

Game device 10 according to the present embodiment includes (a) first launch operation acceptance means, (b) first launch means, (c) photographing processing means, (d) photographing enabling operation acceptance means, (e) photographing operation acceptance means, (f) second launch operation acceptance means, and (g) second launch means as the control structure. In the present embodiment, each of these means is implemented as a result that a program (launch program 61) executed by a computer (CPU 31) of game device 10 causes the computer to function as that means.

(a) First Launch Operation Acceptance Means

The first launch operation acceptance means accepts a first launch operation for selectively launching the plurality of application programs above (step SA6 and SA11 which will be described later). Thus, the user can select a selected application program that the user desires to launch (execute) for execution. As the first launch operation is an operation for selectively launching a selected application program, the first launch operation is also hereinafter referred to as a "selection launch operation." It is noted that a state of accepting the first launch operation (a state where the first launch operation can be performed) is referred to as a "launch acceptance state" (FIG. 19).

(b) First Launch Means

When the first launch operation above is performed, the first launch means launches an application program selected in the first launch operation from among the plurality of application programs above (step SA12 which will be described later). In other words, for example, when photographing application program 53 is selected in the first launch operation, photographing application program 53 is launched.

In the present embodiment, the launch acceptance state corresponds to a state where what is called a menu screen is displayed, and game device 10 is initially in the launch acceptance state after it is started up (power is turned on) (except for start-up for the first time). Though details will be described later, the menu screen (FIG. 23) showing icons indicating selected application programs 53 to 57 is displayed on lower LCD 12 in the launch acceptance state in the present embodiment. The user can launch a selected application program by performing an operation to touch a position of the icon on touch panel 13 as the first launch operation.

(c) Photographing Processing Means

The photographing processing means performs photographing processing (step SA10 which will be described later). The photographing processing is processing for storing an image picked-up by camera 23 or 25 in storage means in the information processing device in accordance with a prescribed photographing operation. In the present embodiment, the photographing operation is an operation to press a prescribed button (more specifically, L button 14I or R button 14J). The photographing processing means above is means implemented by execution of launch program 61 according to the present invention by CPU 31 of game device 10, and it is different from means implemented by photographing application program 53 above. It is noted that the photographing processing means has only to have at least a function to perform photographing processing (a function to store an image picked-up by camera 23 or 25 in the storage means of game device 10), however, it may have other functions relating to photographing (for example, a function to display or edit a stored image).

In the present embodiment, launch program 61 according to the present invention includes a photographing function program 52 shown in FIG. 19. The photographing processing means above is implemented by execution of photographing function program 52 by CPU 31 of game device 10. In other words, game device 10 according to the present embodiment stores two types of programs for executing photographing processing of photographing function program 52 and photographing application program 53.

Further, in the present embodiment, though launch program 61 includes the two types of programs of launch function program 51 and photographing function program 52, launch function program 51 and photographing function program 52 may be one integrated program. Launch program 61 (launch function program 51 and photographing function program 52) is pre-installed in game device 10.

Here, a function attained by the photographing processing means is different from a function enabled by execution of photographing application program 53 above. In the present embodiment, the photographing processing means has only a part of functions attained by photographing application program 53. In an alternative embodiment, the photographing processing means may have a function not attained by photographing application program 53.

(d) Photographing Enabling Operation Acceptance Means

In the launch acceptance state, the photographing enabling operation acceptance means accepts a photographing enabling operation for causing (a state of game device 10 to enter) a photographing enabled state (steps SA6 and SA9 which will be described later). The photographing enabled state is a state where photographing processing by the photographing processing means above can be performed in accordance with the photographing operation above (a state of accepting the photographing enabling operation). In other words, in the launch acceptance state, the user can launch selected application programs 53 to 57 with the first launch operation, and can also activate a photographing function attained by the photographing processing means with the photographing enabling operation (FIG. 19). In the present embodiment, the photographing enabling operation is an operation to press a prescribed button (more specifically, L button 14I or R button 14J).

In the present embodiment, the photographing enabling operation is an operation different from the first launch operation in a manner of operation. Specifically, in the present embodiment, the first launch operation is an input operation to touch panel 13 while the photographing enabling operation is an operation to press a prescribed button (more specifically, L button 14I or R button 14J). It is noted that the phrase "different in a manner of operation" naturally means that an input device to be operated is different and also means that an operation performed on the same input device is different. In an alternative embodiment, the first launch operation and the photographing enabling operation may be operations to touch different positions on touch panel 13, may be operations to input different trails on touch panel 13, or may be operations to press different buttons. In order to easily and quickly activate the photographing function attained by the photographing processing means (launch photographing function program 52), the photographing enabling operation is preferably a simple operation such as an operation to press a prescribed button.

(e) Photographing Operation Acceptance Means

When the photographing enabling operation above is performed, the photographing operation acceptance means accepts the photographing operation (steps SA24 and SA25 which will be described later). In other words, when the photographing enabling operation is performed, the state of game device 10 enters the photographing enabled state (FIG. 19). Thus, the user can take a photograph (cause game device 10 to perform the photographing processing) by performing the photographing operation after the photographing enabling operation.

In the present embodiment, the launch acceptance state and the photographing enabled state are mutually exclusive, and game device 10 is alternatively in either the launch acceptance state or the photographing enabled state. In other words, the photographing operation (in the photographing enabled state) is not accepted in the launch acceptance state while the first launch operation (in the launch acceptance state) is not accepted in the photographing enabled state. In an alternative embodiment, however, the launch acceptance state and the photographing enabled state do not have to be mutually exclusive, and game device 10 can be in the launch acceptance state and the photographing enabled state. For example, game device 10 may accept the first launch operation in the photographing enabled state.

(f) Second Launch Operation Acceptance Means

In the photographing enabled state above, the second launch operation acceptance means accepts a second launch operation for launching photographing application program 53 (steps SA24 and SA29 which will be described later). Thus, in the photographing enabled state, the user can perform the second launch operation in addition to the photographing operation. The second launch operation is an operation for launching photographing application program 53 directly from the photographing enabled state without returning to the launch acceptance state, and thus it is also hereinafter referred to as a "shortcut launch operation."

Figure 24:
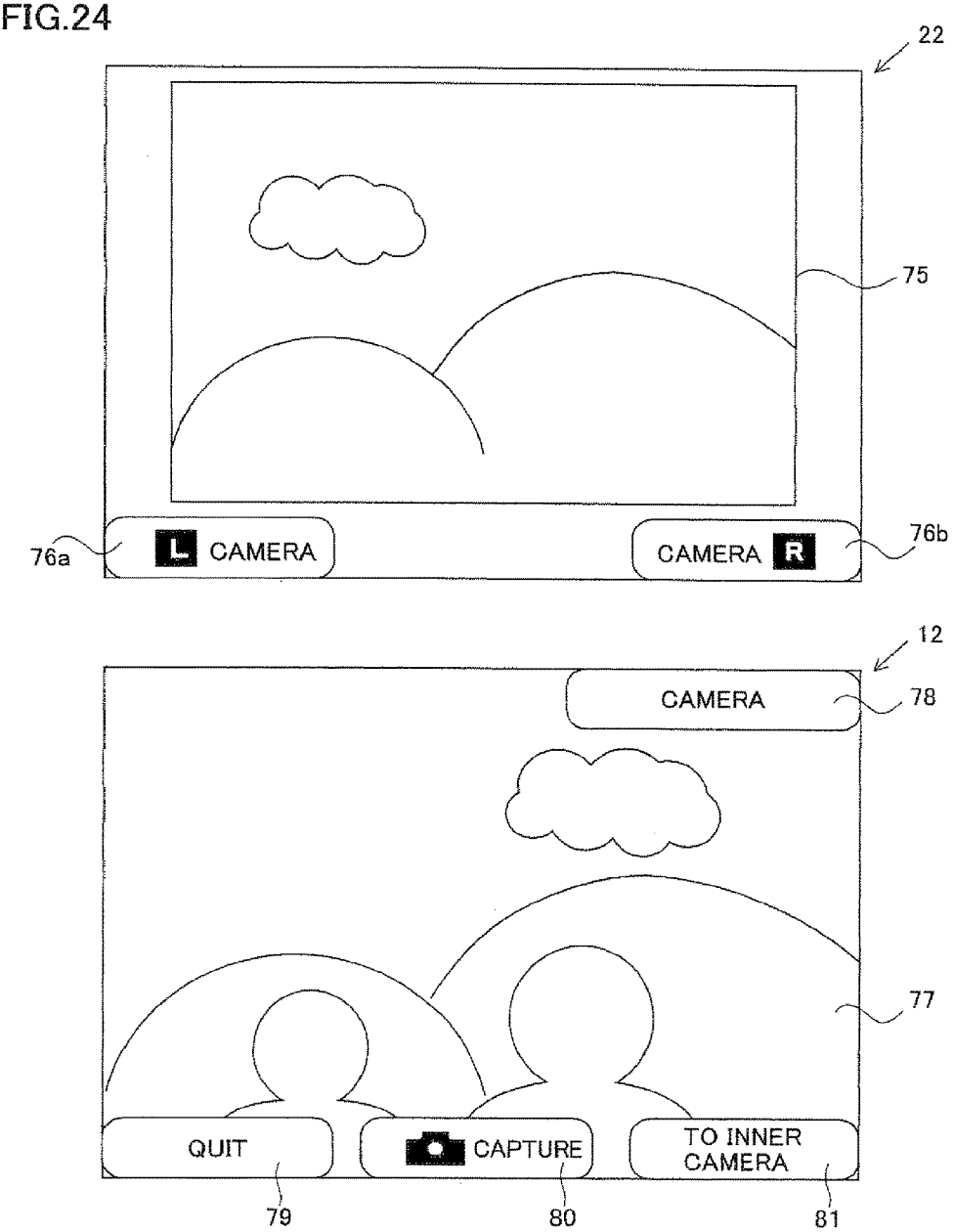
FIG. 24 is a diagram showing an example of an image displayed in a photographing enabled state in the launcher processing in the game device according to the present embodiment.

In the present embodiment, in the photographing enabled state, an image picked-up by camera 23 or 24 is displayed on lower LCD 12 while a button image (a button image 78 shown in FIG. 24) for performing the second launch operation is displayed on lower LCD 12 (FIG. 24). The user can perform the second launch operation by performing an operation to touch the button image. In order to easily and quickly launch photographing application program 53, the second launch operation is preferably a simple operation.

(g) Second Launch Means

When the second launch operation above is performed, the second launch means launches photographing application program 53 (step SA30 which will be described later). Thus, the user can launch photographing application program 53 in any of the launch acceptance state and the photographing enabled state. Photographing application program 53 is launched (executed) with any of the first launch operation in the launch acceptance state above and the second launch operation in the photographing enabled state above.

As described above, according to the present embodiment, in the launch acceptance state, the user can launch selected application programs 53 to 57 with the selection launch operation (the first launch operation) and also can perform the photographing function attained by the photographing processing means with the photographing enabling operation. In addition, in the photographing enabled state where photographing based on the photographing function can be performed, the user can launch photographing application program 53 with the shortcut launch operation (the second launch operation). Thus, even during photographing based on the photographing processing means, the user can easily and quickly launch photographing application program 53 with the shortcut launch operation. In other words, according to the present embodiment, even though the user desires to use a function (of photographing application program 53) not provided by the photographing processing means during photographing based on the photographing processing means, the user can easily and quickly use the function by performing the shortcut launch operation.

<Data Structure>

Data used in the processing in game device 10 will now be described with reference to FIG. 20.

Figure 20:
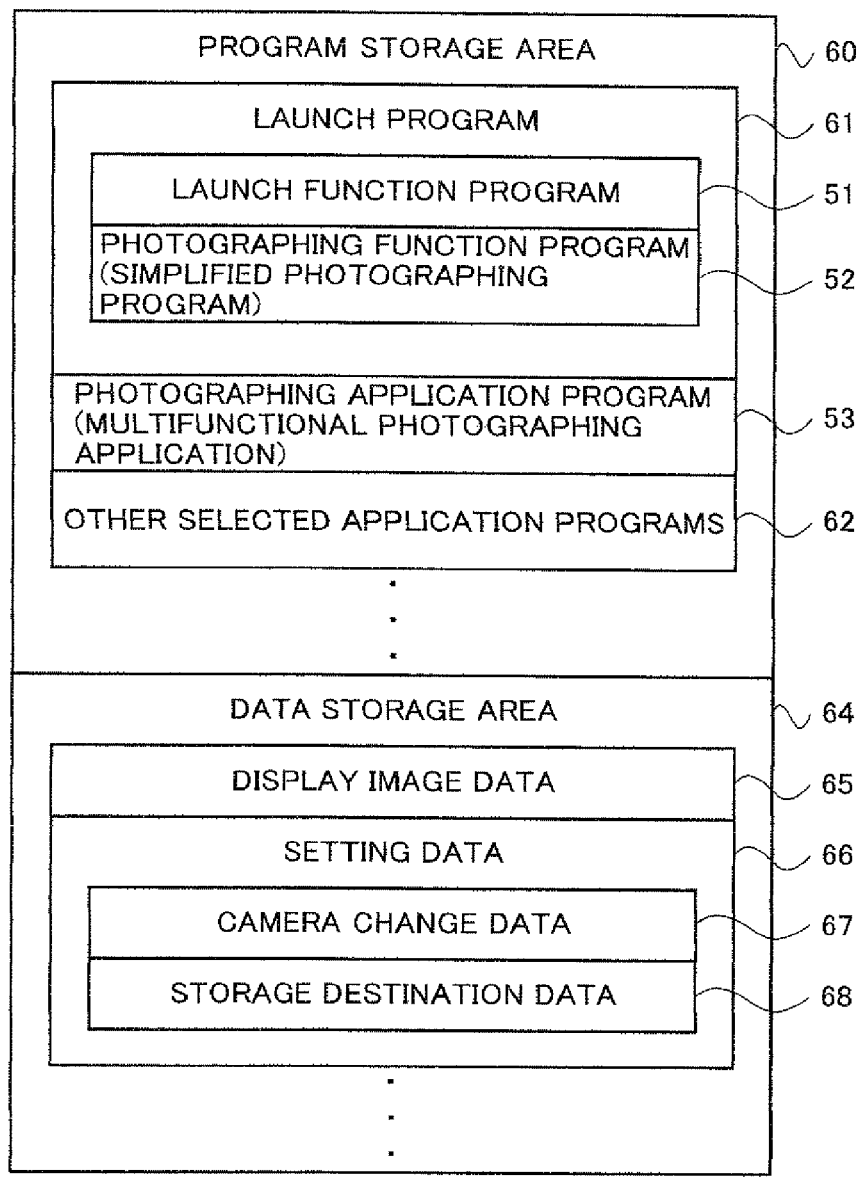
FIG. 20 is a diagram showing main data stored in a main memory of the game device according to the present embodiment.

FIG. 20 is a diagram showing main data stored in main memory 32 of game device 10. As shown in FIG. 20, a program storage area 60 and a data storage area 64 are provided in main memory 32.

In program storage area 60, various programs (application programs) executed by CPU 31 are stored. Specifically, launch program 61, photographing application program 53, other selected application programs 62, and the like are stored. These programs are read from data memory 34 for storage, memory card 28 or memory card 29 and stored in main memory 32 at appropriate timing after start-up of game device 10 (for example, at the timing of launch of a program).

Launch program 61 is a program for performing main processing in game device 10. Launch program 61 is read into the main memory and executed after start-up of game device 10. Launch program 61 includes launch function program 51 and photographing function program 52 above.

Launch function program 51 is a program for selecting a selected application program to be launched as described above.

Photographing function program 52 is a program which is not a selected application program, and it is a program for performing the photographing processing. In the present embodiment, photographing function program 52 has only a part of functions attained by photographing application program 53. In other words, in the present embodiment, photographing function program 52 is a photographing processing program having a relatively simple function, and photographing application program 53 is a relatively multifunctional photographing processing program. Further, photographing function program 52 has a data size smaller than that of photographing application program 53. Since programs 52 and 53 have a common function, a part of data thereof may be stored in common. Hereinafter, photographing function program 52 having a relatively simple function is also referred to as a "simplified photographing program 52," and relatively multifunctional photographing application program 53 is also referred to as a "multifunctional photographing application program 53."

The phrase "(relatively) simple function" herein encompasses both meaning of having (relatively) few functions and meaning of having a (relatively) low function. In other words, the phrase "(relatively) multifunctional" encompasses meaning of having (relatively) many functions as well as meaning of having a (relatively) high function. In other words, simplified photographing program 52 may have a relatively low function (for example, photographing with a small number of pixels, a small number of types of stamps available in editing a picked-up image, and the like) while multifunctional photographing application program 53 may have a relatively high function (for example, photographing with a large number of pixels, a large number of types of stamps available in editing a picked-up image, and the like).

Further, simplified photographing program 52 may have relatively few functions (for example, adjustment of exposure and white balance is impossible, a prescribed edition operation on a picked-up image is impossible, and the like) while multifunctional photographing application program 53 may have relatively many functions (for example, adjustment of exposure and white balance is possible, a prescribed edition operation on a picked-up image is possible, and the like).

Further, other selected application programs 62 refer to selected application programs other than multifunctional photographing application program 53, and include setting application program 54, communication application program 55, game application program 56, sound application program 57 for reproducing music or recording voice and sound described above, and the like.

The selected application programs (including multifunctional photographing application program 53) are stored in data memory 34 for storage or memory card 28, and read into main memory 32 when launched. It is noted that the selected application programs may be obtained (downloaded) from external equipment through communication and stored in data memory 34 for storage.

Meanwhile, in data storage area 64, display image data 65, setting data 66, and the like are stored. In addition to these data 65 and 66, various data used in the processing in game device 10 are stored in data storage area 64.

Display image data 65 is data indicative of a display image. Here, in the present embodiment, one of stored images taken in the past is displayed on the menu screen, and an image being displayed is referred to as a display image. Specifically, display image data 65 indicates a file name and the like of a display image. Though details of a method of selecting a display image will be described later, a favorite image which will be described later, an image immediately after photographing (storage) by means of simplified photographing program 52, or the like is selected as a display image in the present embodiment.

Setting data 66 is data indicative of setting information used in each program for photographing (simplified photographing program 52 and multifunctional photographing application program 53). Setting data 66 is passed as an argument to each of programs 52 and 53 at the time of launch of each of programs 52 and 53 for photographing. Setting data 66 includes camera change data 67 and storage destination data 68.

Camera change data 67 indicates a camera for picking up an image, out of inner camera 23 and outer camera 25. In other words, camera change data 67 is data indicative of either inner camera 23 or outer camera 25.

Storage destination data 68 indicates a storage destination of a picked-up image stored as a result of the photographing operation (referred to as a stored image). In the present embodiment, a picked-up image stored (saved) as a result of the photographing operation is stored in data memory 34 for storage or memory card 28. Thus, storage destination data 68 indicates either data memory 34 for storage or memory card 28.

Figure 29:
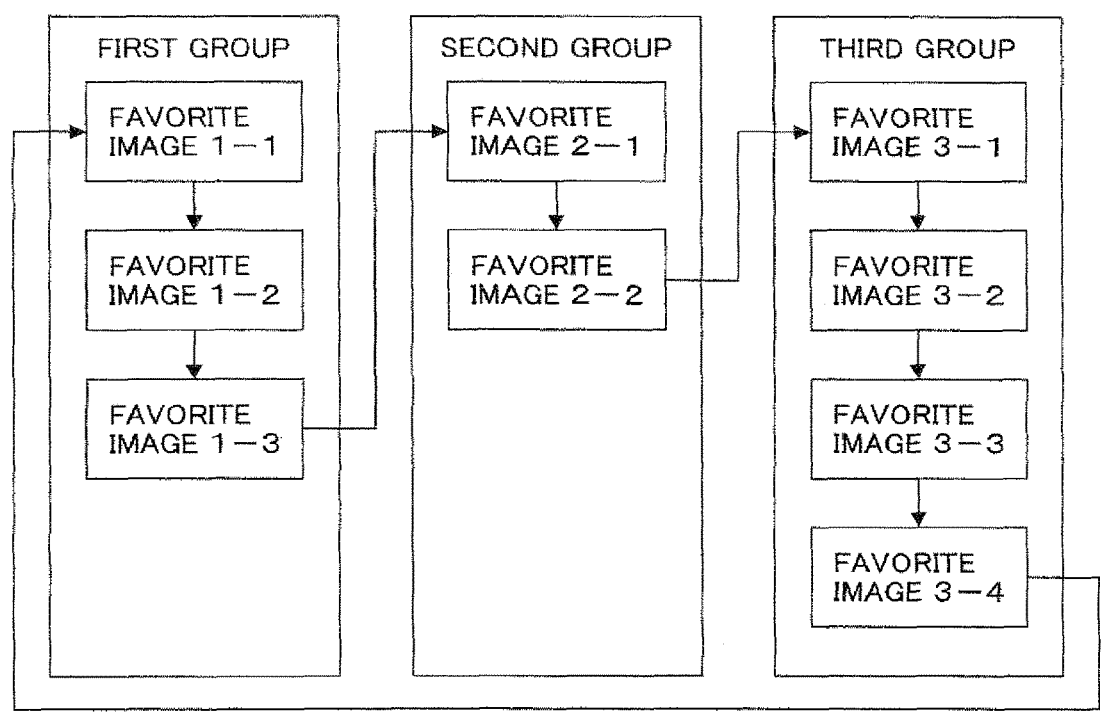
FIG. 29 is a diagram showing a change method in processing for changing a display image in the flowchart shown in FIG. 28.

It is noted that information such as a file name is attached to the stored image and information relating to favorite is also attached. Here, in the present embodiment, the user can set some of stored images as "favorite" (step SA46 which will be described later). A stored image set as favorite is hereinafter referred to as a "favorite image". Information indicative of "favorite" is added to data of a favorite image. In addition, in the present embodiment, information indicative of any of first to third groups is added to the data of the favorite image. In other words, in the present embodiment, favorite images can be managed in three groups of first to third groups (FIG. 29).

<Processing Procedure>

Figure 21:
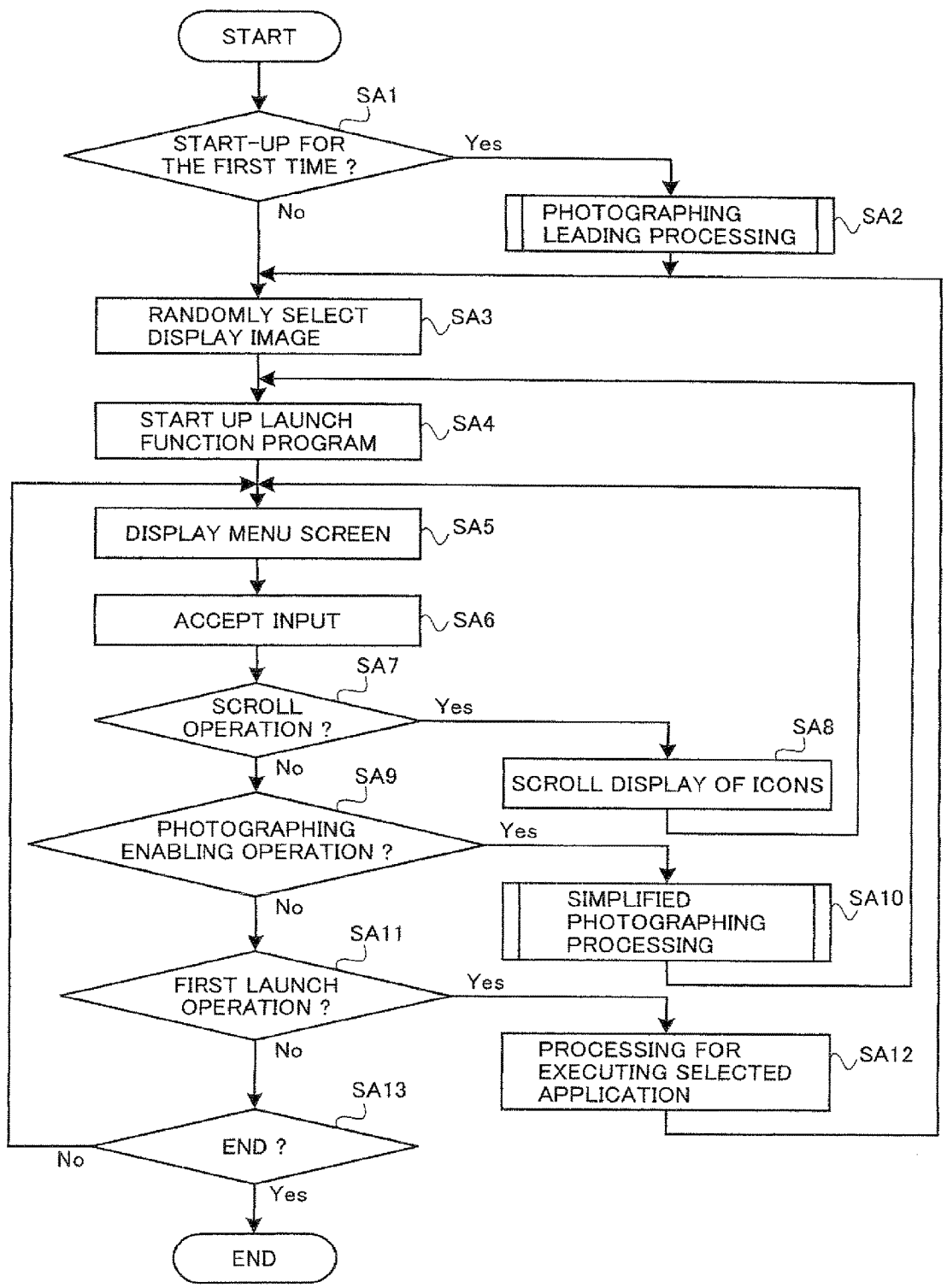
FIG. 21 is a main flowchart showing a flow of launcher processing in the game device according to the present embodiment.

With reference to FIGS. 21 to 30, a flow of the processing relating to the launcher function in game device 10 will now be described. FIG. 21 is a main flowchart showing the flow of the launch processing in game device 10. When power of game device 10 is turned on by pressing power button 14F, CPU 31 of game device 10 initializes main memory 32 or the like, and then starts execution of launch program 61. Thus, processing in subsequent steps SA1 to SA13 is started.

In step SA1, CPU 31 determines whether game device 10 is started up for the first time or not. Determination in step SA1 can be made, for example, by storing time and date of previous start-up of game device 10. In other words, if time and date of previous start-up have been stored, it can be determined that the present start-up of game device 10 is not start-up for the first time. On the other hand, if time and date of the previous start-up have not been stored, it can be determined that the present start-up of game device 10 is start-up for the first time.

When a result of determination in step SA1 indicates Yes, the processing in step SA2 is performed. On the other hand, when the result of determination in step SA1 indicates No, the processing in step SA2 is skipped and the processing in step SA3 is performed.

In step SA2, CPU 31 performs photographing leading processing. The photographing leading processing is processing for leading the user to experience a photographing operation with a simple function. In other words, in the photographing leading processing, the user is caused to select whether or not to perform photographing processing using simplified photographing program 52 above. When the user selects to perform the photographing processing, the user is caused to experience a simple photographing operation based on simplified photographing program 52 above. Details of the photographing leading processing will be described later with reference to FIG. 27. CPU 31 performs the processing in step SA3 following step SA2.

In step SA3, CPU 31 selects a display image from among favorite images in a random manner. Specifically, CPU 31 selects one favorite image from among favorite images stored in data memory 34 for storage in a random manner, and causes main memory 32 to store data indicative of information (for example, a file name) identifying the selected favorite image as display image data 65. Subsequent to step SA3, the processing in step SA4 is performed.

In step SA4, CPU 31 launches launch function program 51. In other words, CPU 31 reads launch function program 51 from data memory 34 for storage, causes main memory 32 to store the program, and executes launch function program 51. The processing in step SA5 and subsequent steps is performed as a result of execution of launch function program 51 by CPU 31. Further, in the present embodiment, CPU 31 reads simplified photographing program 52 into main memory 32 together with launch function program 51 at the timing of reading of launch function program 51. In an alternative embodiment, simplified photographing program 52 may be read into main memory 32 at the timing of execution of simplified photographing processing (step SA11) which will be described later. Subsequent to step SA4, the processing in step SA5 is performed.

In step SA5, CPU 31 has a menu screen displayed. The menu screen is a screen (an image) for causing the user to select a selected application program to be launched from among the selected application programs. The launch acceptance state shown in FIG. 19 is a state where the menu screen is displayed. The menu screen in the present embodiment will be described hereinafter with reference to FIG. 23.

FIG. 23 is a diagram showing an example of the menu screen. As shown in FIG. 23, in step SA5, an image for causing the user to select a selected application program to be executed is displayed on lower LCD 12. Specifically, icon images 71a to 71c, a scroll bar 72, a marker 73, and scroll buttons 74a and 74b are displayed on lower LCD 12.

Icon image 71 is an image representing a selected application program. Icon image 71 is an icon for launching an application program in memory card 29. When memory card 29 is not attached, an icon indicating absence of a card is displayed together with a message that "card is not attached."

The user can launch a selected application program indicated by a touched icon image, by performing an operation to touch icon image 71 displayed at a center of the screen (in the left-right direction) as the first launch operation above.

In the present embodiment, a prescribed number of icon images (four icon images in FIG. 23) among icon images corresponding to a plurality of application programs respectively are displayed on the screen. The (types of) icon images being displayed are changed in accordance with an operation for scrolling the screen. In other words, though icon images indicating selected application programs other than the displayed selected application programs are not shown in FIG. 23, the icon images are displayed by scrolling the screen on lower LCD 12.

The screen of lower LCD 12 can be scrolled by an operation to touch an icon image other than the icon image displayed at the center of the screen, or by an operation to touch marker 73 or scroll button 74a or 74b. In other words, when the user touches the icon image (icon image 71a or 71c in FIG. 23) other than the icon image displayed at the center of the screen, the screen of lower LCD 12 is scrolled and the touched icon image is displayed at the center of the screen. Alternatively, the user can move marker 73 along scroll bar 72 by performing an operation to move a touched position along scroll bar 72 to the right and left while touching marker 73, thereby scrolling the screen of lower LCD 12 in accordance with movement of marker 73. Alternatively, the screen of lower LCD 12 can be scrolled to the left by an operation to touch scroll button 74a on the left of scroll bar 72, and the screen of lower LCD 12 can be scrolled to the right by an operation to touch scroll button 74b on the right of scroll bar 72.

As described above, in the state where the menu screen is displayed, the user can change the icon image displayed at the center of the screen by performing the operation to scroll the screen, and also can launch the selected application program indicated by the icon image with the operation to touch the icon image displayed at the center of the screen.

In the present embodiment, all of the plurality of selected application programs are not concurrently displayed but some of the plurality of selected application programs are displayed in a list and replaced with the rest by scrolling or the like so that the rest is in turn displayed. Here, in an alternative embodiment, all of the plurality of selected application programs may concurrently be displayed. Alternatively, (icon images of) selected application programs displayed in a list may be displayed in a line as in the present embodiment or may be displayed in matrix of 2×2 or more.

Meanwhile, as shown in FIG. 23, in step SA5, a display image 75 and photographing button images 76a and 76b are displayed on upper LCD 22. Display image 75 is a stored image shown based on display image data 65 stored in main memory 32 and selected in step SA3 or the like. In this manner, in the present embodiment, an image taken in the past is displayed on the menu screen. Thus, a user using game device 10 for the first time is made aware that game device 10 has the photographing function. Further, as the menu screen of game device 10 is different for each user (for each information processing device), the menu screen can have individuality.

As display image 75 is randomly selected in step SA3, the user cannot designate as display image 75, an arbitrary image from among images stored in data memory 34 for storage. As will be described later, though multifunctional photographing application program 53 has a function to set a favorite image, the launch function program and simplified photographing program 52 do not have a function to set a favorite image. Further, photographing button images 76a and 76b are images indicating an operation to make transition to a state where photographing based on simplified photographing program 52 can be performed (the photographing enabled state shown in FIG. 19), that is, the photographing enabling operation above. Thus, in the present embodiment, by displaying the operation to make transition to the photographing enabled state on the menu screen (the launch acceptance state), it can clearly be presented to the user that photographing based on simplified photographing program 52 can be performed through the menu screen (without selecting a selected application program).

As shown in FIG. 23, the photographing enabling operation is typically an operation to press L button 14I or R button 14J. Therefore, the user can set the state where photographing based on simplified photographing program 52 can be performed by pressing a button (L button 14I or R button 14J) once in the launch acceptance state.

In the present embodiment, except for start-up for the first time (Yes in step SA1), the menu screen is initially displayed after the start-up of game device 10. In other words, in the present embodiment, game device 10 sets a first state after the start-up of game device 10 to the launch acceptance state. Therefore, the user can launch simplified photographing program 52 immediately after start-up.

Referring back to the description in connection with FIG. 21, subsequent to step SA5, the processing in step SA6 is performed. In step SA6, CPU 31 accepts an input to each input device. In other words, CPU 31 obtains operation data from operation button group 14 and obtains input position data from touch panel 13. The obtained operation data and input position data are stored in main memory 32. In the launch acceptance state, the processing in step SA6 is performed once in a prescribed time period (for example, one frame time (1/60 sec.)). Subsequent to step SA6, processing in step SA7 is performed.

In step SA7, CPU 31 determines whether an operation to scroll the screen of lower LCD 12 has been performed or not. Determination in step SA7 can be made by referring to the input position data stored in main memory 32 in step SA6. In other words, in the determination processing in step SA7, CPU 31 determines whether an input to touch an area where marker 73 or scroll button 74*a* or 74*b* is displayed has been provided or not.

When a result of determination in step SA7 indicates Yes, processing in step SA8 is performed. On the other hand, when the result of determination in step SA7 indicates No, processing in step SA9 which will be described later is performed.

In step SA8, CPU 31 scrolls display of the icon images (the screen of lower LCD 12). In other words, when a touch input of scroll button 74*a* is provided, the icon images are scrolled to the left, and when a touch input of scroll button 74*b* is provided, the icon images are scrolled to the right. Thus, an icon image that has not been displayed on the screen of lower LCD 12 can be displayed. Subsequent to step SA8, the processing in step SA5 is performed again.

Meanwhile, in step SA9, CPU 31 determines whether the photographing enabling operation has been performed or not. Determination in step SA9 can be made by referring to the operation data stored in main memory 32 in step SA6. In other words, in the determination processing in step SA9, CPU 31 determines whether L button 14I or R button 14J has been pressed or not.

When a result of determination in step SA9 indicates Yes, processing in step SA10 is performed. On the other hand, when the result of determination in step SA9 indicates No, processing in step SA11 which will be described later is performed.

In step SA10, CPU 31 performs the simplified photographing processing. The simplified photographing processing is processing for causing the user to perform photographing with a simple function based on simplified photographing program 52. Details of the simplified photographing processing will be described hereinafter with reference to FIG. 22.

Figure 22:
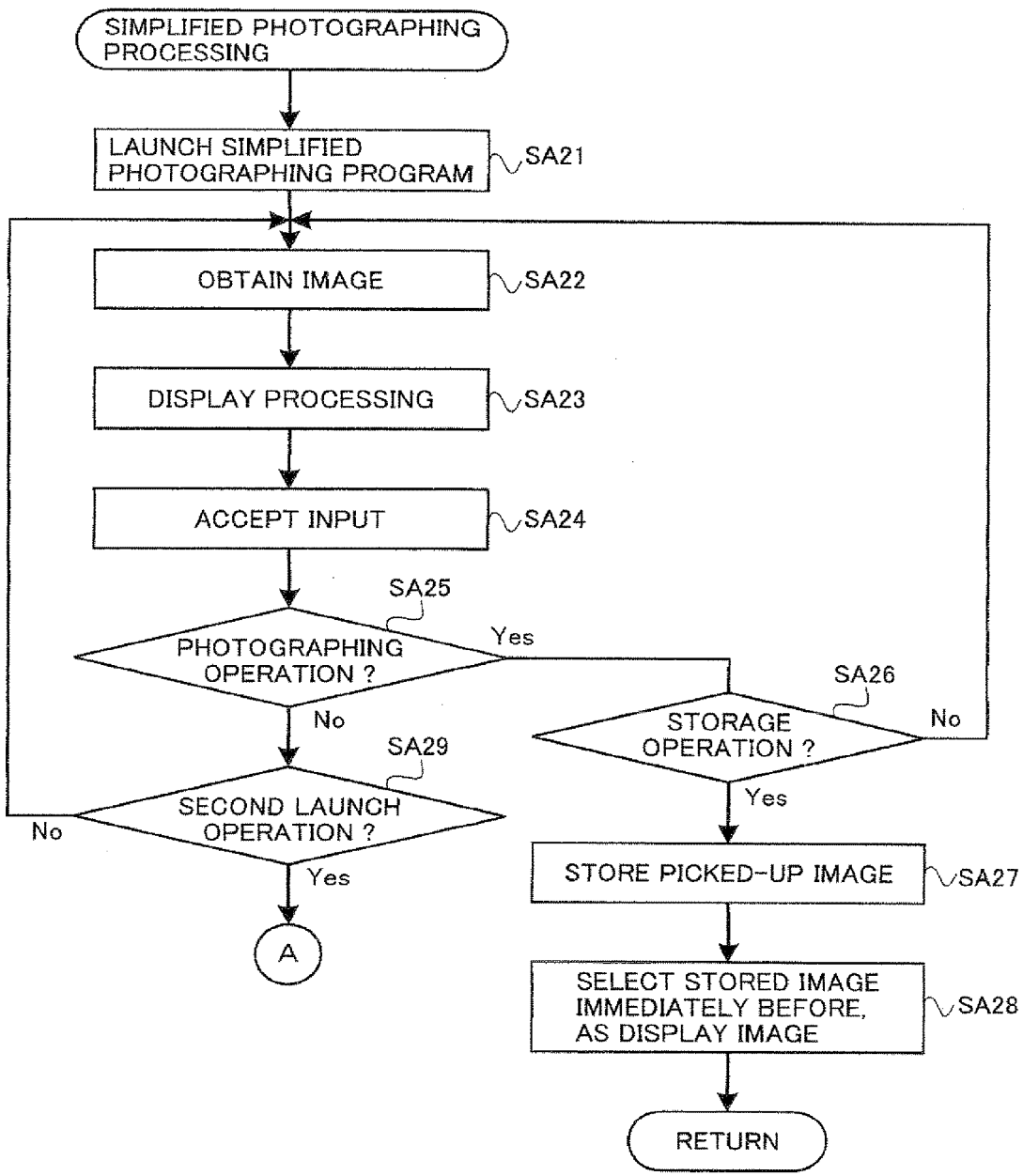
FIG. 22 is a flowchart showing a flow of simplified photographing processing shown in FIG. 21.

FIG. 22 is a flowchart showing a flow of the simplified photographing processing (step SA10) shown in FIG. 21. In input image generation processing, initially in step SA21, CPU 31 launches simplified photographing program 52. In the present embodiment, since simplified photographing program 52 has been read into main memory 32 together with launch function program 51, CPU 31 starts execution of simplified photographing program 52. Here, data 67 and 68 included in setting data 66 stored in main memory 32 are input (set) as arguments for simplified photographing program 52. Processing in steps SA22 to SA28 subsequent to step SA21 is performed by using simplified photographing program 52 (by executing simplified photographing program 52).

In step SA22, CPU 31 obtains data of an image picked-up by inner camera 23 or outer camera 25. In the present embodiment, an image is picked-up by only any one of cameras 23 and 25, and CPU 31 obtains image data only from one camera. Which camera out of cameras 23 and 25 is used for image pick-up is determined in accordance with content of camera change data 67 that was passed as the argument at the time of launch of simplified photographing program 52 (step SA21). Subsequent to step SA22, processing in step SA23 is performed.

In step SA23, CPU 31 performs display processing. In step SA23 in the photographing enabled state, an image picked-up by camera 23 or 25 or the like is displayed. An image displayed in the photographing enabled state will be described hereinafter with reference to FIG. 24.

FIG. 24 is a diagram showing an example of the image displayed in the photographing enabled state. As shown in FIG. 24, in step SA23, an image 77 picked-up by camera 23 or 24 that was obtained in step SA22 is displayed on lower LCD 12. The processing in steps SA22 and SA23 is repeatedly performed once in a prescribed time period (for example, 1/60 sec.). By repeatedly performing the processing in these steps SA22 and SA23, a real-time image picked-up by camera 23 or 24 is displayed on lower LCD 12. In an alternative embodiment, the real-time image may be displayed on upper LCD 22. Here, an image stored by performing the photographing operation may also be displayed on lower LCD 12.

In addition, a button image 78 for performing an operation for executing multifunctional photographing application program 53 (the second launch operation above) is displayed on lower LCD 12. Unlike the icon images displayed on the menu screen, button image 78 is displayed in a fixed manner at a prescribed position (at an upper right position in FIG. 24) on the screen. Though details will be described later, the user can easily make transition from a state of execution of simplified photographing program 52 to a state of execution of multifunctional photographing application program 53 by pressing button image 78.

Further, as in FIG. 23, display image 75 and photographing button images 76*a* and 76*b* are displayed on upper LCD 22. In the present embodiment, as in the photographing enabling operation, the photographing operation is an operation to press L button 14I or R button 14J (see photographing button images 76*a* and 76*b* shown in FIG. 24). In an alternative embodiment, the photographing operation may not be the same as the photographing enabling operation. For example, a button image for performing the photographing operation may be displayed on lower LCD 12 and an operation to touch the button image may serve as the photographing operation. Further, game device 10 may accept both the operation to press L button 14I or R button 14J and the operation to touch the button image as the photographing operation.

Referring back to the description in connection with FIG. 22, subsequent to step SA23, processing in step SA24 is performed. In step SA24, CPU 31 accepts an input to each input device. The processing in step SA24 is the same as the processing in step SA6 above. Subsequent to step SA24, processing in step SA25 is performed.

In step SA25, CPU 31 determines whether the photographing operation has been performed or not. Determination in step SA25 can be made by referring to operation data stored in main memory 32 in step SA24. In the present embodiment, since the first launch operation and the photographing operation are performed by performing the same operation, the processing in step SA25 can be performed as in step SA9.

When a result of determination in step SA25 indicates Yes, processing in step SA26 is performed. On the other hand, when the result of determination in step SA25 indicates No, processing in step SA29 which will be described later is performed.

An image displayed subsequent to the photographing operation will be described hereinafter with reference to FIG. 25.

FIG. 25 is a diagram showing an example of an image displayed after the photographing operation is performed. As shown in FIG. 25, when the result of determination in step SA25 indicates Yes, the picked up image obtained in step SA22 or image 77 picked up by camera 23 or 24 is displayed on lower LCD 12. In addition, a button image ("store") for performing an operation to store a taken, picked-up image and a button image ("capture again") for performing an operation for photographing again are displayed in addition to button image 78 for performing an operation to execute multifunctional photographing application program 53 (the second launch operation above) on lower LCD 12.

In addition, as in FIG. 23, display image 75 as well as photographing button images 76a and 76b are displayed on upper LCD 22. Referring back to the description in connection with FIG. 22, in step SA26, CPU 31 determines whether an operation for storage has been performed or not. Determination in step SA26 can be made by referring to operation data stored in main memory 32 in step SA24 as in step SA25.

When a result of determination in step SA26 indicates Yes (when "store" in FIG. 25 is touched), processing in step SA27 is performed. On the other hand, when the result of determination in step SA26 indicates No (when "capture again" in FIG. 25 is touched), processing in step SA22 described above is performed again. It is noted that determination in step SA26 may be skipped so that the process may proceed to step SA27 directly from step SA25.

In step SA27, CPU 31 has a picked-up image stored. In other words, CPU 31 causes data memory 34 for storage or memory card 28 to store (save) the picked-up image obtained in step SA22. A storage destination of the picked-up image is determined in accordance with content of storage destination data 68 that was passed as the argument at the time of launch of simplified photographing program 52 (step SA21). It is noted that the storage destination of the picked-up image can be changed by the user in the multifunctional photographing processing based on multifunctional photographing application program 53 which will be described later. Subsequent to step SA27, processing in step SA28 is performed.

In step SA28, CPU 31 selects the stored image stored in immediately preceding step SA27 as a display image. Specifically, CPU 31 causes main memory 32 to store as display image data 65, data indicative of the stored image that was stored in immediately preceding step SA27. After the processing in step SA28, CPU 31 ends execution of simplified photographing program 52 and ends the simplified photographing processing. Then, the processing in step SA4 shown in FIG. 21 is performed again.

An image displayed subsequent to the simplified photographing processing will be described hereinafter with reference to FIG. 26.

FIG. 26 is a diagram showing an example of an image displayed after the simplified photographing processing. As shown in FIG. 26, after the simplified photographing processing, the picked-up image obtained in the simplified photographing processing is displayed on upper LCD 22 as new display image 75. Namely, comparing the image shown in FIG. 22 with the image shown in FIG. 26, it can be seen that the display image displayed on upper LCD 22 has been updated.

As described above, in the present embodiment, in response to the photographing operation performed in the photographing enabled state (the simplified photographing processing), the simplified photographing processing ends, and transition from the photographing enabled state to the launch acceptance state is made. In other words, when the user stores one taken image in the simplified photographing processing, a screen display on game device 10 returns to the menu screen, and thus even a novice user who has not read an instruction manual or the like can naturally return to the launch acceptance state (in an example where the process proceeds to step SA27 from step SA25, the screen returns to the menu screen when the user performs one photographing operation in the simplified photographing processing). Further, in the present embodiment, since the photographing enabling operation and the photographing operation are performed by performing the same operation, transition from the launch acceptance state to the photographing enabled state and transition from the photographing enabled state to the launch acceptance state can be made by performing the same operation. Thus, even if the user accidentally presses L button 14I or R button 14J or presses a button without fully understanding a manner of operation to result in transition to the photographing enabled state, the user can return to the original state (the launch acceptance state) by pressing the same button. Thus, game device 10 which is easy for the novice user to operate can be provided.

Further, in the present embodiment, as described above, the state of game device 10 makes transition to the launch acceptance state after the photographing operation. Thus, transition to the launch acceptance state is made without display of the image stored in the processing in step SA26 above based on simplified photographing program 52. Here, in the present embodiment, in the processing in step SA27, CPU 31 sets the image stored in the processing in step SA26 as a display image after transition to the launch acceptance state. Thus, the stored image taken based on simplified photographing program 52 is displayed as the display image immediately after transition to the launch acceptance state. Therefore, according to the present embodiment, though transition to the launch acceptance state is made as a result of the photographing operation, the user can quickly check the image taken based on simplified photographing program 52.

Meanwhile, in step SA29, CPU 31 determines whether the second launch operation has been performed or not. Determination in step SA29 can be made by referring to input position data stored in main memory 32 in step SA24. In other words, in the determination processing in step SA29, CPU 31 determines whether an input to touch an area where button image 78 for performing the second launch operation is displayed has been provided or not. When a result of determination in step SA29 indicates Yes, the multifunctional photographing processing which will be described later (FIG. 30) is performed. On the other hand, when the result of determination in step SA29 indicates No, the processing in step SA22 is performed again. This is the end of the description of the simplified photographing processing shown in FIG. 22.

Referring back to the description in connection with FIG. 21, in step SA11, CPU 31 determines whether the first launch operation has been performed or not. Determination in step SA11 can be made by referring to the input position data stored in main memory 32 in step SA6. In other words, in the determination processing in step SA11, CPU 31 determines whether an input to touch an area where the icon image is displayed has been provided or not. When a result of determination in step SA11 indicates Yes, processing in step SA12 is performed. On the other hand, when the result of determination in step SA11 indicates No, processing in step SA13 which will be described later is performed.

In step SA12, CPU 31 performs processing for executing a selected application program. In other words, CPU 31 reads a selected application program corresponding to the icon image selected in the first launch operation into main memory 32, and executes the selected application program. Thus, the selected application program is started and the user can utilize the selected application program. The processing in step SA12 ends with the end of the selected application program, and the processing in step SA3 is performed again subsequent to step SA12.

Figure 30:
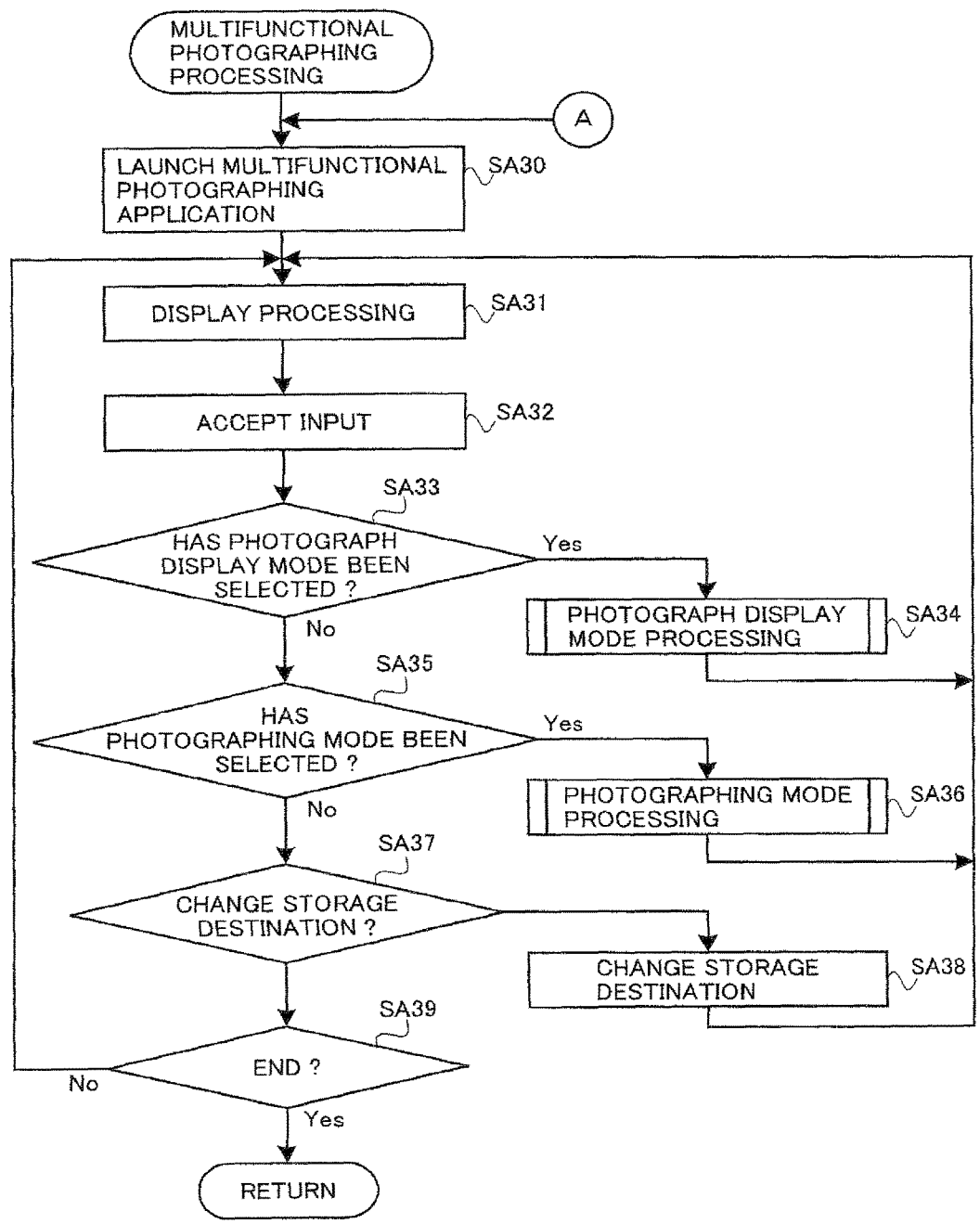
FIG. 30 is a flowchart showing a flow of multifunctional photographing processing according to the present embodiment.

Here, a case where multifunctional photographing application program 53 is executed as the selected application program in step SA12 above will be described in detail. FIG. 30 is a flowchart showing a flow of processing based on multifunctional photographing application program 53 (the multifunctional photographing processing).

In the multifunctional photographing processing, initially in step SA30, CPU 31 launches multifunctional photographing application program 53. In other words, CPU 31 reads multifunctional photographing application program 53 into main memory 32 and starts execution thereof. Here, data 67 and 68 included in setting data 66 stored in main memory 32 are input (set) as arguments for simplified photographing program 52. Subsequent to step SA30, processing in step SA31 is performed. Processing in steps SA31 to SA39 subsequent to step SA30 is performed by using multifunctional photographing application program 53 (by executing multifunctional photographing application program 53).

In step SA31, CPU 31 performs display processing. Here, in the present embodiment, in the multifunctional photographing processing, there are a photographing mode for performing photographing using the image pick-up means and a photograph display mode for displaying an image (a stored image) taken in the past. In the display processing in step SA31, an image for causing the user to select either one of the two modes (the photograph display mode and the photographing mode) in the multifunctional photographing processing, and an image for setting a storage destination of a picked-up image to be stored by performing the photographing operation are displayed on at least one of LCDs 12 and 22. An image displayed in display processing in step SSA31 will be described hereinafter with reference to FIG. 31.

Figure 31:
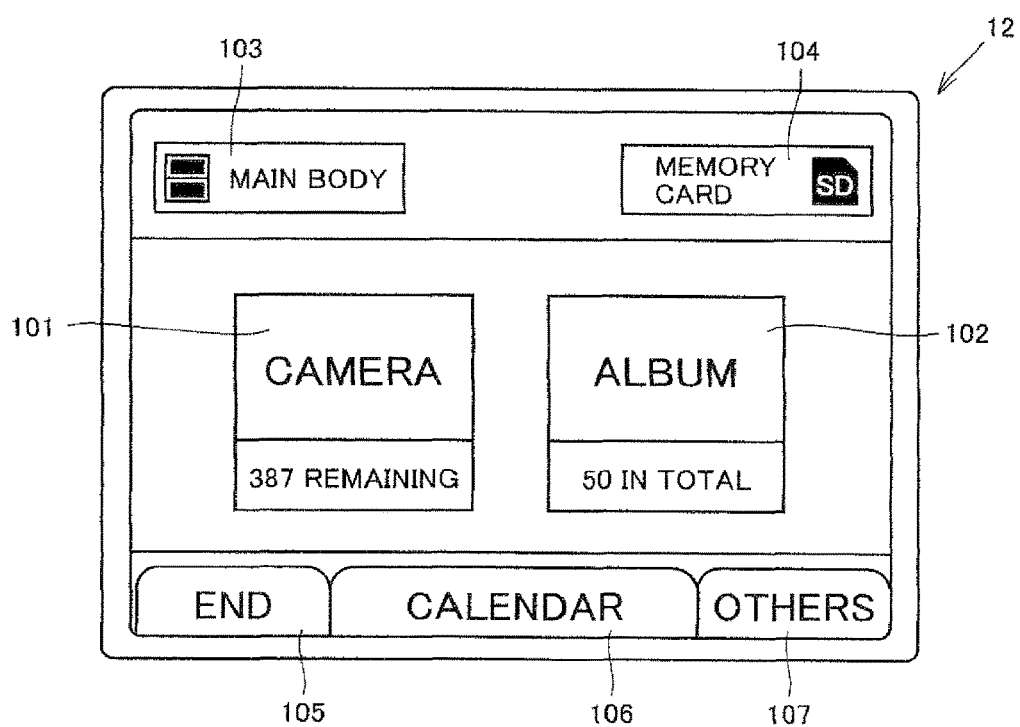
FIG. 31 is a diagram showing an example of an image displayed in multifunctional photographing processing according to the present embodiment.

FIG. 31 is a diagram showing an example of an image displayed in the multifunctional photographing processing. As shown in FIG. 31, in step SA31, a button image 101 for indicating selection of the photographing mode and a button image 102 for indicating selection of the photograph display mode are displayed on lower LCD 12. In addition, button image 101 includes indication of the number of shootings available (for example, xx remaining) in accordance with a currently remaining capacity of the storage destination of taken images. Moreover, button image 102 includes indication of the current number of picked up images (for example, xx in total) that have already been stored in the storage destination of taken images. Further, button images 103 and 104 indicating change of the storage destination of picked up images are also displayed on lower LCD 12. When button image 103 is touched, a non-volatile memory embedded in the main body (embedded memory; data memory 34 for storage) is set to the selected state, and when button image 104 is touched, a removable memory card (card memory; memory card 28) is set to the selected state. When the embedded memory is selected, a manner of display of button image 103 is varied, and when the card memory is selected, a manner of display of button image 104 is varied. When button image 101 or 102 is touched, transition to the photographing mode or the photograph display mode is made at that timing of touching.

Namely, the present embodiment is configured such that the user can select any of the embedded memory and the card memory at the time of launch of the multifunctional photographing application, and selection is not yet fixed as of the timing of selection. The present embodiment is configured such that the user can select any of the photographing mode and the photograph display mode on the same screen. Then, selection between the embedded memory and the card memory is fixed at the timing of selection between the photographing mode and the photograph display mode. Namely, when the photographing mode is selected while the embedded memory is selected, the photographing mode is launched and images that will be taken in the subsequent photographing mode are stored in the embedded memory. Alternatively, when the photographing mode is selected while the card memory is selected, the photographing mode is launched and images that will be taken in the subsequent photographing mode are stored in the card memory. Alternatively, when the photograph display mode is selected while the embedded memory is selected, the photograph display mode is launched and a taken image stored in the embedded memory is displayed in the subsequent photograph display mode. Alternatively, when the photograph display mode is selected while the card memory is selected, the photograph display mode is launched and a taken image stored in the card memory is displayed in the subsequent photograph display mode.

In addition, various button images 105 to 107 are displayed on the lower LCD. An end button 105 is a button image for performing an operation to end the multifunctional photographing processing. Namely, when a touch input of end button 105 is made, the multifunctional photographing processing ends and the processing by CPU 31 returns to the processing in step SA4.

A calendar button 106 is a button image for performing an operation to launch a calendar function which will be described later. Namely, when a touch input of calendar button 106 is made, the calendar function which will be described later is performed. An others button 107 is a button image for performing an operation for making various types of setting or the like.

In step SA32, CPU 31 accepts an input to each input device. Processing in step SA32 is the same as the processing in step SA6 above. Subsequent to step SA32, processing in step SA33 is performed.

In step SA33, CPU 31 determines whether the photograph display mode has been selected or not. Determination in step SA33 can be made by referring to input position data stored in main memory 32 in step SA32. In other words, in the determination processing in step SA33, CPU 31 determines whether an input to touch an area where image 102 indicating the photograph display mode is displayed has been provided or not as shown in FIG. 31.

When a result of determination in step SA33 indicates Yes, processing in step SA34 is performed. On the other hand, when the result of determination in step SA33 indicates No, processing in step SA35 which will be described later is performed.

In step SA34, CPU 31 performs processing to be performed in the photograph display mode (photograph display mode processing). Details of the photograph display mode processing will be described hereinafter with reference to FIG. 32.

Figure 32:
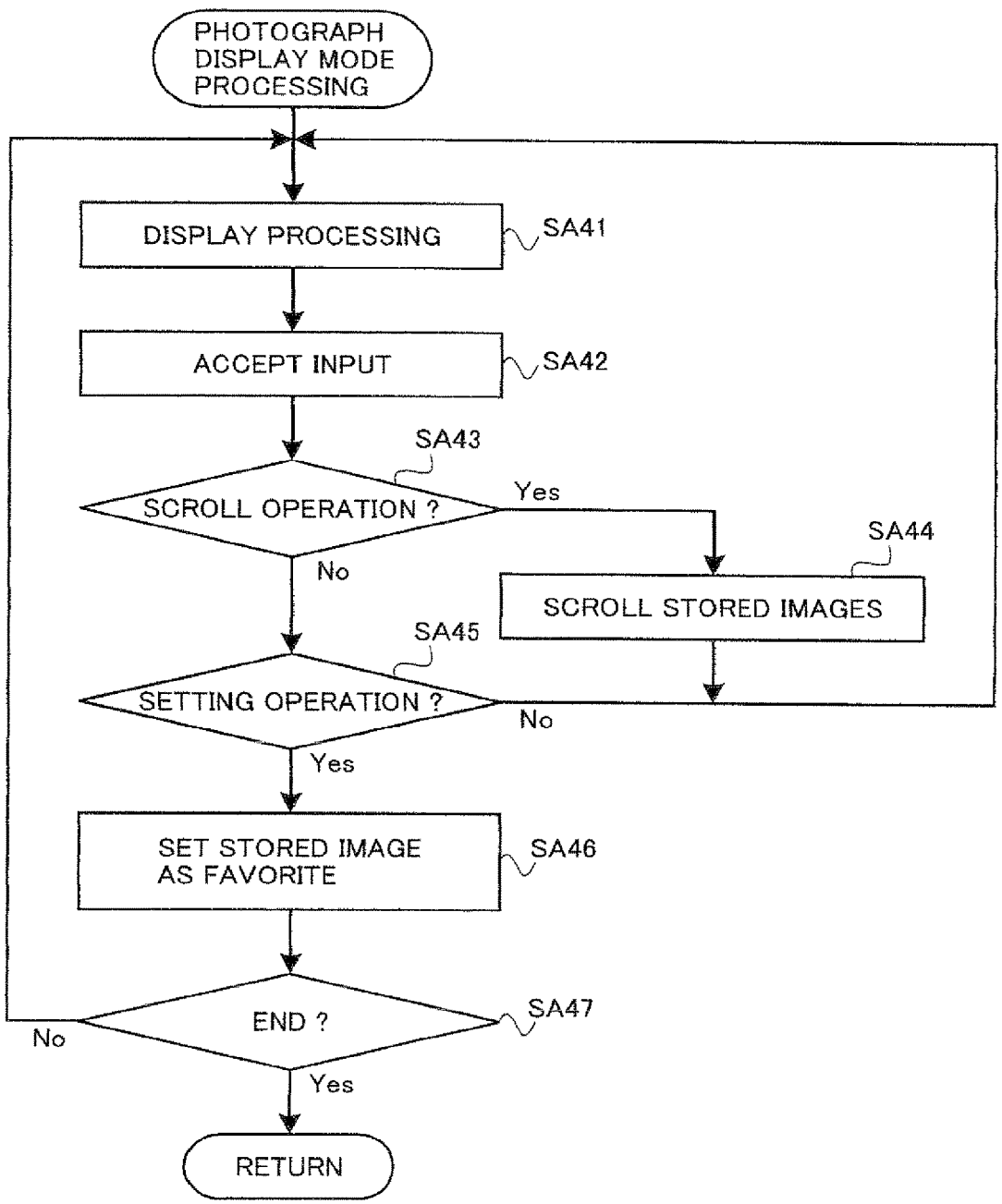
FIG. 32 is a flowchart showing a flow of photograph display mode processing shown in FIG. 30.

FIG. 32 is a flowchart showing a flow of the photograph display mode processing (step SA34) shown in FIG. 30. In the photograph display mode processing, initially in step SA41, CPU 31 performs display processing. In step SA41 in the photograph display mode, a stored image taken in the past or the like is displayed. An image displayed in the photograph display mode will be described with reference to FIG. 33.

Figure 33:
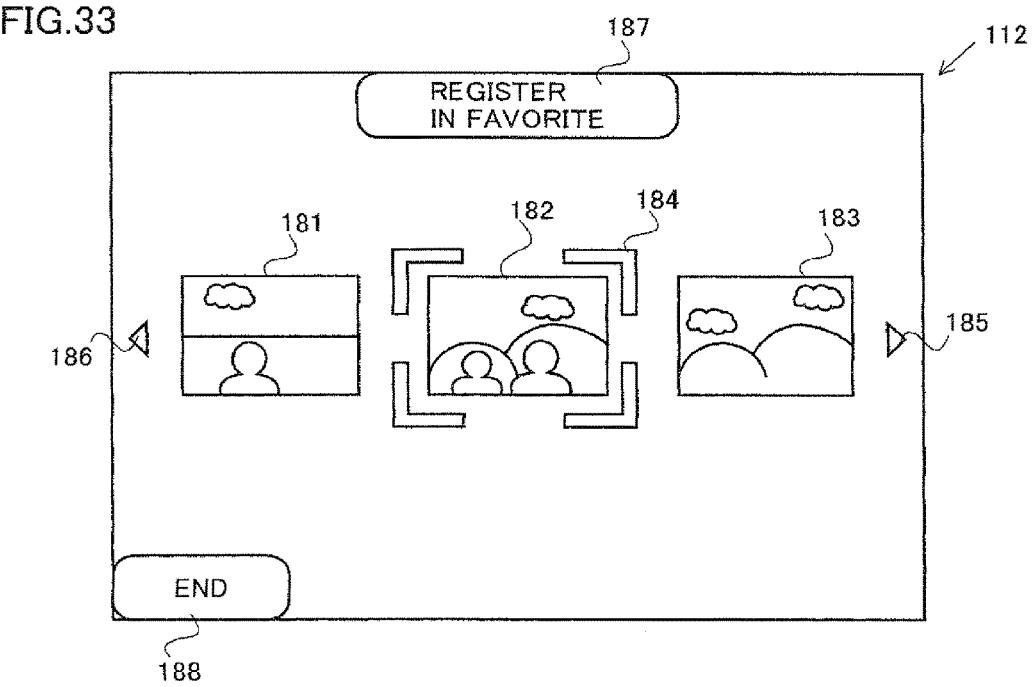
FIG. 33 is a diagram showing an example of an image displayed in a photograph display mode according to the present embodiment.

FIG. 33 is a diagram showing an example of an image displayed in the photograph display mode. As shown in FIG. 33, in step SA41, a plurality of (three in the drawing) stored images 181 to 183, a cursor 184, scroll buttons 185 and 186, a setting button 187, and an end button 188 are displayed on lower LCD 12.

In FIG. 33, stored images 181 to 183 are (some of) stored images that are stored in data memory 34 for storage or memory card 28. Stored image 182 surrounded by cursor 184 is an image currently selected by cursor 184. Scroll buttons 185 and 186 are buttons for scrolling stored images 181 to 183 to the right and left. In other words, when a touch input of scroll button 185 on the right of the screen is made, stored images 181 to 183 are scrolled to the right, and when a touch input of scroll button 186 on the left of the screen is made, stored images 181 to 183 are scrolled to the left. As a result of scroll of the stored images to the right or left, the stored image displayed on lower LCD 12 is changed and the stored image selected by cursor 184 is changed.

In the present embodiment, in the photograph display mode, a picked-up image stored in any of the simplified photographing processing and the multifunctional photographing processing is displayed. In the present embodiment, a stored image stored in the simplified photographing processing and a stored image stored in the multifunctional photographing processing are stored without distinction. Specifically, a rule for attaching a file name to a data file of the stored image (for example, attaching a file name using time and date of photographing, a total number of images taken by game device 10, and the like) is the same for any stored image. Since the stored images stored in any photographing processing are stored without distinction, stored images stored in any photographing processing can both be displayed in the photograph display mode.

Setting button 187 is a button image for performing an operation for newly setting the stored image selected by cursor 184 as a favorite image. In other words, when a touch input of setting button 187 is made, the stored image selected by cursor 184 is set as a favorite image.

End button 188 is a button image for performing an operation for ending the photograph display mode. In other words, when a touch input of end button 188 is made, the photograph display mode ends and the processing by CPU 31 returns to the processing in step SA31.

In step SA41, some information may or may not be displayed on upper LCD 22. In the present embodiment, CPU 31 causes upper LCD 22 to display the stored image selected with cursor 184.

Referring back to the description in connection with FIG. 32, subsequent to step SA41, processing in step SA42 is performed. In step SA42, CPU 31 accepts an input to each input device. The processing in step SA42 is the same as the processing in step SA6 above. Subsequent to step SA42, processing in step SA43 is performed.

In step SA43, CPU 31 determines whether an operation to scroll the stored image displayed on lower LCD 12 has been performed or not. Determination in step SA43 can be made by referring to input position data stored in main memory 32 in step SA42. In other words, in the determination processing in step SA43, CPU 31 determines whether an input to touch an area where scroll button 185 or 186 is displayed has been provided or not.

When a result of determination in step SA43 indicates Yes, processing in step SA44 is performed. On the other hand, when the result of determination in step SA43 indicates No, processing in step SA45 which will be described later is performed.

In step SA44, CPU 31 scrolls the stored image displayed on lower LCD 12. In other words, when a touch input of scroll button 185 is made, CPU 31 scrolls the stored image to the right, and when a touch input of scroll button 186 is made, CPU 31 scrolls the stored image to the left. Thus, a stored image that has not been displayed so far on the screen of lower LCD 12 is displayed. Subsequent to step SA44, the processing in step SA41 above is performed again.

Meanwhile, in step SA45, CPU 31 determines whether an operation for setting a stored image as a favorite image has been performed or not. Determination in step SA45 can be made by referring to the input position data stored in main memory 32 in step SA42. In other words, in the determination processing in step SA45, CPU 31 determines whether an input to touch an area where setting button 187 is displayed has been provided or not. When a result of determination in step SA45 indicates Yes, processing in step SA46 is performed. On the other hand, when the result of determination in step SA45 indicates No, the processing in step SA41 above is performed again.

In step SA46, CPU 31 sets a stored image currently selected with cursor 184 as a favorite image. Specifically, CPU 31 adds information indicative of the favorite image to data of the stored image stored in data memory 34 for storage or memory card 28. In addition, in the present embodiment, in step SA46, CPU 31 causes the user to select to which of the first to third groups the stored image should belong. Therefore, information indicative of a group selected by the user among the first to third groups is added to the data of the stored image above. Subsequent to step SA46 above, processing in step SA47 is performed.

In step SA47, CPU 31 determines whether to end the photograph display mode or not. Determination in step SA47 can be made by referring to the input position data stored in main memory 32 in step SA42. In other words, in the determination processing in step SA47, CPU 31 determines whether an input to touch an area where end button 188 is displayed has been provided or not. When a result of determination in step SA47 indicates Yes, CPU 31 ends the photograph display mode processing shown in FIG. 32. On the other hand, when the result of determination in step SA47 indicates No, the processing in step SA41 above is performed again.

In the photograph display mode described above, the user can view the stored images taken in the past and also can set the stored image as a favorite image. As described above, in step SA3 above, the display image displayed on the menu screen (display image 75 shown in FIG. 23) is selected from among favorite images. Therefore, the user can select an image to be displayed as a display image by himself or herself.

Referring back to the description in connection with FIG. 30, when the processing in step SA34 above ends, the processing in step SA31 is performed again. Therefore, when the photograph display mode ends, the screen for causing the user to select any of the photograph display mode and the photographing mode is displayed again (step SA31).

Meanwhile, in step SA35, CPU 31 determines whether the photographing mode has been selected or not. Determination in step SA35 can be made by referring to the input position data stored in main memory 32 in step SA32. In other words, in the determination processing in step SA35, CPU 31 determines whether an input to touch an area where image 101 indicating the photographing mode is displayed has been provided or not. When a result of determination in step SA35 indicates Yes, processing in step SA36 is performed. On the other hand, when the result of determination in step SA35 indicates No, processing in step SA37 which will be described later is performed.

In step SA36, CPU 31 performs processing to be performed in the photographing mode (photographing mode processing). Details of the photographing mode processing will be described hereinafter with reference to FIG. 34.

Figure 34:
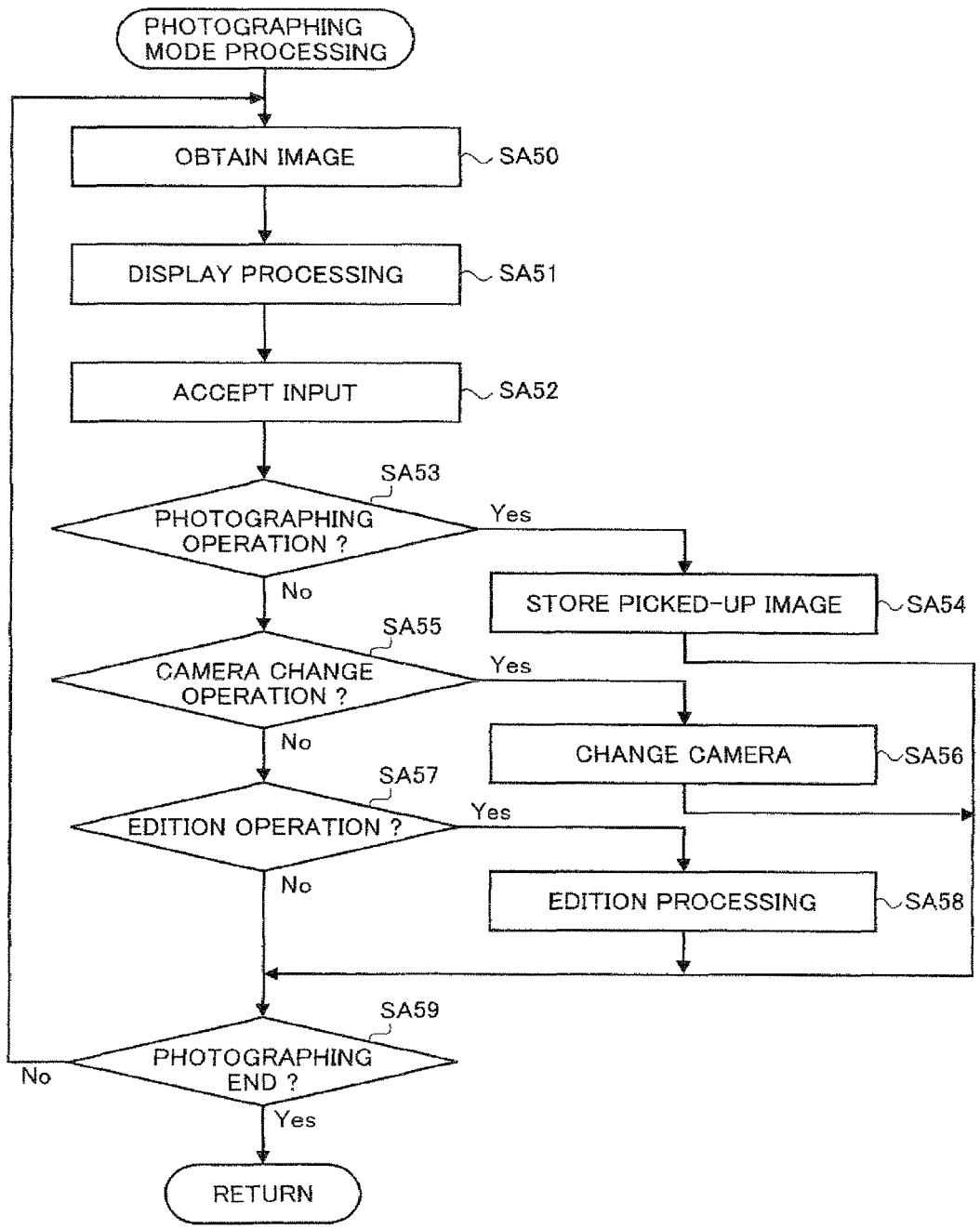
FIG. 34 is a flowchart showing a flow of photographing mode processing shown in FIG. 32.

FIG. 34 is a flowchart showing a flow of the photographing mode processing (step SA36) shown in FIG. 32. In the photographing mode processing, initially in step SA50, CPU 31 obtains data of an image picked-up by inner camera 23 or outer camera 25. Processing in step SA50 is the same as the processing in step SA22 above (FIG. 22). Subsequent to step SA50, processing in step SA51 is performed.

In step SA51, CPU 31 performs display processing. In step SA51 in the photographing mode, the image picked-up by camera 23 or 24 or the like is displayed. An image displayed in the photographing mode will be described hereinafter with reference to FIG. 35(a).

Figure 35:
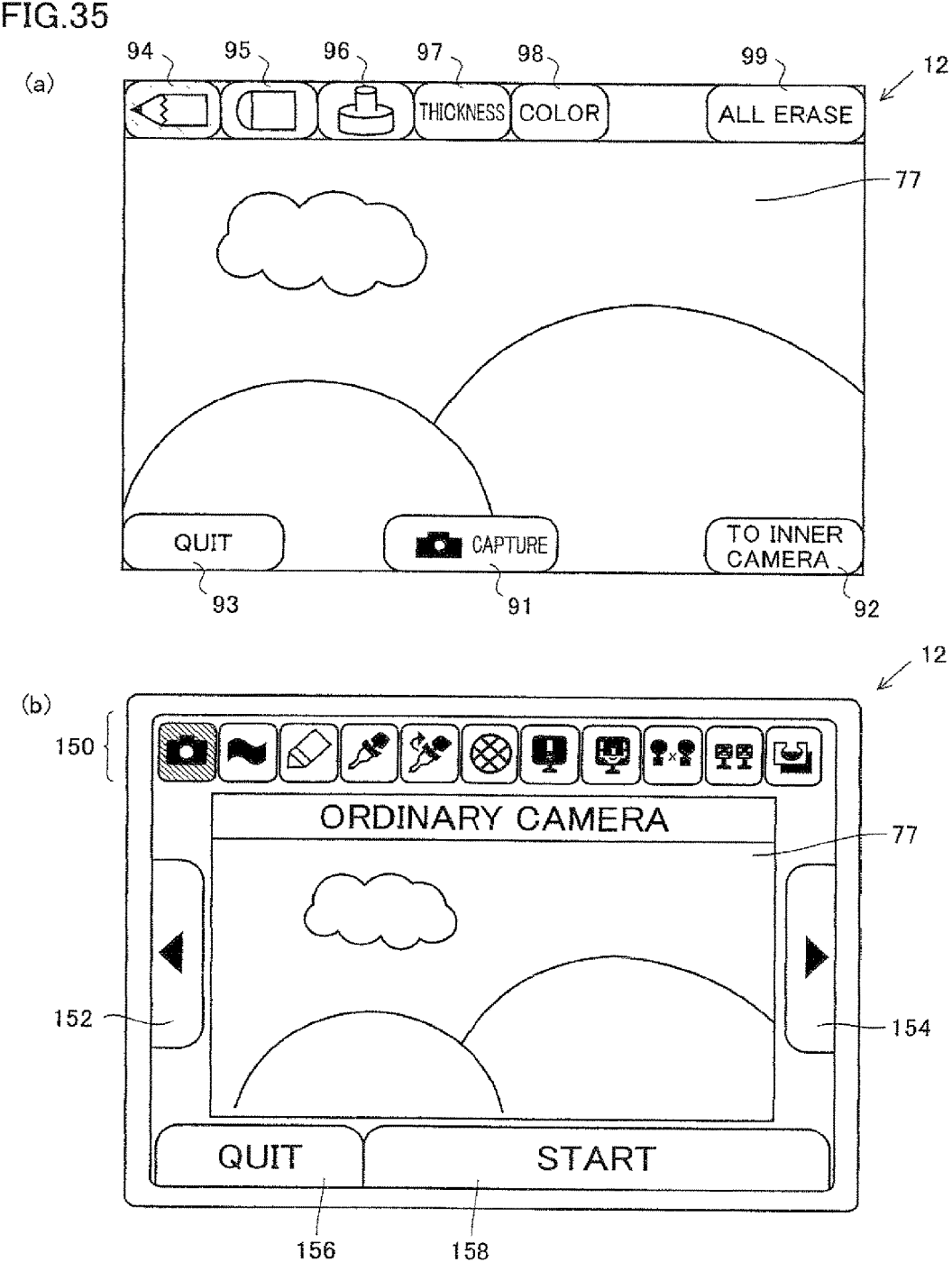
FIG. 35 is a diagram showing an example of an image displayed in a photographing mode according to the present embodiment.

FIG. 35(a) is a diagram showing an example of the image displayed in the photographing mode. As shown in FIG. 35(a), in step SA51, in addition to picked-up image 77 as in FIG. 24, various buttons 91 to 99 are displayed on lower LCD 12. Each of buttons 91 to 99 is an image for giving an instruction to game device 10 in response to the user's touch input to a position on the image. Buttons 91 to 99 will be described hereinafter.

A photographing button 91 is a button image for performing the photographing operation. In other words, when a touch input of photographing button 91 is made, processing for storing a picked-up image is performed. It is noted that photographing button 91 is preferably displayed substantially at a center of lower housing 11 (in the left-right direction) such that the user can easily operate photographing button 91 with either a right hand or a left hand.

A camera change button 92 is an image for performing a camera change operation. In other words, when a touch input of camera change button 92 is made, a camera for picking up an image is changed between inner camera 23 and outer camera 25.

An end button 93 is a button image for performing an operation for ending the photographing mode. In other words, when a touch input of end button 93 is made, the photographing mode ends and the processing by CPU 31 returns to the processing in step SA31.

Each of buttons 94 to 99 is a button image for giving an instruction in edition processing. A pen mode button 94, an eraser mode button 95, and a stamp mode button 96 are button images for performing an operation for changing an edition mode. Here, in the present embodiment, three modes of a pen mode, a stamp mode and an eraser mode are prepared in advance. In the pen mode, an image of an input trail input to touch panel 13 can be added to a picked-up image. In the stamp mode, a stamp image prepared in advance can be added to a picked-up image. In the eraser mode, an image added in the pen mode or the stamp mode can be erased. Pen mode button 94 is an image for giving an instruction to change the edition mode to the pen mode. Eraser mode button 95 is an image for giving an instruction to change the edition mode to the eraser mode. Stamp mode button 96 is an image for giving an instruction to change the edition mode to the stamp mode.

A thickness change button 97 is an image for giving an instruction to change a thickness of a line to be input in the pen mode. A color change button 98 is an image for giving an instruction to change a color of a line to be input in the pen mode. An all erase button 99 is an image for giving an instruction to erase all images added in the pen mode or the stamp mode.

By giving an instruction using each of buttons 94 to 99 above, the user can input an image over the picked-up image displayed on lower LCD 12 (in a manner superimposed on the picked-up image). It is noted that FIG. 35(a) shows an image in the case where there is no image input by the user in the edition processing which will be described later. Further, in the present embodiment, an image for explaining a manner of operation in the photographing mode to the user is displayed on upper LCD 22.

Referring back to the description in connection with FIG. 34, in step SA52, CPU 31 accepts an input to each input device. Processing in step SA52 is the same as the processing in step SA6 above. Subsequent to step SA52, processing in step SA33 is performed.

In step SA53, CPU 31 determines whether the photographing operation has been performed or not. Determination in step SA53 can be made by referring to operation data and input position data stored in main memory 32 in step SA52. In other words, in the determination processing in step SA53, CPU 31 determines whether L button 14I or R button 14J has been pressed or not or whether an input to touch an area where photographing button 91 is displayed has been provided or not.

Thus, in the multifunctional photographing processing, the user can perform an operation the same as the photographing operation in the simplified photographing processing (the operation of pressing L button 14I or R button 14J) as the photographing operation and can perform an operation to touch photographing button 91 as the photographing operation. When a result of determination in step SA53 indicates Yes, processing in step SA54 is performed. On the other hand, when the result of determination in step SA53 indicates No, processing in step SA55 which will be described later is performed.

As described in connection with step SA53 above, in the present embodiment, the photographing processing function attained in common by simplified photographing program 52 and multifunctional photographing application program 53 is performed by performing the same operation (the operation of pressing L button 14I or R button 14J). Since the same function is attained by the same operation in spite of change of a program, a user-friendly operation system can be provided.

It is noted that the phrase "the function attained in common is performed by performing the same operation" means that a certain identical function should only be performed by performing a certain operation in both of simplified photographing program 52 and multifunctional photographing application program 53, and it does not intend to exclude such meaning that the function is attained also by performing an operation different from the certain operation in any one of simplified photographing program 52 and multifunctional photographing application program 53. In other words, as in the present embodiment, in multifunctional photographing application program 53, the photographing processing may be performed by performing the operation to touch photographing button 91 other than the operation to press L button 14I or R button 14J.

In step SA54, CPU 31 has a picked-up image stored. Processing in step SA54 is the same as the processing in step SA26 in the simplified photographing processing above. Therefore, in the present embodiment, processing for storing a picked-up image is similarly performed in the simplified photographing processing and the multifunctional photographing processing. Specifically, a method of deciding a camera used for image pick-up and a method of deciding a storage destination in the simplified photographing processing are the same as those in the multifunctional photographing processing. Subsequent to step SA54, processing in step SA59 which will be described later is performed.

In step SA55, CPU 31 determines whether the camera change operation has been performed or not. Determination in step SA55 can be made by referring to the input position data stored in main memory 32 in step SA52. In other words, in the determination processing in step SA55, CPU 31 determines whether an input to touch an area where camera change button 92 is displayed has been provided or not. When a result of determination in step SA55 indicates Yes, processing in step SA56 is performed. On the other hand, when the result of determination in step SA55 indicates No, processing in step SA57 which will be described later is performed.

In step SA56, CPU 31 changes the camera for picking up an image. In other words, when the camera for picking up an image is inner camera 23, CPU 31 changes the camera for picking up an image to outer camera 25. When the camera for picking up an image is outer camera 25, CPU 31 changes the camera for picking up an image to inner camera 23. Specifically, CPU 31 gives an instruction to stop an operation to one of cameras 23 and 25 that is picking up an image, and gives an instruction to perform image pick-up to the other camera. If the processing in step SA56 above is performed, in step SA50 that will subsequently be performed, data of an image picked-up by the camera after the change is obtained by CPU 31, and in subsequent step SA51, the image picked-up by the camera after the change is displayed on lower LCD 12. Further, in step SA56, CPU 31 causes main memory 32 to store data indicative of the camera after the change as camera change data 67. Thus, when the multifunctional photographing processing is performed next time and when the simplified photographing processing is performed next time, image pick-up will be performed by the camera after the change. Subsequent to step SA56, processing in step SA59 which will be described later is performed.

In step SA57, CPU 31 determines whether an edition operation has been performed or not. Determination in step SA57 can be made by referring to the input position data stored in main memory 32 in step SA52. In other words, in the determination processing in step SA57, CPU 31 determines whether an input to touch an area where any of buttons 94 to 99 is displayed or an area where picked-up image 77 is displayed has been provided or not. When a result of determination in step SA57 indicates Yes, processing in step SA58 is performed. On the other hand, when the result of determination in step SA57 indicates No, processing in step SA59 which will be described later is performed.

In step SA58, CPU 31 performs various types of edition processing in accordance with a touch input made by the user. For example, when any of buttons 94 to 98 is touched, CPU 31 changes setting (the edition mode and the setting relating to a thickness or a color of a line) in accordance with a touched button. When the area of picked-up image 77 is touched, CPU 31 performs processing in accordance with the edition mode with respect to a touched position. In other words, when the edition mode is set to the pen mode, an image of trail of touch input is added to picked-up image 77. When the edition mode is set to the stamp mode, a stamp image prepared in advance is added to picked-up image 77 at the touched position. When the edition mode is set to the eraser mode, the image added at the touched position in the pen mode or the stamp mode is erased. When all erase button 99 is touched, all images added to picked-up image 77 in the pen mode or the stamp mode are erased. Details of the processing in accordance with the edition mode in step SA58 will be described later.

Subsequent to step SA58 above, the processing in step SA59 is performed.

In step SA59, CPU 31 determines whether to end the photographing mode or not. Determination in step SA59 can be made by referring to the input position data stored in main memory 32 in step SA452. In other words, in the determination processing in step SA59, CPU 31 determines whether an input to touch an area where end button 93 is displayed has been provided or not. When a result in step SA59 indicates Yes, CPU 31 ends the photographing mode processing shown in FIG. 34. On the other hand, when the result of determination in step SA59 indicates No, the processing in step SA50 above is performed again. This is the end of the description of the photographing mode processing shown in FIG. 34.

Multifunctional photographing application program 53 described above may have a function to subject picked-up image 77 to other types of edition operations or an operation for providing effect, in addition to the edition function described above. In such a case, the menu screen for allowing the user to select a desired function is preferably displayed prior to the display processing in step SA51. An example of the menu screen displayed in the photographing mode will be described hereinafter with reference to FIG. 35(b).

FIG. 35(b) is a diagram showing an example of the menu screen displayed in the photographing mode. As shown in FIG. 35(b), the menu screen including a button group 150 and various buttons 152, 154, 156, and 158 in addition to picked-up image 77 as in FIG. 24 is displayed on lower LCD 12. Each icon image included in button group 150 is an image for instructing game device 10 to select a corresponding function included in multifunctional photographing application program 53. Each button 152, 154, 156, and 158 will be described hereinafter.

Scroll buttons 152 and 154 are button images for selecting each icon image included in button group 150. Namely, when a touch input of scroll button 152 or 154 is made, an icon image in a selected (active) state among the icon images included in button group 150 is successively changed.

An end button 156 is a button image for performing an operation to end the photographing mode. Namely, when a touch input of end button 152 is made, the photographing mode ends and the processing by CPU 31 returns to the processing in step SA31.

A start button 158 is a button image for performing an operation to indicate execution of a function selected from among the functions included in the multifunctional photographing application program. Namely, when a touch input of start button 158 subsequent to selection of any icon image included in button group 150 is made, the function corresponding to the selected icon image is performed.

Referring back to the description in connection with FIG. 30, when the processing in step SA36 above ends, the processing in step SA31 is performed again. Therefore, when the photographing mode ends, the screen for causing the user to select any of the photograph display mode and the photographing mode is displayed again (step SA31).

Meanwhile, in step SA37, CPU 31 determines whether an operation for changing a storage destination of a stored image has been performed or not. Determination in step SA37 can be made by referring to the input position data stored in main memory 32 in step SA32. In other words, in the determination processing in step SA37, CPU 31 determines whether an input to touch an area where the image indicating change of a storage destination of a picked-up image has been provided or not. When a result of determination in step SA37 indicates Yes, processing in step SA38 is performed. On the other hand, when the result of determination in step SA37 indicates No, processing in step SA39 which will be described later is performed.

In step SA38, CPU 31 changes a storage destination of a picked-up image. In other words, when a current storage destination is set to data memory 34 for storage, the storage destination is changed to memory card 28, and when the current storage destination is set to memory card 28, the storage destination is changed to data memory 34 for storage. Specifically, CPU 31 causes main memory 32 to store data indicative of the storage destination after the change as storage destination data 68. Subsequent to step SA38, the processing in step SA31 is performed again.

In step SA39, CPU 31 determines whether to end the multifunctional photographing processing or not. Determination is made based on whether or not an instruction to end the multifunctional photographing processing has been given by the user. For example, the instruction to end the multifunctional photographing processing may be given in such a manner that a button image for performing an operation to end the multifunctional photographing processing is displayed in the display processing in step SA31 and that button image is touched. Alternatively, the instruction may be given also by pressing a predetermined prescribed button. When a result of determination in step SA39 indicates No, the processing in step SA31 is performed again. On the other hand, when the result of determination in step SA39 indicates Yes, CPU 31 ends execution of multifunctional photographing application program 53 and ends the multifunctional photographing processing. Thereafter, the processing in step SA3 shown in FIG. 21 is performed again.

Referring back to the description in connection with FIG. 21, in step SA13, CPU 31 determines whether to end the processing in game device 10 or not. Determination in step SA13 is made, for example, based on whether a prescribed end instruction operation (specifically, an operation to press power button 14F or the like) has been performed by the user or not. When a result of determination in step SA13 indicates No, the processing in step SA5 is performed again. On the other hand, when the result of determination in step SA13 indicates Yes, CPU 31 ends the processing shown in FIG. 21.

As described above, according to the present embodiment, in the state where the menu screen is displayed (in the launch acceptance state; in step SA5), game device 10 accepts the first launch operation for launching a selected application program (steps SA11 and SA12) and the photographing enabling operation for launching simplified photographing program 52 (steps SA9 and SA10). Therefore, since simplified photographing program 52 can immediately be launched by performing the photographing enabling operation from the state where the menu screen is displayed, the user can easily launch simplified photographing program 52. Particularly, in the present embodiment, in order to launch a desired selected application program, the user has to perform the first launch operation after a scrolling operation as necessary, while the user has only to perform the photographing enabling operation in order to launch simplified photographing program 52. Therefore, in the present embodiment, simplified photographing program 52 can more easily be launched than the selected application program.

In addition, according to the embodiment above, during execution of simplified photographing program 52 (in the photographing enabled state; in steps SA22 to SA29), CPU 31 accepts the second launch operation for launching photographing application program 53 (step SA29). Thus, the user can launch multifunctional photographing application program 53 by performing the second launch operation even during photographing based on simplified photographing program 52. Therefore, even when the user desires to use a function of multifunctional photographing application program 53 not attained by simplified photographing program 52 during photographing based on simplified photographing program 52, the user can easily and quickly use the function by performing the second launch operation.

Further, in the present embodiment, simplified photographing program 52 having a relatively simple function can quickly be launched from the menu screen, and multifunctional photographing application program 53 having more functions can immediately be launched during execution of simplified photographing program 52.

Therefore, according to the present embodiment, the user can be caused to use game device 10 in such a manner of use that "game device 10 is initially operated based on a photographing program having a simple function and then various photographing functions of game device 10 are utilized based on a photographing program having more functions," and the user can be caused to use game device 10 in such a manner that he/she gradually gets used to an operation of game device 10.

Further, simplified photographing program 52 can be assumed as an introduction (a trial version) for multifunctional photographing application program 53, and from the viewpoint of a supplier of game device 10, the user can be prompted to use multifunctional photographing application program 53 by allowing quick launch of simplified photographing program 52 from the menu screen.

Further, in the present embodiment, since the function of simplified photographing program 52 is a part of the functions of multifunctional photographing application program 53, the data size of simplified photographing program 52 is smaller than that of multifunctional photographing application program 53. Therefore, by setting a program launched with the photographing enabling operation above from the menu screen to simplified photographing program 52 having the smaller data size, a program for photographing can quickly be launched from the menu screen.

<Photographing Leading Processing>

Figure 27:
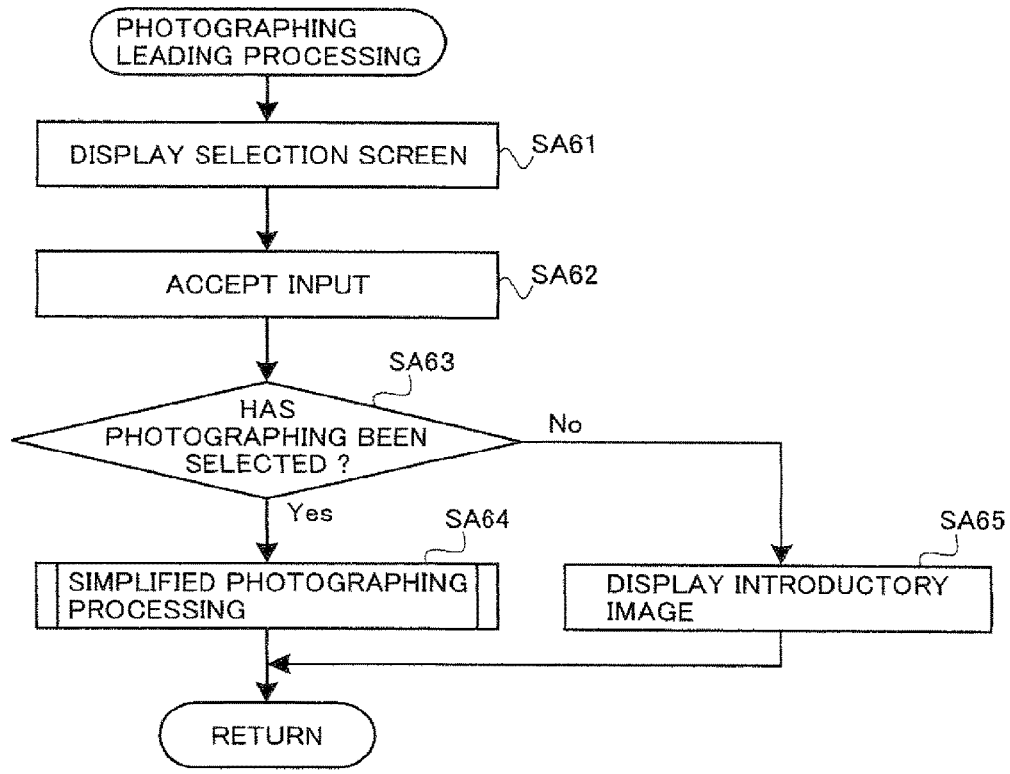
FIG. 27 is a flowchart showing a flow of photographing leading processing shown in FIG. 21.

Details of the photographing leading processing in step SA2 above will now be described. FIG. 27 is a flowchart showing a flow of the photographing leading processing (step SA2) shown in FIG. 21. In the photographing leading processing, initially in step SA61, CPU 31 has a selection screen displayed for causing the user to select whether to perform photographing or not (that is, whether to make transition of the state of game device 10 to the photographing enabled state or not). For example, together with a message that "Why don't you take a picture," a button image for giving an instruction to perform photographing and a button image for giving an instruction not to perform photographing are displayed on lower LCD 12. Subsequent to step SA61, processing in step SA62 is performed.

In step SA62, CPU 31 accepts an input to each input device. The processing in step SA62 is the same as the processing in step SA6 above. Subsequent to step SA62, processing in step SA63 is performed.

In step SA63, CPU 31 determines whether the instruction to perform photographing has been selected or not. Determination in step SA63 can be made by referring to input position data stored in main memory 32 in step SA62. In other words, in the determination processing in step SA63, CPU 31 determines whether an input to touch an area where the button image for giving the instruction to perform photographing has been provided or not. When a result of determination in step SA63 indicates Yes, processing in step SA64 is performed. On the other hand, when the result of determination in step SA63 indicates No, processing in step SA65 which will be described later is performed.

In step SA64, CPU 31 performs the simplified photographing processing. As this simplified photographing processing is the same as in step SA10 above, detailed description thereof will not be provided. Since the photographing enabled state can be set as a result of the simplified photographing processing, the user can perform the photographing operation. After the simplified photographing processing in step SA64 ends, CPU 31 ends the photographing leading processing shown in FIG. 27. In the present embodiment, since the processing in step SA64 is the same as the processing in step SA10, multifunctional photographing application program 53 can also be launched during the simplified photographing processing in step SA64, as in step SA10. In an alternative embodiment, however, in the simplified photographing processing in step SA64, button image 78 for performing the second launch operation may not be displayed such that launch of multifunctional photographing application program 53 is not permitted.

On the other hand, in step SA65, CPU 31 has an image for introducing a photographing function displayed. For example, an image or the like for explaining functions relating to simplified photographing program 52 and multifunctional photographing application program 53 is displayed on LCDs 12 and 22. After step SA65, CPU 31 ends the photographing leading processing shown in FIG. 27.

As described above, in the present embodiment, game device 10 determines whether game device 10 is started up for the first time or not (step SA1). When game device 10 is started up for the first time (Yes in step SA1), game device 10 provides display for causing the user to select whether to make transition of the state of game device 10 to the photographing enabled state or not (step SA61). Then, when the user selects to perform photographing (Yes in step SA63), game device 10 causes the user to actually experience the photographing operation (step SA64).

Thus, the user can be led to initially experience the photographing operation in game device 10. In other words, through the photographing leading processing, a user using game device 10 for the first time can be caused to initially perform the photographing operation to get used to the photographing operation. Further, in the present embodiment, since the user is caused to experience the simple photographing operation based on simplified photographing program 52 above in step SA64, the user can perform the photographing operation more easily than in an example where the user is caused to initially experience the photographing operation based on multifunctional photographing application program 53.

Further, from the viewpoint of a manufacturer of game device 10, the photographing function of game device 10 can be introduced to the user in a manner easy to understand, by having the user initially actually experience the simple photographing operation.

In the present embodiment, the user is caused to select whether or not to make transition to the photographing enabled state in step SA61. In an alternative embodiment, however, in the photographing leading processing, transition to the photographing enabled state may be made without user's selection. In other words, the photographing processing based on photographing program 52 or 53 may be performed without user's selection.

<As to Change of Display Screen>

In the present embodiment, game device 10 changes content of the display image on the menu screen at prescribed timing (automatically without an instruction from the user), which produces variation in the menu screen and the user can be prevented from getting bored.

Further, in the present embodiment, the prescribed timing above includes timing of start-up of game device 10 and timing of end of the selected application program. Namely, as described above, when game device 10 is started up and when a selected application program ends, the display processing in step SA5 is performed after the processing in step SA3 and thus the display image on the menu screen is changed. In other words, each time game device 10 is started up and each time a selected application program is executed, the display image is changed.

According to this feature, as the user can have things to look forward to (regarding "which image will be displayed") at the time of start-up and end of execution of the selected application program, from the viewpoint of the supplier of game device 10, an effect to prompt the user to start up game device 10 and to execute a selected application program (that is, to use game device 10) is achieved.

In addition, in the present embodiment, the prescribed timing above includes timing of opening foldable information processing device 10. In the present embodiment, since game device 10 in the closed state is in a sleep mode state, "timing of start-up of game device 10" above may well be said to include "timing of opening of game device 10 from the closed state (sleep mode) (re-start of game device 10 from the sleep mode)." When game device 10 is opened again after game device 10 in the opened state is once closed, CPU 31 changes the display image between before and after closing.

Thus, as the user has things to look forward to in opening game device 10, from the viewpoint of the supplier of game device 10, an effect to prompt the user to use game device 10 is achieved by making the user open game device 10. In the present embodiment, at the timing of opening of game device 10 from the closed state, the display image is changed not in a random manner but in a prescribed order. Details of processing for changing the display image in response to opening and closing will be described hereinafter with reference to FIG. 28.

Figure 28:
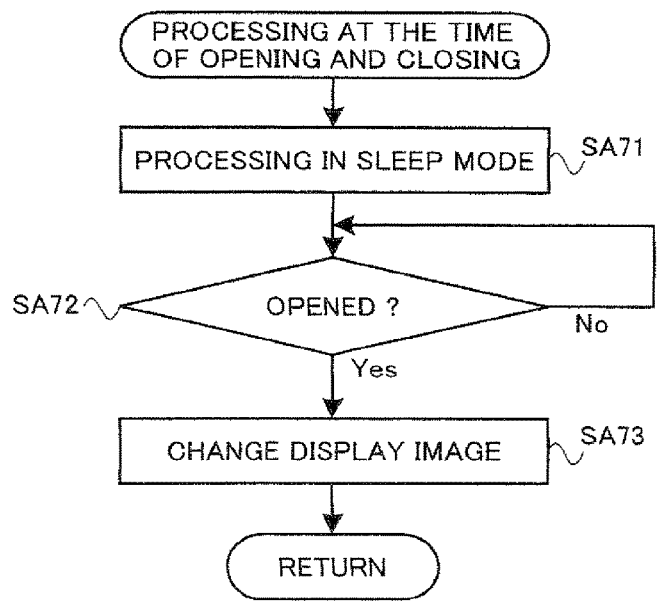
FIG. 28 is a flowchart showing details of processing at the time of opening and closing of the game device according to the present embodiment.

FIG. 28 is a flowchart showing details of processing (processing at the time of opening and closing) performed when game device 10 is opened and closed. The processing shown in FIG. 28 is started in response to closing of game device 10 at any timing during the processing shown in FIG. 21.

In the processing at the time of opening and closing, initially in step SA71, CPU 31 causes game device 10 to make transition to the sleep mode. Specifically, CPU 31 stops image display on each of LCDs 12 and 22 or temporarily stops processing in an application program being executed. Subsequent to step SA71, processing in step SA72 is performed.

In step SA72, CPU 31 determines whether game device 10 has been opened or not. When a result of determination in step SA72 indicates Yes, processing in step SA73 is performed. On the other hand, when the result of determination in step SA72 indicates No, the processing in step SA72 is performed again. In other words, CPU 31 waits until game device 10 is opened.

In step SA73, CPU 31 changes the display image from a state before the processing at the time of opening and closing is started. Here, in step SA73, the display image is changed by successively selecting a display image from among the favorite images in a prescribed order. A method of changing the display image will be described hereinafter with reference to FIG. 29.

FIG. 29 is a diagram showing the method of changing the display image in step SA73. FIG. 29 shows a case where the first group includes three favorite images, the second group includes two favorite images, and the third group includes four favorite images by way of example. In the present embodiment, the favorite images included in each group are managed with the favorite images being arranged in a prescribed order. For example, the prescribed order may be an order of time and date of photographing (storage), an order of time and date of setting as a favorite image, or an order set by the user. In step SA73, a favorite image is successively changed in this order. In other words, CPU 31 sets a favorite image immediately following a display image before change (in the state before the processing at the time of opening and closing is started) as a display image after change. Further, when a display image before change is the last favorite image in a group, a first favorite image in a next group is set as a display image after change. Further, when a display image before change is the last favorite image in the third group, a first favorite image in the first group is set as a display image after change. As described above, in step SA73, the display image is changed in an order indicated by an arrow in FIG. 29. Subsequent to step SA73, CPU 31 ends the processing at the time of opening and closing, and returns to a state immediately before the processing at the time of opening and closing is started.

As described above, in the present embodiment, each time game device 10 is opened, the display image is changed in the prescribed order. Thus, the user can enjoy change of display images one after another by performing an operation to open and close game device 10. For example, the user can create a four-panel cartoon of which picture (display image) changes every time game device 10 is opened, or can successively view a series of photographs arranged in chronological order by repeatedly opening and closing game device 10. Here, in step SA3 above, CPU 31 may select a display image from among first favorite images in respective groups in a random manner. Thus, all images included in these groups can successively be displayed in a prescribed order.

In an alternative embodiment, game device 10 may change the display image in a prescribed order in accordance with a prescribed operation (for example, an operation to press a prescribed button). In other words, the prescribed timing above may be the timing of a prescribed operation.

<Variation>

In the embodiment above, prescribed information (data) is commonly used in simplified photographing program 52 and multifunctional photographing application program 53. Specifically, two programs 52 and 53 commonly use information on the camera for image pick-up and information on a storage destination of a stored image. Here, in an alternative embodiment, two programs 52 and 53 may commonly use other information. For example, in the case where a file name of a stored image is determined based on a total number of images taken by game device 10, information on the total number of images may commonly be used.

Further, in an alternative embodiment, game device 10 may cause content of an argument to be passed to multifunctional photographing application program 53 to be different between when multifunctional photographing application program 53 is launched in the photographing enabled state (Yes in step SA29) and when multifunctional photographing application program 53 is launched in the launch acceptance state (Yes in step SA11).

For example, the argument above may be set as information indicative of a mode at the time of start of execution of multifunctional photographing application program 53. In other words, the mode at the time of start of execution of multifunctional photographing application program 53 may be different between when multifunctional photographing application program 53 is launched in the photographing enabled state and when multifunctional photographing application program 53 is launched in the launch acceptance state.

Specifically, when multifunctional photographing application program 53 is launched in the launch acceptance state, the mode at the time of start of execution thereof may be set to a mode for causing the user to select between the photographing mode and the photograph display mode as in the embodiment above. On the other hand, when multifunctional photographing application program 53 is launched in the photographing enabled state, a mode at the time of start of execution thereof may be set to the photographing mode.

This is because, when multifunctional photographing application program 53 is launched in the photographing enabled state, it can be assumed that the user launched multifunctional photographing application program 53 for performing photographing with a function not attained by simplified photographing program 52.

Further, in an alternative embodiment, when multifunctional photographing application program 53 is launched in the photographing enabled state, the mode at the time of start of execution of multifunctional photographing application program 53 may be set to the photograph display mode, and in addition, an image relating to a display image that has been displayed in the photographing enabled state (for example, a favorite image in the same group as the display image, an image taken on the same day as the display image, and the like) may be displayed.

Further, in the embodiment above, a single button image for launching multifunctional photographing application program 53 in the photographing enabled state (button image 78 shown in FIG. 24) is provided. In an alternative embodiment, however, two button images may be displayed. Here, one of the two button images is a button for launching multifunctional photographing application program 53 with the mode at the time of start of execution thereof being set to the photographing mode, and the other button image is a button for launching multifunctional photographing application program 53 with the mode at the time of start of execution thereof being set to the photograph display mode. Thus, in an alternative embodiment, game device 10 may prepare a plurality of types of second launch operations, so that the mode at the time of start of execution (of multifunctional photographing application program 53) is different depending on a type of a performed second launch operation.

Further, in the embodiment above, simplified photographing program 52 is different from launch function program 51 and it is launched by a launch program separately from launch function program 51. Here, in an alternative embodiment, simplified photographing program 52 may be implemented as a part of launch function program 51 (that is, launch function program 51 and simplified photographing program 52 may implement one program in launch program 61). In an alternative embodiment, launch function program 51 may launch simplified photographing program 52.

In other words, an instruction (an operation) for launching simplified photographing program 52 should only be different from that for launching multifunctional photographing application program 53, and simplified photographing program 52 and multifunctional photographing application program 53 may be launched by the same program or by different programs.

[7. Details of Function in Multifunctional Photographing Application]

<Overview>

As described above, as a result of execution of multifunctional photographing application program 53, a large number of functions not attained by simplified photographing program 52 are provided. Details of two typical functions provided by multifunctional photographing application program 53 according to the present embodiment will be described hereinafter.

<Processing Procedure (First Example)>

Figure 36:
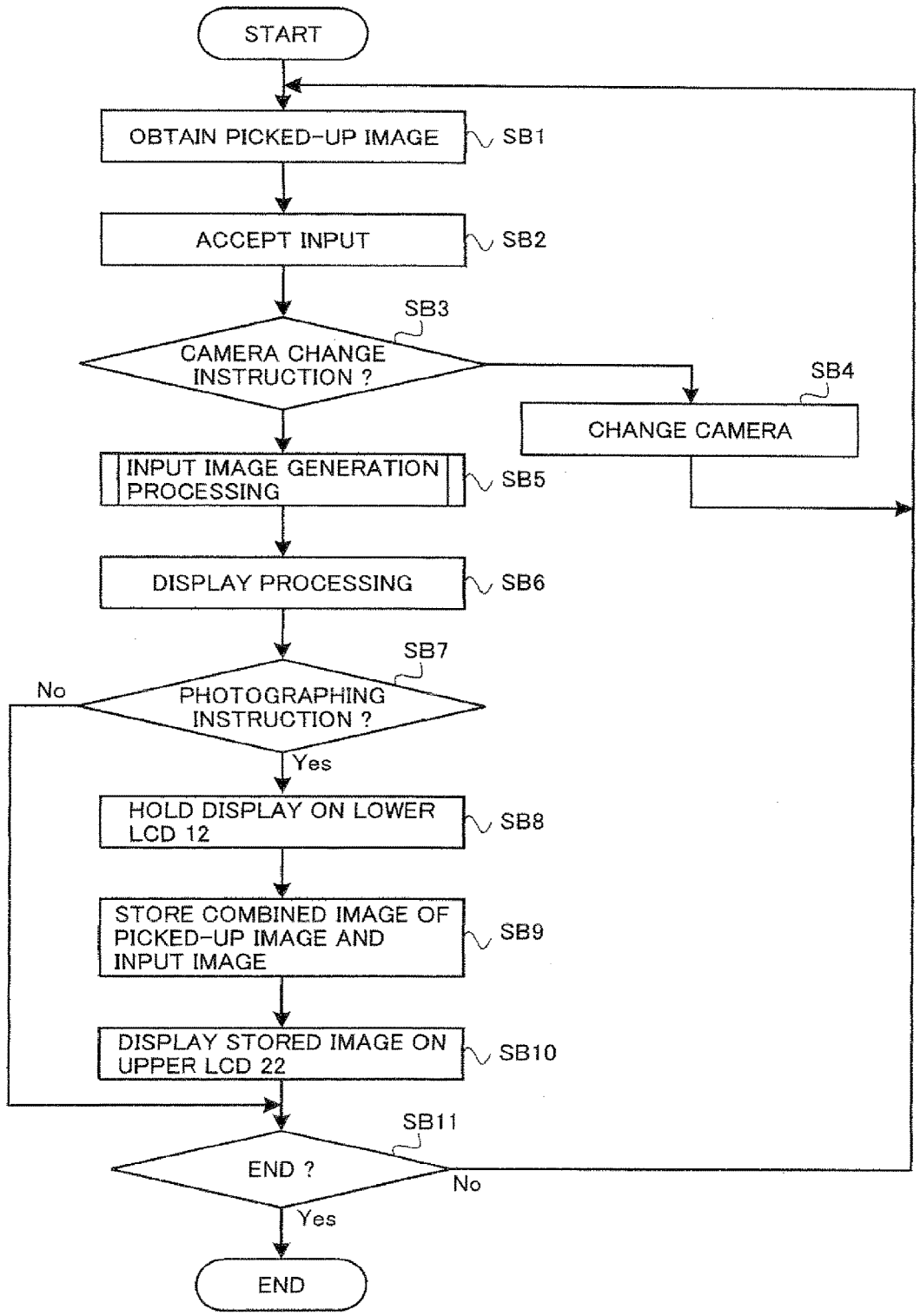
FIG. 36 is a flowchart showing a flow of photographing processing (No. 1) in the game device according to the present embodiment.

FIG. 36 is a flowchart showing a flow of photographing processing (No. 1) in the multifunctional photographing application in game device 10. It is noted that a processing loop of steps SB1 to SB11 shown in FIG. 36 (except for a case where processing in steps SB8 to SB10 are performed) is performed once in a prescribed time period (for example, 1/60 sec.).

In step SB1 shown in FIG. 36, CPU 31 obtains data of an image picked-up by inner camera 23 or outer camera 25. In the present embodiment, an image is picked-up by any one of cameras 23 and 25. In step SB1, CPU 31 obtains image data only from one camera. In the present embodiment, at the time of start of the photographing processing, a camera for picking up an image is set to outer camera 25. Subsequent to step SB1, processing in step SB2 is performed.

Figure 37:
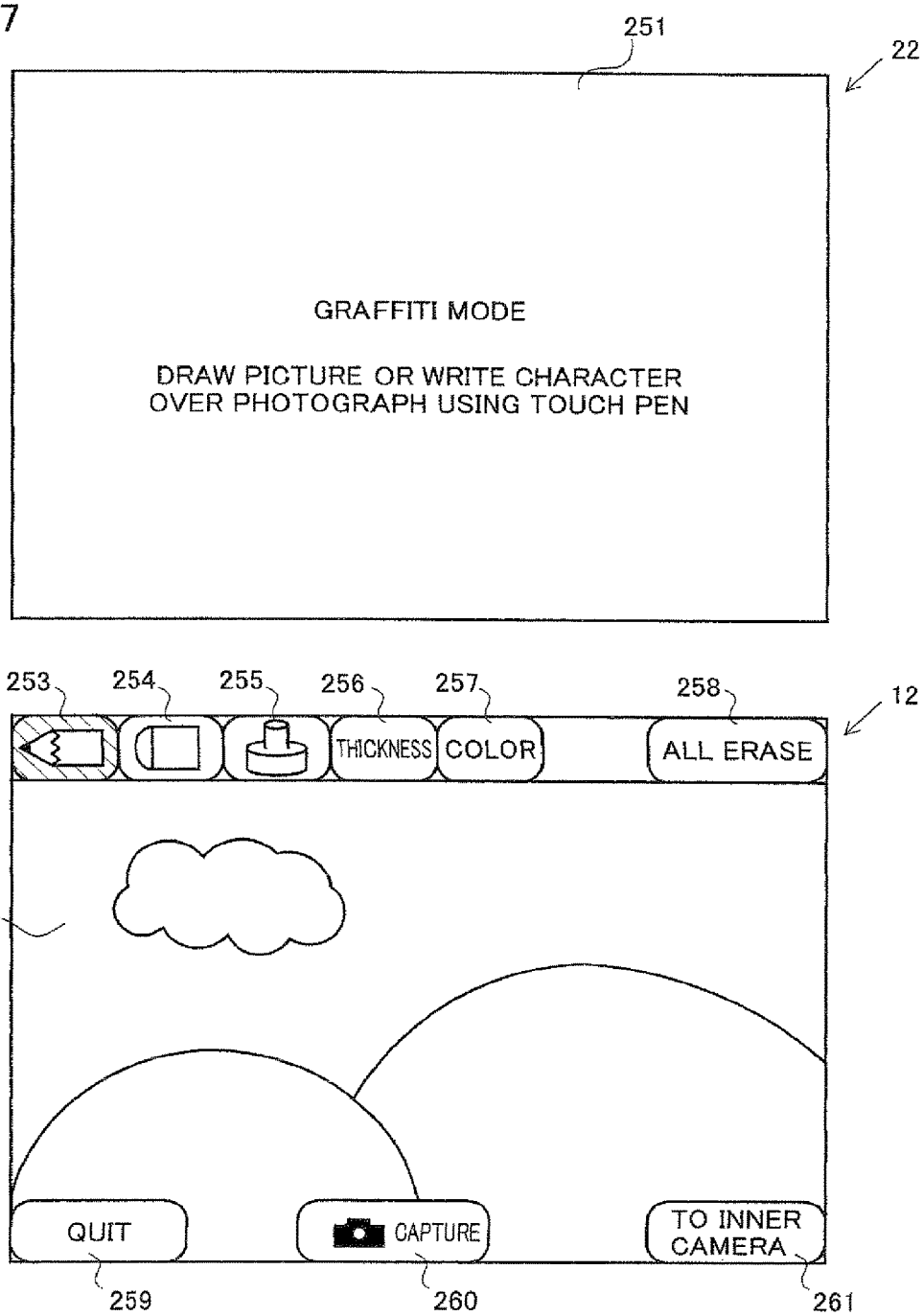
FIG. 37 is a diagram showing an example of an image displayed in photographing processing in the image pick-up device according to the present embodiment shown in FIG. 36.

The image data obtained from camera 23 or 25 in step SB1 above is displayed on lower LCD 12. FIG. 37 is a diagram showing an example of an image displayed on each of LCDs 12 and 22. FIG. 37 shows an image in the case where there is no image input by the user in input image generation processing which will be described later. As shown in FIG. 37, CPU 31 causes lower LCD 12 to display a real-time image (a picked-up image) 52 picked-up by camera 23 or 25. It is noted that an image 252 for explaining a manner of operation to the user is displayed on upper LCD 22. In the present embodiment, CPU 31 causes lower LCD 12 to display various button images 253 to 261 together with picked-up image 252. Each of button images 253 to 261 is an image for giving an instruction to game device 10 by the user's touch input onto a position of the image. Button images 253 to 261 will be described hereinafter.

A pen mode image 253, an eraser mode image 254, and a seal mode image 255 are images for changing an edition mode. Here, in the present embodiment, three modes of a pen mode, a seal mode and an eraser mode are prepared in advance. In the pen mode, an image of an input trail input to touch panel 13 can be added to the picked-up image. In the seal mode, a seal image prepared in advance can be added to the picked-up image. In the eraser mode, an image added in the pen mode or the seal mode can be erased. Pen mode image 253 is an image for giving an instruction to change the edition mode to the pen mode. Eraser mode image 254 is an image for giving an instruction to change the edition mode to the eraser mode. Seal mode image 255 is an image for giving an instruction to change the edition mode to the seal mode.

A thickness change image 256 is an image for giving an instruction to change a thickness of a line input in the pen mode. A color change image 257 is an image for giving an instruction to change a color of a line input in the pen mode. An all erase image 258 is an image for giving an instruction to erase all images added in the pen mode or the seal mode.

By giving instructions using button images 253 to 258 above, the user can input an image over the picked-up image displayed on lower LCD 12 (in a manner superimposed on the picked-up image). Processing for generating an input image (input image generation processing) will be described in detail later.

An end image 259 is an image for giving an instruction to end the photographing processing. A photographing instruction image 260 is an image for giving a photographing instruction. In the present embodiment, the photographing instruction is an instruction to store (record) an image displayed on lower LCD 12 (an image obtained by superimposing an input image on a picked-up image). It is noted that photographing instruction image 260 is preferably displayed substantially at the center of lower housing 11 (in the left-right direction) for facilitating a user's operation with either a right hand or a left hand. Therefore, if lower LCD 12 is not arranged substantially at the center of lower housing 11, CPU 31 preferably has photographing instruction image 260 displayed such that it is arranged substantially at the center of lower housing 11, not at the center of lower LCD 12. A camera change image 261 is an image for giving a camera change instruction. The camera change instruction is an instruction to change a camera for image pick-up between inner camera 223 and outer camera 225.

In step SB2, CPU 31 accepts an input to each input device. In other words, CPU 31 obtains operation data from operation button group 14 and obtains touch position data from touch panel 13. The obtained operation data and touch position data are stored in main memory 32. Subsequent to step SB2, processing in step SB3 is performed.

In step SB3, CPU 31 determines whether the camera change instruction has been given or not. In the present embodiment, the camera change instruction is given by pressing a prescribed button (for example, button 14B, button 14C, button 14D, or button 14E) or by providing an input to touch panel 13 by touching an area where camera change image 261 is displayed. Therefore, in the determination processing in step SB3, CPU 31 determines whether or not the prescribed button above has been pressed or whether or not an input to touch the area where camera change image 261 is displayed has been performed. Determination in step SB3 can be made by referring to the operation data and the touch position data stored in main memory 32 in step SB2. When a result of determination in step SB3 indicates Yes, processing in step SB4 is performed.

On the other hand, when the result of determination in step SB3 indicates No, processing in step SB5 which will be described later is performed.

In step SB4, CPU 31 changes the camera for image pick-up. In other words, when the camera for image pick-up is set to inner camera 23, CPU 31 changes the camera for image pick-up to outer camera 25. When the camera for image pick-up is set to outer camera 25, CPU 31 changes the camera for image pick-up to inner camera 23. Specifically, CPU 31 gives an instruction to stop an operation to one of cameras 23 and 25 picking up an image, and gives an instruction to perform image pick-up (an image pick-up execution instruction) to the other camera. If the processing in step SB4 above is performed, in step SB1 that will subsequently be performed, data of an image picked-up by the camera after the change is obtained by CPU 31, and in subsequent step SB6, the image (live image) picked-up by the camera after the change is displayed on lower LCD 12. Subsequent to step SB4, the processing in step SB1 is performed again.

In step SB5, CPU 31 performs the input image generation processing. The input image generation processing is processing for generating an input image based on user's input. The input image generation processing will be described hereinafter in detail with reference to FIGS. 38 and 39.

Figure 38:
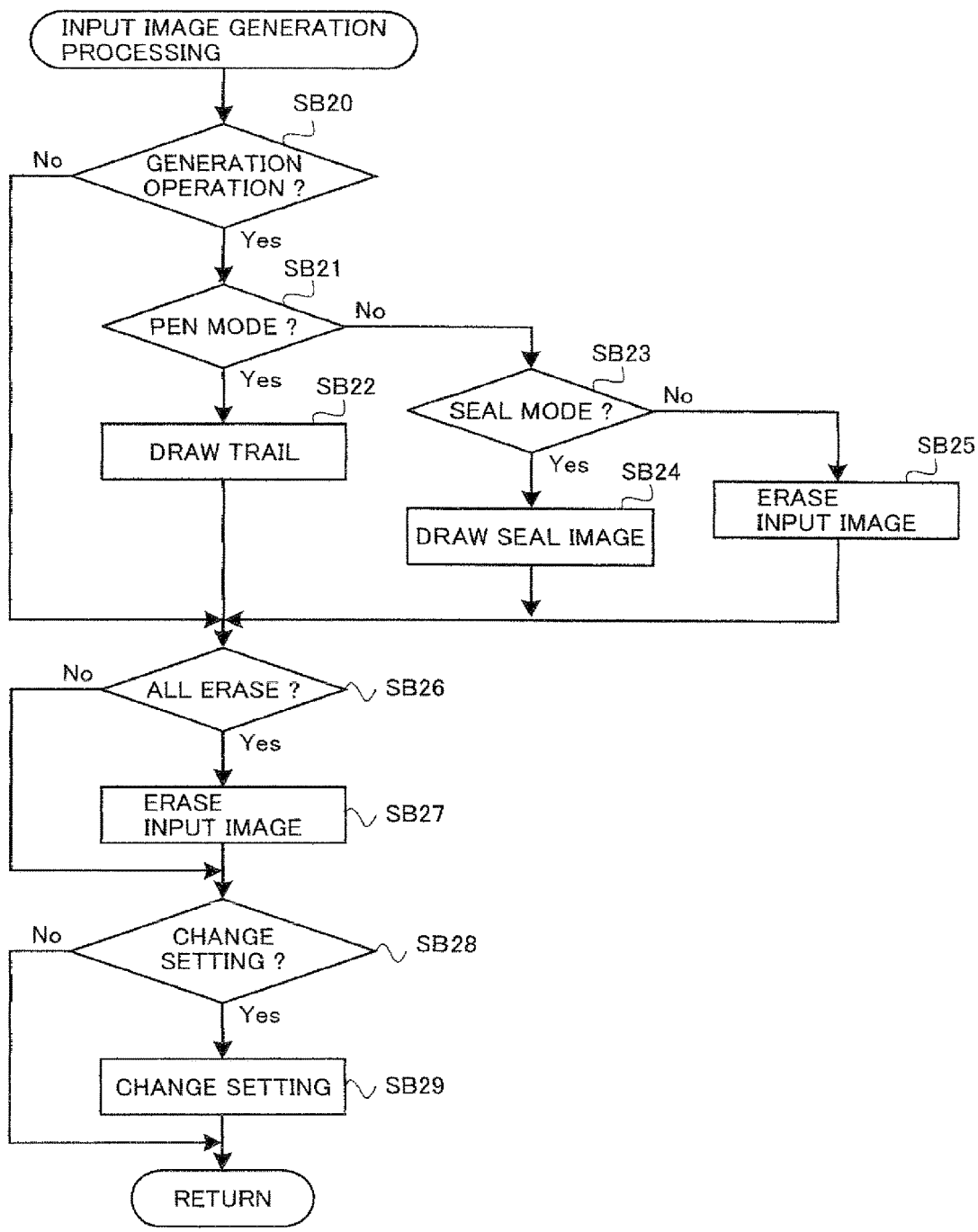
FIG. 38 is a flowchart showing a flow of input image generation processing shown in FIG. 36.

FIG. 38 is a flowchart showing a flow of the input image generation processing (step SB5) shown in FIG. 36. In the input image generation processing, initially in step SB20, CPU 31 determines whether an operation for generating an input image has been performed or not. In other words, CPU 31 determines whether an input to touch an area where the picked-up image is displayed in the input surface of touch panel 13 has been provided or not. Determination in step SB20 can be made by determining whether or not the touch position data obtained in step SB2 indicates a position in the area where the picked-up image is displayed. When a result of determination in step SB20 indicates Yes, processing in step SB21 is performed. On the other hand, when the result of determination in step SB20 indicates No, processing in step SB26 which will be described later is performed.

In step SB21, CPU 31 determines whether or not a current edition mode is set to the pen mode. In the present embodiment, it is assumed that the edition mode has been set to the pen mode at the time of start of the edition processing. When a result of determination in step SB21 indicates Yes, processing in step SB22 is performed. On the other hand, when the result of determination in step SB21 indicates No, processing in step SB23 which will be described later is performed.

Figure 39:
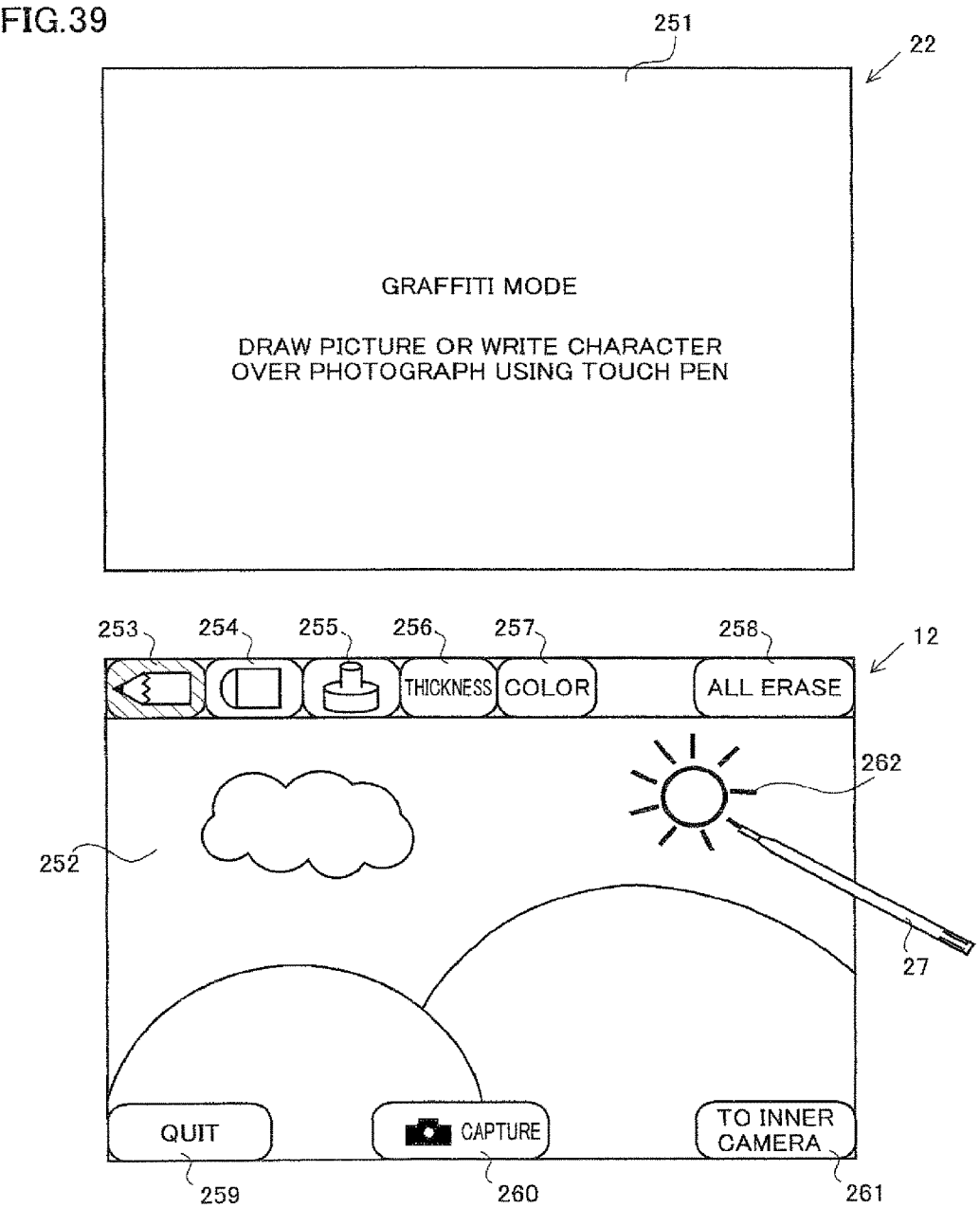
FIG. 39 is a diagram showing an example of an image displayed in a pen mode shown in FIG. 38.

In step SB22, processing in the pen mode is performed. In other words, CPU 31 draws an image of a trail of touch input provided on the picked-up image. Specifically, an image of a line connecting positions indicated by the touch position data that has been obtained in step SB2 by now is drawn in a memory (a frame buffer) storing image data to be displayed on LCDs 12 and 22. It is noted that a thickness and a color of a drawn line are determined in accordance with contents set in step SB29 which will be described later. The processing in step SB22 may be any processing so long as the processing is processing for generating and drawing an image representing a trail of positions of user's input to touch panel 13. An example of such processing is shown in steps SB52 and SB53 which will be described later. FIG. 39 is a diagram showing an example of an image displayed on each of LCDs 12 and 22 in the pen mode. When the processing in step SB22 is performed, in display processing which will be described later (step SB6), an input image 262 showing a trail drawn by the user is displayed in a manner superimposed on the picked-up image displayed on lower LCD 12 (see FIG. 39). Subsequent to step SB22, processing in step SB26 which will be described later is performed.

On the other hand, in step SB23, CPU 31 determines whether the current edition mode is set to the seal mode or not. When a result of determination in step SB23 indicates Yes (namely, when the current edition mode is set to the seal mode), processing in step SB24 is performed. On the other hand, when the result of determination in step SB23 indicates No (namely, when the current edition mode is set to the eraser mode), processing in step SB25 which will be described later is performed.

In step SB24, processing in the seal mode is performed. In other words, CPU 31 draws a prescribed seal image at a position of touch input on the picked-up image. Specifically, CPU 31 draws the prescribed seal image at a position indicated by the touch position data obtained in step SB2. It is noted that the processing in step SB24 may be any processing so long as the processing is processing for generating and drawing the prescribed seal image at a position of user's input to touch panel 13. An example of such processing is shown in steps SB60 and SB61 which will be described later. When the processing in step SB24 is performed, in display processing which will be described later (step SB6), an input image which is the prescribed seal image is displayed in a manner superimposed on the picked-up image displayed on lower LCD 12. It is noted that CPU 31 may prepare a plurality of seal images in advance and cause the user to select a seal image to be drawn from among the plurality of seal images. Subsequent to step SB24, the processing in step SB26 which will be described later is performed.

On the other hand, in step SB25, processing in the eraser mode is performed. In other words, CPU 31 erases the input image (the image of the trail or the seal image) on an edited image in accordance with an input to touch panel 13. Specifically, the input image drawn at the position indicated by the touch position data obtained in step SB2 is erased. Subsequent to step SB25, the processing in step SB26 is performed.

In step SB26, CPU 31 determines whether an instruction to erase all input images has been given or not. Specifically, CPU 31 determines whether an input to touch an area where all erase image 258 above is displayed has been provided or not. When a result of determination in step SB26 indicates Yes, processing in step SB27 is performed. On the other hand, when the result of determination in step SB26 indicates No, the processing in step SB27 is skipped and processing in step SB28 which will be described later is performed.

In step SB27, CPU 31 erases all input images that have been generated and drawn by now. Thus, the user can start again an operation for drawing an input image by touching all erase image 258. Subsequent to step SB27, processing in step SB28 is performed.

In step SB28, CPU 31 determines whether an instruction to change setting relating to the operation for generating an input image has been given or not. Specifically, CPU 31 determines whether an input to touch an area where each of button images 253 to 257 above is displayed has been provided or not. When a result of determination in step SB28 indicates Yes, processing in step SB29 is performed. On the other hand, when the result of determination in step SB28 indicates No, the processing in step SB28 is skipped and CPU 31 ends the input image generation processing.

In step SB29, CPU 31 changes the setting in accordance with the provided instruction. In other words, when a touch input to any of mode images 253 to 255 is provided, CPU 31 changes the edition mode to a mode corresponding to a mode image indicated by the touch input. When a touch input to thickness change image 256 is made, CPU 31 changes setting of a thickness of a line (trail) generated in the pen mode. Specifically, CPU 31 displays a plurality of images of lines different in thickness, causes the user to select a line of a desired thickness from among the plurality of lines different in thickness, and changes the setting of a thickness of a line to the selected thickness. When a touch input to color change image 257 is made, CPU 31 changes a color of a line (trail) generated in the pen mode. Specifically, CPU 31 displays a plurality of images of a plurality of colors, causes the user to select a desired color from among the plurality of colors, and changes the setting of a color of a line to the selected color. After the end of step SB29, CPU 31 ends the input image generation processing.

As a result of step SB5 above, addition to the real-time image (the live image) based on an input to the touch panel is made. In other words, the user can input an image over the picked-up image displayed on lower LCD 12 (in a manner superimposed on the picked-up image). In the present embodiment, though the processing for adding an image drawn by the user or a seal image prepared in advance to the picked-up image has been described by way of example, in an alternative embodiment, CPU 31 should only perform processing for modifying a real-time image, and it may perform processing for distorting the picked-up image, processing for altering expression of a face (processing for detecting a feature point of the face through image recognition processing and changing a position of the feature point) when a face of a person is included in the picked-up image, processing for converting a picked-up image into an image symmetrical about a line, and the like.

Referring back to the description of step SB20, in step SB6 subsequent to step SB5, CPU 31 performs the display processing for displaying a prescribed image on LCDs 12 and 22. Specifically, an image such as image 252 shown in FIG. 37 for explaining a manner of operation to the user is displayed on upper LCD 22. The picked-up image obtained in step SB1 and button images 253 to 261 are displayed on lower LCD 12 (see FIG. 37). Further, when an input image is generated and drawn in the input image generation processing, the input image is displayed over the picked-up image (see FIG. 39). In the present embodiment, since the processing in steps SB1 to SB6 is repeatedly performed, the picked-up image is different each time. Therefore, the user can add an input image onto an image picked up by camera 23 or 25 in real time. Subsequent to step SB6, processing in step SB7 is performed.

In step SB7, CPU 31 determines whether a photographing instruction has been given or not. In the present embodiment, the photographing instruction is given by pressing a prescribed button (for example, button 14I or button 14J) or by providing to touch panel 13, an input to touch an area where photographing instruction image 260 is displayed. It is noted that photographing may automatically be performed at prescribed timing by program processing. Therefore, in the determination processing in step SB7, CPU 31 determines whether or not the prescribed button above has been pressed or whether or not the input to touch the area where photographing instruction image 260 is displayed has been provided. Determination in step SB7 can be made by referring to the operation data and the touch position data stored in main memory 32 in step SB2. When a result of determination in step SB7 indicates Yes, processing in step SB8 is performed. On the other hand, when the result of determination in step SB7 indicates No, processing in step SB11 which will be described later is performed.

In step SB8, CPU 31 holds (freezes) a display content (the picked-up image and the input image) currently displayed on lower LCD 12. In other words, display on lower LCD 12 of a still image (the picked-up image and the input image displayed in step SB5) which is a live image at the time when a photographing instruction was given is continued. A period for which the still image is displayed may be a predetermined prescribed period or a period until display processing in step SB6 is performed next time. In an alternative embodiment, the processing in step SB8 may not be performed. In other words, a moving image of a live image may always be displayed on lower LCD 12, instead of display of a still image on lower LCD 12 in accordance with an image pick-up instruction. Subsequent to step SB8, processing in step SB9 is performed.

In step SB9, CPU 31 causes storage of a picked-up image currently displayed on lower LCD 12 and the input image. In other words, data of the picked-up image and the input image displayed in step SB5 is stored, for example, in data memory 34 for storage. Thus, the user can store the picked-up image and the input image added onto the picked-up image. It is noted that CPU 31 may cause storage of data of an image obtained by combining the picked-up image and the input image, or may cause separate storage but in association with each other, of image data of the picked-up image and image data of the input image. Subsequent to step SB9, processing in step SB10 is performed.

In step SB10, CPU 31 causes upper LCD 22 to display the image stored in step SB9. It is noted that the image displayed on upper LCD 22 is continuously displayed until another photographing instruction is given (Yes in step SB7 again) and another stored image is displayed in step SB10. In a variation, the image displayed on upper LCD 22 may be displayed for a predetermined prescribed period, or may be displayed until display processing in step SB6 is performed next time. Further, after display of the stored image ends, an image for explaining a manner of operation to the user (an operation guidance image as described previously with reference to FIG. 37) may be displayed on upper LCD 22. Though the display processing is performed in step SB10 following the storage processing in step SB9 in the present embodiment, any of the storage processing and the display processing may be performed first. Specifically, in response to a photographing instruction, CPU 31 may cause upper LCD 22 to display an image stored in response to the photographing instruction. CPU 31 may not only display an image stored in response to a photographing instruction but also may display an image which is to be stored in response to a photographing instruction. Subsequent to step SB10, processing in step SB11 is performed.

Figure 40:
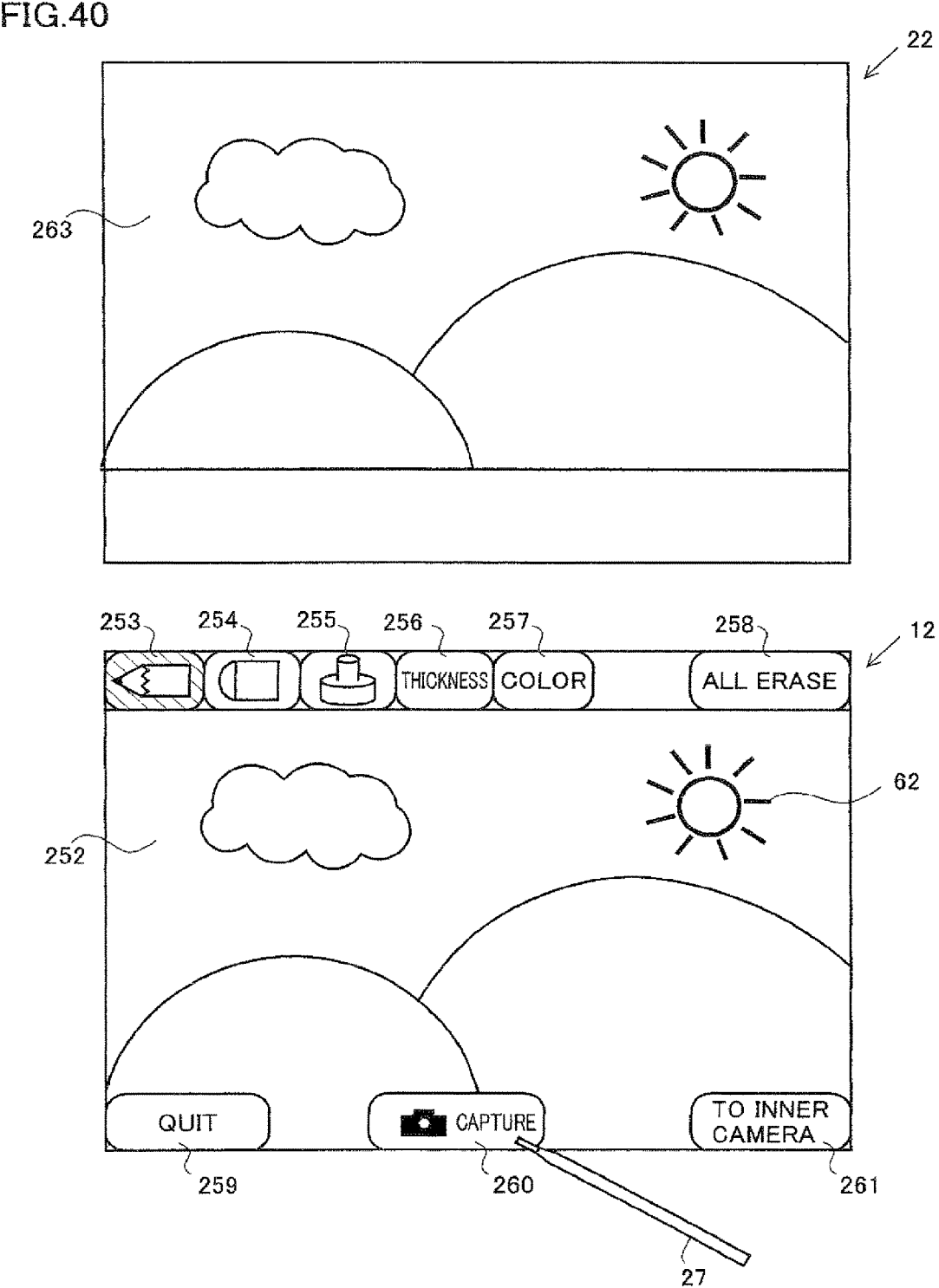
FIG. 40 is a diagram showing an example of an image displayed in processing for displaying a stored image shown in FIG. 36.

FIG. 40 is a diagram showing an example of an image displayed on LCDs 12 and 22 when step SB 10 is performed. As shown in FIG. 40, in the present embodiment, in accordance with a photographing instruction (a photographing operation), an image 263 stored in response to the photographing instruction is displayed on upper LCD 22 (step SB 10). Thus, an image representing a result of photographing can be displayed on upper LCD 22 having a display screen that faces in a display direction corresponding to the photographing direction of camera 23 or 25 (in a direction the same as the photographing direction or in a direction opposite to the photographing direction). By displaying the image representing the result of photographing on upper LCD 22, the image representing the result of photographing can be presented to the user in a manner easy for the user to recognize the photographing direction. In the present embodiment, since a real-time image picked-up by camera 23 or 25 is displayed on lower LCD 12 of which display direction does not correspond to the photographing direction of camera 23 or 25, it is particularly effective to present the image representing the result of photographing to the user in a manner easy for the user to recognize the photographing direction.

In the present embodiment, an edition result obtained before a photographing instruction is given is maintained also after the photographing instruction was given (after an image is stored). Namely, as shown in FIG. 40, input image 262 input prior to a photographing instruction is displayed on lower LCD 12 in a manner superimposed on a live image even after the photographing instruction was given. In an alternative embodiment, an edition result obtained before a photographing instruction is given may be erased in accordance with the photographing instruction, and only a live image may be displayed on lower LCD 12 after the photographing instruction was given.

In an alternative embodiment, an image representing a result of photographing (a stored image) may be displayed on upper LCD 22 at any timing, without limited to the timing in accordance with a photographing instruction. For example, CPU 31 may cause upper LCD 22 to display an image representing a result of photographing in accordance with a user's instruction to view an image (the number of images may be one or more) or may always display an image representing a result of photographing on upper LCD 22 instead of the image for explaining a manner of operation.

In step SB11, CPU 31 determines whether or not to end the edition processing. Determination is made based on whether or not an instruction to end the edition processing has been given by the user. Specifically, determination in step SB 11 is made based on whether a touch input to an area of end image 259 displayed on lower LCD 12 has been provided or not. When a result of determination in step SB 11 indicates No, CPU 31 performs the processing in step SB1 again. Thereafter, the processing loop of steps SB1 to SB11 is repeatedly performed until determination to end the photographing processing is made in step SB11. On the other hand, when the result of determination in step SB11 indicates Yes, CPU 31 ends the photographing processing shown in FIG. 36.

Through the photographing processing described above, the user can store an image picked-up by the camera in accordance with the photographing instruction. Here, in the present embodiment, two display devices are included, an image being currently taken is displayed on one of the display devices, and a picture for explaining an operation is displayed on the other display device. Thus, since the user can perform the photographing operation while looking at the picture for explaining the operation in addition to the currently picked-up image, user-friendly game device 10 can be provided. Further, in the present embodiment, by providing touch panel 13 in lower LCD 12, an operation can more easily be performed.

Further, in the present embodiment, the user can provide the photographing instruction by pressing button 14I or button 14J. By using button 14I or button 14J as the shutter button, the user can press the shutter button while holding lower housing 11 with both hands. Thus, the photographing operation can more easily be performed. In an alternative embodiment, some of buttons 14B to 14E may be used as the shutter button. In this case as well, the user can press the shutter button while holding lower housing 11 with both hands as in the present embodiment. Alternatively, some buttons of direction input button A (for example, one direction input; for example, a left input) and one of buttons 14B to E (for example, button 14D) may both have a function of the shutter button. By doing so, either a left-handed user or a right-handed user can easily operate the shutter button.

<Processing Procedure (Second Example)>

In the processing procedure above, in the photographing processing, the case where the user adds an input image to an image obtained in real time has been described by way of example, however, in the photographing processing, the user may add an input image to an image (a still image) picked-up by game device 10. A second example of the photographing processing will be described hereinafter with reference to FIGS. 41 to 45.

Figure 41:
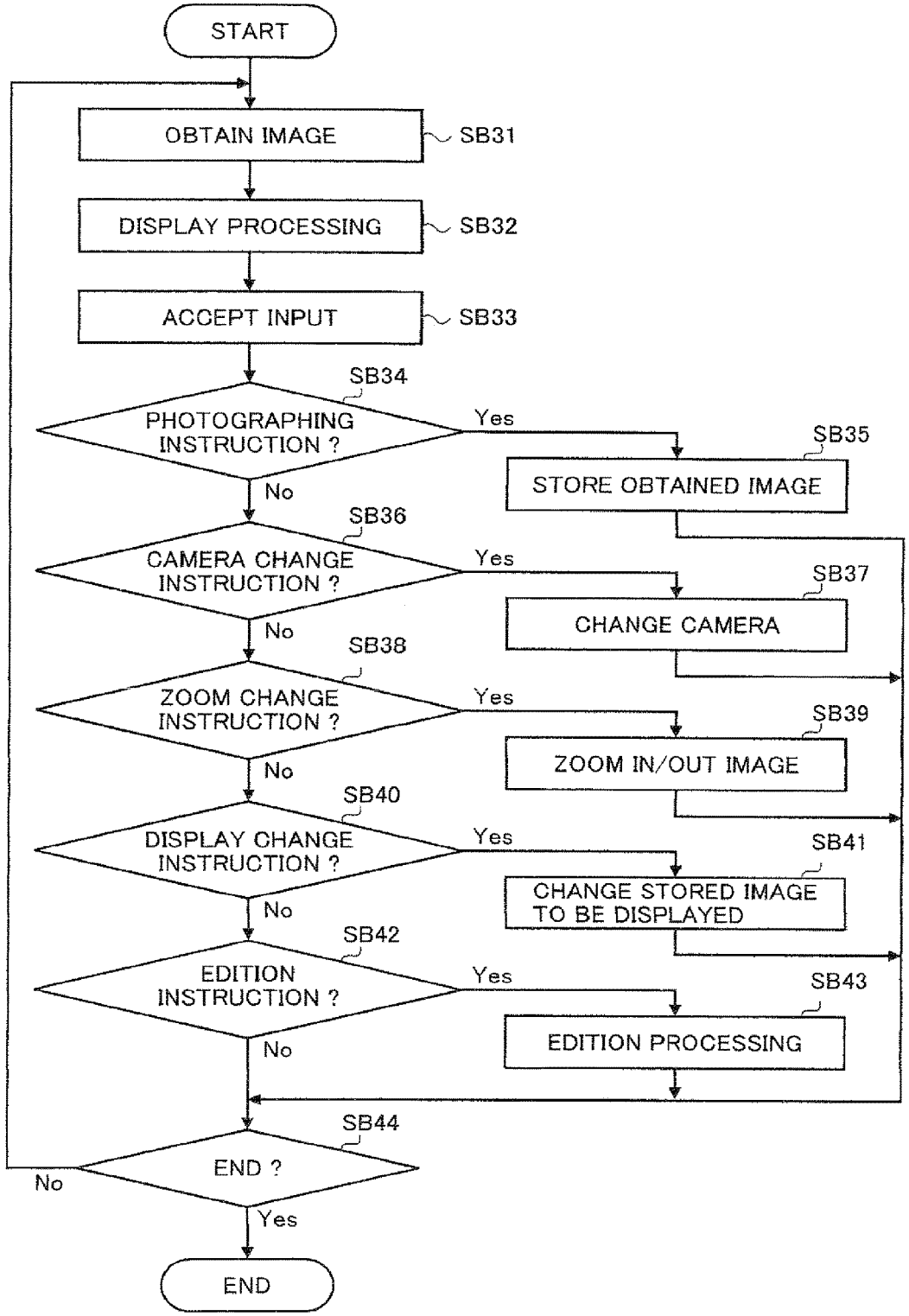
FIG. 41 is a flowchart showing a flow of photographing processing (No. 2) in the game device according to the present embodiment.

FIG. 41 is a flowchart showing a flow of photographing processing (No. 2) in the multifunctional photographing application in game device 10. When power of game device 10 is turned on by pressing of power button 14F, CPU 31 of game device 10 initializes main memory 32 and the like, and then starts execution of a program for performing the photographing processing shown in FIG. 41. It is noted that a processing loop of steps SB31 to SB44 shown in FIG. 41 is performed once in a prescribed time period (for example, 1/60 sec.) except for a period when edition processing (step SB43) is performed.

In step SB31 shown in FIG. 41, CPU 31 obtains data of an image picked-up by inner camera 23 or outer camera 25. In the present second example, an image is picked-up by only any one of cameras 23 and 25. In step SB31, CPU 31 obtains image data only from one camera. In the present variation, at the time of start of the photographing processing, a camera for image pick-up is set to outer camera 25. Subsequent to step SB31, processing in step SB32 is performed.

In step SB32, CPU 31 performs display processing for displaying prescribed images on LCDs 12 and 22. FIG. 42 is a diagram showing an example of an image displayed on LCDs 12 and 22 in step SB32. As shown in FIG. 42, CPU 31 causes upper LCD 22 to display a real-time image (a picked-up image) 51 taken by camera 23 or 25. In other words, CPU 31 outputs the image data obtained in step SB31 to upper LCD 22. Further, in the present variation, an image 272 showing a current date is displayed on upper LCD 22 in a manner superimposed on picked-up image 271.

In the present variation, magnification data indicative of a magnification of the picked-up image displayed on upper LCD 22 is stored in main memory 32. In step SB32, the picked-up image is displayed on upper LCD 22 at a magnification indicated by the magnification data. In other words, CPU 31 determines an area in the picked-up image to be displayed in accordance with the magnification above, zooms in an image of the determined area to have a size of upper LCD 22 as necessary, and causes upper LCD 22 to display that image. It is noted that, at the time of start of the photographing processing, the magnification data is set so as to indicate a predetermined prescribed magnification (for example, a magnification with which an entirety of the picked-up image is displayed on upper LCD 22 (one time)). Content of the magnification data is changed when a zoom change instruction which will be described later is given. Therefore, when the picked-up image is zoomed in and displayed on upper LCD 22, not the entirety but only a part of the picked-up image may be displayed.

On the other hand, CPU 31 causes lower LCD 12 to display an operation screen for operating game device 10. As shown in FIG. 42, the operation screen displayed in step SB32 includes stored images 273A to 273D and instruction images 274 to 278 for giving various instructions to game device 10 using touch panel 13.

Stored images 273A to 273D are images previously taken by game device 10 and stored in game device 10 (or alternatively in memory card 28) (referred to as stored images). In the present variation, among the stored images, a prescribed number of images (four in FIG. 42) are displayed on lower LCD 12. It is noted that, in main memory 32, data indicative of stored images to be displayed on lower LCD 12 (displayed stored images) is stored as displayed stored image data. The displayed stored image data is, for example, data indicative of an ID assigned to a stored image. In FIG. 42, stored images 273A to 273D are aligned and displayed in order of date (time and date) of photographing. Here, leftmost stored image 273A is an image taken at the earliest time, and the time of photographing is earlier in order of stored image 273B which is second from the left, stored image 273C which is second from the right, and rightmost stored image 273D. In the present variation, an instruction to perform edition processing for editing a stored image (an edition instruction) can be given by providing a touch input to displayed stored images 273A to 273D through touch panel 13.

Further, as the instruction images above, a photographing instruction image 274, a camera change image 275, a zoom bar 276, a zoom cursor 277, and display change images 278A and 278B are displayed on lower LCD 12. Photographing instruction image 274 is an image for giving a photographing instruction using touch panel 13. The photographing instruction is an instruction for causing camera 23 or 25 of game device 10 to perform photographing. Camera change image 275 is an image for giving a camera change instruction using touch panel 13. The camera change instruction is an instruction to change the camera for image pick-up between inner camera 23 and outer camera 25. Zoom bar 276 and zoom cursor 277 are images for giving a zoom change instruction using touch panel 13. The zoom change instruction is an instruction to zoom in/out the picked-up image displayed on upper LCD 22. Display change images 278A and 278B are images for giving a display change instruction. The display change instruction is an instruction for changing stored images to be displayed as stored images 273A to 273D on lower LCD 12 among the stored images stored in game device 10. A manner of giving each of these instructions and processing performed by game device 10 in accordance with each of the instructions will be described later.

Referring back to the description in connection with FIG. 41, subsequent to step SB32, processing in step SB33 is performed. In step SB33, CPU 31 accepts an input to each input device. In other words, CPU 31 obtains operation data from operation button group 14 and obtains touch position data from touch panel 13. The obtained operation data and touch position data are stored in main memory 32. Subsequent to step SB33, processing in step SB34 is performed.

In step SB34, CPU 31 determines whether the photographing instruction has been given or not. In the present variation, the photographing instruction is given by pressing a prescribed button (for example, button 14I or button 14J) or by providing to touch panel 13, an input to touch an area where photographing instruction image 274 is displayed. Therefore, in the determination processing in step SB34, CPU 31 determines whether or not the prescribed button above has been pressed or whether or not the input to touch the area where photographing instruction image 274 is displayed has been provided. Determination in step SB34 can be made by referring to the operation data and the touch position data stored in main memory 32 in step SB33. When a result of determination in step SB34 indicates Yes, processing in step SB35 is performed. On the other hand, when the result of determination in step SB34 indicates No, processing in step SB36 which will be described later is performed.

In step SB35, CPU 31 performs the photographing processing. In other words, CPU 31 causes data memory 34 for storage to store (save) the image data obtained from the camera in step SB31. In an alternative embodiment, CPU 31 may cause any of LCDs 12 and 22 to display the image data obtained from the camera in step SB31, and inquire of the user whether or not to store the image data. Only when the user provides an instruction to store the image data, CPU 31 may cause data memory 34 for storage to store (save) the image data. Further, in an alternative embodiment, CPU 31 may cause memory card 28 to store data of the picked-up image, or may cause the user to indicate whether the image data should be stored in a device main body (data memory 34 for storage) or in memory card 28. Subsequent to step SB35, processing in step SB42 which will be described later is performed.

On the other hand, in step SB36, CPU 31 determines whether the camera change instruction has been given or not. In the present variation, the camera change instruction is given by pressing a prescribed button (for example, button 14B, button 14C, button 14D, or button 14E) or by providing to touch panel 13, an input to touch an area where camera change image 275 is displayed. Thus, in the determination processing in step SB36, CPU 31 determines whether or not the prescribed button above has been pressed or whether or not the input to touch the area where camera change image 275 is displayed has been provided. Determination in step SB36 can be made by referring to the operation data and the touch position data stored in main memory 32 in step SB33. When a result of determination in step SB36 indicates Yes, processing in step SB37 is performed. On the other hand, when the result of determination in step SB36 indicates No, processing in step SB38 which will be described later is performed.

In step SB37, CPU 31 changes the camera for image pick-up. In other words, when the camera for image pick-up is set to inner camera 23, CPU 31 changes the camera for image pick-up to outer camera 25. When the camera for image pick-up is set to outer camera 25, CPU 31 changes the camera for image pick-up to inner camera 23. Specifically, CPU 31 gives an instruction to stop an operation to one of cameras 23 and 25 picking up an image and gives an instruction to perform image pick-up (an image pick-up execution instruction) to the other camera. If the processing in step SB37 above is performed, in step SB31 that will subsequently be performed, data of an image picked-up by the camera after the change is obtained by CPU 31, and in subsequent step SB32, the image picked-up by the camera after the change is displayed on upper LCD 22. Subsequent to step SB37, processing in step SB42 which will be described later is performed.

On the other hand, in step SB38, CPU 31 determines whether the zoom change instruction has been given or not. In the present variation, the zoom change instruction is given by moving zoom cursor 277 on zoom bar 276 upward or downward by using a prescribed button (for example, an up button or a down button of direction input button 14A) or by providing an input to touch panel 13. Specifically, zoom cursor 277 is moved upward by a prescribed distance in accordance with pressing of the up button of direction input button 14A and moved downward by a prescribed distance in accordance with pressing of the down button of direction input button 14A. In addition, the user can move zoom cursor 277 upward or downward by initially touching a screen area where zoom cursor 277 is displayed and performing an operation with respect to touch panel 13 to slide a touch position upward or downward while touching the screen area. Therefore, in the determination processing in step SB38, CPU 31 determines whether or not the prescribed button above has been pressed or whether or not the operation with respect to touch panel 13 for moving zoom cursor 277 has been performed. Determination in step SB38 can be made by referring to the operation data and the touch position data stored in main memory 32 in step SB33. When a result of determination in step SB38 indicates Yes, processing in step SB39 is performed. On the other hand, when the result of determination in step SB38 indicates No, processing in step SB40 which will be described later is performed.

In step SB39, CPU 31 zooms in/out the picked-up image displayed on upper LCD 22 in accordance with the zoom change instruction. In other words, when an instruction for moving zoom cursor 277 upward is given, CPU 31 changes the content of the magnification data stored in main memory 32 such that the magnification is lowered. Thus, in step SB32 that will subsequently be performed, a picked-up image is displayed with the image being zoomed out as compared to preceding step SB32. On the other hand, when an instruction for moving zoom cursor 277 downward is given, CPU 31 changes the content of the magnification data stored in main memory 32 such the magnification is increased. Thus, in step SB32 that will subsequently be performed, a picked-up image is displayed with the image being zoomed in as compared to preceding step SB32. Subsequent to step SB39, processing in step SB42 which will be described later is performed.

On the other hand, in step SB40, CPU 31 determines whether the display change instruction has been given or not. In the present variation, the display change instruction is given by pressing a prescribed button (for example, a left button or a right button of direction input button 14A) or by providing to touch panel 13, an input to touch an area where display change image 278A is displayed or an area where display change image 278B is displayed. Therefore, in the determination processing in step SB40, CPU 31 determines whether or not the prescribed button above has been pressed or whether or not the input to touch the area where display change image 278A is displayed or the area where display change image 278B is displayed has been provided. Determination in step SB40 can be made by referring to the operation data and the touch position data stored in main memory 32 in step SB33. When a result of determination in step SB40 indicates Yes, processing in step SB41 is performed. On the other hand, when the result of determination in step SB40 indicates No, processing in step SB42 which will be described later is performed.

In step SB41, CPU 31 changes stored images to be displayed on lower LCD 12 (displayed stored images) among the stored images. Specifically, when the right button of direction input button 14A is pressed or when display change image 278B is touched, the displayed stored images are shifted by one image toward recent images. In other words, among the four currently displayed stored images, the image taken at the earliest time is removed from the displayed stored images. In addition, a stored image taken subsequent to the image taken most recently among the four currently displayed stored images is added as a new displayed stored image. On the other hand, when the left button of direction input button 14A is pressed or when display change image 278A is touched, the displayed stored images are shifted by one image toward old images. In other words, among the four currently displayed stored images, the image taken most recently is removed from the displayed stored images. In addition, a stored image taken immediately before the image taken at the earliest time among the four currently displayed stored images is added as a new displayed stored image. In main memory 32, data indicative of the displayed stored images after the change in step SB40 is stored as new displayed stored image data. Subsequent to step SB41, processing in step SB42 which will be described later is performed.

In step SB42, CPU 31 determines whether an edition instruction has been given or not. In the present variation, the edition instruction is given by providing through touch panel 13, a touch input to a display area of a stored image of which edition is desired among displayed stored images 273A to 273D. Thus, in the determination processing in step SB42, CPU 31 determines whether the input to touch any of the areas where stored images 273A to 273D are displayed respectively has been provided or not. Determination in step SB42 can be made by referring to the operation data and the touch position data stored in main memory 32 in step SB33. When a result of determination in step SB42 indicates Yes, processing in step SB43 is performed. On the other hand, when the result of determination in step SB42 indicates No, processing in step SB44 which will be described later is performed.

In step SB43, CPU 31 performs the edition processing. The edition processing is processing for editing a stored image. Hereinafter, a stored image to be edited is referred to as an edited image. The edition processing will be described hereinafter in detail with reference to FIGS. 43 to 45.

Figure 43:
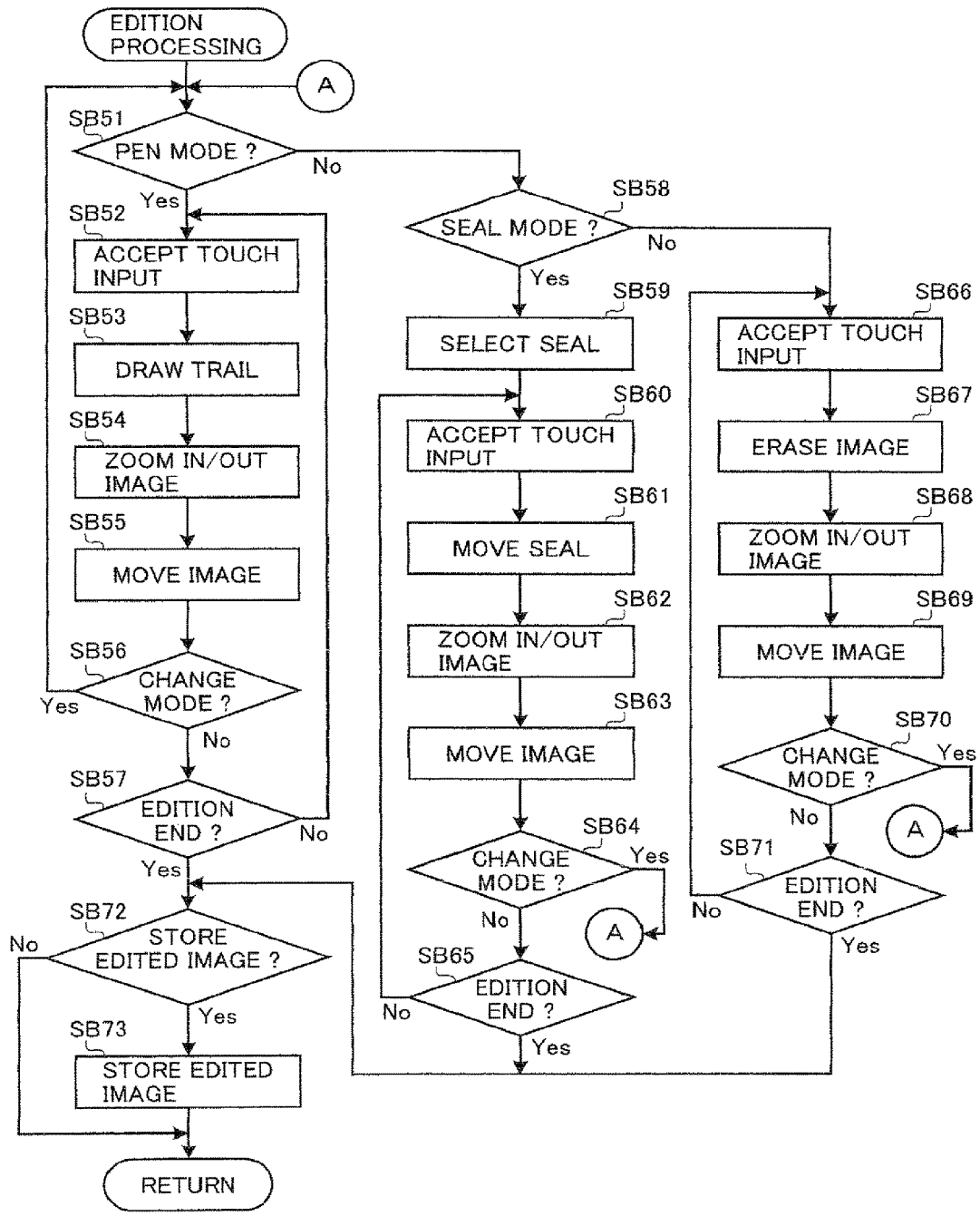
FIG. 43 is a flowchart showing a flow of edition processing shown in FIG. 41.

FIG. 43 is a flowchart showing a flow of the edition processing (step SB43) shown in FIG. 41. In the edition processing, initially in step SB51, CPU 31 determines whether or not the current edition mode is set to the pen mode. Here, in the present variation, in the edition processing, three modes of the pen mode, the seal mode and the eraser mode are prepared in advance. In the pen mode, an image of an input trail input through touch panel 13 can be added to an edited image. In the seal mode, a seal image prepared in advance can be added to an edited image. In the eraser mode, an image added in the pen mode or the seal mode can be erased. In the present variation, it is assumed that the edition mode has been set to the pen mode at the time of start of the edition processing. When a result of determination in step SB51 indicates Yes, processing in step SB52 is performed. On the other hand, when the result of determination in step SB51 indicates No, processing in step SB58 which will be described later is performed.

Figure 44:
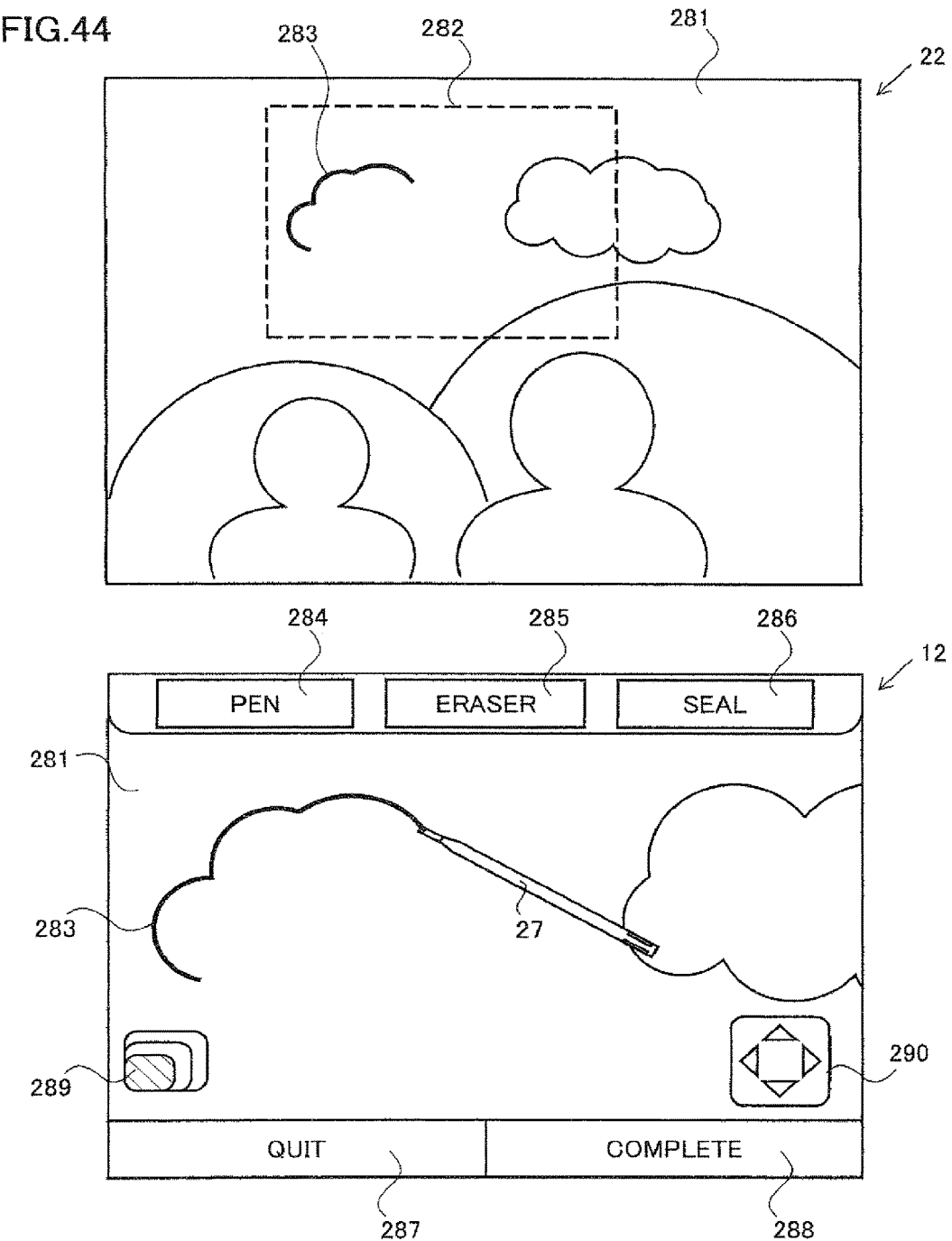
FIG. 44 is a diagram showing an example of an image displayed in the pen mode in the edition processing shown in FIG. 43.

In steps SB52 to SB57, processing in the pen mode is performed. FIG. 44 is a diagram showing an example of an image displayed on LCDs 12 and 22 in the pen mode in the edition processing. As shown in FIG. 44, during the edition processing, an operation screen for edition (an edition screen) is displayed on lower LCD 12. Specifically, a part or an entirety of an edited image 281 is displayed on lower LCD 12. Edited image 281 is a stored image to be edited, that is, a stored image designated with a touch input from among stored images 273A to 273D shown in FIG. 42. Further, images 284 to 290 for performing various operations are displayed on lower LCD 12. Operations using these images 284 to 290 will be described in detail later. On the other hand, during the edition processing, as shown in FIG. 44, entire edited image 281 is displayed on upper LCD 22. It is noted that a dotted-line area 282 shown in FIG. 44 shows an area in edited image 281 being displayed on lower LCD 12. An image of such a dotted-line area 282 may or may not be displayed on upper LCD 22. Since a real-time image picked-up by camera 23 or 25 is not displayed during the edition processing, CPU 31 may give an instruction not to perform an image pick-up operation to each of cameras 23 and 25. The processing in the pen mode (the steps SB52 to SB57) will be described hereinafter in detail with reference to FIG. 44.

In step SB52, CPU 31 accepts an input to touch panel 13. In other words, CPU 31 obtains touch position data from touch panel 13. The obtained touch position data is stored in main memory 32. Subsequent to step SB52, processing in step SB53 is performed.

In step SB53, CPU 31 has an image of an input trail 283 displayed in accordance with an input to touch panel 13. In other words, when a touch input through touch panel 13 to an area of edited image 281 is provided, the image of input trail 283 is displayed. Input trail 283 is an image showing a trail of positions of touch input to touch panel 13. Specifically, when the touch position data obtained in step SB52 indicates a position in an area where edited image 281 is displayed, CPU 31 adds the image of input trail 283 at the position in edited image 281. Edited image 281 to which the image has been added is displayed on LCDs 12 and 22. Since a processing loop of steps SB51 to SB56 is repeated once in a prescribed time period (one frame time (1/60 sec.)) during the pen mode, the processing in steps SB52 and SB53 is repeated during the pen mode. Therefore, when the user continuously provides input to touch panel 13 to draw a trail, the image of input trail 283 is generated and displayed in a manner showing the trail. It is noted that generation and display processing of input trail 283 in step SB53 is performed only when a touch input to the area of edited image 281 is provided, and it is not performed when a touch input is not provided or when a touch input to an area other than the area of edited image 281 is provided. Subsequent to step SB53, processing in step SB54 is performed.

In step SB54, CPU 31 performs zoom in/out processing of edited image 281 displayed on lower LCD 12. The zoom in/out processing is performed when a magnification change instruction is given, that is, when an input to an area of a magnification change instruction image 289 displayed on lower LCD 12 is provided through touch panel 13. Magnification change instruction image 289 is an image for giving an instruction to zoom in or out edited image 281 displayed on lower LCD 12. In step SB54, CPU 31 changes a magnification for displaying edited image 281 displayed on lower LCD 12 when the touch position data obtained in step SB52 indicates a position in the area where magnification change instruction image 289 is displayed. In the present variation, the magnification for displaying edited image 281 has, for example, three levels, and CPU 31 changes the magnification in order of a low magnification, an intermediate magnification, and a high magnification each time the magnification change instruction is given. When the magnification change instruction is given in the case of high magnification, CPU 31 changes the magnification to the low magnification. Thus, when the magnification change instruction is given by the user, the magnification for edited image 281 displayed on lower LCD 12 is changed. It is noted that the magnification change processing in step SB54 is performed only when a touch input to the area of magnification change instruction image 289 is provided, and it is not performed when an input to touch panel 13 is not provided or when a touch input to an area other than the area of magnification change instruction image 289 is provided. Subsequent to step SB54, processing in step SB55 is performed.

In step SB55, CPU 31 performs movement processing of edited image 281 displayed on lower LCD 12. The movement processing is performed when a movement instruction is given, that is, when a touch input to an area of a movement instruction image 290 displayed on lower LCD 12 is provided. Movement instruction image 290 is an image for giving an instruction to move (scroll) edited image 281 displayed on lower LCD 12. In step SB55, CPU 31 scrolls for display, edited image 281 displayed on lower LCD 12 when the touch position data obtained in step SB52 indicates a position in the area where movement instruction image 290 is displayed. In the present variation, as shown in FIG. 44, movement instruction image 290 includes images indicating four directions of an upward direction, a downward direction, a left direction, and a right direction (triangle images in FIG. 44). When a touch input to any of areas of these images is provided, CPU 31 scrolls edited image 281 in a direction corresponding to the image to which the touch input was provided. It is noted that the movement processing in step SB55 is performed only when a touch input to the area of movement instruction image 290 is provided, and it is not performed when an input to touch panel 13 is not provided or when a touch input to an area other than the area of movement instruction image 290 is provided. Subsequent to step SB55, processing in step SB56 is performed.

In step SB56, CPU 31 determines whether or not to change the edition mode. Determination is made based on whether or not a mode change instruction has been given by the user. Specifically, determination in step SB56 is made by determining whether a touch input to any of areas of a pen mode image 284, an eraser mode image 285, and a seal mode image 286 displayed on lower LCD 12 has been provided or not. Pen mode image 284 is an image for giving an instruction to change the edition mode to the pen mode. Eraser mode image 285 is an image for giving an instruction to change the edition mode to the eraser mode. Seal mode image 286 is an image for giving an instruction to change the edition mode to the seal mode. In step SB56, when the position indicated by the touch position data obtained in step SB52 is within the area where any of pen mode image 284, eraser mode image 285, and seal mode image 286 is displayed, CPU 31 determines that a determination result indicates Yes. Then, CPU 31 changes the edition mode to a mode corresponding to the image to which input was provided. On the other hand, when the position indicated by the touch position data is not within the area where any of pen mode image 284, eraser mode image 285, and seal mode image 286 is displayed, CPU 31 determines that the determination result indicates No. In this case, the edition mode is not changed. When the result of determination in step SB56 indicates Yes, the processing in step SB51 is performed again. On the other hand, when the result of determination in step SB56 indicates No, processing in step SB57 is performed.

In step SB57, CPU 31 determines whether or not to end the edition processing. Determination is made based on whether an instruction to end the edition processing has been given by the user or not. Specifically, determination in step SB57 is made based on whether a touch input to any of areas of a stop instruction image 287 and a completion instruction image 288 displayed on lower LCD 12 has been provided or not. Stop instruction image 287 is an image for giving an instruction to stop the edition processing. Completion instruction image 288 is an image for giving an instruction to complete the edition processing. In step SB57, when the position indicated by the touch position data obtained in step SB52 is within the area where any of stop instruction image 287 and completion instruction image 288 is displayed, CPU 31 determines that a determination result indicates Yes. On the other hand, when the position indicated by the touch position data obtained in step SB52 is not within the area where any of stop instruction image 287 and completion instruction image 288 is displayed, CPU 31 determines that the determination result indicates No. When the result of determination in step SB57 indicates Yes, processing in step SB72 which will be described later is performed. On the other hand, when the result of determination in step SB57 indicates No, the processing in step SB52 is performed again.

As described above, the processing in the pen mode (steps SB52 and SB57) is repeated until the result of determination in step SB56 indicates Yes or until the result of determination in step SB57 indicates No. Further, when the user inputs a trail to touch panel 13 in the pen mode, the image of input trail 283 is added to the edited image (see FIG. 44).

On the other hand, in step SB58, CPU 31 determines whether the current edition mode is set to the seal mode or not. When a result of determination in step SB58 indicates Yes (that is, when the current edition mode is set to the seal mode), processing in step SB59 is performed. On the other hand, when the result of determination in step SB58 indicates No (that is, when the current edition mode is set to the eraser mode), processing in step SB66 which will be described later is performed.

Figure 45:
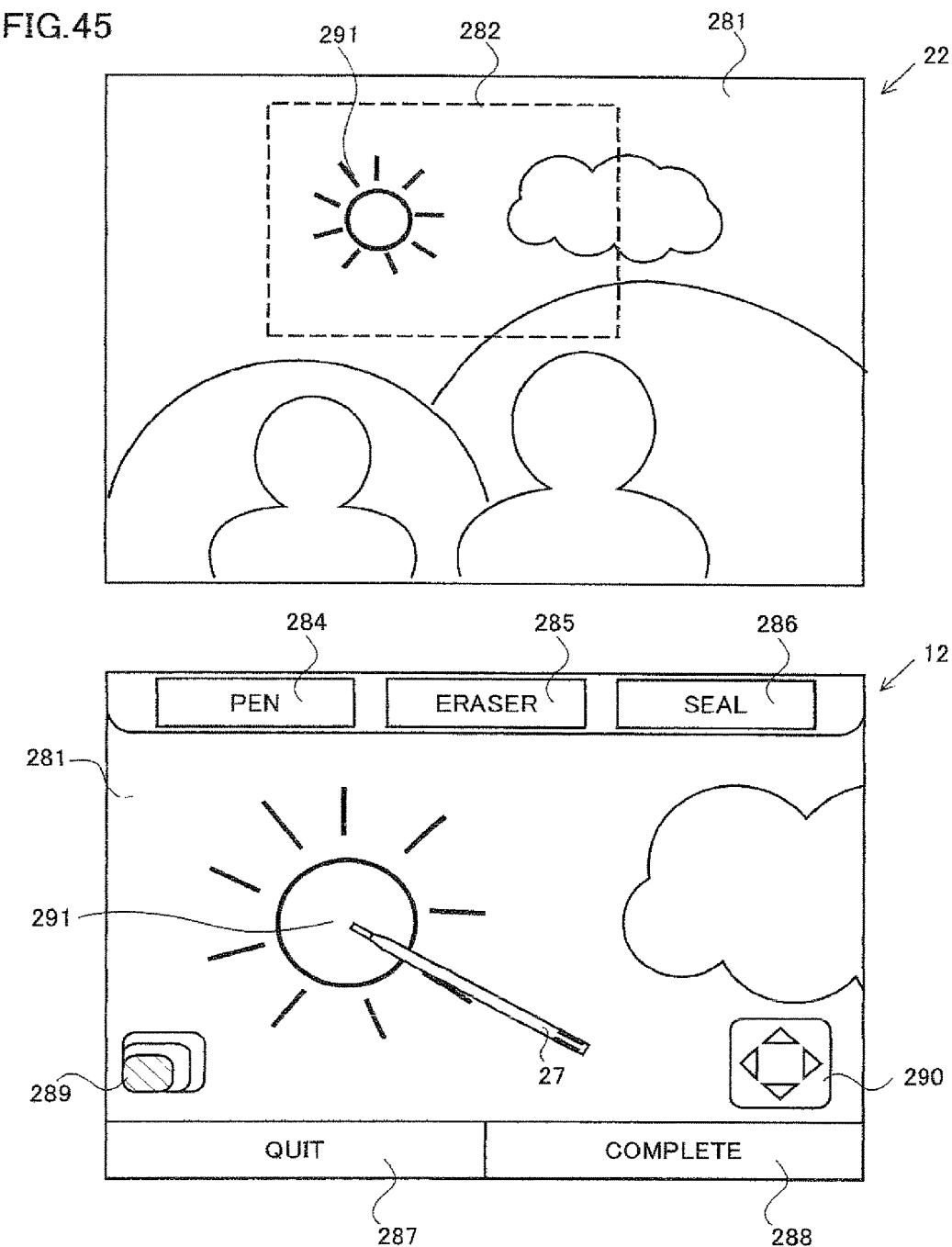
FIG. 45 is a diagram showing an example of an image displayed in a seal mode in the edition processing shown in FIG. 43.

In steps SB59 to SB65, processing in the seal mode is performed. FIG. 45 is a diagram showing an example of an image displayed on LCDs 12 and 22 in the seal mode of the edition processing. As shown in FIG. 45, in the seal mode as well, as in the pen mode, edited image 281 is displayed on LCDs 12 and 22, and images 264 to 270 for performing various operations are displayed on lower LCD 12. The processing in the seal mode (steps SB59 to SB65) will be described hereinafter in detail with reference to FIG. 45.

In step SB59, CPU 31 selects a seal image to be added to edited image 281. Selection of the seal image is made by user's designation of a desired seal image from among seal images stored in advance in main memory 32, data memory 34 for storage, or memory card 28. When a seal image is selected in step SB59, the selected seal image is added at a prescribed position (for example, at a center position) in edited image 281. Thus, a seal image 291 is added to edited image 281 and displayed on LCDs 12 and 22 (FIG. 45). Subsequent to step SB59 above, processing in step SB60 is performed.

In step SB60, CPU 31 accepts an input to touch panel 13. The processing in step SB60 is the same as in step SB52 above. In the following step SB61, CPU 31 moves seal image 291 on edited image 281 in accordance with the input to touch panel 13. An operation for moving seal image 291 is performed by performing the same operation as that for the aforementioned zoom change instruction (step SB38). In other words, the user can move seal image 291 by initially touching an area where seal image 291 is displayed and performing an operation to slide a touch position on touch panel 13 while touching the area. CPU 31 can detect the operation for moving seal image 291 by referring to touch position data stored in main memory 32 in step SB60. It is noted that the processing for moving seal image 291 in step SB61 is performed only when the operation for moving seal image 291 above is performed, and it is not performed when an input to touch panel 13 is not provided or when an operation other than such an operation is performed. Subsequent to step SB61, processing in step SB62 is performed.

In step SB62, CPU 31 performs processing for zoom-in/out of edited image 281 displayed on lower LCD 12. The processing in step SB62 is the same as in step SB54 above. In the seal mode, when the magnification for edited image 281 displayed on lower LCD 12 is changed, seal image 291 is also zoomed in or out in accordance with zoom in or out of edited image 281, and a ratio between a size of edited image 281 and a size of seal image 291 is not changed. In the following step SB63, CPU 31 performs processing for moving edited image 281 displayed on lower LCD 12. The processing in step SB63 is the same as in step SB55 above. Subsequent to step SB63, processing in step SB64 is performed.

In step SB64, CPU 31 determines whether or not to change the edition mode. The processing in step SB64 is the same as in step SB56 above. When a result of determination in step SB64 indicates Yes, the processing in step SB51 is performed again. On the other hand, when the result in step SB64 indicates No, processing in step SB65 is performed.

In step SB65, CPU 31 determines whether or not to end the edition processing. The processing in step SB65 is the same as in step SB57 above. When a result of determination in step SB65 indicates Yes, processing in step SB72 which will be described later is performed. On the other hand, when the result of determination in step SB65 indicates No, the processing in step SB60 is performed again.

As described above, the processing in the seal mode (steps SB60 to SB65) is repeated until the result of determination in step SB64 indicates Yes or until the result of determination in step SB65 indicates No. Seal image 291 is added to edited image 281 in the seal mode, and the user can arrange a seal image at a desired position by providing an input to touch panel 13.

On the other hand, when the result of determination in step SB58 indicates No, that is, when the current edition mode is set to the eraser mode, processing in steps SB66 to SB71 is performed. In the eraser mode as well, as in the pen mode and the seal mode, edited image 281 is displayed on LCDs 12 and 22, and images 264 to 270 for performing various operations are displayed on lower LCD 12. Further, in the eraser mode, input trail 283 and seal image 291 added during a period from the time of start of the edition processing to the time of transition to the eraser mode are displayed together with edited image 281 on LCDs 12 and 22.

In step SB66, CPU 31 accepts an input to touch panel 13. The processing in step SB66 is the same as in step SB52 above. In the following step SB67, CPU 31 erases the image of input trail 283 or seal image 291 on edited image 281 in accordance with the input to touch panel 13. Specifically, when touch position data obtained in step SB66 indicates a position in an area where input trail 283 or seal image 291 added to edited image 281 is displayed, CPU 31 erases the image added at the position in edited image 281. Then, CPU 31 causes LCDs 12 and 22 to display edited image 281 from which the image has been erased. It is noted that the processing for erasing an image in step SB67 is performed only when a touch input to the area of input trail 283 or the area of seal image 291 is provided, and it is not performed when an input to touch panel 13 is not performed or when a touch input to an area other than the area of input trail 283 and seal image 291 is provided. Subsequent to step SB67, processing in step SB68 is performed.

In step SB68, CPU 31 performs processing for zooming in/out edited image 281 displayed on lower LCD 12. In step SB69, CPU 31 performs processing for moving edited image 281. The processing in steps SB68 and SB69 is the same as in steps SB54 and SB55 above, respectively.

In the following step SB70, CPU 31 determines whether or not to change the edition mode. The processing in step SB70 is the same as in step SB56 above. When a result of determination in step SB70 indicates Yes, the processing in step SB51 is performed again. On the other hand, when the result of determination in step SB70 indicates No, processing in step SB71 is performed.

In step SB71, CPU 31 determines whether or not to end the edition processing. The processing in step SB71 is the same as in step SB57 above. When a result of determination in step SB71 indicates Yes, processing in step SB72 is performed. On the other hand, when the result of determination in step SB71 indicates No, the processing in step SB66 is performed again.

As described above, the processing in the eraser mode (steps SB66 to SB71) is repeated until the result of determination in step SB640 indicates Yes or until the result of determination in step SB71 indicates No. In the eraser mode, the image of input trail 283 and seal image 291 is erased in accordance with an input to touch panel 13.

When end of the edition processing is determined in step SB57, SB65, or SB71 above, the processing in step SB72 is performed. In step SB72, CPU 31 determines whether or not to store edited image 281 edited in the edition processing. Determination is made by determining whether a touch input to any of stop instruction image 287 and completion instruction image 288 has been provided or not based on the touch position data obtained in step SB52, SB60 or SB66. In other words, when a touch input to the area of stop instruction image 287 has been provided, CPU 31 stops the edition processing, that is, determines not to store the edited image. On the other hand, when a touch input to the area of completion instruction image 288 has been provided, CPU 31 completes the edition processing, that is, determines to store the edited image. When a result of determination in step SB72 indicates Yes, processing in step SB73 is performed. On the other hand, when the result of determination in step SB72 indicates No, CPU 31 skips the processing in step SB73 and ends the edition processing shown in FIG. 43.

In step SB73, CPU 31 stores (saves) edited image 281 in data memory 34 for storage. It is noted that edited image 281 may be written over the stored image before the edition processing or stored separately from the stored image before the edition processing, or the user may be caused to select between writing of edited image 281 over the stored image before the edition processing or storage of edited image 281 separately therefrom. Further, edited image 281 may be stored in memory card 28 instead of in data memory 34 for storage. Subsequent to step SB73, CPU 31 ends the edition processing shown in FIG. 43.

According to the edition processing described above, the user can add a character and a drawing to an edited image by providing an input to draw a trail on touch panel 13. Further, the user can add a seal image at a desired position on the edited image.

Referring back to the description in connection with FIG. 41, subsequent to the edition processing (step SB43) above, processing in step SB44 is performed. In step SB44, CPU 31 determines whether or not to end the photographing processing. Specifically, CPU 31 determines whether power button 14F has been pressed or not.

When a result of determination in step SB44 indicates No, CPU 31 performs the processing in step SB31 again. Thereafter, the processing loop of steps SB31 to SB44 is repeatedly performed until end of the photographing processing is determined in step SB44. On the other hand, when the result of determination in step SB44 is affirmative, CPU 31 ends the photographing processing shown in FIG. 41.

Through the photographing processing described above, the user can store the image picked-up by the camera in accordance with the photographing instruction. In the present variation, two display devices are included, a currently picked-up image is displayed on one of the display devices, and an operation screen and a previously taken image are displayed on the other display device. Thus, as the user can perform a photographing operation while looking at the currently taken image displayed on upper LCD 22 as well as the operation screen and the previously taken image, user-friendly game device 10 can be provided. Further, in the present variation, by providing touch panel 13 on lower LCD 12, an operation is more easily performed.

<Calendar Function>

A calendar function launched when a touch input of calendar button 106 is made in the image displayed in the multifunctional photographing processing shown in FIG. 31 will now be described with reference to FIG. 46.

Figure 46:
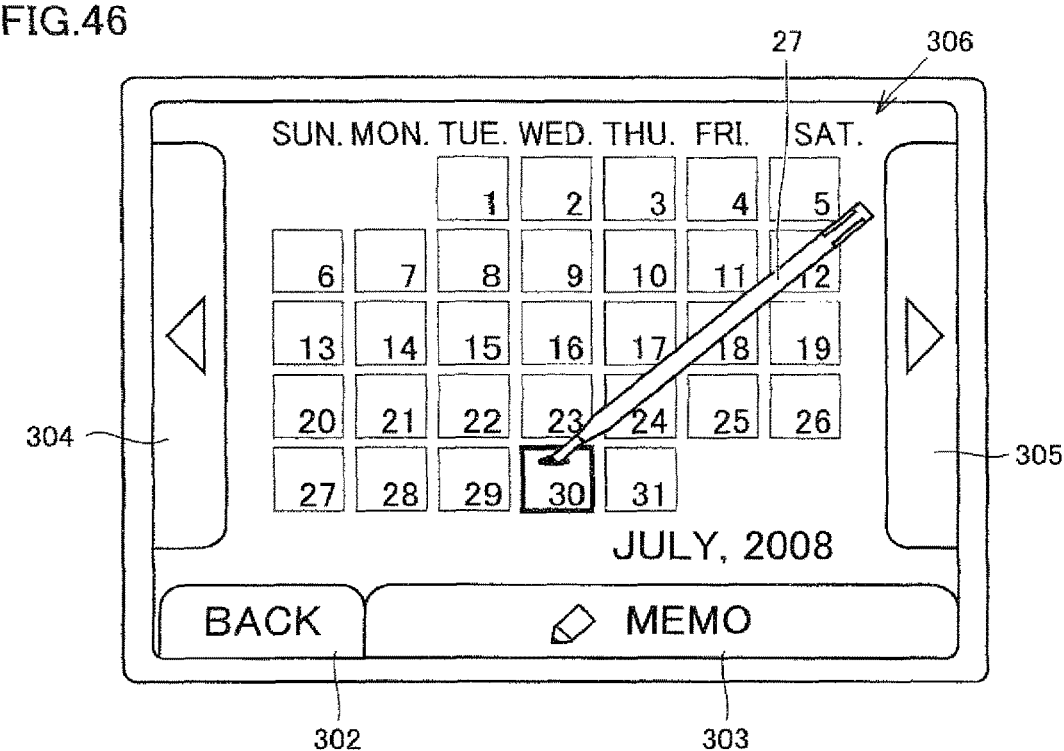
FIG. 46 is a diagram showing an image displayed in calendar processing according to the present embodiment.

FIG. 46 is a diagram showing an image displayed in calendar processing according to the present embodiment. It is noted that the image shown in FIG. 46 is displayed on upper LCD 22 while the image displayed in the multifunctional photographing processing shown in FIG. 31 is displayed on lower LCD 12. When a touch input of calendar button 106 is then made, the image shown in FIG. 46 is now displayed on lower LCD 12 with a display effect as if the image moved from upper LCD 22 to lower LCD 12.

As shown in FIG. 46, various buttons 302, 303, 304, and 305 in addition to a calendar image 306 of one month are displayed on lower LCD 12. When a touch input of any date included in calendar image 306 is made and if a picked-up image taken on the date indicated with the touch input, a memo input on that date or the like has been stored in any of main memory 32, data memory 34 for storage, and memory card 28, a corresponding picked-up image and/or memo is read and the content thereof is displayed on upper LCD 22.

Scroll buttons 304 and 305 are button images for selecting displayed calendar image 306. Namely, when a touch input of scroll button 304 or 305 is made, month and year displayed as calendar image 306 is successively changed.

A memo button 303 is a button image for performing an operation to store a memo input by the user in data memory 34 for storage or the like in correspondence with the designated date. Namely, when a touch input of memo button 303 is made, switching to a not-shown memo content accepting screen is made so that the user can input any character or graphic by using touch pen 27 etc. on the memo content accepting screen.

An end button 302 is a button image for performing an operation to end the calendar processing. Namely, when a touch input of end button 302 is made, the calendar processing ends and the image shown in FIG. 46 is displayed on upper LCD 22 with a display effect as if the image moved from lower LCD 12 to upper LCD 22, and substantially at the same time, the image shown in FIG. 46 is again displayed on lower LCD 12.

[8. Image Communication Function]
<Overview>

Processing provided by an image communication program executed as a result of launch of communication application program 55 will now be described with reference to FIGS. 47 to 55. Prior to description of a specific processing operation, an exemplary display manner on lower LCD 12 and/or upper LCD 22 through execution of the image communication processing, exemplary connection to another device, and the like will initially be described.

Figure 47:
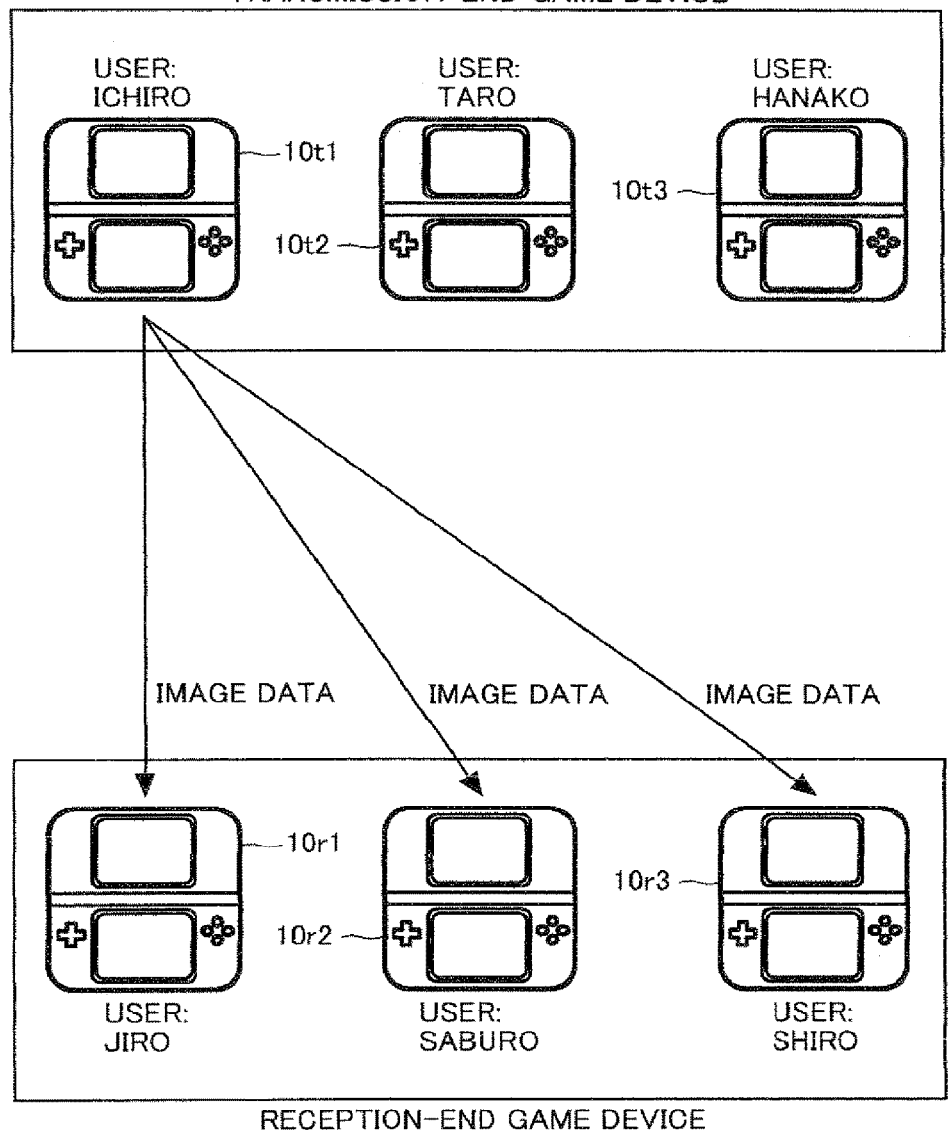
FIG. 47 is a diagram illustrating an exemplary system in which a plurality of game devices according to the present embodiment are connected to each other.
Figure 48:
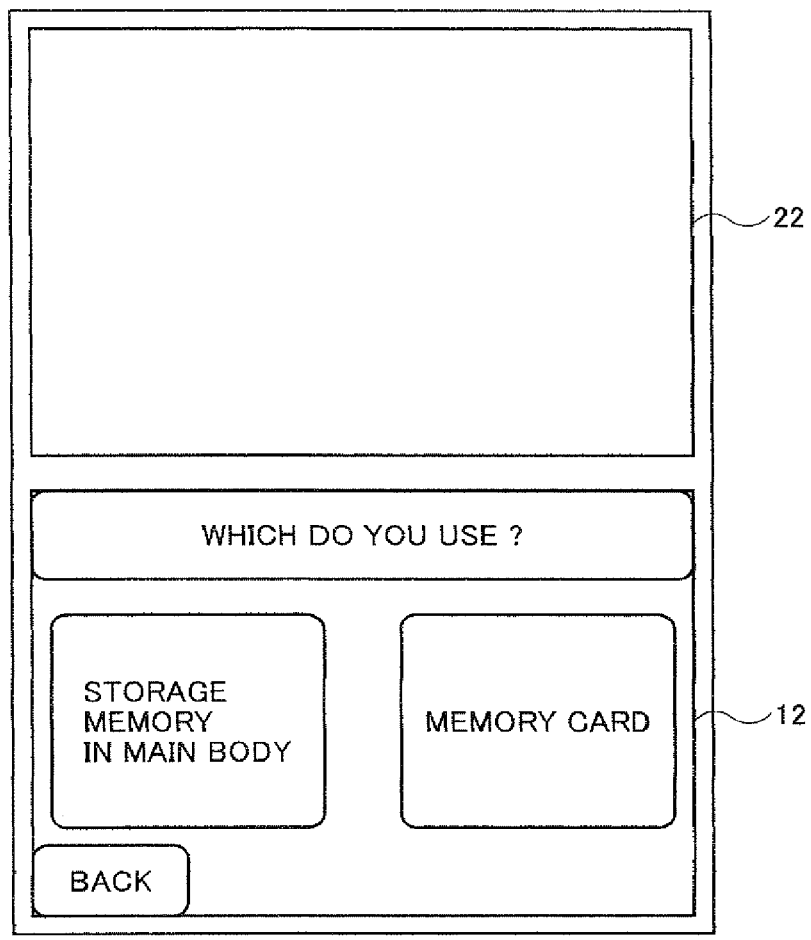
FIG. 48 is a diagram showing exemplary screen display (No. 1) displayed before whether the game device according to the present embodiment serves as a transmission-end device or a reception-end device is determined.
Figure 49:
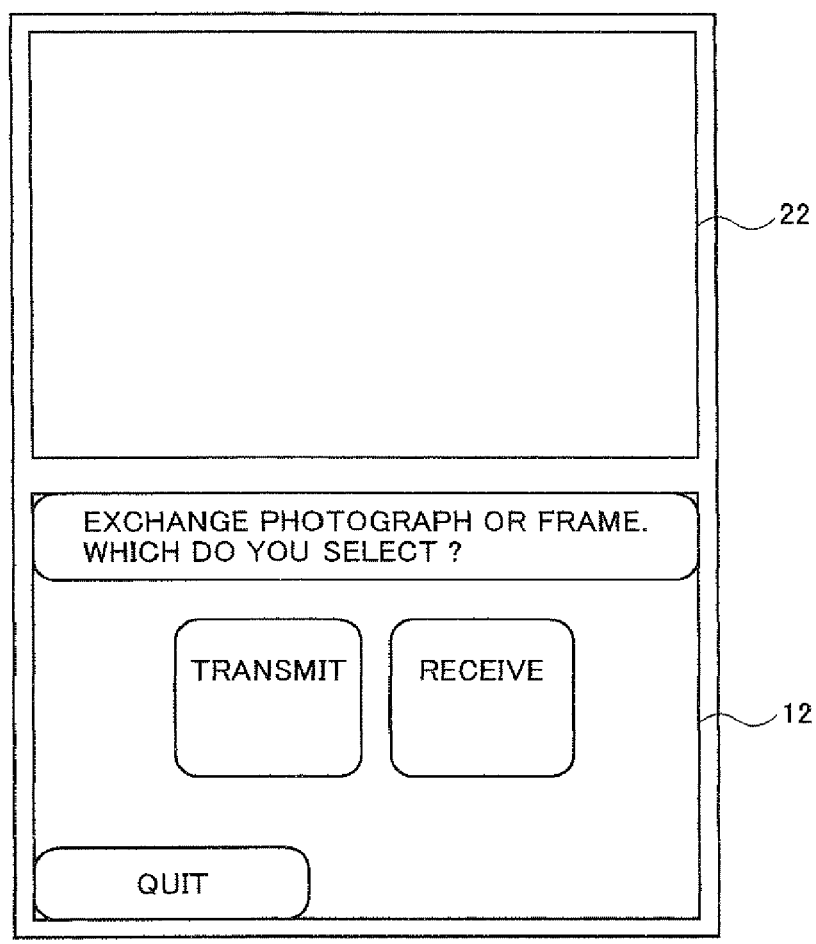
FIG. 49 is a diagram showing exemplary screen display (No. 1) displayed before whether the game device according to the present embodiment serves as a transmission-end device or a reception-end device is determined.
Figure 55:
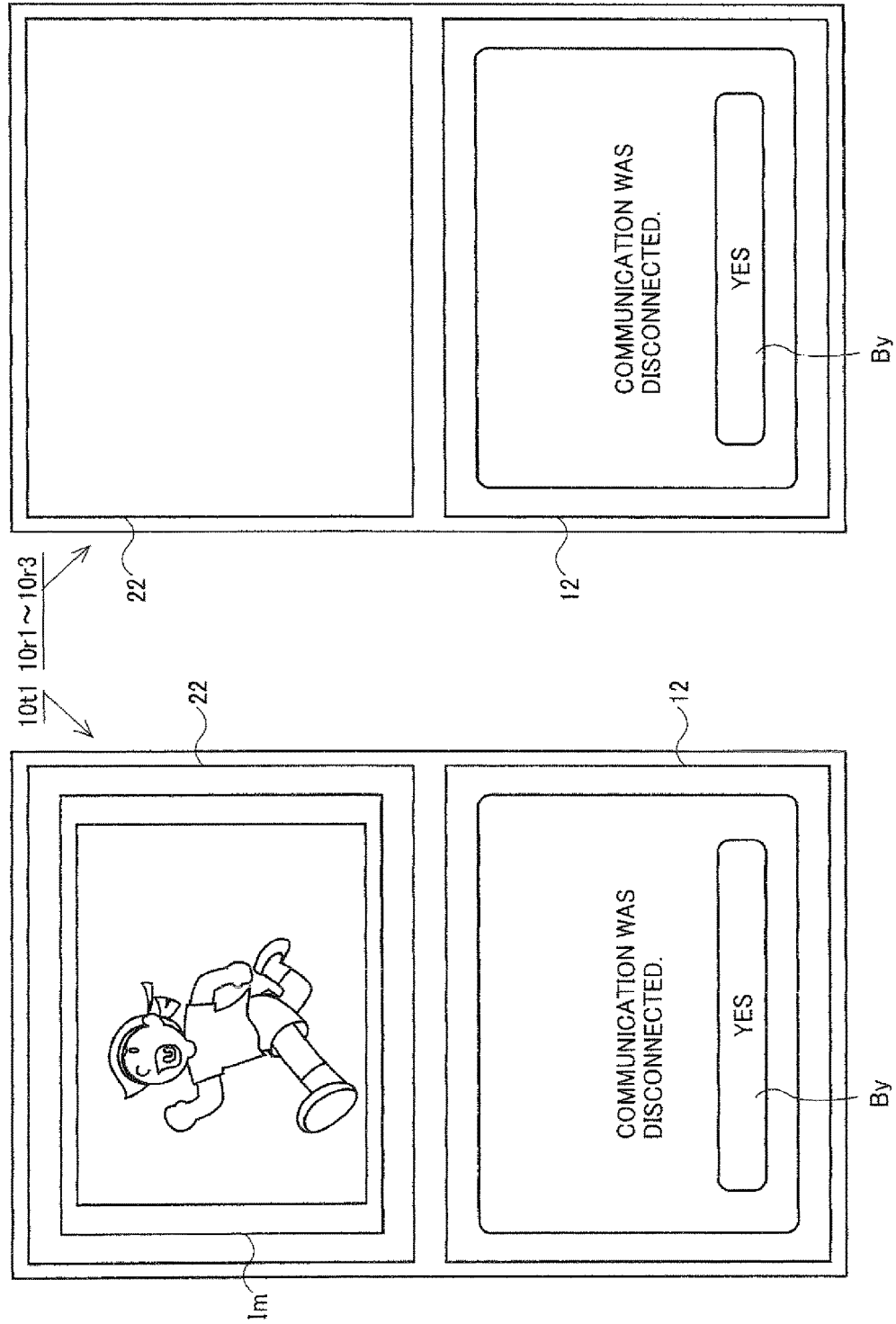
FIG. 55 is a diagram showing exemplary screen display displayed when communication is disconnected, on the transmission-end game device according to the present embodiment and the reception-end game device according to the present embodiment.

FIG. 47 is a diagram illustrating an exemplary image communication system in which a plurality of game devices 10 are connected to each other. FIGS. 48 and 49 are diagrams showing exemplary screen display provided on lower LCD 12 and upper LCD 22 of game device 10 before determination as to whether game device 10 should serve as a transmission-end device or a reception-end device. FIGS. 50 to 54 are diagrams showing exemplary screen display provided in the first stage to the fifth stage of a communication application program respectively, on lower LCD 12 and upper LCD 22 of each of transmission-end game device 10t1 and reception-end game devices 10r1 to 10r3. FIG. 55 is a diagram showing exemplary screen display provided on lower LCD 12 and upper LCD 22 of each of transmission-end game device 10t1 and reception-end game devices 10r1 to 10r3 when communication is disconnected.

In FIG. 47, a plurality of game devices 10 transmit and receive image data such as a photograph (picked-up image) and the like through wireless communication. As described above, game device 10 can establish wireless communication with another game device 10 through wireless communication module 38 or local communication module 39, however, an example in which game device 10 establishes wireless communication to game devices of the same type through local communication module 39 based on a prescribed communication scheme will be described here. In order to make the description specific, it is assumed that each of game devices 10t1 to 10t3 shown in FIG. 47 is a transmission-end game device 10t serving to transmit image data and each of game devices 10r1 to 10r3 is a reception-end game device 10r serving to receive image data.

In the present embodiment, a user is allowed to select whether his/her game device is to serve to transmit image data or to serve to receive image data when the image communication program is executed. Namely, whether game device 10 serves as a transmission-end game device or a reception-end game device is determined based on user's selection. It is noted, however, that a transmission-end device for executing only a transmission-end program may be different from a reception-end device for executing only a reception-end program.

Transmission-end game device 10t includes game device 10t1 used by a user "Ichiro", game device 10t2 used by a user "Taro", and game device 10t3 used by a user "Hanako". On the other hand, reception-end game device 10r includes game device 10r1 used by a user "Jiro", game device 10r2 used by a user "Saburo", and game device 10r3 used by a user "Shiro". Here, transmission-end game devices 10t1 to 10t3 perform broadcast transmission of signals (transmitter data) indicating that transmission-end game devices 10t1 to 10t3 are transmitters of image data. An example in which the users "Jiro", "Saburo" and "Shiro" receive image data from game device 10t1 serving as a transmitter used by the user "Ichiro" among transmission-end game devices 10t will be described. "Ichiro", "Taro" and the like represent a user name stored in a main body of game device 10, and a user may set any user name. The user name is stored in preset data memory 35, data memory 34 for storage or the like in the main body of game device 10.

Initially, for example on lower LCD 12 of each game device 10, information for inquiring of a user whether a storage memory in the main body (for example, data memory 34 for storage) or a memory card (for example, memory card 28) is to be used is displayed (FIG. 48). The user of game device 10 can select a storage medium to be used by performing a touch operation for selection from among options displayed on lower LCD 12 through touch panel 13.

Next, for example on lower LCD 12 of each game device 10, information for inquiring of a user whether a photograph is to be transmitted to another game device or to be received from another game device is displayed (FIG. 49). When the user of game device 10 performs a touch operation for selection from among options displayed on lower LCD 12 through touch panel 13, the user can determine whether his/her game device is to serve as a transmitter (for example, transmission-end game device 10t1, 10t2 or 10t3) or as a receiver (for example, reception-end game device 10r1, 10r2 or 10r3).

Figure 50:
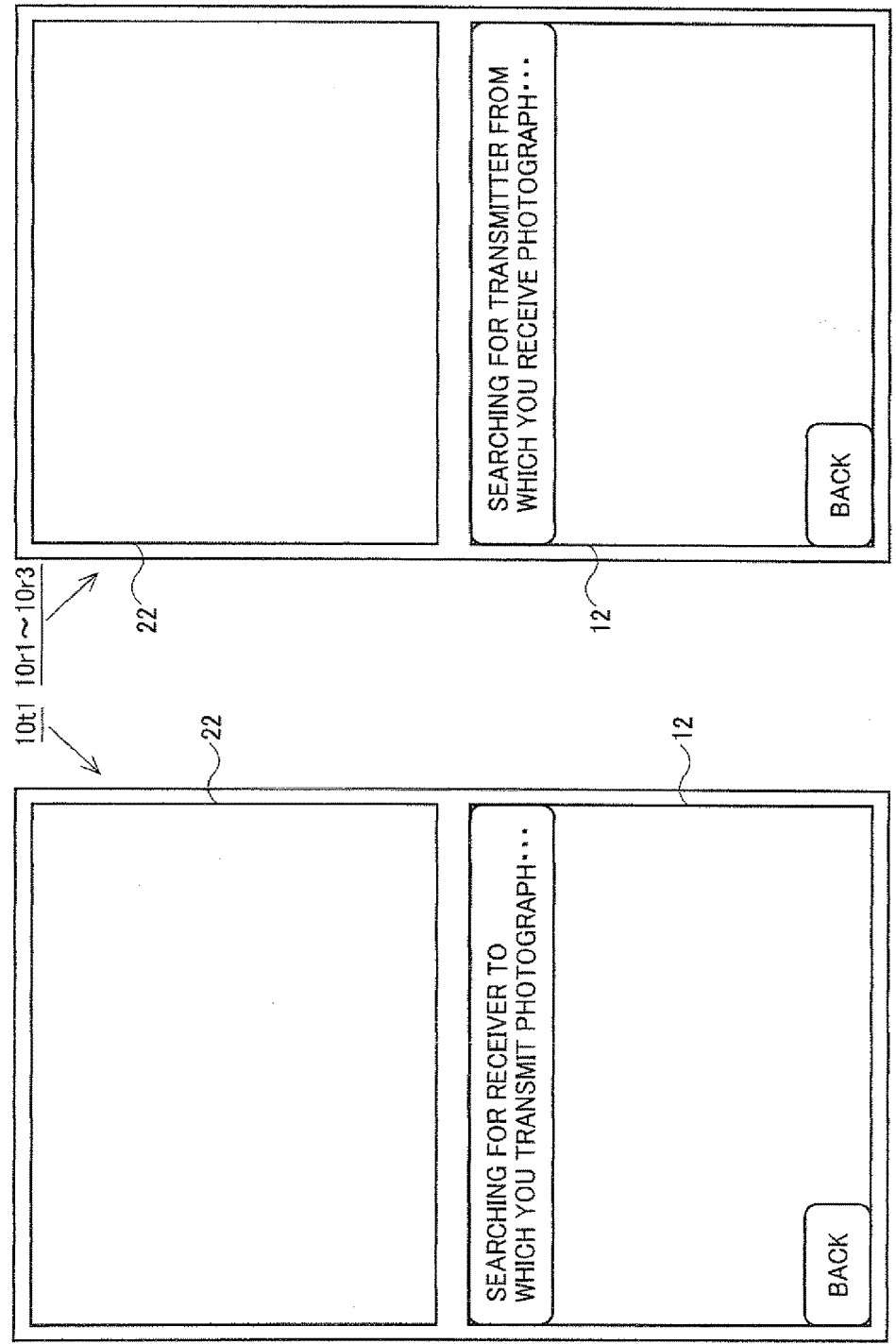
FIG. 50 is a diagram showing exemplary screen display displayed in a first stage, on a transmission-end game device according to the present embodiment and a reception-end game device according to the present embodiment.

For example on lower LCD 12 of reception-end game devices 10r1 to 10r3, a message that it is searching for game device 10t to serve as a transmitter (for example, character information indicating that "searching for transmitter from which you receive photograph") is displayed until the transmitter data is received from transmission-end game device 10t (the right drawing in FIG. 50). On the other hand, for example on lower LCD 12 of transmission-end game device 10t1, a message that it is searching for game device 10r to serve as a receiver (for example, character information indicating that "searching for receiver to which you transmit photograph") is displayed while it invites a request for image data reception from reception-end game device 10 by transmitting the transmitter data above (the left drawing in FIG. 50).

Next, when reception-end game devices 10r1 to 10r3 receive the transmitter data from transmission-end game devices 10t1 to 10t3, for example on lower LCD 12 of reception-end game devices 10r1 to 10r3, information indicating a user name of transmitter game device 10t from which the transmitter data has been received is displayed. For example, user names Nt1 to Nt3 of respective transmission-end game devices 10t1 to 10t3 are displayed on lower LCD 12 of reception-end game devices 10r1 to 10r3 in an example in the right drawing in FIG. 51. A user of each of reception-end game devices 10r1 to 10r3 performs through touch panel 13, a touch operation to touch one of user names Nt1 to Nt3 displayed on lower LCD 12, so that the user can select one of transmission-end game devices 10t1 to 10t3 as a transmitter. When the user of each of reception-end game devices 10r1 to 10r3 performs the operation to select a transmitter, reception-end game devices 10r1 to 10r3 transmit receiver data representing a reception request to any selected transmission-end game devices 10t1 to 10t3.

On the other hand, when transmission-end game device 10t1 receives the receiver data from reception-end game devices 10r1 to 10r3, information indicating a user name of game device 10r serving as a receiver from which the receiver data has been received is displayed, for example on lower LCD 12. In the example shown in the left drawing in FIG. 51, on lower LCD 12 of transmission-end game device 10t1, user names Nr1 to Nr3 of respective reception-end game devices 10r1 to 10r3 that have issued a reception request are displayed. In the present embodiment, transmission-end game device 10t1 has no right to select a reception-end device from among a plurality of displayed reception-end game devices 10r1 to 10r3 and it is only allowed to determine whether to transmit image data to all displayed reception-end game devices 10r1 to 10r3 or to stop transmission. For example, when a user of transmission-end game device 10t1 performs through touch panel 13, a touch operation to touch an operation button icon Bs representing "start" displayed on lower LCD 12, transition to image transmission processing can be made.

Next, transmission-end game device 10t1 performs processing for selecting an image to be transmitted, from among images stored in a memory (for example, data memory 34 for storage) in the main body of game device 10t1 or in a memory card (for example, memory card 28). Though an image taken by game device 10t1 is typically transmitted, another image (for example, an image received from another device or a stored image other than a taken image) may be transmitted. For example, in an example shown in the left drawing in FIG. 52, thumbnail images of images stored in data memory 34 for storage of game device 10t1 or memory card 28 are displayed in a thumbnail display area At on lower LCD 12. Further, the thumbnail images displayed in thumbnail display area At are scrolled to the right or left by performing a touch operation to touch a scroll button icon Bl or Br through touch panel 13 for display. A user of transmission-end game device 10t1 can select a thumbnail image surrounded by a cursor C displayed on lower LCD 12 as an image to be transmitted. Here, a thumbnail image IM (that is, an image to be transmitted) surrounded by cursor C is displayed on upper LCD 22. When the user of transmission-end game device 10t1 performs through touch panel 13, a touch operation to touch an operation button icon Bt representing "transmit" displayed on lower LCD 12, image data of image IM currently selected as an image to be transmitted can be transmitted. When the user of transmission-end game device 10t1 performs a touch operation through touch panel 13 to touch an operation button icon Bf representing "end" displayed on lower LCD 12, the image transmission processing itself can end.

Figure 52:
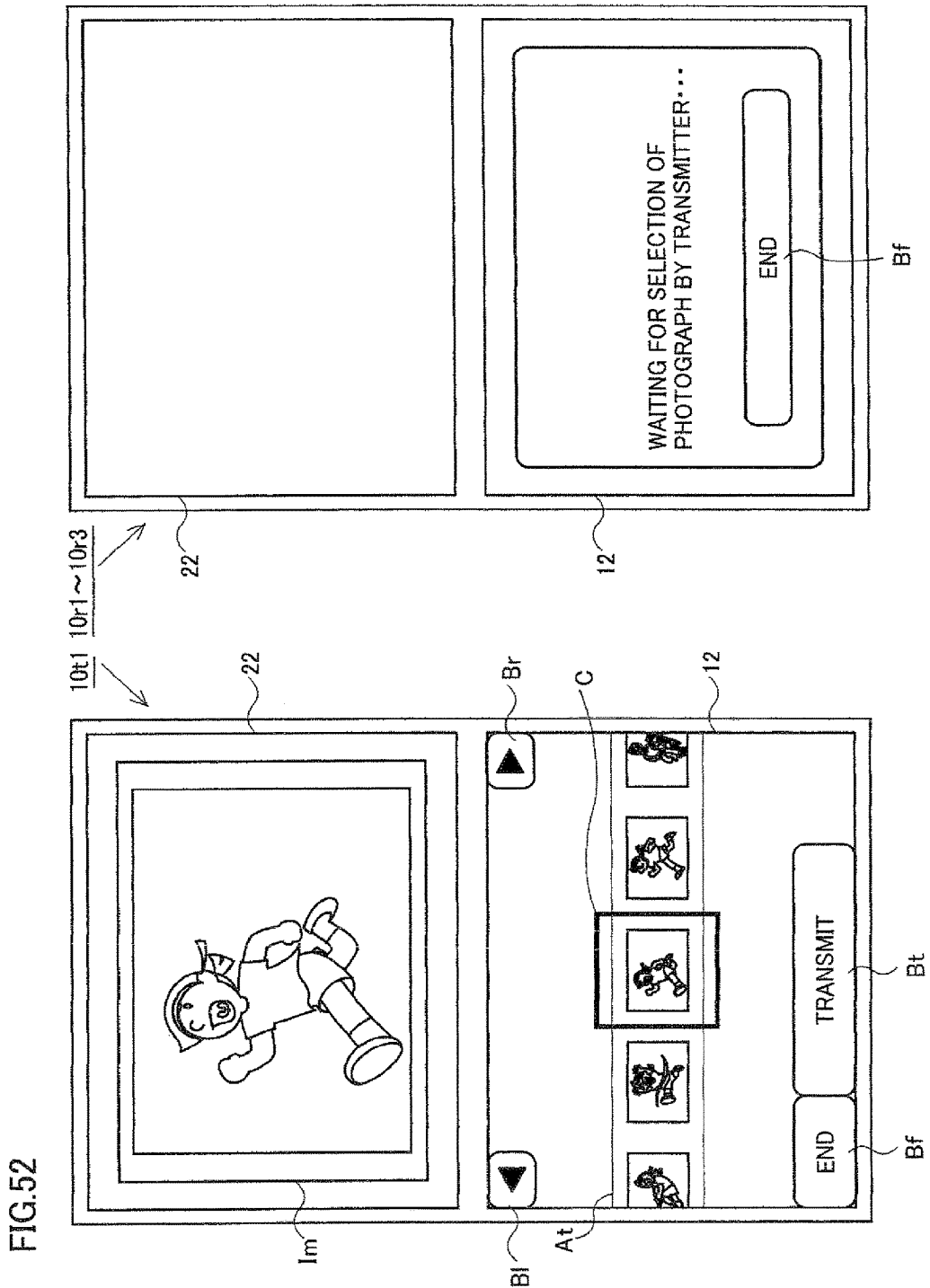
FIG. 52 is a diagram showing exemplary screen display displayed in a third stage, on the transmission-end game device according to the present embodiment and the reception-end game device according to the present embodiment.

On the other hand, for example on lower LCD 12 of reception-end game devices 10r1 to 10r3, a message that a user of transmission-end game device 10t1 is selecting an image (for example, character information indicating that "waiting for selection of photograph by transmitter") is displayed while the user of transmission-end game device 10t1 is selecting an image to be transmitted (the right drawing in FIG. 52).

Next, transmission-end game device 10t1 outputs to each of reception-end game devices 10r1 to 10r3, image data of image IM selected as an image to be transmitted from among images stored in the memory in the main body of game device 10t1 or in the memory card. Here, on lower LCD 12 and/or upper LCD 22 of transmission-end game device 10t1, a message that selected image IM is being transmitted from game device 10t1 to reception-end game devices 10r1 to 10r3 is displayed. For example, as shown in the left drawing in FIG. 53, image IM being transmitted is displayed on upper LCD 22 and character information indicating that "transmitting photograph" is displayed on lower LCD 12.

Figure 53:
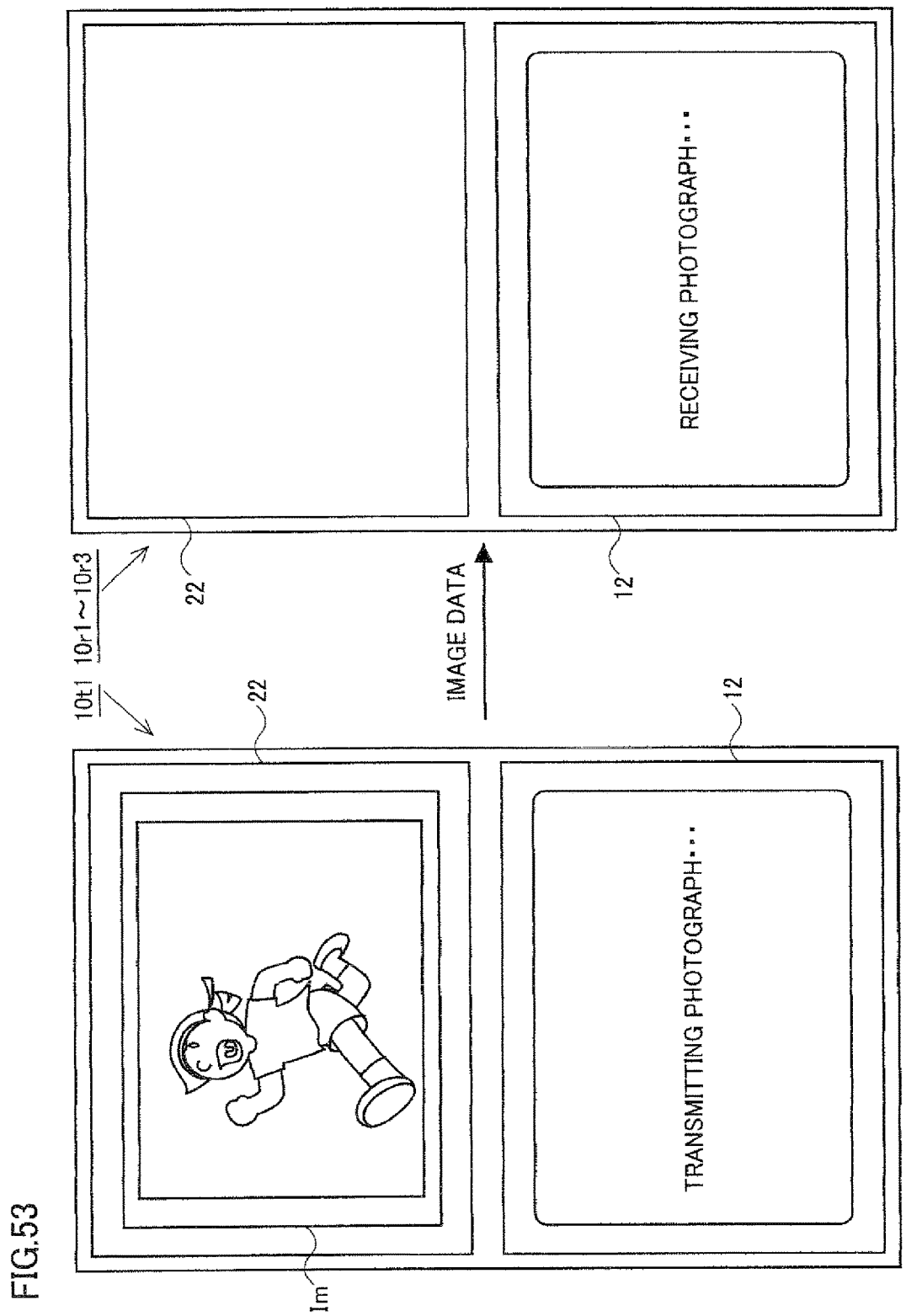
FIG. 53 is a diagram showing exemplary screen display displayed in a fourth stage, on the transmission-end game device according to the present embodiment and the reception-end game device according to the present embodiment.
Figure 54:
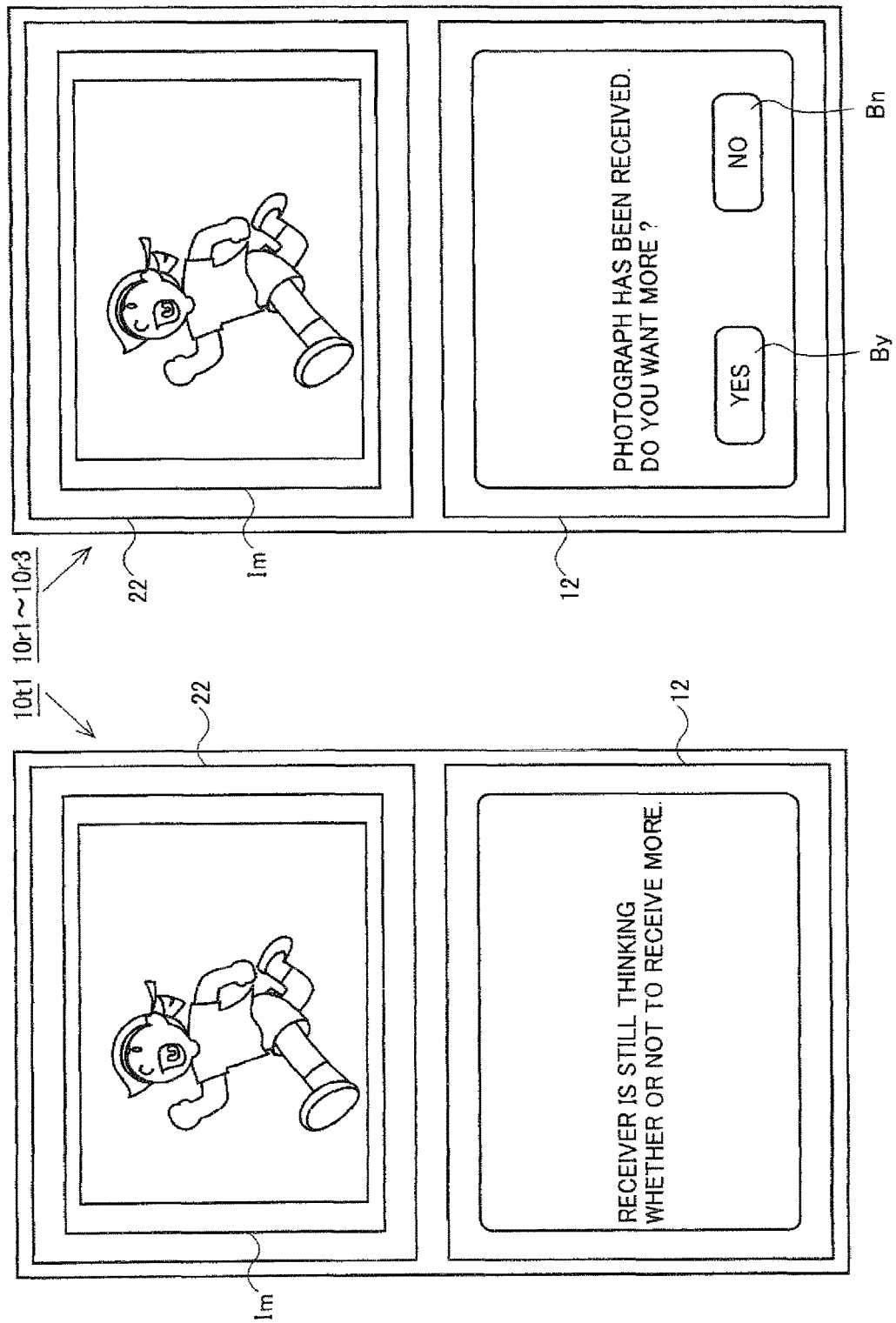
FIG. 54 is a diagram showing exemplary screen display displayed in a fifth stage, on the transmission-end game device according to the present embodiment and the reception-end game device according to the present embodiment.

On the other hand, for example on lower LCD 12 of reception-end game devices 10r1 to 10r3, a message indicating that the image data is being received from transmission-end game device 10t1 (for example, character information indicating that "receiving photograph") is displayed while the image data is being transmitted from transmission-end game device 10t1 (the right drawing in FIG. 53).

Next, when reception of the image data transmitted from transmission-end game device 10t1 ends, for example on upper LCD 22 of reception-end game devices 10r1 to 10r3, image IM represented by the image data received from transmitter game device 10t1 is displayed, and a user is urged to determine whether or not to further receive image data from game device 10t1. For example, as shown in the right drawing in FIG. 54, received image IM is displayed on upper LCD 22 and character information indicating that "photograph has been received. Do you want more?" is displayed on lower LCD 12. When a user of each of reception-end game devices 10r1 to 10r3 performs through touch panel 13, a touch operation to touch an operation button icon By of "YES" displayed on lower LCD 12, the user can request further reception of image data from transmitter game device 10t1. Here, the screen described in connection with the right drawing in FIG. 52 is displayed on reception-end game devices 10r1 to 10r3, and reception-end game devices 10r1 to 10r3 wait until a user of transmission-end game device 10t1 selects again an image to be transmitted. Further, when the user of each of reception-end game devices 10r1 to 10r3 performs through touch panel 13, a touch operation to touch an operation button icon Bn of "NO" displayed on lower LCD 12, subsequent reception of image data can be stopped to disconnect communication with transmission-end game device 10t1.

On the other hand, when transmission of the image data to reception-end game devices 10r1 to 10r3 ends, transmitted image IM is displayed, for example, on upper LCD 22 of transmission-end game device 10t1 and a message that reception-end game devices 10r1 to 10r3 are determining whether or not to further receive image data is displayed. For example, as shown in the left drawing in FIG. 54, transmitted image IM is displayed on upper LCD 22 and character information indicating that "receiver is still thinking whether or not to receive more" is displayed on lower LCD 12. When information indicating whether or not to further receive image data is obtained from all reception-end game devices 10r1 to 10r3 and a reception request for requesting further reception of image data is received from at least one of reception-end game devices 10r1 to 10r3, the screen described in connection with the left drawing in FIG. 52 is displayed and the user of transmission-end game device 10t1 selects again an image to be transmitted.

When users of transmission-end game device 10t1 and/or reception-end game devices 10r1 to 10r3 perform an operation for ending the image transmission processing, information inquiring of a user whether or not a photograph is to be transmitted to another game device or to be received from another game device as shown in FIG. 49 is displayed, for example on lower LCD 12 of each game device 10, and the process described above is repeated. When all reception-end game devices 10r1 to 10r3 end reception from transmission-end game device 10t1 or when transmission-end game device 10t1 ends transmission to reception-end game devices 10r1 to 10r3, a message that communication was disconnected is displayed. For example, as shown in the left drawing and the right drawing in FIG. 55, when communication is disconnected, character information indicating that "communication was disconnected" is displayed, for example, on lower LCD 12 of each of transmission-end game device 10t1 and reception-end game devices 10r1 to 10r3. When the user of each of transmission-end game device 10t1 and reception-end game devices 10r1 to 10r3 performs through touch panel 13, a touch operation to touch operation button icon By of "YES" displayed on lower LCD 12, the process returns to an initial stage of the image transmission processing and new image transmission processing is started.

<Data Structure>

Figure 56:
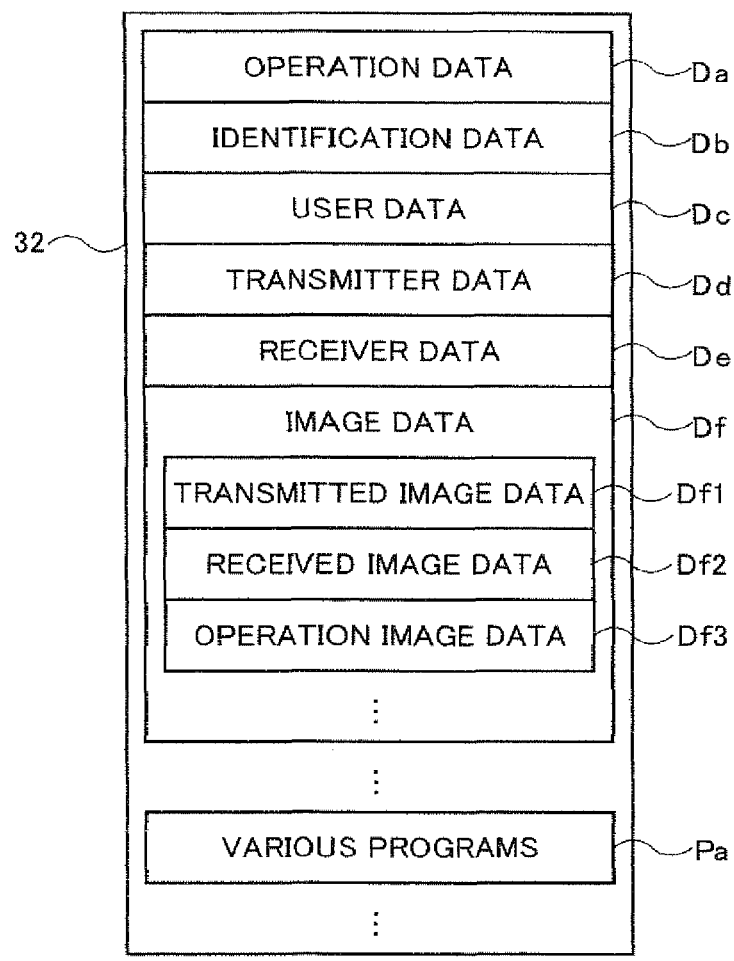
FIG. 56 is a diagram showing an example of various data stored in a main memory in accordance with execution of an image communication program according to the present embodiment.

Next, various data to be used for executing the image communication application program will now be described with reference to FIG. 56. FIG. 56 is a diagram illustrating an example of various data stored in main memory 32 in accordance with execution of the image communication application program.

In FIG. 56, main memory 32 stores programs read from memory cards 28 and 29 and data memory 34 for storage and temporary data generated in processing. In FIG. 56, operation data Da, identification data Db, user data Dc, transmitter data Dd, receiver data De, image data Df, and the like are stored in a data storage area of main memory 32. Further, various programs Pa including the image communication application program and the like are stored in a program storage area of main memory 32.

Operation data Da includes data of a touch coordinate representing a touch position TP in a screen coordinate system of touch panel 13 touched by a player (touch coordinate point data) and data representing a state of operation of operation button group 14 by a player (operation button data). For example, the touch coordinate data and the operation button data are acquired every unit time (for example, 1/60 sec.) in which game device 10 performs game processing, and they are updated and stored as operation data Da when acquired.

Identification data Db includes data representing a unique identification number for identifying game device 10. For example, data representing an own device ID set in advance in preset data memory 35 or the like of game device 10 is stored as identification data Db. The own device ID may be stored as a unique serial number assigned in a manufacturing plant or as identification information generated at random in game device 10.

User data Dc includes data representing a user name set in advance by a user of game device 10. For example, in preset data memory 35 or the like of game device 10, a user name input by a user is described and data representing the user name is stored therein as user data Dc.

Transmitter data Dd includes data representing the identification number and the user name of game device 10 serving as a transmitter when image data is transmitted and received. Receiver data De includes data representing the identification number and the user name of game device 10 serving as a receiver when image data is transmitted and received.

Image data Df includes transmitted image data Df1, received image data Df2, operation image data Df3, and the like. As transmitted image data Df1, image data of an image to be transmitted to another game device 10 is temporarily stored. As received image data Df2, image data of an image received from another game device 10 is temporarily stored. Operation image data Df3 is image data representing operation buttons for operating game device 10 and information of which the user is to be informed.

<Processing Procedure>

Figure 57:
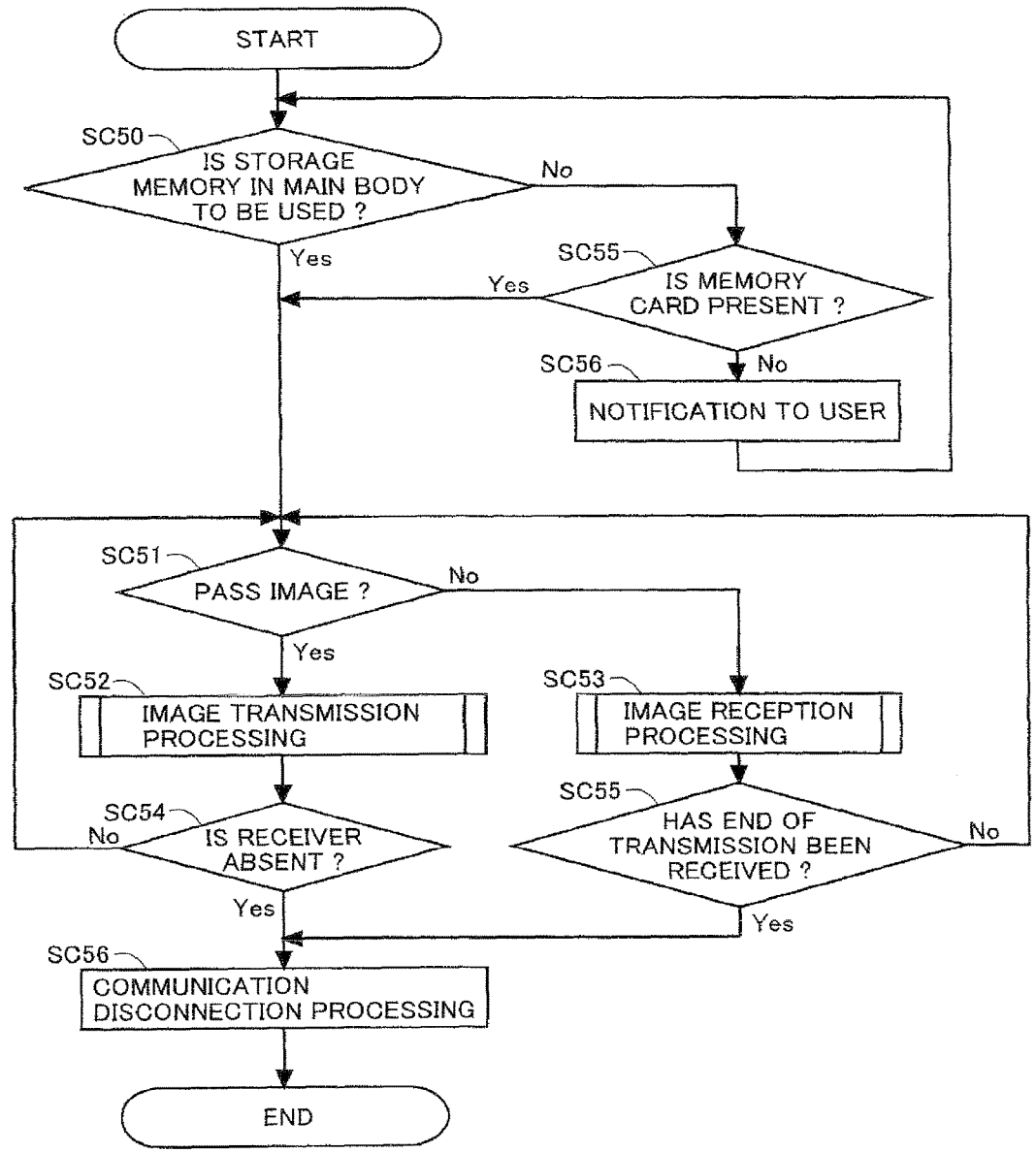
FIG. 57 is a flowchart showing an example in which the game device according to the present embodiment performs image communication processing.
Figure 58:
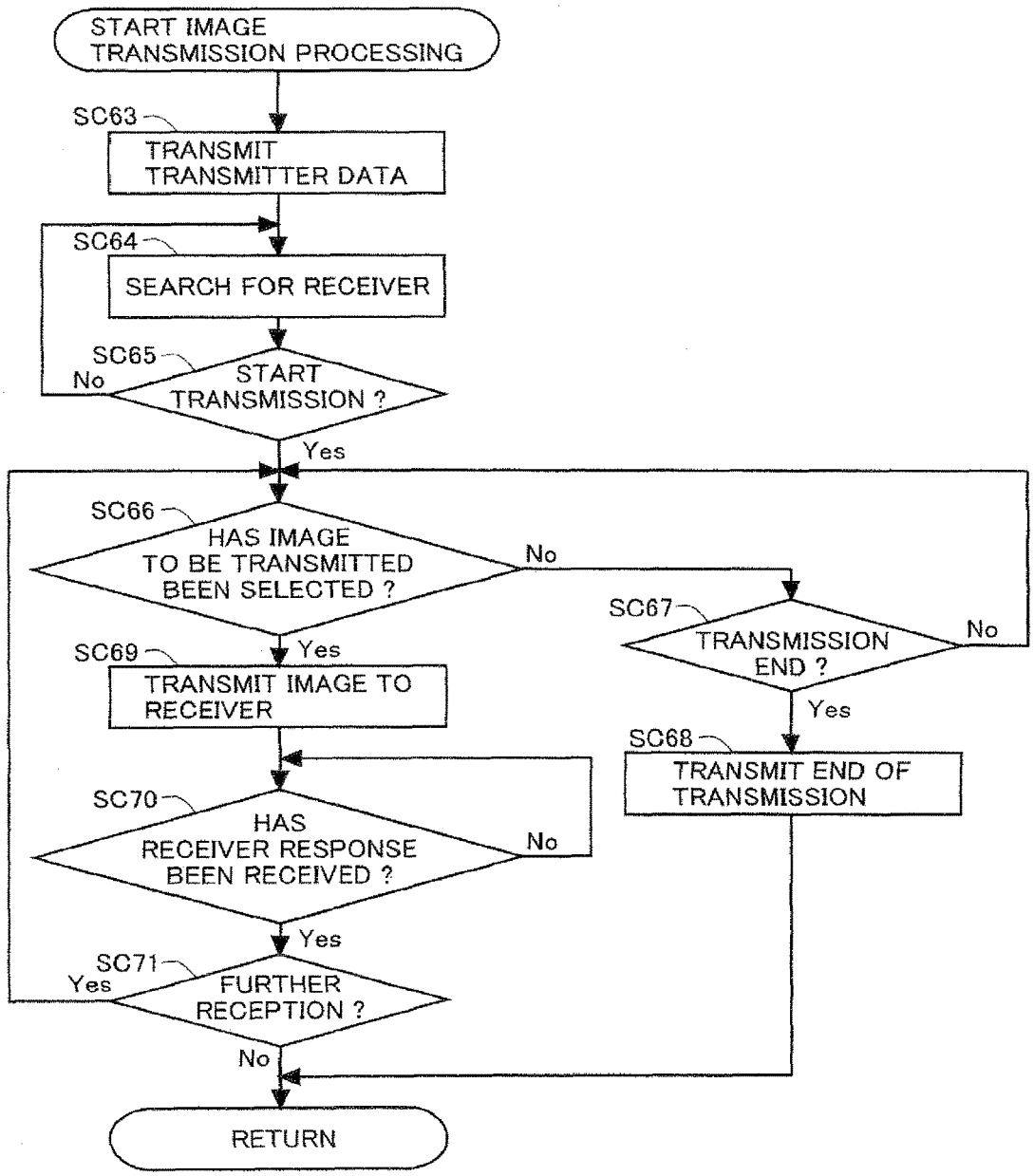
FIG. 58 is a flowchart showing sub routine showing detailed operation in image transmission processing shown in FIG. 57.
Figure 59:
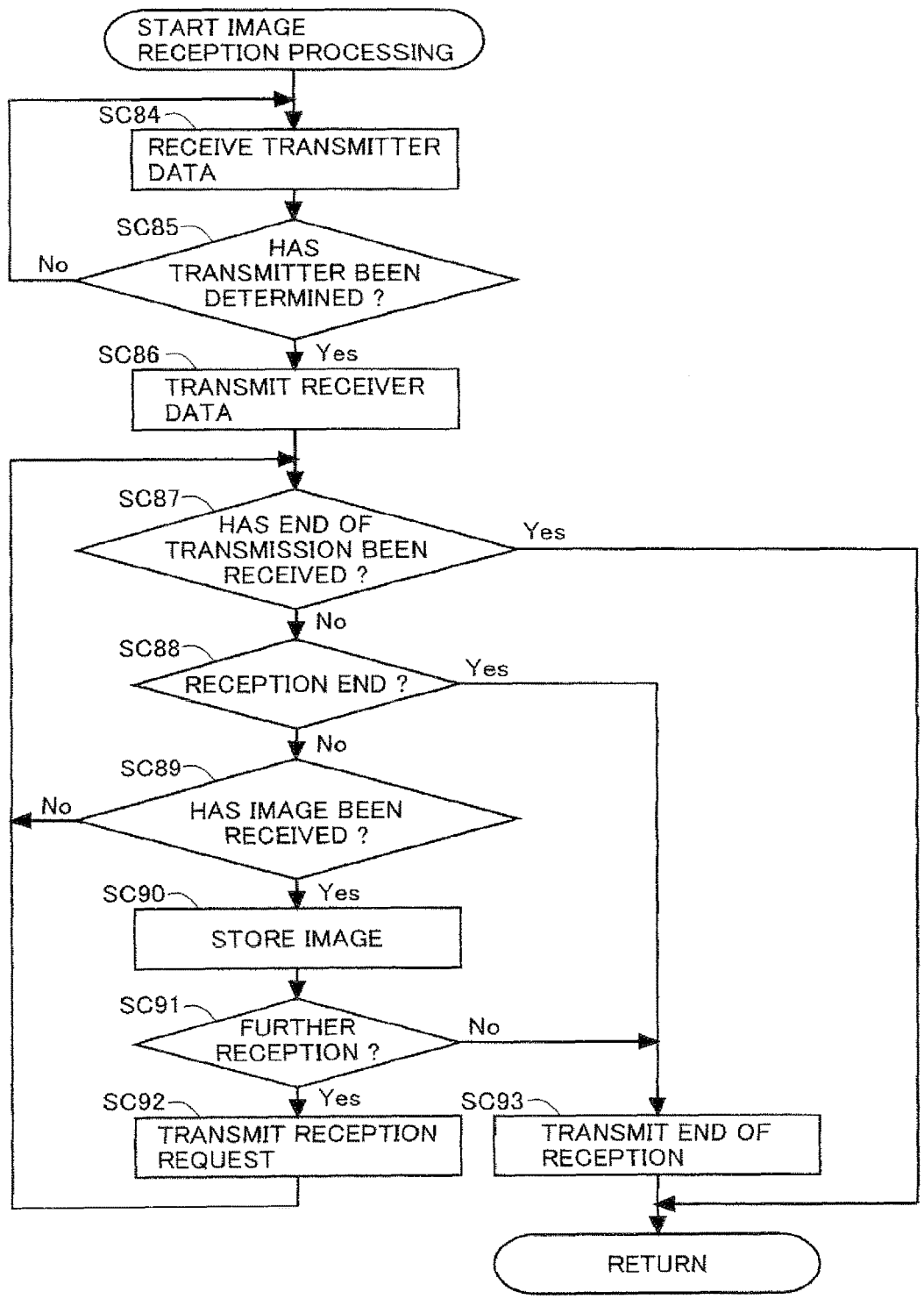
FIG. 59 is a flowchart showing sub routine showing detailed operation in image reception processing shown in FIG. 57.
Figure 60:
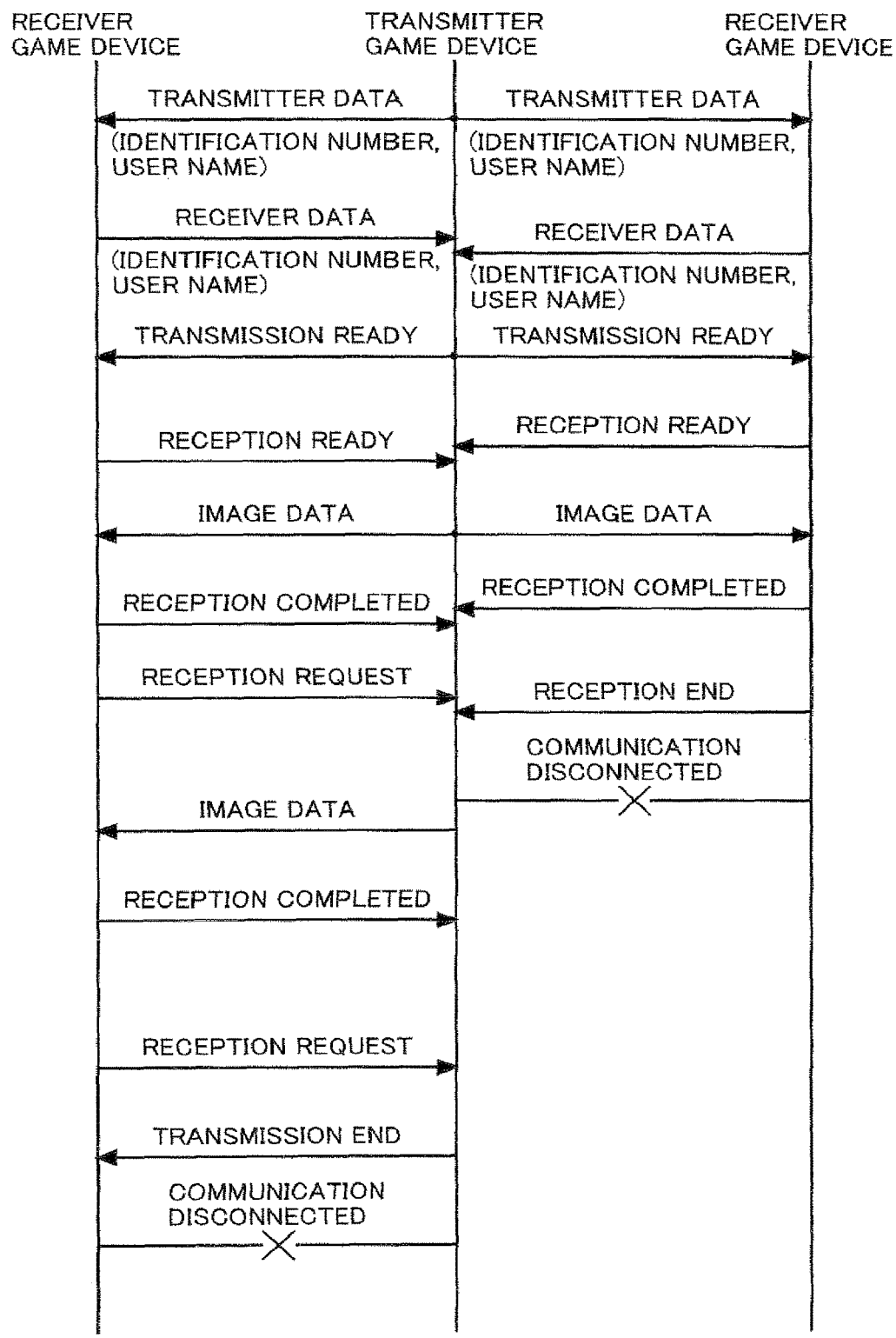
FIG. 60 is a diagram showing an exemplary signal transmitted and received between the game device serving as a transmitter according to the present embodiment and the game device serving as a receiver according to the present embodiment.

A specific processing operation based on the image communication application program executed by game device 10 will now be descried with reference to FIGS. 57 to 60. FIG. 57 is a flowchart showing an example in which game device 10 performs image communication processing by executing the image communication application program. FIG. 58 illustrates sub routine showing in detail an operation in image transmission processing performed in step SC52 in FIG. 57. FIG. 59 illustrates sub routine showing in detail an operation in image reception processing performed in step SC53 in FIG. 57. FIG. 60 is a diagram showing exemplary signals transmitted and received between game device 10*t* serving as a transmitter and game device 10*r* serving as a receiver. A program for performing the processing is included in a program stored in data memory 34 for storage, and when power of game device 10 is turned on, the program is read from data memory 34 for storage into main memory 32 through memory control circuit 33 and executed by CPU 31. Though the image communication application program is stored in advance in data memory 34 for storage in the present embodiment, the program may be downloaded to game device 10 through the Internet or the like. Further, the program stored in memory card 28 or memory card 29 may be read and executed.

Initially, when power of game device 10 (power button 14F) is turned on, CPU 31 executes a boot program (not shown) so that a launcher program stored in data memory 34 for storage for selectively executing a plurality of application programs is loaded to main memory 32 and executed by CPU 31. Thereafter, an image communication application is selected and executed on the launcher program, so that the image communication application program is loaded to main memory 32. The loaded image communication application program is executed by CPU 31.

The image communication application program in the present embodiment includes not only an image communication function but also a photographing function and a taken image display function to display a taken image. A user can selectively perform a function through an operation of the touch panel and the buttons. When the photographing function is selected here, a video image picked-up by the camera currently selected from inner camera 23 and outer camera 25 is displayed on lower LCD 12 in real time. When L button 14I or R button 14J is operated in this state, the photographing processing is performed to store the taken image in a storage medium selected from the storage memory in the main body (for example, data memory 34 for storage) and a memory card (for example, memory card 28). The taken image may be displayed on lower LCD 12 immediately after photographing. Further, when the taken image display function is selected, images desired by a user from among the taken images stored in the storage medium selected from the storage memory in the main body and the memory card may be displayed one by one or in a list. Further, before selection of each function, a user selects whether the storage memory in the main body or the memory card is to be used, so that storage means selected here serves to store the taken image in the photographing function and serves as a source of reading of an image to be displayed in the taken image display function. An image to be transmitted from the transmission-end device in the image communication function is read from this selected storage means, and an image received by the reception-end device is also stored in this selected storage means. When a user selects and performs the image communication function, processing in step SC51 and subsequent steps shown in FIG. 57 is performed.

In FIG. 57, CPU 31 determines whether a memory in the main body (for example, data memory 34 for storage) or a memory card (for example, memory card 28) is to be used in subsequent processing based on operation data Da (step SC50). For example, an indication urging a user to select whether to use the storage memory in the main body or the memory card is provided on lower LCD 12 and/or upper LCD 22 of game device 10 (see FIG. 48). CPU 31 then determines which storage medium is to be used in accordance with the user's operation for selection from among the options. When the memory card is to be used, the process proceeds to next step SC57. On the other hand, when the storage memory in the main body is to be used, the process proceeds to next step SC51.

In step SC57, CPU 31 determines whether the memory card (for example, memory card 28) for storing an image in game device 10 is attached to a connector of game device 10 or not. When the memory card above is attached to the connector of game device 10, the process proceeds to step SC51. On the other hand, when the memory card above is not attached to the connector of game device 10, CPU 31 causes lower LCD 12 and/or upper LCD 22 to display notification for urging a user to attach the memory card (step SC58), and the process returns to step SC50 and the processing is repeated.

In step SC51, CPU 31 determines whether an image is to be transmitted to another game device 10*r* or received from another game device 10*t* in subsequent processing based on operation data Da. For example, an indication urging a user to select whether or not a photograph is to be transmitted to another game device 10*r* or to be received from another game device 10*t* is provided on lower LCD 12 and/or upper LCD 22 of game device 10 (see FIG. 49). CPU 31 then determines whether an image is to be transmitted to another game device 10*r* or to be received from another game device 10*t* in accordance with the user's operation for selection from among the options. When an image is to be transmitted to another game device 10*r*, the process proceeds to next step SC52. On the other hand, when an image is to be received from another game device 10*t*, the process proceeds to next step SC53.

In step SC52, CPU 31 performs image transmission processing and the process proceeds to next step SC54. Detailed operation in the image transmission processing performed in step SC52 above will be described hereinafter with reference to FIG. 58.

In FIG. 58, CPU 31 performs broadcast transmission of transmitter data indicating that the own device is a transmitter of image data, for example through local communication module 39 (step SC63), and the process proceeds to next step SC. For example, CPU 31 generates the transmitter data by using data representing the identification number and the user name stored as identification data Db and user data Dc respectively, and has the generated data stored as transmitter data Dd. Then, broadcast transmission of the transmitter data stored as transmitter data Dd is performed, so that another game device 10*r* that can receive the transmitter data is informed of presence of game device 10 to serve as a transmitter (see FIG. 60).

Next, CPU 31 searches for another game device 10*r* to serve as a receiver (step SC64) and the process to a next step. As will be clarified in the description below, another game device 10*r* to serve as the receiver selects game device 10*t* to serve as a transmitter from which reception is desired, based on the received transmitter data. The receiver data indicating that another game device 10*r* serves as the receiver of image data is transmitted to selected game device 10*t* serving as the transmitter (see FIG. 60). In step SC64 above, CPU 31 waits until the receiver data is received, for example through local communication module 39. When the receiver data is received, CPU 31 then describes the identification number and the user name of another game device 10*r* to serve as the receiver, that are represented by the receiver data, as receiver data De. While another game device 10*r* to serve as the receiver is being searched for, CPU 31 causes, for example, lower LCD 12 to display notification that game device 10*r* to serve as the receiver is currently being searched for (see the left drawing in FIG. 50). Further, when the receiver data is received from another game device 10*r* serving as the receiver, CPU 31 causes, for example, lower LCD 12 to display information indicating the user name of another game device 10*r* serving as the receiver that is represented by the receiver data (see user names Nr1 to Nr3 in the left drawing in FIG. 51).

Next, CPU 31 determines whether or not to start processing for transmitting an image to another game device 10*r* serving as the receiver as a result of search based on operation data Da (step SC65). For example, CPU 31 provides an indication (operation button icon Bs) on lower LCD 12 and/or upper LCD 22 urging a user to perform an operation for starting the image transmission processing. In response to the user's operation for starting the image transmission processing, it is determined that the processing is to be started, and the process proceeds to next step SC66. On the other hand, when the processing for transmitting an image is not to be started, the process returns to step SC64 above, and search for another game device 10*r* to serve as the receiver is continued.

In a period from determination of start of the image transmission processing to determination of an image to be transmitted, game device 10*t* serving as the transmitter transmits transmission ready data indicating that transmission to game device 10*r* serving as the receiver is ready. On the other hand, when game device 10*r* serving as the receiver is ready to receive image data, game device 10*r* serving as the receiver transmits reception ready data indicating that reception of image data is ready to game device 10*t* serving as the transmitter, in response to reception of the transmission ready data (see FIG. 60).

In step SC66, CPU 31 determines, based on operation data Da, whether an image to be transmitted to another game device 10*r* has been selected or not. For example, CPU 31 causes lower LCD 12 and/or upper LCD 22 to display a screen for allowing a user to select an image to be transmitted to another game device 10*r* (see the left drawing in FIG. 52), so as to urge the user to select an image to be transmitted. Then, the process proceeds to next step SC69 in response to the user's operation to determine an image to be transmitted (for example, an operation to touch operation button icon Bt). On the other hand, when the user does not perform the operation to determine an image to be transmitted (No in step SC66), the process proceeds to next step SC67.

In step SC69, CPU 31 transmits image data representing a transmitted image selected in step SC66 above to another game device 10*r* serving as the receiver, and the process proceeds to a next step. For example, CPU 31 extracts the image data corresponding to the transmitted image selected in step SC66 from the storage medium selected in step SC50 above, and has the extracted image data stored as transmitted image data Df1. CPU 31 then identifies another game device 10*r* currently serving as the receiver by referring to receiver data De, and transmits the image data stored as transmitted image data Df1 to identified another game device 10*r*, for example, through local communication module 39 (see FIG. 60). While the image data is transmitted to another game device 10*r* serving as the receiver, CPU 31 provides an indication, for example on lower LCD 12, that the image data is being transmitted to game device 10*r* currently serving as the receiver (see the left drawing in FIG. 53).

Next, CPU 31 waits for a receiver response transmitted from each game device 10*r* serving as the receiver (step SC70). The receiver response includes a response indicating further reception of image data (reception request) or a response indicating end of reception (end of reception). After receiving the image data, each game device 10r serving as the receiver transmits any response to game device 10t serving as the transmitter (see FIG. 60). CPU 31 waits for a response from all game devices 10r currently serving as the receiver. When the reception request is received from at least one game device 10r serving as the receiver (Yes in step SC71), the process returns to step SC66 above and the processing is repeated. On the other hand, when CPU 31 waits for a response from all game devices 10r currently serving as the receiver and the end of reception is received from all game devices 10r serving as the receiver (No in step SC71), CPU 31 ends the processing in the sub routine. When CPU 31 receives the end of reception from game device 10r serving as the receiver, CPU 31 erases data of game device 10r serving as the receiver from receiver data De. Further, while CPU 31 waits for the response from another game device 10r serving as the receiver, CPU 31 provides an indication, for example on lower LCD 12, that the response from game device 10r currently serving as the receiver is awaited (see the left drawing in FIG. 54).

On the other hand, when the user has not yet performed the operation to determine a transmitted image in step SC66 above, CPU 31 determines whether or not to end the processing for transmitting an image based on operation data Da (step SC67). For example, CPU 31 determines whether or not to end the processing for transmitting an image in accordance with a user's operation (for example, an operation to touch operation button icon Bf). When the processing for transmitting an image should end, CPU 31 transmits data indicating that transmission should end (end of transmission; see FIG. 60) to each game device 10r currently serving as the receiver (step SC68), and the processing in the sub routine ends. On the other hand, when the processing for transmitting an image should not end, the process returns to step SC66 above and the processing is repeated.

Referring back to FIG. 57, following the image transmission processing in step SC52 above, CPU 31 determines whether or not a receiver is absent (step SC54). For example, when determination in step SC71 above indicates No (that is, end of reception is received from all game devices 10r serving as the receiver), CPU 31 determines that no receiver exists. When no receiver exists, the process proceeds to next step SC56. On the other hand, when determination in step SC67 above indicates Yes (that is, when the user selects end of transmission), CPU 31 disconnects communication with game device 10r serving as the receiver. The process returns to step SC51 above and the processing is repeated.

CPU 31 performs the image reception processing in step SC53 and the process proceeds to next step SC55. Detailed operation in the image reception processing performed in step SC53 above will be described hereinafter with reference to FIG. 59.

In FIG. 59, CPU 31 receives the transmitter data indicating a transmitter of image data (step SC84) and the process proceeds to a next step. Here, as described above, game device 10t serving as a transmitter performs broadcast transmission of the transmitter data indicating that game device 10t is a transmitter of image data, for example, through local communication module 39 (see FIG. 60). In step SC84 above, when CPU 31 receives the transmitter data transmitted through broadcast transmission, CPU 31 can know presence of another game device 10t serving as a transmitter. When CPU 31 receives the transmitter data, CPU 31 acquires the identification number and the user name of game device 10t serving as the transmitter that are represented by the transmitter data and describes the identification number and the user name as transmitter data Dd.

While another game device 10t serving as a transmitter is being searched for, CPU 31 provides an indication, for example on lower LCD 12, that game device 10t serving as a transmitter is currently being searched for (see the right drawing in FIG. 50). Further, when the transmitter data is received from another game device 10t serving as the transmitter, CPU 31 causes, for example, lower LCD 12 to display information indicating the user name of another game device 10t serving as the transmitter, that is represented by the transmitter data (see the right drawing in FIG. 51).

Next, CPU 31 determines, based on operation data Da, whether or not a transmitter has been determined from among game devices 10t serving as the transmitter that have been searched for (step SC85). For example, CPU 31 provides an indication urging selection from information indicating the user name of another game device 10t serving as the transmitter, on lower LCD 12 and/or upper LCD 22 (see user names Nt1 to Nt3 in the right drawing in FIG. 51). In accordance with a user's operation to select any of the user names, the selected user is determined as a transmitter from which an image is to be received, and the process proceeds to next step SC86. On the other hand, when a transmitter from which an image is to be received is not determined, the process returns to step SC84 above, and search for another game device 10t serving as the transmitter is continued.

In step SC86, CPU 31 transmits receiver data indicating that the own device is a receiver of image data to another game device 10t to serve as the transmitter, for example, through local communication module 39, and the process proceeds to a next step. For example, CPU 31 generates the receiver data by using the identification number and the user name stored as identification data Db and user data Dc respectively, and has the generated data stored as receiver data De. When the receiver data stored as receiver data De is transmitted to another game device 10t serving as the transmitter, another game device 10t serving as the transmitter that has received the receiver data is informed of presence and the user name of game device 10 serving as a receiver (see FIG. 60).

In a period from determination of start of the image transmission processing to determination of an image to be transmitted in another game device 10t serving as the transmitter, transmission ready data indicating that transmission to game device 10r serving as the receiver is ready is transmitted. Here, when game device 10r serving as the receiver is ready to receive image data, game device 10r serving as the receiver transmits reception ready data indicating that reception of the image data is ready to another game device 10t serving as the transmitter, in response to reception of the transmission ready data (see FIG. 60).

Next, CPU 31 determines whether or not data indicating end of transmission has been received from another game device 10t serving as the transmitter (step SC87), determines whether or not the user has performed an operation to end reception (step SC88) based on operation data Da, and determines whether or not the image data has been received from another game device 10t serving as the transmitter (step SC89). For example, when another game device 10t serving as the transmitter is selecting an image to be transmitted, CPU 31 causes lower LCD 12 and/or upper LCD 22 to display a screen indicating that the receiver is waiting for selection of a photograph by the transmitter (see the right drawing in FIG. 52) and informs a user of a current state. In accordance with the user's operation to stop reception of an image (for example, an operation to touch operation button icon Bf), CPU 31 determines that a user has performed an operation to cancel reception (Yes in step SC88) and the process proceeds to next step SC93. Further, when end of transmission is received from another game device 10*t* serving as the transmitter (see step SC68 in FIG. 58, and FIG. 60) (Yes in step SC87), CPU 31 ends the processing in the sub routine. Further, when reception of image data from another game device 10*t* serving as the transmitter is started (see step SC69 in FIG. 58, and FIG. 60) (Yes in step SC89), the process proceeds to next step SC90. On the other hand, when each determination indicates No (that is, when determination in each of steps SC87 to SC89 indicates No), CPU 31 repeats determination in steps SC87 to SC89.

In step SC90, CPU 31 has the image data received from another game device 10*t* (see FIG. 60) stored as received image data Df2. CPU 31 then causes the storage medium selected in step SC50 above to store the image data stored as received image data Df2, and the process proceeds to a next step. Here, when reception of the image data from another game device 10*t* is started, CPU 31 causes, for example, lower LCD 12 to display a message that the image data is currently being received from game device 10*t* serving as the transmitter while the image data is received (see the right drawing in FIG. 53).

Next, CPU 31 determines whether or not to further receive an image from another game device 10*t* serving as the transmitter based on operation data Da. For example, CPU 31 causes lower LCD 12 and/or upper LCD 22 to display a screen for having a user determine whether or not to further receive an image from another game device 10*t* serving as the transmitter (see the right drawing in FIG. 54) and urges the user to make selection. The process proceeds to next step SC92 in accordance with the user's operation to request further reception of an image (for example, an operation to touch operation button icon By). On the other hand, the process proceeds to next step SC93 in accordance with the user's operation to end reception of an image (for example, an operation to touch operation button icon Bn).

In step SC92, CPU 31 transmits to another game device 10*t* serving as the transmitter, data indicating further reception of image data (reception request; see FIG. 60), and the process returns to step SC87 and the processing is repeated.

On the other hand, in step SC93, CPU 31 transmits to another game device 10*t* serving as the transmitter, data indicating that reception should end (end of reception: see FIG. 60), and the processing in the sub routine ends. In determination in step SC88, reception may automatically be canceled regardless of a user's operation. For example, a remaining storage capacity of the storage medium selected in step SC50 above is monitored, and when the remaining capacity indicates an amount equal to or lower than a prescribed amount, a user may be informed that storage capacity for 0 image is available, and the processing in step SC93 may be performed.

Referring back to FIG. 57, after the image reception processing in step SC53, CPU 31 determines whether or not end of transmission has been received (step SC55). For example, when determination in step SC87 above indicates Yes (that is, when end of transmission is received from game device 10*t* serving as the transmitter), the process proceeds to next step SC56. On the other hand, when determination in step SC91 above indicates No (that is, when the user selects end of reception), communication with game device 10*t* serving as the transmitter is disconnected, and the process returns to step SC51 and the processing is repeated.

In step SC56, CPU 31 performs communication disconnection processing, and the processing in the flowchart ends. For example, CPU 31 ends (disconnects) communication with another game device 10 with which communication is currently established, and causes lower LCD 12 and/or upper LCD 22 to display a screen indicating that communication was disconnected (see the left drawing or the right drawing in FIG. 55), so as to inform a user of a current state.

Thus, when game device 10 according to the present embodiment serves as a receiver of image data, game device 10 serving as the receiver can select a transmitter from which the image data is to be received. Therefore, when images are transmitted and received among devices, game device 10 can select a transmission-end device desired by a user to receive an image from the transmission-end device.

In the description above, though game device 10*r* serving as a receiver that receives image data has the right to select game device 10*t* serving as a transmitter that transmits the image data, game device 10*t* serving as the transmitter may also have the right to select game device 10*r* serving as the receiver that receives image data. For example, in the processing in step SC65 above for determining start of transmission, when the user determines start of transmission after the user selects game device 10*r* to serve as a receiver, the transmitter can also select the receiver. For example, when game device 10*r* serving as a receiver selects a user to serve as a transmitter, a check box is provided (for example, next to each of user names Nr1 to Nr3) for each user name serving as the receiver displayed on a display screen of game device 10*t* serving as the transmitter. When a user of game device 10*t* serving as the transmitter checks the user name by performing an operation to touch the check box provided for the user name of the receiver, image data is transmitted only to the checked user to serve as the receiver.

In the processing operation described above, game device 10*r* serving as a receiver can leave a group in which images are transmitted and received at the time desired by a user. Further, even when game device 10*r* serving as the receiver leaves the group, so long as at least one game device 10*r* serving as the receiver remains, game device 10*t* serving as a transmitter can continue transmission of image data. Thus, even when game device 10*r* serving as the receiver leaves the group due to lack of the remaining storage capacity, game device 10*t* serving as the transmitter and other game devices 10*r* serving as the receiver are not affected. On the other hand, transmission of image data may be continued only when all game devices 10*r* serving as the receiver request to continue image communication, and when at least one of game devices 10*r* serving as the receiver leaves the group, any communication in the group above may end.

Further, in the processing operation described above, though game device 10*t* to initially serve as a transmitter transmits the transmitter data through broadcast transmission in which data is transmitted to an unspecified large number of receivers, communication may be started in another manner. For example, game device 10*r* to initially serve as a receiver may transmit the receiver data to an unspecified large number of transmitters, and game device 10*t* to serve as the transmitter that has received the receiver data may send back the transmitter data. Here, it is not necessary to describe as the receiver data to initially be transmitted, the user name of game device 10*r* that transmits the receiver data.

Further, in the processing procedure described above, game device 10*r* to serve as a receiver that communicates with game device 10*t* serving as a transmitter is determined first, and thereafter an image to be transmitted from game device 10*t* to game device 10*r* is selected. Thus, game device 10*t* serving as the transmitter can sequentially transmit selected transmitted images to determined game device 10*r* serving as the receiver, so that various images can readily be transmitted. When such an effect is not expected, however, an image to be transmitted may be determined in another procedure. For example, game device 10*t* serving as a transmitter determines an image to be transmitted to another game device 10, and thereafter determines game device 10*r* to serve as a receiver. In this case, when game device 10*t* to initially serve as the transmitter transmits the transmitter data to an unspecified large number of receivers, and such data is transmitted together with data representing the image determined as an image to be transmitted. Thus, a user of game device 10*r* serving as the receiver can select a transmitter from which the image data is to be received after reviewing the user name of the transmitter and an image to be transmitted, so that information for selection is increased and the transmitter that better matches expectations can be selected.

Further, in the processing procedure described above, when an operation to touch button Bt is performed, a thumbnail image surrounded by cursor C is selected as an image to be transmitted, that is, the image is selected and transmitted one by one. On the other hand, a plurality of images may be selected and transmitted. For example, in the left drawing in FIG. 52, in a selection operation for selecting a thumbnail image displayed in thumbnail display area At (for example, an operation to directly touch a thumbnail image), the thumbnail image is highlighted and an image corresponding to the thumbnail image is selected. Further, the selection operation is performed multiple times, so that a plurality of images are in the selected state. The operation to touch button Bt may be performed in this state, so that the plurality of images in the selected state are transmitted.

In the former case, as an image is selected and transmitted one by one, the number of images transmitted at a time is accordingly limited to one. On the other hand, in the latter case, by limiting the number of selectable images, the number of images transmitted at a time is limited to the number of selectable images. Specifically, in the latter case, a prescribed number of images or more may not be selected at a time, or further selection of images at a time may be prohibited when the total capacity of selected images is equal to or greater than a prescribed capacity. Further alternatively, the number of images transmitted at a time may be limited separately from the number of selectable images. In this case, the number of selectable images may be greater than the number of images transmitted at a time. Here, for a single image selection operation, the image transmission processing for transmitting the limited number of images is repeated multiple times for completing the processing for transmitting the selected images. In any image selection manner/image transmission limitation manner, a user of reception-end game device 10 can cancel further reception of an image while an image is being received, and can determine whether or not to continue reception based on the number of received images.

Further, when game device 10*t* to initially serve as a transmitter transmits the transmitter data to an unspecified large number of receivers, the transmitter data may be transmitted together with additional information to game device 10*r* to serve as a receiver. For example, information indicating a title of an image or the number of images to be transmitted from game device 10*t* serving as the transmitter may be included in the transmitter data above and transmitted. Thus, game device 10*r* serving as the receiver can display information representing a title of an image and the number of images included in the received transmitter data together with the user name of the transmitter, so that information for helping a user of the receiver select a transmitter is increased and selection of a transmitter that better matches expectations can be made. A user of game device 10*t* serving as the transmitter may select a title of an image to be included in the transmitter data from among predetermined typical titles, or the user may freely input a title thereof. Further, the number of images to be transmitted by a user of game device 10*t* serving as the transmitter may be input as the number of images to be included in the transmitter data, or the number of photographs stored in game device 10*t* may be included as the number of images to be included in the transmitter data.

Further, screen display as described above is only by way of example, and another screen display may naturally be employed. For example, though notification that image data is being transmitted or received is displayed in the exemplary screen display shown in FIG. 53, notification may not be displayed when a time period for transmitting or receiving the image data is extremely short.

Though a still image taken by game device 10 or the like is transmitted and received among game devices 10 in the description above, a moving image may be transmitted and received. In this case, a moving image to be transmitted may be a moving image taken by game device 10, a moving image received from another device, or a stored moving image other than a taken moving image.

In addition, in the present embodiment described above, the process returns to step SC51 when a user himself/herself selects end of transmission or end of reception. Specifically, though an exemplary operation in which the process returns to processing for urging a user to determine whether an image is to be transmitted to another game device 10*r* or to be received from another game device 10*t* is described, the process may not return to that processing. For example, even when a user himself/herself selects end of transmission or end of reception, the processing in step SC56 may be performed. That is, communication with another game device 10 with which communication has been established may be disconnected and a screen indicating that communication was disconnected may be displayed (see the left drawing or the right drawing in FIG. 55) and the processing in the flowchart may end.

Further, in the present embodiment described above, lower LCD 12 and upper LCD 22 physically separated from each other and disposed vertically are described by way of example of a liquid crystal display portion having two screens (two screens of an upper screen and a lower screen), however, the display screen including two screens may differently be structured. For example, lower LCD 12 and upper LCD 22 may be arranged side-by-side on one main surface of lower housing 11. Alternatively, a vertically long LCD having a width equal to lower LCD 12 and a length twice as large as lower LCD 12 (that is, a physically single LCD having a vertical length equivalent to two display screens) may be disposed on one main surface of lower housing 11 and two images may vertically be displayed (that is, two images are displayed vertically adjacent to each other, with no boundary portion being interposed therebetween). Alternatively, a horizontally long LCD having a length equal to lower LCD 12 and having a width twice as large as lower LCD 12 may be disposed on one main surface of lower housing 11 and two game images may horizontally be displayed side-by-side (that is, two game images may be displayed horizontally adjacent to each other, with no boundary portion being interposed therebetween). That is, a physically single screen may be divided in two parts to display two images respectively. For any form of images, the present invention can similarly be implemented by disposing touch panel 13 on the screen for displaying a display image displayed on lower LCD 12 described above. Further, in a case where a physically single screen is divided into two parts to display two images above, touch panel 13 may be disposed over the entire screen.

In addition, in the present embodiment described above, touch panel 13 is integrally provided in game device 10, however, the present invention can also be implemented in such a manner that the game device and the touch panel are separately provided. Further, touch panel 13 may be provided on the upper surface of upper LCD 22 to display thereon a display image that has been displayed on lower LCD 12 described above. Furthermore, though two display screens (lower LCD 12 and upper LCD 22) are provided in the present embodiment, a single display screen may be provided. That is, in the present embodiment, only lower LCD 12 may serve as a display screen and touch panel 13 may be provided thereon without providing upper LCD 22. In addition, in the present embodiment, touch panel 13 may be provided on the upper surface of upper LCD 22 without providing lower LCD 12, and a display image that has been displayed on lower LCD 12 described above may be displayed on upper LCD 22.

In addition, in the present embodiment, though touch panel 13 is used as input means in game device 10 for providing a coordinate input, another pointing device may be used. Here, the pointing device is an input device for designating an input position or a coordinate on a screen. For example, the present invention can similarly be implemented by employing a mouse, a track pad, a track ball, or the like as input means and by using positional information based on a screen coordinate system calculated from an output value output from the input means.

Furthermore, in such a stationary game device that a player enjoys a game while holding a game controller, another type of a pointing device may also be employed. For example, a camera securely fixed to a housing of a game controller may be used as the pointing device. In this case, an image picked-up by the camera varies depending on variation of a position indicated by the housing of the game controller. Therefore, by analyzing the picked-up image, a coordinate on a display screen indicated by the housing above can be calculated. The present invention can naturally be implemented even though game device 10 does not include a pointing device itself such as touch panel 13.

Moreover, in the present embodiment described above, though portable game device 10 or a stationary game device is described by way of example, an information processing device such as a general personal computer may execute the image communication application program of the present invention so as to implement the present invention.

The shape of game device 10 described above as well as a shape, the number, a setting position, or the like of operation button 14 group and touch panel 13 provided in game device 10 are only by way of example, and the present invention can naturally be implemented even though the shape, the number, and the setting position thereof may be different. An order of performing the steps, a screen display example, or the like used in the image communication processing described above is only by way of example, and the present invention can naturally be implemented even though the order of performing the steps or screen display may be different.

[9. Sound Function]

Processing provided by the sound program executed as a result of launch of sound application program 57 will now be described with reference to FIGS. 61 to 101.

<Exemplary Usage of Game Device>

Figure 61:
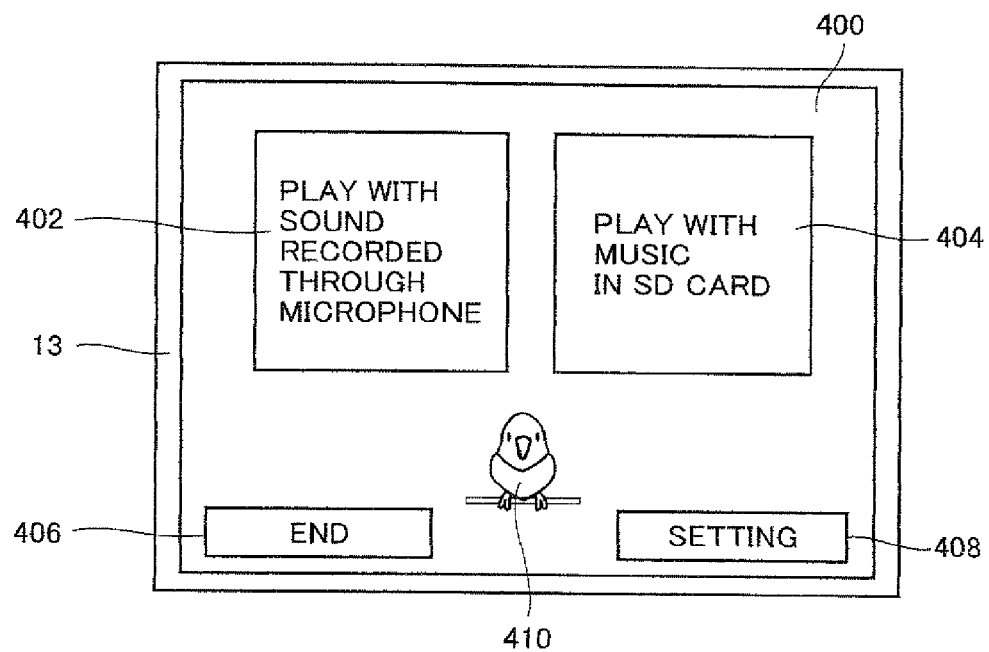
FIG. 61 is a diagram showing an exemplary sound selection screen 400 in a sound function in the game device according to the present embodiment.

FIG. 61 is a diagram showing an exemplary sound selection screen 400 in a sound function in game device 10 according to the present embodiment.

Referring to FIG. 61, game device 10 according to the present embodiment includes a plurality of functions including a function for reproduction of a recording data file freely recorded by the user through the microphone in the main body or reproduction of a music file which is music data stored in an SD card, and the user can arbitrarily select a desired function on sound selection screen 400 shown in FIG. 61.

In the example shown in FIG. 61, a plurality of icons 402 and 404 corresponding to respective functions incorporated in game device 10 are displayed on the screen of lower LCD 12.

Here, when a "play with sound recorded through microphone" icon 402 is selected, transition to a microphone recording and reproduction mode of a function allowing the user to create a recording data file by freely recording sound through the microphone in the main body or to reproduce the created recording data file or to edit the created recording data file is made.

On the other hand, when a "play with music in SD card" icon 404 is selected, transition to a music reproduction mode of a function to reproduce a music file which is music data stored in the SD card is made. In the present embodiment, for example, the music file is stored in the SD card as appropriate through a personal computer or the like, however, wireless communication module 38 described above may be used to transmit and receive data to and from a server storing music files through the Internet, and a downloaded music file may be stored in the SD card.

Alternatively, when the user selects a "setting" icon 408 here, the user can freely select a function relating to setting processing.

Alternatively, when a "quit" icon 406 is selected, a sound function ends and the screen returns to a not-shown menu screen.

In addition, in FIG. 61, an object 410 in a bird shape is displayed in a lower portion of the screen of lower LCD 12. While object 410 in a bird shape is being displayed, it is assumed that an automatic recording and reproduction function which will be described later is being performed.

The music reproduction mode, which is a function to perform processing or the like for reproducing a music file which is music data stored in the SD card, will initially be described hereinafter.

Specifically, when "play with music in SD card" icon 404 is selected, transition to the music reproduction mode is made and a music reproduction folder list selection screen 500 is displayed.

FIG. 62 is a diagram illustrating music reproduction folder list selection screen 500 according to the present embodiment.

FIG. 62(a) shows a case where music reproduction folder list selection screen 500 is displayed on the screen of lower LCD 12.

In addition, in FIG. 62(b), a list screen 500# of music files included in a currently selected folder is displayed on the screen of upper LCD 22.

Referring to FIG. 62(a), the user can select any folder in a folder list display range 530 in music reproduction folder list selection screen 500 by touching the screen of lower LCD 12 with touch pen 27 etc. For example, a case in which folders are diagonally displayed along the circumference of a disc in folder list display range 530 is shown.

For example, it is assumed that a cursor 520 selects the folder displayed at the top of folder list display range 530. Processing for scroll display of the folder list in accordance with a trail of movement of the touch pen is performed by touching a position where another folder is displayed in folder list display range 530 on the screen of lower LCD 12 with touch pen 27 etc. or by touching the screen and moving touch pen 27 etc. while maintaining the touched state. In the present example, for example, it is assumed that the position of cursor 520 is not changed and a folder at the top in the folder list currently displayed in folder list display range 530 is set to a selected state. Therefore, processing for scroll display of the folder list is performed such that the disc turns in accordance with the trail of movement of the touch pen.

In the present example, though the description is given by way of example, assuming that the position of cursor 520 is not changed, the position of cursor 520 may be moved to a position in accordance with a touch position which is a position touched with touch pen 27. Specifically, when the screen is touched and thereafter an operation to reset the touched state without changing the touch position from the originally touched position is performed (off the screen), only cursor 520 moves in accordance with the touch position. Here, the processing for scroll display of the folder list is not performed. Specifically, when a "random" folder is touched in FIG. 62(a), only cursor 520 moves to the position of the "random" folder.

Meanwhile, when an operation to touch the screen and move touch pen 27 etc. while maintaining the touched state, that is, an operation to change the touch position from the originally touched position while maintaining the touched state (drag operation), is performed, the processing for scroll display of the folder list is performed in accordance with the trail of movement (travel distance) of the touch pen. Here, cursor 520 can be maintained at the position of cursor 520 before scroll display processing or the folder at the top of the folder list can be set in a selected state.

In addition, when the position of cursor 520 is varied and the selected folder is changed, FIG. 62(b) is updated to list screen 500# of music files included in the folder selected by cursor 520. Specifically, when a favorite folder which will be described later is touched, a list of music files registered in the favorite folder is displayed. Alternatively, when the random folder is touched, random reproduction as will be described later is carried out and a list of music files to be reproduced in random reproduction is displayed. In random reproduction, a file name of an already reproduced music file may be displayed, but a file name of a music file which has not yet been reproduced may be displayed with its name being replaced with a different symbol or the like. Through this processing, in random reproduction, the user cannot know a music file to be reproduced next until this music file is reproduced. Thus, the user can have expectation and enjoy reproduction of music data.

Even when the position of cursor 520 is not varied, the folder selected by cursor 520 is changed in accordance with the processing for scroll display of the folder list. Therefore, in list screen 500# displayed on the screen of upper LCD 22, update to the list of music files in the selected folder is made.

In addition, the user can move a slider 518 on a folder list scroll bar 510 displayed on the screen of lower LCD 12, by using touch pen 27 etc.

By moving slider 518 on folder list scroll bar 510, the folder list displayed in folder list display range 530 is updated and a folder list in accordance with the cursor position is displayed.

Moreover, the user can set a volume at which output from the speaker or the like is provided, by designating a volume setting icon 550 with touch pen 27 etc.

Further, the user can return to sound selection screen 400, which is a preceding screen, by selecting a "back" icon 512.

In addition, by selecting an "open" icon 514, a music file selection screen is displayed.

Moreover, by selecting a selection function icon 516 in FIG. 62(a), the user can perform the function corresponding to the selection function icon. It is assumed that display and setting of the selection function icon are switched in correspondence with the folder currently selected by cursor 520. Here, for example, a case where a "best 10" folder which is one of the favorite folder is selected is shown, and selection function icon 516 of "all erase" is provided in correspondence with this folder. When selection function icon 516 of "all erase" is selected, processing for erasing all music files registered in the best 10 folder is performed. The favorite folder which will be described later may be displayed when a music file is registered in the folder but it may not be displayed when no music file is registered.

The "random" folder is displayed as a folder next to the "best 10" folder. It is assumed that, when this "random" folder is selected and executed, reproduction of all music files is started such that the order of reproduction from the first file to the last file is randomly designated. It is then assumed that, when reproduction of the last designated music file ends, reproduction is continued in such a manner that the order of reproduction is again randomly designated. When the "random" folder is selected, random reproduction is carried out but the order of reproduction is designated. Therefore, reproduction can be repeated from a music file that was once reproduced. In addition, in an example where reproduction of the last designated music file ends and then the order of next reproduction is randomly designated, in case that the last designated music file happens to be the same as the first music file in subsequent reproduction, processing for setting the order of reproduction again is performed. As a result of this processing, successive reproduction of the same music piece can be suppressed and stress imposed on the user can be suppressed. In addition, it is assumed that, when the "random" folder is selected, reproduction processing is automatically started and hence a reproduction operation selection screen 503 which will be described later is displayed.

Here, for example, subsequent to "best 10", the "random" folder, a "memories" folder and a "collection" folder that are other favorite folders are sequentially displayed, however, the order of display is not particularly limited as such and a manner of display can freely be set. For example, the "random" folder and "best 10" may be displayed with their positions being interchanged. For example, when an initial position of cursor 520 is on the "random" folder, the reproduction processing above is automatically started. Therefore, music data can be reproduced without any selection by the user.

FIG. 63 is a diagram illustrating another music reproduction folder list selection screen 501 according to the present embodiment.

FIG. 63(a) shows a case where music reproduction folder list selection screen 501 is displayed on lower LCD 12.

In addition, in FIG. 63(b), a list screen 501# of music files included in the currently selected folder is displayed on the screen of lower LCD 12.

For example, a case where the user uses touch pen 27 etc. to attain scroll display of the folder list in folder list display range 530 in FIG. 62(a) is shown.

Specifically, for example, the touch pen is moved while it keeps touching the screen in folder list display range 530 (slide operation), so that the folder list is updated in accordance with the trail of movement.

Therefore, FIG. 63(a) shows a case where the position of cursor 518# on folder list scroll bar 510 has moved from the initial position.

In addition, list screen 501# in FIG. 63(b) shows that a music folder FA is selected with cursor 520 and a plurality of music files are stored in this music folder FA. As other features are as described in connection with FIG. 62, detailed description thereof will not be repeated.

As the favorite folder such as "best 10", the "random" folder and the like and the music folders are displayed in parallel in the same folder list display range 230, a folder to be designated can be grasped at a glance and user's operability in selection from the folder list is improved.

FIG. 62(a) shows by way of example a case that "best 10", "memories" and "collection" are provided as the favorite folders. In addition to the folders above, though not shown, a "practice" folder and a folder that can be displayed in a special manner in accordance with user's preference can also be provided. For example, such a "secret" folder that only first several characters of a music file included in the folder are displayed and remaining characters are not shown (hidden) may be provided. Registration of this folder will be described later.

FIG. 64 is a diagram illustrating a music file selection screen 502 according to the present embodiment.

Referring to FIG. 64(a), a music file list 540 is displayed on the screen of lower LCD 12.

When "open" icon 514 is selected in the preceding music reproduction folder list selection screen, the list of music files included in the selected music folder is displayed.

In addition, the user can move a slider 518# on a file list scroll bar 510# on the screen of lower LCD 12, by using touch pen 27 etc.

By moving the slider on file list scroll bar 510#, the file list displayed in the file list selection screen is scrolled and the list of music files in accordance with the cursor position is displayed.

Moreover, by selecting the selection function icon in FIG. 64(a), the user can perform the function corresponding to the selection function icon. It is assumed that display and setting of the selection function icon are switched in correspondence with the folder currently selected by cursor 520. Here, a selection function icon 515 of "favorite" is provided. When selection function icon 515 of "favorite" is selected, a favorite folder selection screen is displayed.

Figure 102:
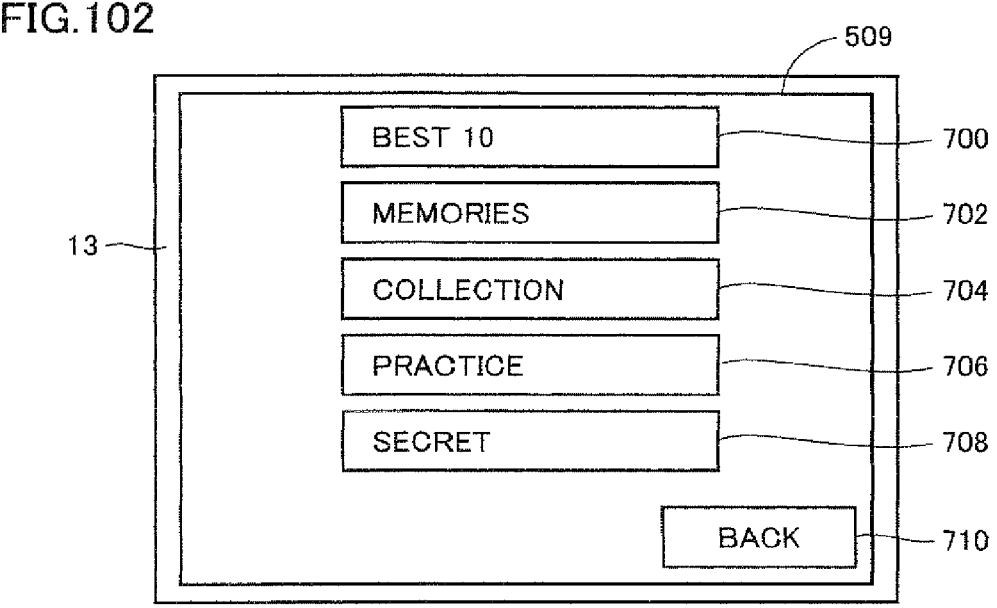
FIG. 102 is a diagram illustrating a favorite folder selection screen according to the present embodiment.

FIG. 102 is a diagram illustrating a favorite folder selection screen 509 according to the present embodiment.

Referring to FIG. 102, a case where a "best 10" registration icon 700, a "memories" registration icon 702, a "collection" registration icon 704, a "practice" registration icon 706, and a "secret" registration icon 708 that are favorite folders are provided on the screen of lower LCD 12 is shown.

The user selects any of the registration icons above in favorite folder selection screen 509, so that a music file selected with a cursor 520# in FIG. 64(a) above is registered in the selected folder and displayed.

When a "back" icon 710 is selected, music file selection screen 502 which is the preceding screen is displayed.

Referring again to FIG. 64(a), a reproduction mode switching icon 517 is provided in music file selection screen 502.

In addition, the user can make switching among reproduction modes in the folder based on selection of reproduction mode switching icon 517. Specifically, switching among a reproduction mode in which a music file being reproduced is repeatedly reproduced, a reproduction mode in which music files are sequentially reproduced and reproduction is repeated from the beginning when reproduction is completed, a reproduction mode in which music files are sequentially reproduced and reproduction is stopped when reproduction is completed, a reproduction mode in which random reproduction is performed, and a reproduction mode in which only a set section is repeatedly reproduced can sequentially be made for execution.

In addition, information on the selected music folder is displayed on upper LCD 22 in FIG. 64(b).

In FIG. 64(a), the user selects a "start" icon 516 to perform the operation of reproducing the music file selected with cursor 520#, and the reproduction operation selection screen is displayed.

FIG. 65 is a diagram illustrating reproduction operation selection screen 503 according to the present embodiment.

FIG. 65(a) shows a case where reproduction operation selection screen 503 for allowing an operation with music being modified in the reproduction operation or the like is displayed on lower LCD 12.

Specifically, for example, the user can switch between sound effects output from a speaker or the like by operating R button 14J and L button 14I after selection of a sound effect selection icon 532, 534 with the touch pen etc.

In addition, the user can perform the function to vary a reproduction speed or a key of a reproduction signal by selecting a speed and key adjustment icon 541.

Moreover, the user can perform the function of change to another tone by modulating a frequency of the reproduction signal or performing filtering processing or the like, by selecting a tone adjustment icon 542.

Further, the user can perform the function to output as sound effect from the speaker, a recording data file created by recording voice and sound which will be described later, by selecting a recording data selection icon 544.

In addition, it is assumed that a slider 519 moves in accordance with a reproduction position in a total duration of the music file within the display range of a reproduction time bar 511. When the user touches a position within the display range of reproduction time bar 511 with touch pen 27 etc., processing for reproducing the music file can be started from the time corresponding to the touch position. Here, it is assumed that slider 519 moves to the position where the reproduction processing is started. By selecting slider 519 with touch pen 27 etc. and performing the slide operation, the reproduction processing may be started from the position resulting from the slide operation.

In addition, the user can cause the music file being reproduced to pause, by selecting a pause command icon 522. Moreover, the user can select a next music file included in the folder to perform the reproduction operation thereof, by selecting a next music selection command icon 524. Further, the user can select a previous music file included in the folder to perform the reproduction operation thereof, by selecting a previous music selection command icon 520.

In addition, the user can perform visualizer processing which will be described later, by pressing a visualizer switching icon 531.

In addition, the user can make switching among reproduction modes in the folder by pressing reproduction mode switching icon 517. Specifically, switching among the reproduction mode in which a music file being reproduced is repeatedly reproduced, the reproduction mode in which music files are sequentially reproduced and reproduction is repeated from the beginning when reproduction is completed, the reproduction mode in which music files are sequentially reproduced and reproduction is stopped when reproduction is completed, the reproduction mode in which random reproduction is performed, and the reproduction mode in which only a set section is repeatedly reproduced can sequentially be made for execution.

In addition, by pressing "favorite" icon 515, the user can have favorite folder selection screen 509 as described in connection with FIG. 102 displayed. As described above, by selecting any of the registration icons in favorite folder selection screen 509, the currently reproduced music file can be registered in the selected folder and displayed.

FIG. 65(*b*) shows a case where music file list 540 displayed on the screen of lower LCD 12 in FIG. 64(*a*) is displayed on the screen of upper LCD 22 as a music file selection list screen 503#. A music file included in the same folder where the music file being reproduced is included can be selected by operating direction input button 14A. Specifically, after the music file is selected with the touch pen etc. on the screen of lower LCD 12 in FIG. 64(*a*) (start is pressed), on the screen of lower LCD 12 in FIG. 65(*a*), processing relating to the operation for reproducing the music file selected with the touch pen etc. is selected in the reproduction operation selection screen with the touch pen etc., and on the screen of upper LCD 22, a music file can be selected with direction input button 14A.

For example, by using direction input button 14A to select the music file and pressing any of operation buttons 14B to 14E, the music file being reproduced is switched to the selected music file and the reproduction operation thereof can be performed.

Therefore, the processing in reproduction operation selection screen 503 on lower LCD 12 and the processing in music file selection list screen 503# on upper LCD 22 can be performed in parallel, which contributes to convenience of the user.

Detailed processing of the sound function according to the present embodiment will be described hereinafter.

A processing procedure relating to the "sound function" according to the present embodiment described above will be described with reference to the following flow. It is noted that each step is implemented representatively by reading of a program or the like stored in memory card 29 to main memory 32 and execution thereof by CPU 31.

<Function Selection Processing>

Figure 66:
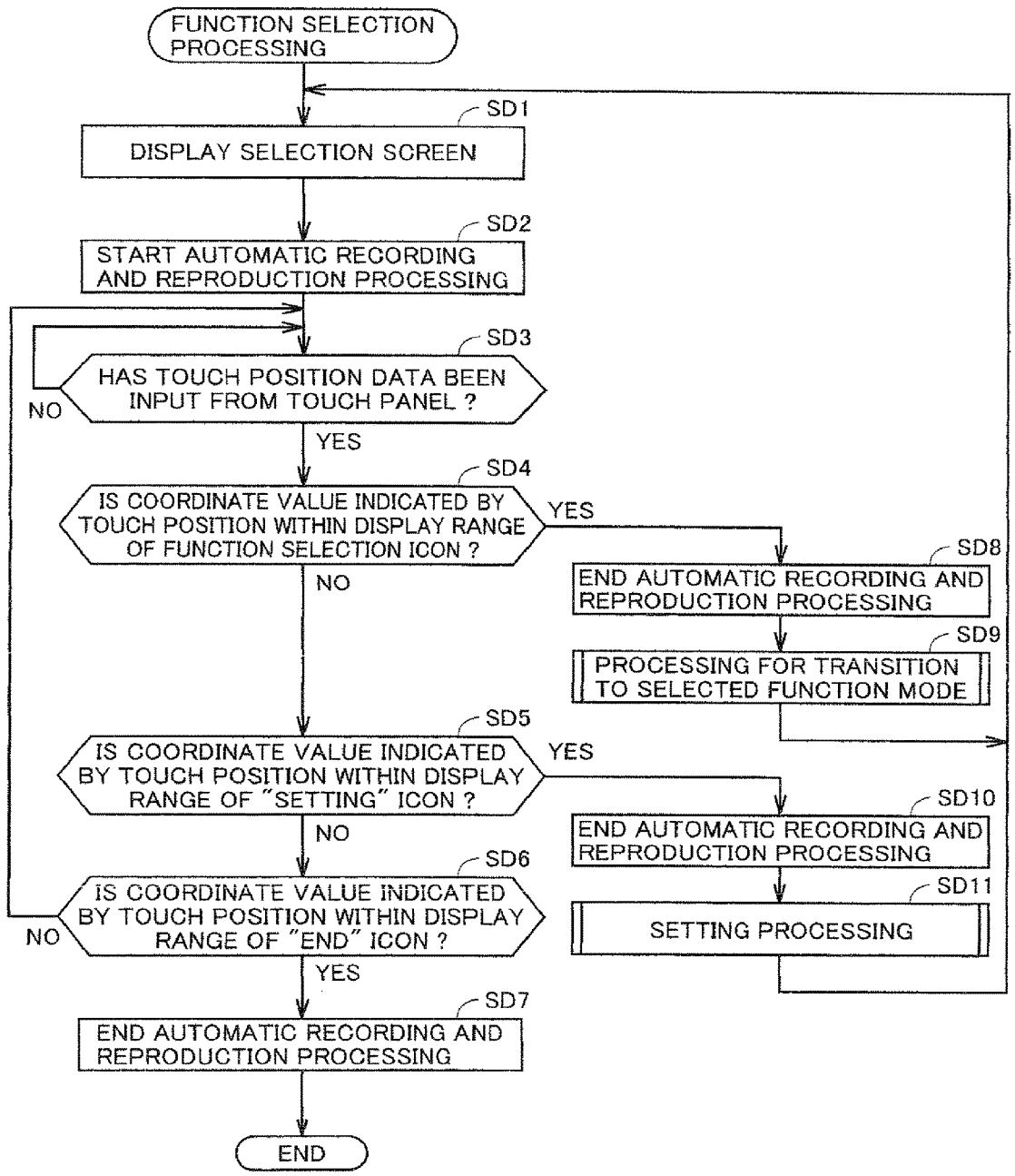
FIG. 66 is a flowchart illustrating processing relating to function selection in the game device according to the present embodiment.

FIG. 66 is a flowchart illustrating processing relating to function selection in game device 10 according to the present embodiment. It is noted that the flow shown in FIG. 66 illustrates the processing in sound selection screen 400 in FIG. 61.

Referring to FIG. 66, when the power of game device 10 is turned on or the start button is pressed and thereafter the user selects a prescribed icon in a not-shown menu screen, the sound function is performed.

In step SD1, CPU 31 causes lower LCD 12 to display sound selection screen 400 as shown in FIG. 61.

Thereafter, CPU 31 starts automatic recording and reproduction processing (step SD2). The automatic recording and reproduction processing will be described later. It is noted that the processing in steps SD1 and SD2 may be interchanged.

Thereafter, CPU 31 determines whether data of the touch position has been input from touch panel 13 or not (step SD3). CPU 31 determines whether or not the touch position data has been input from touch panel 13 through I/F circuit 42. Namely, CPU 31 determines whether a touch operation with touch pen 27 etc. by the user has been performed or not. When the touch position data has not been input (NO in step SD3), the processing in step SD3 is repeated.

On the other hand, when the touch position data has been input (YES in step SD3), the process proceeds to step SD4.

In step SD4, CPU 31 determines whether the coordinate value indicated by the touch position data is within a display range of the function selection icon or not. Specifically, CPU 31 determines which of "play with sound recorded through microphone" icon 402 or "play with music in SD card" icon 404 has been selected.

Then, when the coordinate value indicated by the touch position data is within the display range of "play with sound recorded through microphone" icon 402 or "play with music in SD card" icon 404 (YES in step SD4), the process proceeds to step SD8.

On the other hand, when the coordinate value indicated by the touch position data is out of the display range of "play with sound recorded through microphone" icon 402 or "play with music in SD card" icon 404 (NO in step SD4), the process proceeds to step SD5.

When CPU 31 determines in step SD4 that the coordinate value indicated by the touch position is within the display range of the function selection icon, the processing for automatic recording and reproduction processing ends in step SD8 (step SD8).

Then, CPU 31 performs processing for transition to a next selected function mode (step SD9). The processing for transition to the selected function mode will be described later.

On the other hand, when CPU 31 determines in step SD4 that the coordinate value indicated by the touch position is not within the display range of the function selection icon, CPU 31 then determines whether the coordinate value indicated by the touch position is within the display range of "setting" icon 408 or not (step SD5).

When CPU 31 determines in step SD5 that the coordinate value indicated by the touch position is within the display range of "setting" icon 408, the automatic recording and reproduction processing ends (step SD10).

Thereafter, CPU 31 performs the setting processing (step SD11). The setting processing will be described later.

On the other hand, when CPU 31 determines in step SD5 that the coordinate value indicated by the touch position is not within the display range of "setting" icon 408, CPU 31 then determines whether the coordinate value indicated by the touch position is within the display range of "end" icon 406 or not (step SD6).

When CPU 31 determines in step SD6 that the coordinate value indicated by the touch position is within the display range of "end" icon 408, the automatic recording and reproduction processing ends and the function selection processing ends (end). Namely, the screen thus returns to the not-shown menu screen.

On the other hand, when the coordinate value indicated by the touch position is not within the display range of "end" icon 408 in step SD6, the process returns to step SD3.

Figure 67:
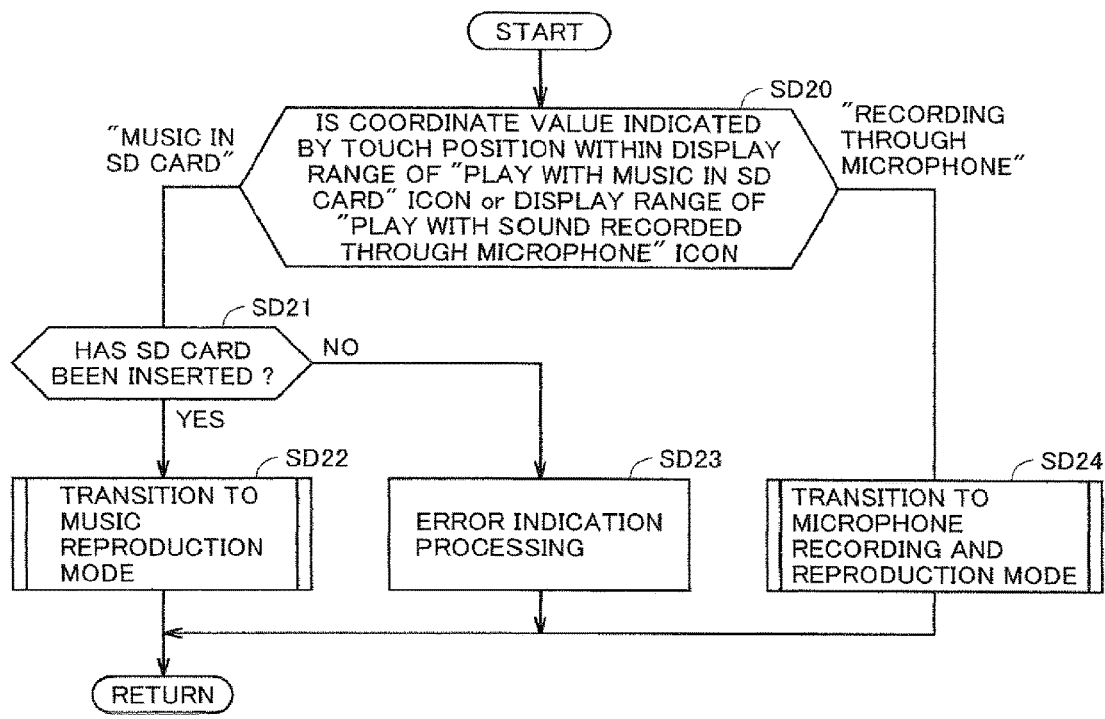
FIG. 67 is a flowchart illustrating sub routine processing of processing for transition to a selection function mode in FIG. 66.

FIG. 67 is a flowchart illustrating sub routine processing of the processing for transition to a selection function mode in FIG. 66.

Referring to FIG. 67, CPU 31 determines whether the coordinate value indicated by the touch position is within the display range of "play with music in SD card" icon 404 or "play with sound recorded through microphone" icon 402 (step SD20).

When the coordinate value indicated by the touch position is within the display range of "play with music in SD card" icon 404, the process proceeds to step SD21.

Then, CPU 31 determines whether the SD card has been inserted or not (step SD21). When CPU 31 determines that the SD card has been inserted, transition to the music reproduction mode is then made (step SD22). The music reproduction mode will be described later. When the music reproduction mode ends, the screen again returns to the sound selection screen in step SD1 in FIG. 1 (return).

On the other hand, when CPU 31 determines in step SD21 that the SD card has not been inserted, CPU 31 performs error indication processing (step SD23). The error indication processing is processing for performing processing for indicating, for example, that an "SD card is not inserted" or the like and urging the user to insert the SD card. Then, the process again returns to step SD1 (return).

On the other hand, when CPU 31 determines in step SD20 that the coordinate value indicated by the touch position is within the display range of "play with sound recorded through microphone" icon 402, transition to the microphone recording and reproduction mode is made (step SD24). The microphone recording and reproduction mode will be described later. When the microphone recording and reproduction mode ends, the screen again returns to the sound selection screen in step SD1 in FIG. 1 (return).

<Music Reproduction Mode>

The music reproduction mode will now be described.

Figure 68:
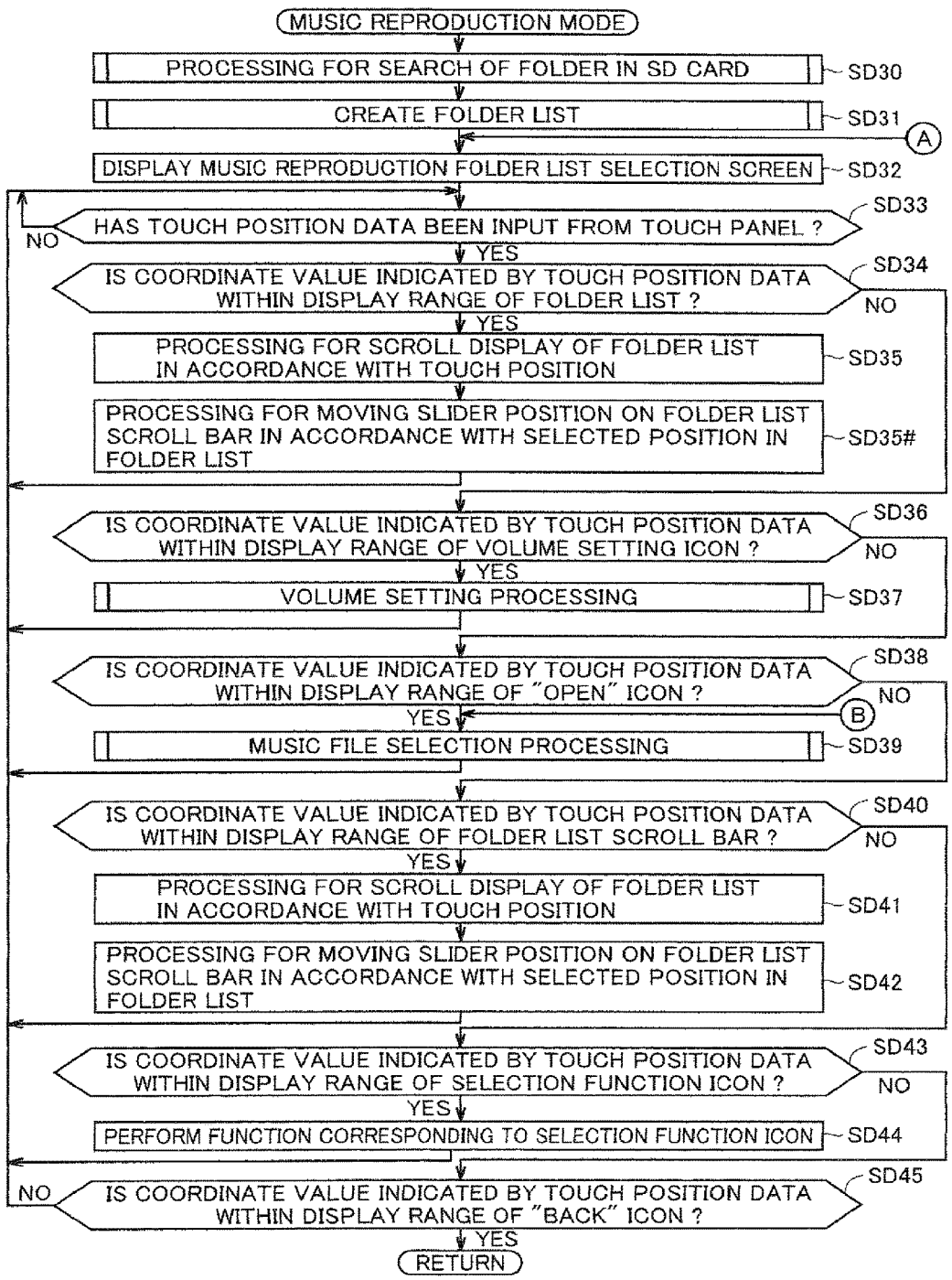
FIG. 68 is a flowchart illustrating sub routine processing in a music reproduction mode.

FIG. 68 is a flowchart illustrating sub routine processing in the music reproduction mode.

Referring to FIG. 68, initially, CPU 31 performs processing for search of a folder in an SD card (step SD30).

Then, CPU 31 generates the folder list (step SD31).

Then, CPU 31 has the music reproduction folder list selection screen displayed (step SD32). FIGS. 62 and 63 above show examples of display of music reproduction folder list selection screen 500.

The processing for search of a folder in an SD card will be described here.

Figure 69:
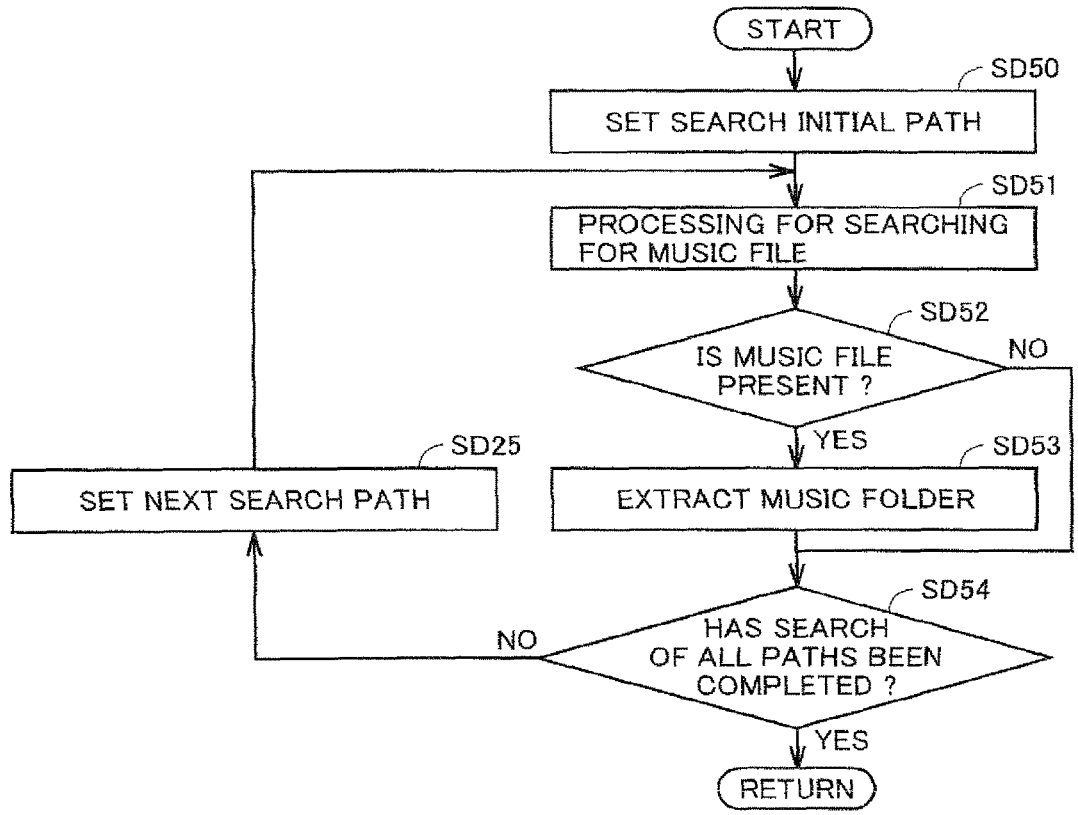
FIG. 69 is a flowchart illustrating sub routine processing of processing for search of a folder in an SD card.

FIG. 69 is a flowchart illustrating sub routine processing of the processing for search of a folder in an SD card.

Referring to FIG. 69, CPU 31 sets a search initial path to be first searched, among paths associated with the folders stored in the SD card (step SD50). Thereafter, CPU 31 performs processing for searching for a music file in accordance with the search initial path (step SD51).

Then, CPU 31 determines whether or not a music file is present in the folder through the processing for search for the music file in accordance with the search initial path (step SD52).

When CPU 31 determines in step SD52 that the music file is present, the music folder including the music file is extracted (step SD53).

Whether the music file is present or not can be determined, for example, by referring to an extension for identifying a file. Here, determination may also be made by referring to identification information stored in a header or the like of a file, without limited to determination based on the extension, and a determination method is not limited.

Thereafter, CPU 31 determines whether search of all paths has been completed or not (step SD54).

When CPU 31 determines in step SD54 that search of all paths has not been completed, CPU 31 sets a next search path to be searched next (step SD25).

Then, the process returns to step SD51 and the processing for searching for the music file which is the processing described above is performed.

The processing in steps SD51 to SD54 described above is repeated until search of all paths is completed. When CPU 31 determines in step SD54 that search of all paths has been completed, the process ends (return).

Thus, all folders in which a music file is present can be extracted from the attached SD card.

Figure 70:
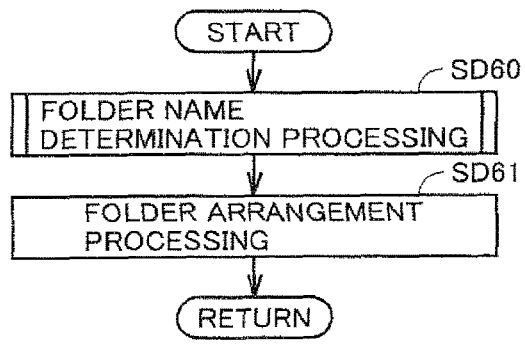
FIG. 70 is a flowchart illustrating sub routine processing for generating a folder list.

FIG. 70 is a flowchart illustrating sub routine processing for generating a folder list.

Referring to FIG. 70, initially, CPU 31 performs processing for determining a folder name (step SD60). Thereafter, CPU 31 performs folder arrangement processing (step SD61).

Figure 71:
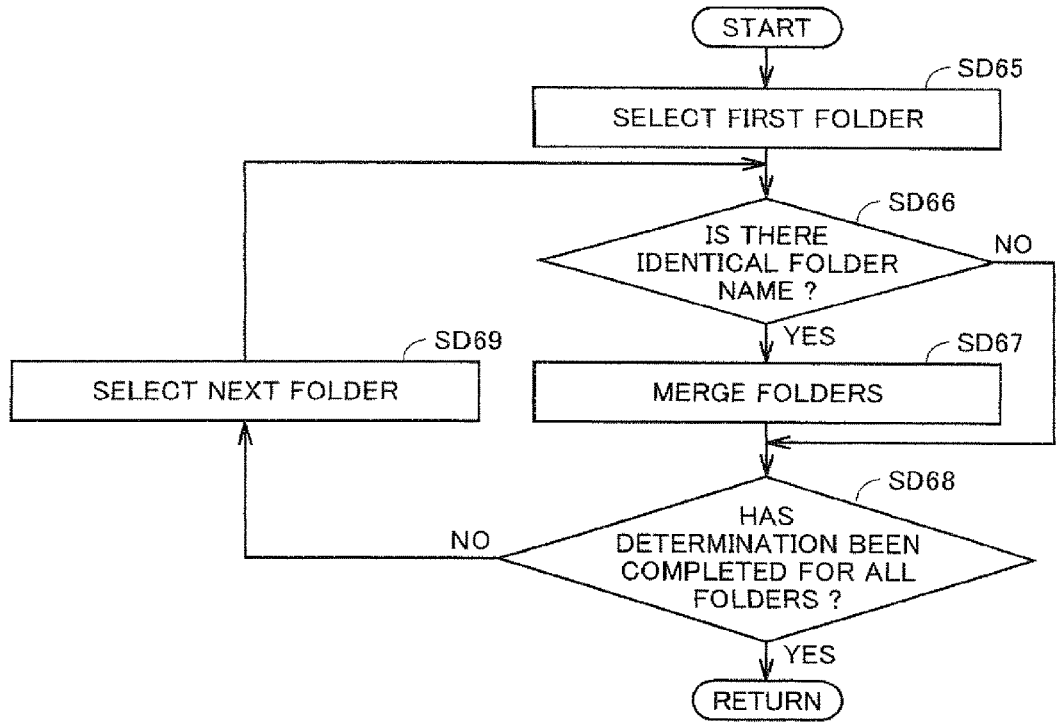
FIG. 71 is a flowchart illustrating sub routine processing of processing for determining a folder name.

FIG. 71 is a flowchart illustrating sub routine processing of the processing for determining a folder name.

Referring to FIG. 71, CPU 31 selects a first folder extracted in the processing for search of the folder in FIG. 69 (step SD65). Then, CPU 31 determines whether there is an identical folder name or not (step SD66).

When CPU 31 determines in step SD66 that there is an identical folder name, CPU 31 merges the folders (step SD67).

On the other hand, when CPU 31 determines in step SD66 that there is no identical folder, the process proceeds to step SD68. CPU 31 determines in step SD68 whether or not determination has been completed for all folders extracted in the processing for search of the folder in FIG. 69.

When CPU 31 determines in step SD68 that determination has not been completed for all folders, CPU 31 selects a next folder extracted in the processing for search of the folder in FIG. 69 (step SD69). Then, the process returns to step SD66 and the processing in steps SD66 to SD69 described above is repeated.

When CPU 31 determines in step SD68 that determination has been completed for all folders, the process then proceeds to the folder arrangement processing (step SD61) in FIG. 70.

Referring again to FIG. 70, in the folder arrangement processing (step SD61), the folders or the like merged in the folder name determination processing (step SD60) are arranged in accordance with a prescribed order of arrangement based on a name, a symbol, or the like.

Then, the process again returns to FIG. 68 (return).

Referring to FIG. 68, in step SD32, in accordance with the order of folders arranged in the folder arrangement processing (step SD61), the folder list is then displayed on the music reproduction folder list selection screen (step SD32).

Figure 72:
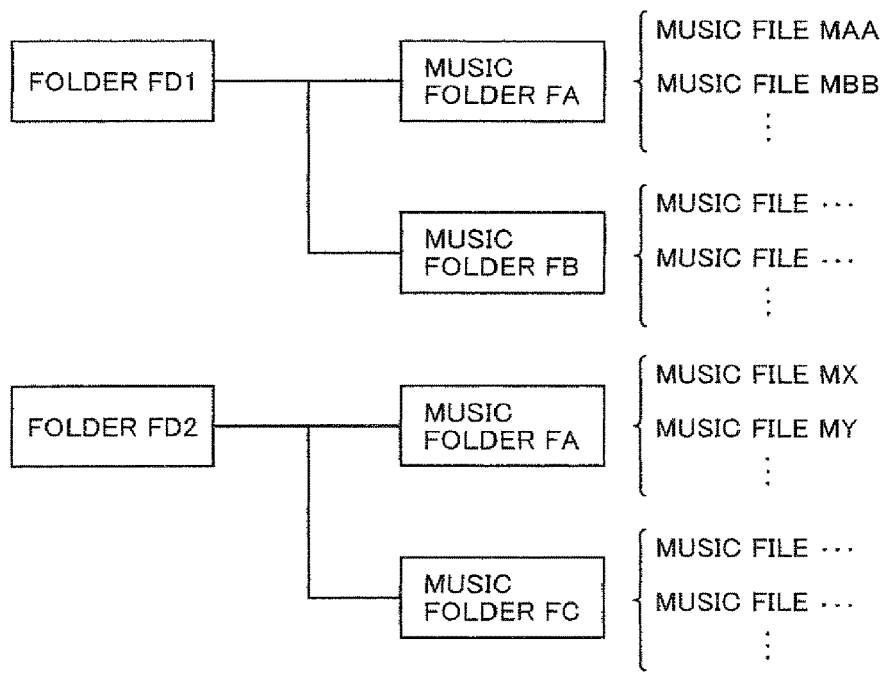
FIG. 72 is a diagram illustrating a specific example illustrating folder search processing.

FIG. 72 is a diagram illustrating a specific example illustrating the folder search processing.

Here, for example, a list structure of music files and folders stored in one SD card is shown.

Referring to FIG. 72, specifically, for example, a case where a folder FD1 and a folder FD2 are provided and music folder FA and music folder FB are provided in folder FD1 is shown.

Then, a case where a music file MAA, a music file MBB, . . . are included in music folder FA is shown.

In addition, a case where a music file . . . are included in music folder FB is shown.

A case where music folder FA and a music folder FC are provided in folder FD2 is shown.

Then, a case where music files MX, MY are included in music folder FA is shown.

In addition, a case where a music file . . . are included in music folder FC is shown.

In a case where folders having such a tree structure are stored in the SD card, four music folders of music folders FA, FB, FA, FC storing music files are extracted in the processing in accordance with the flow described in connection with FIG. 69.

In the processing in accordance with the flow described in connection with FIG. 71, as music folder FA stored in folder FD1 and music folder FA stored in folder FD2 have the same folder name, music files stored in respective music folders FA are merged. As a result of such merging, in the example described above, music file MAA, music file MBB, . . . , music file MX, music file MY, . . . are displayed in a list as music files belonging to music folder FA, in music file list screen 501# as illustrated in FIG. 63(*b*) or music file selection list screen 503# as illustrated in FIG. 70(*b*).

In this processing, merging is carried out based on the same folder name, whereby the folder list is displayed on the folder list selection screen. Thus, if folders having the same name are present in the attached memory card (SD card), display in a list as belonging to the same group is provided. Therefore, no disadvantageous condition in folder extraction processing due to a folder configuration in the SD card, such as presence of a plurality of identical folder names, is caused and convenience can be improved.

In the present embodiment, in order to group music files within the attached memory card (SD card), folder information in the memory card is utilized as it is, without utilizing attribute information of music files (music files present in the same folder are handled as belonging to the same group). In addition, regardless of levels where folders are present, all folders are displayed in parallel (in one level) in music reproduction folder list selection screen 500 or the like. Specifically, in the example of FIG. 72 where music files are present in both of folder FD1 and folder FD2, folder FD1, folder FD2, music folder FA, music folder FB, and music folder FC are displayed in a list in parallel on music reproduction folder list selection screen 500. Thus, in spite of a complicated level configuration in the memory card, for example, even a child or the like representative of the user can readily find a desired music file.

In addition, since the folder name registered in the memory card is directly utilized on music reproduction folder list selection screen 500 or the like as the name of the folder handled as belonging to the same group, the user can readily locate a desired music file and convenience is improved.

In addition, as described previously, in music reproduction folder list selection screen 500, since the name of each folder extracted from the memory card (which also serves as a touch button for display in a list of music files belonging to each folder) and the favorite folder (which also serves as a touch button for display in a list of music files registered as favorite) are displayed in parallel (in one level), an operation to select a folder is facilitated and convenience is further improved. In addition, as the "random" folder is displayed in parallel in such a list, convenience is further improved.

Referring again to FIG. 68, after the music reproduction folder list selection screen is displayed in step SD32, CPU 31 then determines whether the touch position data has been input from touch panel 13 or not (step SD33). CPU 31 determines whether or not the touch position data has been input from touch panel 13 through I/F circuit 42. Namely, CPU 31 determines whether a touch operation with touch pen 27 by the user has been performed or not. In other words, CPU 31 determines whether the coordinate value input through the user's operation of touch panel 13 is detected or not. When the touch position data has not been input (NO in step SD33), the processing in step SD33 is repeated.

On the other hand, when the touch position data has been input (YES in step SD33), the process proceeds to step SD34.

Then, CPU 31 determines whether the coordinate value indicating the touch position data is within the display range of the folder list or not (step SD34).

When CPU 31 determines in step SD34 that the coordinate value indicated by the touch position data is within the display range of the folder list, CPU 31 performs the processing for scroll display of the folder list in accordance with the trail of movement from the touch position or the touch position with the touch pen (step SD35).

Thereafter, CPU 31 performs the processing for moving the slider position on folder list scroll bar 510 in accordance with the position of the selected folder in the folder list (step SD35#). Then, the process again returns to step SD33. It is noted that the processing in steps SD35 and SD35# may be interchanged, which is also applicable hereinafter.

In the present example, as the description is given by way of example assuming that the position of cursor 520 is not changed, only the processing for scroll display of the folder list is described. As described above, however, display processing can also be performed such that the position of cursor 520 is moved to a position in accordance with a touch position which is a position touched with touch pen 27.

In this case, when the screen is touched and thereafter an operation to reset the touched state without changing the touch position from the originally touched position is performed (off the screen), only cursor 520 moves in accordance with the touch position. Here, the processing for scroll display of the folder list and the processing for moving the slider position on the folder list scroll bar are not performed.

Meanwhile, when an operation to touch the screen and move touch pen 27 etc. while maintaining the touched state, that is, an operation to change the touch position from the originally touched position while maintaining the touched state (drag operation), is performed, the processing for scroll display of the folder list is performed in accordance with the trail of movement (travel distance) of the touch pen. Here, the processing for moving also the slider position on the folder list scroll bar is performed.

On the other hand, when CPU 31 determines in step SD34 that the coordinate value indicated by the touch position data is not within the display range of the folder list, CPU 31 determines whether the coordinate value indicated by the touch position data is within the display range of volume setting icon 550 or not (step SD36).

When CPU 31 determines in step SD36 that the coordinate value indicated by the touch position data is within the display range of volume setting icon 550, CPU 31 then performs the volume setting processing (step SD37). Then, the process again returns to step SD33. The volume setting processing will be described later.

When CPU 31 determines in step SD36 that the coordinate value indicated by the touch position data is not within the display range of volume setting icon 550, CPU 31 then determines whether the coordinate value indicated by the touch position data is within the display range of "open" icon 514 or not (step SD38).

When CPU 31 determines in step SD36 that the coordinate value indicated by the touch position data is within the display range of "open" icon 514, CPU 31 then performs music file selection processing (step SD39). The music file selection processing will be described later.

On the other hand, when CPU 31 determines in step SD38 that the coordinate value indicated by the touch position data is not within the display range of "open" icon 514, CPU 31 then determines whether the coordinate value indicated by the touch position data is within the display range of folder list scroll bar 510 or not (step SD40).

When CPU 31 determines in step SD40 that the coordinate value indicated by the touch position data is within the display range of folder list scroll bar 510, CPU 31 performs the processing for scroll display of the folder list in accordance with the touch position (step SD41).

Thereafter, the processing for moving the slider position on folder list scroll bar 510 in accordance with the position of the selected folder in the folder list is performed (step SD42). Then, the process again returns to step SD33.

On the other hand, when CPU 31 determines in step SD40 that the coordinate indicated by the touch position data is not within the display range of folder list scroll bar 510, CPU 31 then determines whether the coordinate value indicated by the touch position data is within the display range of the selection function icon or not (step SD43).

When CPU 31 determines in step SD43 that the coordinate value indicated by the touch position data is within the display range of the selection function icon, CPU 31 performs the function corresponding to the selection function icon (step SD44).

On the other hand, when CPU 31 determines in step SD43 that the coordinate value indicated by the touch position data is not within the display range of the selection function icon, CPU 31 then determines whether the coordinate value indicated by the touch position data is within the display range of "back" icon 512 or not (step SD45).

When CPU 31 determines in step SD45 that the coordinate value indicated by the touch position data is within the display range of "back" icon 512, the processing in the music reproduction mode ends and the sound selection screen in step SD1 in FIG. 66 is displayed.

On the other hand, when CPU 31 determines in step SD45 that the coordinate value indicated by the touch position data is not within the display range of "back" icon 512, the process returns to step SD33.

Figure 73:
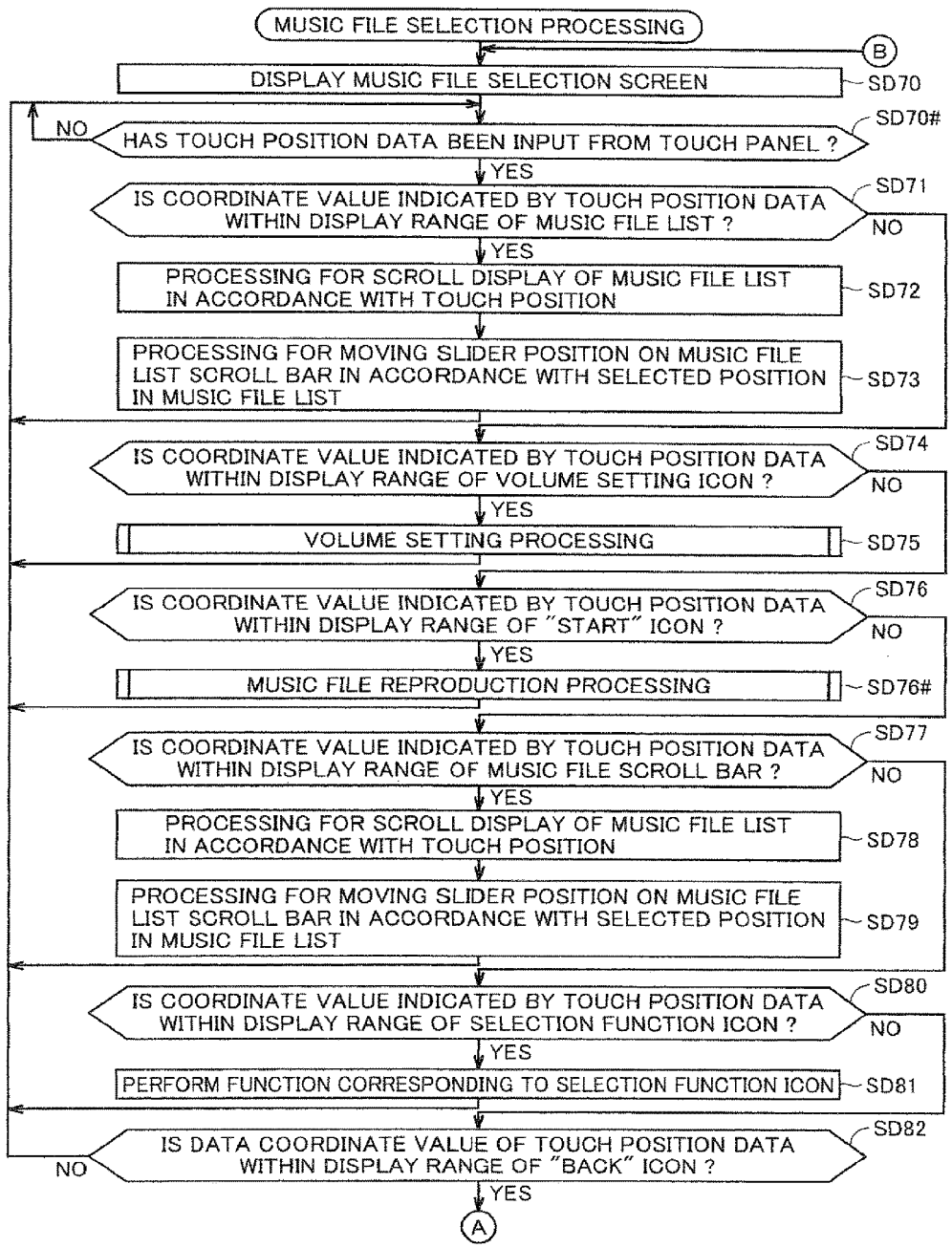
FIG. 73 is a flowchart illustrating sub routine processing of processing for selecting a music file.

FIG. 73 is a flowchart illustrating sub routine processing of the processing for selecting a music file.

Referring to FIG. 73, CPU 31 initially has music file selection screen 502 as described in connection with FIG. 64 displayed (step SD70).

CPU 31 then determines whether the touch position data has been input from touch panel 13 or not (step SD70#). CPU 31 determines whether or not the touch position data has been input from touch panel 13 through I/F circuit 42. Namely, CPU 31 determines whether a touch operation with touch pen 27 by the user has been performed or not. In other words, CPU 31 determines whether the coordinate value input through the user's operation of touch panel 13 is detected or not. When the touch position data has not been input (NO in step SD70#), the processing in step SD70# is repeated.

On the other hand, when the touch position data has been input (YES in step SD70#), the process proceeds to step SD71.

Then, CPU 31 determines whether the coordinate value indicated by the touch position data is within the display range of music file list 540 or not (step SD71).

When CPU 31 determines in step SD71 that the coordinate value indicated by the touch position data is within the display range of music file list 540, CPU 31 performs the processing for scroll display of music file list 540 in accordance with the touch position (step SD72).

Thereafter, CPU 31 performs the processing for moving the slider position on music file list scroll bar 510# in accordance with the position of the selected music file in the music file list (step SD73). Then, the process again returns to step SD70#.

On the other hand, when CPU 31 determines in step SD71 that the coordinate value indicated by the touch position data is not within the display range of music file list 540, CPU 31 then determines whether the coordinate value indicated by the touch position data is within the display range of volume setting icon 550 or not (step SD74). When CPU 31 determines in step SD74 that the coordinate value indicated by the touch position data is within the display range of volume setting icon 550, CPU 31 performs the volume setting processing (step SD75). Then, the process again returns to step SD70#. The volume setting processing will be described later.

When CPU 31 determines in step SD74 that the coordinate value indicated by the touch position data is not within the display range of volume setting icon 550, CPU 31 determines whether the coordinate value indicated by the touch position data is within the display range of a "start" icon 526 (step SD76).

When CPU 31 determines in step SD76 that the coordinate value indicated by the touch position data is within the display range of "start" icon 526, CPU 31 performs the music file reproduction processing (step SD76#). The music file reproduction processing will be described later.

On the other hand, when CPU 31 determines in step SD76 that the coordinate value indicated by the touch position data is not within the display range of "start" icon 526, CPU 31 then determines whether the coordinate value indicated by the touch position data is within the display range of music file list scroll bar 510# or not (step SD77).

When CPU 31 determines in step SD77 that the coordinate value indicated by the touch position data is within the display range of music file list scroll bar 510#, CPU 31 performs the processing for scroll display of music file list 540 in accordance with the touch position data (step SD78).

Thereafter, CPU 31 performs the processing for moving the slider position on music file list scroll bar 510# in accordance with the position of the selected music file in the music file list (step SD79). Then, the process again returns to step SD70#.

On the other hand, when CPU 31 determines in step SD77 that the coordinate value indicated by the touch position data is not within the display range of music file list scroll bar 510#, CPU 31 then determines whether the coordinate value indicated by the touch position data is within the display range of the selection function icon or not (step SD80).

When CPU 31 determines in step SD80 that the coordinate value indicated by the touch position data is within the display range of the selection function icon, CPU 31 performs the function corresponding to the selection function icon (step SD81). Then, the process again returns to step SD70#. For example, when determination that the coordinate value is within the display range of selection function icon 515 of "favorite" is made, favorite folder selection screen 509 described in connection with FIG. 102 above is displayed. By selecting any of the registration icons, processing for registering the music file in the selected folder is performed.

On the other hand, when CPU 31 determines in step SD80 that the coordinate value indicated by the touch position data is not within the display range of the selection function icon, CPU 31 then determines whether the coordinate value indicated by the touch position data is within the display range of a "back" icon 512# or not.

When it is determined in step SD82 that the coordinate value indicated by the touch position data is within the display range of "back" icon 512#, the process proceeds to "A" and the music reproduction folder list selection screen in step SD32 in FIG. 68 is displayed.

Figure 74:
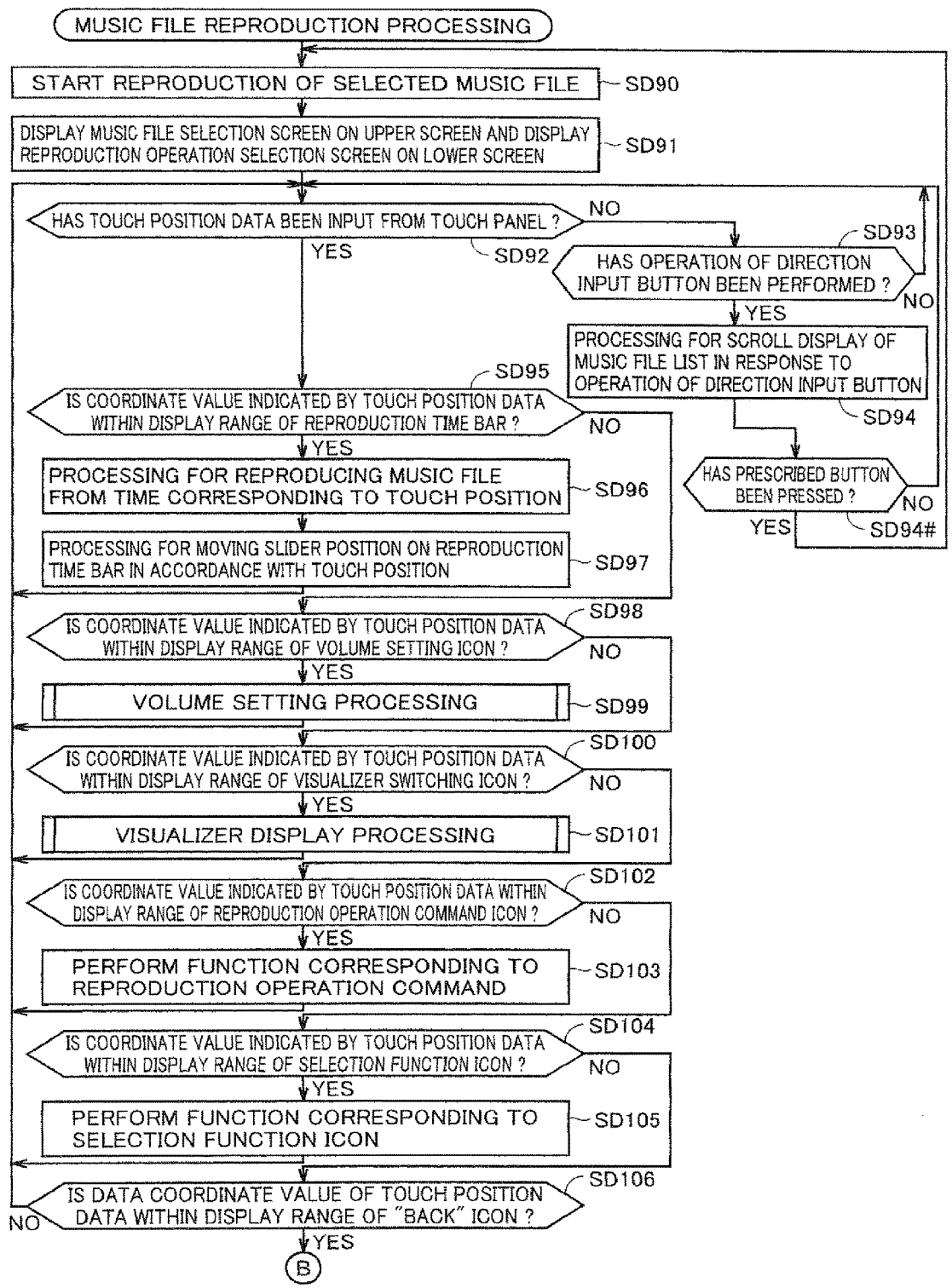
FIG. 74 is a diagram illustrating sub routine processing of processing for reproducing a music file.

FIG. 74 is a diagram illustrating sub routine processing of the processing for reproducing a music file.

Referring to FIG. 74, CPU 31 starts reproduction of the selected music file (step SD90).

As described above, in response to an instruction from CPU 31, audio output control circuit 42c provides output to the headphone through headphone amplifier 48 when headphone 18 is connected, and it provides output to right speaker 45, 47 through amplifier 44, 46 when the headphone is not connected.

Thereafter, the music file selection screen is displayed on upper LCD 22 and the reproduction operation selection screen is displayed on lower LCD 12 (step SD91).

Thereafter, CPU 31 determines whether the touch position data has been input from touch panel 13 or not (step SD92).

When CPU 31 determines in step SD92 that the touch position data has not been input from touch panel 13, CPU 31 then determines whether the operation of direction input button 14A has been performed or not (step SD93).

When CPU 31 determines in step SD93 that the operation of direction input button 14A has been performed, CPU 31 performs the processing for scroll display of the music file list selected by the cursor position on the music file selection screen in accordance with the operation of direction input button 14A (step SD94).

On the other hand, when CPU 31 determines in step SD93 that the operation of direction input button 14A has not been performed, the process again returns to step SD92.

Then, CPU 31 determines whether a prescribed button has been pressed or not (step SD94#).

When the prescribed button has been pressed in step SD94#, CPU 31 starts reproduction of the music file selected by the cursor position (step SD90).

On the other hand, when the prescribed button has not pressed in step SD94#, the process again returns to step SD92. Here, it is assumed that any of operation buttons 14B to 14E is set as the prescribed button.

When the touch position data has been input from touch panel 13 in step SD92, CPU 31 then determines whether the coordinate value indicated by the touch position data is within the display range of reproduction time bar 511 or not (step SD95).

When CPU 31 determines in step SD95 that indication by the touch position data is within the display range of reproduction time bar 511, CPU 31 performs the processing for reproducing the music file from the time corresponding to the touch position (step SD96).

Then, CPU 31 performs the processing for moving the slider position indicating the reproduction position in the total duration of the music file on reproduction time bar 511 in accordance with the touch position (step SD97). Then, the process again returns to step SD92.

When CPU 31 determines in step SD95 that the coordinate value indicated by the touch position data is not within the display range of reproduction time bar 511, CPU 31 then determines whether the coordinate value indicated by the touch position data is within the display range of volume setting icon 550 or not (step SD98).

When CPU 31 determines in step SD98 that the coordinate value indicated by the touch position data is within the display range of volume setting icon 550, CPU 31 performs the volume setting processing (step SD99). Then, the process again returns to step SD92. The volume setting processing will be described later.

On the other hand, when CPU 31 determines in step SD98 that the coordinate value indicated by the touch position data is not within the display range of volume setting icon 550, CPU 31 then determines whether the coordinate value indicated by the touch position data is within the range of visualizer switching icon 531 or not (step SD100).

When CPU 31 determines in step SD100 that the coordinate value indicated by the touch position data is within the display range of visualizer switching icon 531, CPU 31 then performs the visualizer display processing (step SD101). Then, the process again returns to step SD92. The visualizer display processing will be described later.

When CPU 31 determines in step SD100 that the coordinate value indicated by the touch position data is not within the display range of visualizer switching icon 531, CPU 31 then determines whether the coordinate value indicated by the touch position data is within the display range of a reproduction operation command icon or not (step SD402). Here, pause command icon 522, next music selection command icon 524 and previous music selection command icon 520 are provided by way of example of the reproduction operation command icon.

When CPU 31 determines in step SD402 that the coordinate value indicated by the touch position data is within the display range of the reproduction operation command icon, CPU 31 performs the function corresponding to the reproduction operation command (step SD103). Then, the process again returns to step SD92.

Specifically, when it is determined that the coordinate value indicated by the touch position data is within the display range of pause command icon 522, CPU 31 causes the reproduction operation to pause. Alternatively, when it is determined that the coordinate value indicated by the touch position data is within the display range of next music selection command icon 524, CPU 31 starts reproduction of the next selected music file. On the other hand, when it is determined that the coordinate value indicated by the touch position data is within the display range of previous music selection command icon 521, CPU 31 starts reproduction of the previously selected music file.

When CPU 31 determines in step SD402 that the coordinate value indicated by the touch position data is not within the display range of the reproduction operation command icon, CPU 31 then determines whether the coordinate value indicated by the touch position data is within the display range of the selection function icon or not.

When CPU 31 determines in step SD104 that the coordinate value indicated by the touch position data is within the display range of the selection function icon, CPU 31 then performs the function corresponding to the selection function icon (step SD105). Then, the process again returns to step SD92. For example, in the present example, "favorite" icon 515, reproduction mode switching icon 517, speed and key adjustment icon 541, tone adjustment icon 542, and recording data selection icon 544 are displayed as the selection function icon.

Specifically, as described above, when CPU 31 determines that the coordinate value indicated by the touch position data is within the display range of "favorite" icon 515, CPU 31 performs the processing for moving the currently selected music file to the favorite folder.

Alternatively, when CPU 31 determines that the coordinate value indicated by the touch position data is within the display range of reproduction mode switching icon 517, CPU 31 switches the setting of the reproduction mode for display.

Alternatively, when CPU 31 determines that the coordinate value indicated by the touch position data is within the display range of speed and key adjustment icon 541, CPU 31 performs the function to change a reproduction speed or a key which will be described later.

Alternatively, when CPU 31 determines that the coordinate value indicated by the touch position data is within the display range of tone adjustment icon 542, CPU 31 performs the function for change to another tone by performing filtering processing for modulating a frequency which will be described later.

Alternatively, when CPU 31 determines that the coordinate value indicated by the touch position data is within the display range of recording data selection icon 544, CPU 31 performs the function to output an audio data file in which sound is recorded from the speaker as sound effect, as will be described later.

When CPU 31 determines in step SD104 that the coordinate value indicated by the touch position data is not within the display range of the selection function icon, CPU 31 then determines whether the coordinate value indicated by the touch position data is within the display range of a "back" icon 512*a* or not (step SD106).

When CPU 31 determines in step SD106 that the coordinate value indicated by the touch position data is not within the display range of "back" icon 512*a*, the process returns to step SD92.

On the other hand, when CPU 31 determines in step SD106 that the coordinate value indicated by the touch position data is within the display range of "back" icon 512*a*, the process proceeds to "B" and the music file selection screen is displayed in step SD70 in FIG. 73.

<Volume Setting Processing>

The volume setting processing will now be described.

FIG. 75 is an enlarged view of volume setting icon 550.

Referring to FIG. 75(*a*), volume setting icon 550 is provided with a slider 552, for example, of which position on the horizontal axis from left toward right indicates a greater volume.

Slider 552 is displayed at a position in accordance with a current value within a volume level parameter setting range.

Here, a region in a direction of lower volume relative to a position corresponding to the current value, at which slider 552 is displayed, is identified as a volume low region 554, and a region in a direction of higher volume relative to the position corresponding to the current value, at which slider 552 is displayed, is identified as a volume high region 555.

In the embodiment of the present invention, in a case where slider 552 is selected with the touch pen etc., the slider can continuously be operated to move (what is called a drag operation) in any direction toward volume low region 554 and volume high region 555 from the position corresponding to the current value, in accordance with a subsequent touch-and-slide operation (an operation to change the touch position with a touch-on state being maintained).

The case where slider 552 is selected with the touch pen etc. includes (i) a case where slider 552 is touched and (ii) a case where the touch position enters slider 552 during the touch operation. Here, the drag operation of slider 552 may be performed only in the case (i), the drag operation may be performed only in the case (ii), or the drag operation may be performed in either of the case (i) or (ii).

Referring to FIG. 75(*b*), in a case where volume low region 554 other than slider 552 is touched with the touch pen etc., slider 552 can instantaneously be operated to move to the touch-on position. Thus, change to a volume lower than a current volume value can instantaneously be made. On the other hand, when volume high region 555 other than slider 552 is touched with the touch pen etc., slider 552 is not instantaneously operated to move to the touch-on position. Thus, change to a volume higher than the current volume value cannot instantaneously be made.

The case where volume low region 554 is touched includes (i) a case where somewhere within volume low region 554 is touched and (ii) a case where the touch position enters volume low region 554 during the touch operation. Here, slider 552 may instantaneously be moved to the touch-on position only in the case (i), slider 552 may instantaneously be moved to the touch position only in the case (ii), or slider 552 may instantaneously be moved in either of the case (i) or (ii).

In addition, when volume low region 554 is touched, slider 552 is instantaneously moved to the touch position, and when the slide operation follows, the drag operation as described above can be performed.

Figure 76:
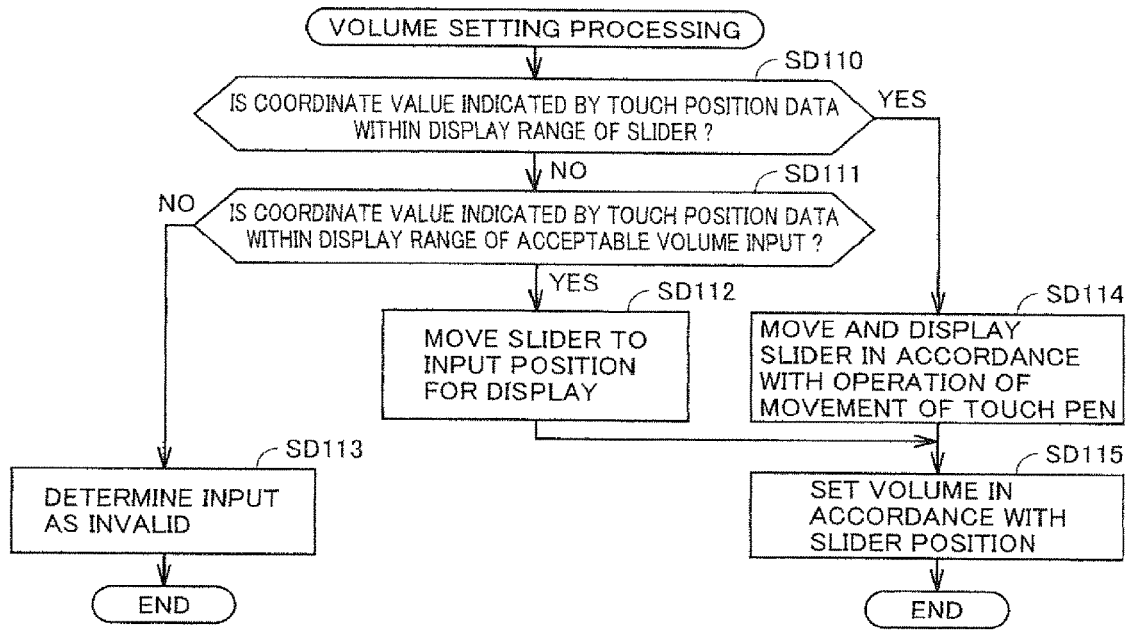
FIG. 76 is a flowchart illustrating sub routine processing of volume setting processing according to the present embodiment.

FIG. 76 is a flowchart illustrating sub routine processing of the volume setting processing according to the present embodiment.

Referring to FIG. 76, when CPU 31 determines that the coordinate value indicated by the touch position data is within the display range of volume setting icon 550, CPU 31 determines whether the coordinate value indicated by the touch position data is within the display range of slider 552 or not (step SD110).

When CPU 31 determines in step SD110 that the coordinate value indicated by the touch position data is within the display range of the slider, slider 552 is moved to and displayed at the most recent touch position in accordance with the trail of movement of the touch pen that keeps touching the screen (slide operation) (step SD114). Namely, a continuous operation of movement of slider 552 from the current position to a desired position within the volume level parameter setting range is accepted.

Then, CPU 31 sets the volume in accordance with the position of slider 552 (step SD115). Namely, the volume level parameter is updated to a value in accordance with the position of slider 552 resulting from movement in accordance with a moving operation. In this regard, as slider 552 continuously moves from the current position to the desired position, the volume level parameter is gradually adjusted along with movement.

On the other hand, when CPU 31 determines in step SD110 that the coordinate value indicated by the touch position data is not within the display range of slider 552, CPU 31 then determines whether the coordinate value indicated by the touch position data is within the display range of acceptable volume input or not (step SD111).

When CPU 31 determines in step SD111 that the coordinate value indicated by the touch position data is within the display range of acceptable volume input, slider 552 is moved to and displayed at the position input with the touch pen (step SD112). Then, the volume in accordance with the position of slider 552 within the parameter setting range is set (step SD115).

On the other hand, when CPU 31 determines in step SD111 that the coordinate value indicated by the touch position data is not within the display range of acceptable volume input, CPU 31 performs invalid input determination processing (step SD113). Namely, processing for determining the input as invalid is performed. Then, the process ends.

In the present embodiment, it is assumed that the volume low region is set as inside of the display range of acceptable volume input. Volume high region 555 is not set as inside of the display range of acceptable volume input. Specifically, in a case where the slider is moved in a direction of decrease from the current value of the parameter, in the present example, the input indicating the operation of moving the slider to the desired position in the volume low region is accepted. In a case where the slider is moved in a direction of increase from the current value of the parameter, in the present example, the input indicating the operation of moving the slider to the desired position in the volume high region is not accepted.

Therefore, slider 552 is immediately moved to the touch position in the volume low region and the volume in accordance with the slider position is set. On the other hand, touching the volume high region results in the invalid input determination processing, so that the slider is not moved and the volume in accordance with the slider position is not set.

As a result of such processing, abrupt increase in the volume caused by a user's erroneous operation while the volume setting processing is performed with the touch pen is avoided. Specifically, the position of the slider is varied with the touch pen in a direction of decrease in the volume and the volume setting processing in accordance with the slider position can be performed. In the direction of increase in the volume, however, the position of the slider is not varied with the touch pen and the volume is not increased.

In particular, in performing the setting processing using the touch pen, the user can freely designate any position on the touch panel but a display range of volume setting icon 550 cannot be great owing to layout restrictions. Accordingly, in performing the volume setting processing, though attention should be paid in designating a position in accordance with a desired volume level within the display range of volume setting icon 550, it is very likely that the user erroneously designates the direction of increase in the volume with the touch pen. Therefore, as a result of this processing, such stress imposed on the user that he/she operates game device 10 while being anxious about the possibility of abrupt increase in the volume caused by his/her erroneous operation can be suppressed.

In the above, regarding the operation of moving the slider to the desired position, a case where the slider is immediately moved to the position in the volume low region so that the volume in accordance with the slider position is set has been described, however, as in the continuous operation of moving the slider, such setting that the volume level parameter is gradually adjusted can also be made.

Figure 77:
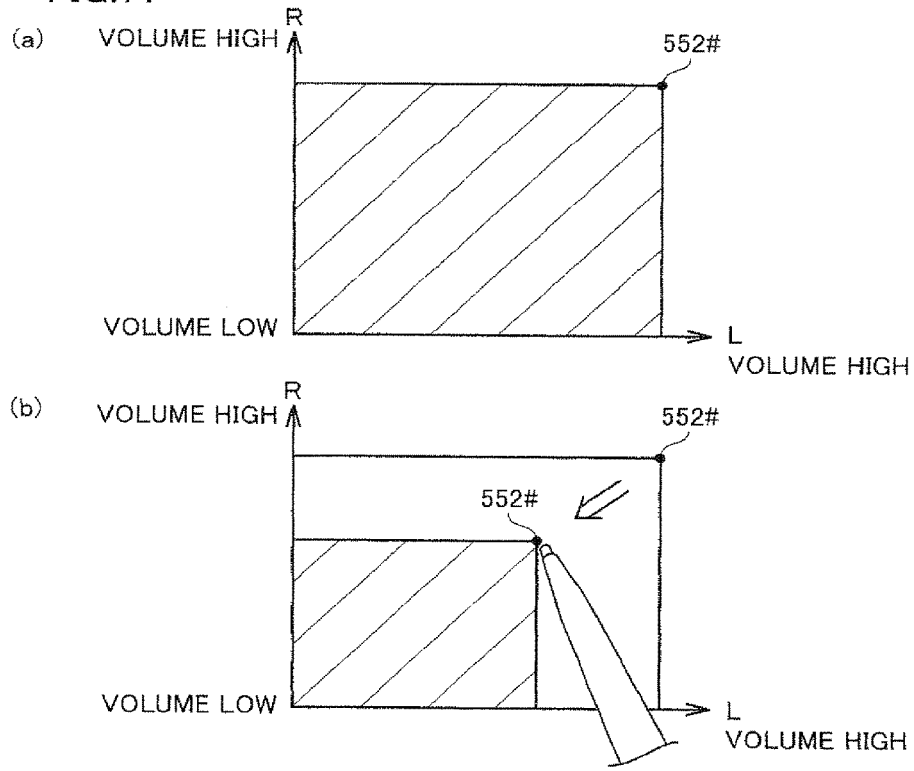
FIG. 77 is a diagram illustrating another example of the volume setting icon.

FIG. 77 is a diagram illustrating another example of the volume setting icon.

Referring to FIG. 77(a), a volume setting region for setting a volume at which output is provided from the right speaker and the left speaker is shown here.

Specifically, the ordinate (R) represents a volume level of the right speaker and the abscissa (L) represents a volume level of the left speaker. Namely, a coordinate value (position) at any point is associated with the volume level of the right speaker and the left speaker. Here, a point 552# indicating a position corresponding to the current volume level of the right speaker and the left speaker is displayed.

By touching point 552# with the touch pen, point 552# is selected. By moving the touch pen while the screen is being touched (performing the slide operation), the pointer is moved and displayed in accordance with the trail of movement. On the other hand, when a position other than point 552# is touched with the touch pen and this touched position is within the display range of acceptable audio input, point 552# is moved and displayed at the position of input with the touch pen.

Though a case where setting of two types of parameters, that is, the volume level of the right speaker and the left speaker, is associated with the coordinate value (position) on the abscissa and the ordinate has been described here, the setting may be associated with more types of parameters, without limited to two types of parameters. Regarding display of a parameter setting range, when a single parameter is set, for example, a position of the parameter may be displayed one-dimensionally, that is, on the abscissa. On the other hand, for example, when two parameters are set, a position of the parameters may be displayed two-dimensionally, that is, on the ordinate and the abscissa. Further, when a plurality of types of parameters are set, a position of the parameters may be displayed multi-dimensionally, in accordance with the number of types thereof.

Referring to FIG. 77(b), the case where a position within the display range of acceptable volume input is touched with the touch pen and the volume level in accordance with this position is immediately set is shown here. Namely, for example, a direction of decrease in the volume of at least any one of the right speaker and the left speaker with the use of the touch pen is set as inside of the display range of acceptable volume input, however, other regions are not set as inside of the display range of acceptable volume input.

Therefore, when a position other than point 552# is touched, pointer 552# is not moved in a direction of increase in the volume, which is outside of the display range of acceptable audio input, in spite of touch with the touch pen. Thus, the volume is prevented from becoming excessively high and having the user feel uncomfortable can be suppressed.

In the present example, a case where the display range of volume setting icon 550 is divided into the display range of acceptable audio input and otherwise has been described. Such division, however, is not limited to division relating to volume setting, and for example, the reproduction time bar described in connection with FIG. 65 can also be divided into a display range of acceptable input and otherwise. For example, an already-reproduced position is defined as inside of the display range of acceptable input, and a position where reproduction has not yet been carried out is defined as outside of the display range of acceptable input so that only a continuous operation of moving slider 519 is allowed. As a result of such processing, start of reproduction in response to touching with the touch pen from a position where reproduction has not yet been carried out is prevented and having the user feel uncomfortable can be suppressed.

<Speed and Key Adjustment Processing>

Figure 78:
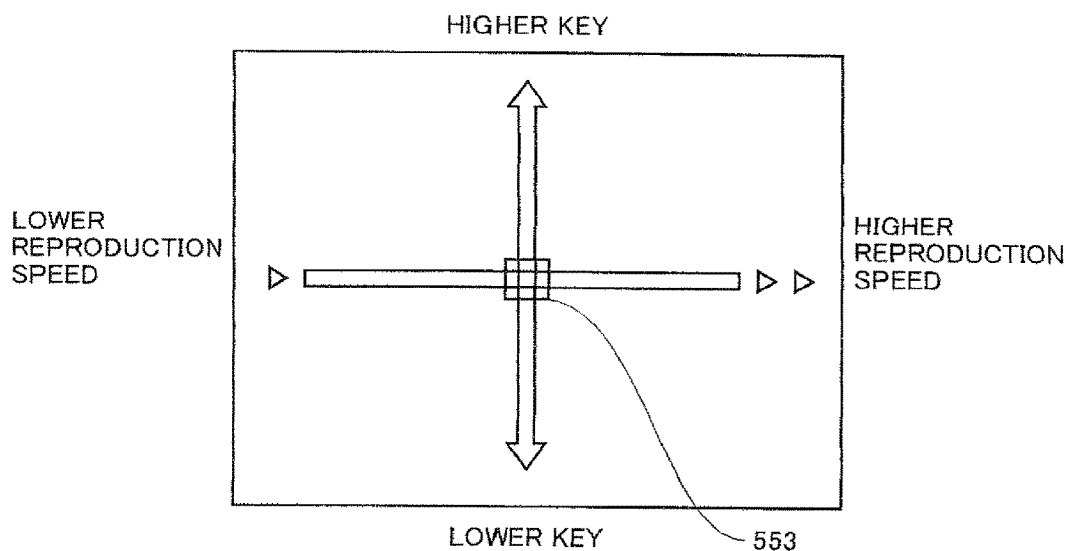
FIG. 78 is a diagram illustrating a function to change a reproduction speed or a key by selecting a speed and key adjustment icon.

FIG. 78 is a diagram illustrating a function to change a reproduction speed or a key by selecting speed and key adjustment icon 541.

Referring to FIG. 78, a speed and key adjustment screen displayed on the screen of lower LCD 12 by pressing speed and key adjustment icon 541 is shown here.

Here, the user uses the touch pen etc. to select and move a slider 553, so that adjustment to a reproduction speed and a key corresponding to a moved position can be made. Specifically, by moving the slider toward the right from a current position of slider 553, the reproduction speed can be made faster. In contrast, by moving the slider toward the left, the reproduction speed can be made slower. In addition, by moving slider 553 upward from the current position of slider 553, the key can be made higher. In contrast, by moving slider 553 downward, the key can be lowered.

By performing this function, the reproduced and output audio signal can be varied as the user desires.

<Tone Adjustment Processing>

Figure 79:
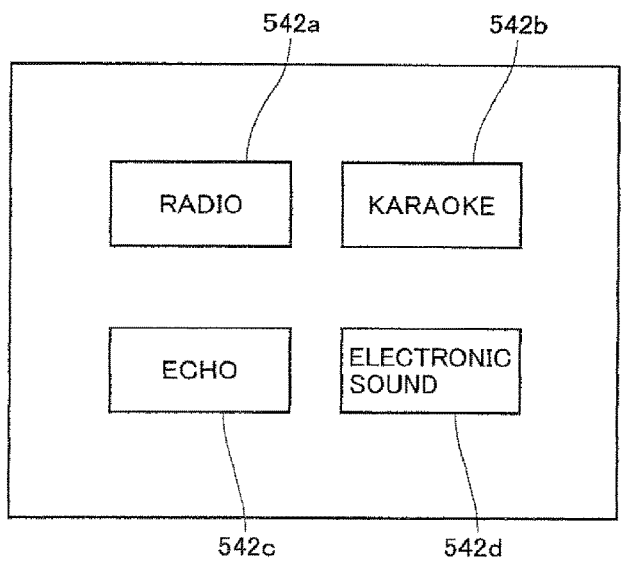
FIG. 79 is a diagram illustrating a function for change to another tone by modulating a frequency of a reproduction signal, performing filtering processing or the like, based on selection of a tone adjustment icon.

FIG. 79 is a diagram illustrating a function for change to another tone by modulating a frequency of a reproduction signal or performing filtering processing or the like based on selection of tone adjustment icon 542.

Referring to FIG. 79, a tone adjustment icon selection screen displayed on the screen of lower LCD 12 by pressing tone adjustment icon 542 is shown here.

Four tone adjustment selection icons are provided here. Specifically, a "radio" icon 542a for adjusting sound to such a tone as heard on a radio by modulating a frequency, a "karaoke" icon 542b suppressing vocals based on subtraction of left and right sound from a stereophonic sound source, an "echo" icon 542c for making sound echo through filtering processing, and an "electronic sound" icon 542d for varying sound to an electronic tone by modulating a frequency are provided. When the user selects any of these four tone adjustment selection icons by using the touch pen etc., the function of the selected icon is performed.

Though a case where four tone adjustment selection icons are provided and sound can be adjusted to four types of tones has been described here, any number of icons may be provided, without particularly limited to four. By providing a plurality of tone adjustment selection patterns, adjustment to a tone as desired by the user can be made.

Here, regarding the function of "karaoke" icon 542b, a case of suppression of vocals based on subtraction of left and right sound from the stereophonic sound source is described. This processing is performed generally because vocal sound or the like is localized in the center of a sound field of the stereophonic sound source and ambient sound or the like is localized on the left and right except for the center. Vocals can also be suppressed with other methods without particularly limited to this method.

<Sound Effect Selection Processing>

Figure 80:
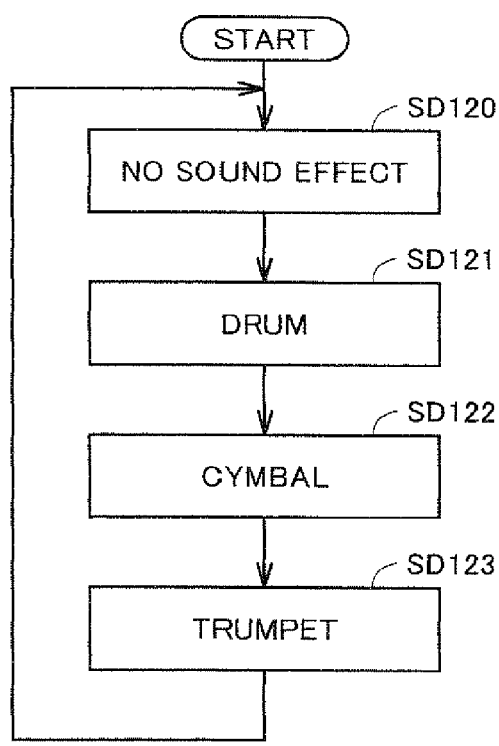
FIG. 80 is a diagram illustrating a case where sound effect output from a speaker or the like is changed in response to a user's operation of an R button and an L button for selecting a sound effect selection icon.

FIG. 80 is a diagram illustrating a case where sound effect output from a speaker or the like is changed in response to a user's operation of R button 14J and L button 14I for selecting sound effect selection icon 532, 534. In the present embodiment, by operating R button 14J and L button 14I, sound effect can additionally be produced for fun during reproduction of music based on a music file.

Referring to FIG. 80, the sound effect can be changed by selecting sound effect selection icon 532, 534 shown in FIG. 65. Specifically, in an initial state, a "no sound effect" state is set (step SD120). Thereafter, sound effect selection icon 532 is selected once, to set the sound effect of "drum" (step SD121). Thereafter, by selecting sound effect selection icon 532, the sound effect of "cymbal" is set (step SD122). Thereafter, by selecting sound effect selection icon 532, the sound effect of "trumpet" is set (step SD123). By selecting sound effect icon 532 again, the "no sound effect" state is set (step SD120). Namely, switching between the sound effects output from the speaker or the like can be made in accordance with the number of times of selection of the sound effect selection icon. In the present example, by selecting sound effect selection icons 532, 534 with R button 14J and L button 14I respectively, sound effect in accordance with the button operation can be set.

Here, a case where switching in the order of "no sound effect", "drum", "cymbal", and "trumpet" is made is described, however, the order is not particularly limited as such and any order can be set. In addition, such setting as switching to a plurality of sound effects can also naturally be made. Moreover, such setting that types of sound effects are different between R button 14J and L button 14I respectively can also be made.

<Visualizer Display Processing>

FIG. 81 is a diagram illustrating visualizer display processing according to the present embodiment.

When CPU 31 determines in step SD100 in FIG. 74 that the coordinate value indicated by the touch position data is within a range of visualizer switching icon 531, CPU 31 performs the visualizer display processing.

FIG. 81(a) shows the reproduction operation selection screen on lower LCD 12. As the screen is the same as described in connection with FIG. 65, detailed description thereof will not be repeated.

FIG. 81(b) shows the visualizer display screen on upper LCD 22.

Figure 82:
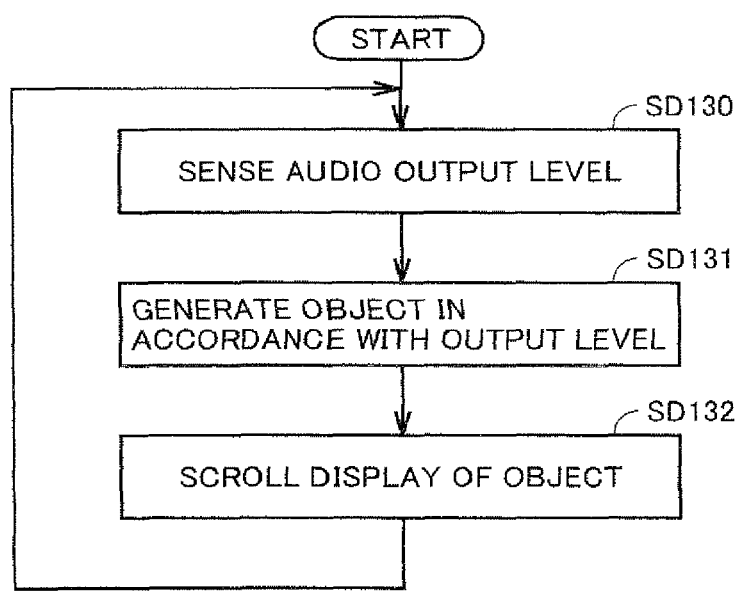
FIG. 82 is a flowchart illustrating sub routine processing of the visualizer display processing.

FIG. 82 is a flowchart illustrating sub routine processing of the visualizer display processing.

Referring to FIG. 82, initially, an audio output level is sensed (step SD130). Specifically, output level sensing circuit 42d senses the output level of the audio signal output from audio output control circuit 42c to amplifiers 44, 46 and outputs the result to CPU 31.

Thereafter, CPU 31 generates an object in accordance with the output level sensed by output level sensing circuit 42d (step SD131).

Thereafter, scroll display of the object is provided (step SD132). The process again returns to step SD130 and the processing above is repeated.

Specifically, in FIG. 81(b), as the output level of the audio signal being reproduced is successively sensed, new objects are successively generated at positions in accordance with the output level, and scroll display of these objects is provided. In the present embodiment, an object 801 (specifically, a ground object) is sequentially generated at a height in accordance with the output level at the right end of a visualizer display area and scroll display of the entire picture toward the left is provided. In addition, on the ground object thus generated, another object (in the present example, objects 802 and 803, for example) in automatically controlled operation is provided (that is, moves horizontally along the ground on the screen or jumps).

In the present example, the height of the ground object is determined by the total output level of the audio signal being reproduced from right and left speakers 45 and 47, or alternatively the controlled operation of a first object (in the present embodiment, object 802 in a motorcycle form) (speed, acceleration, height of jump, etc.) is determined by the output level of right speaker 45 and the controlled operation of a second object (in the present embodiment, object 803 in a motorcycle form) is determined by the output level of left speaker 47.

Without limited to the above, in yet another example, the height of the ground object for the first object (in the present embodiment, object 802) or the controlled operation (speed, acceleration, height of jump, etc.) of the first object may be determined by the output level of a signal for right speaker 45 of the audio signal, and the height of the ground object for the second object (in the present embodiment, object 803) or the controlled operation of the second object may be determined by the output level of a signal for left speaker 47 of the audio signal.

The user can visually recognize variation of the output level based on the height of a geographic feature in accordance with the output level of the audio signal. In addition, as two objects 802 and 803 in a motorcycle form jump in accordance with the height of the geographic feature, the user can visually recognize variation of the output level of the audio signal also based on variation of objects 802 and 803.

In addition, relative positional relation between two objects 802 and 803 in a motorcycle form may be varied, depending on a difference in the volume level between the audio signal output from right speaker 45 and the audio signal output from left speaker 47.

If the processing for reproducing the selected music file pauses, there is no variation of the geographic feature in accordance with the output level above and hence scroll display of a flat geographic feature object is provided. Here, for example, when the user operates L button 14I and R button 14J described above, the sound effect is output from the speaker or the like. Therefore, the output level of the audio signal of the sound effect is sensed, the geographic object in accordance with the output level of the audio signal is generated, and scroll display thereof is provided. The visualizer display screen hereinafter is also processed in accordance with a similar scheme.

FIG. 83 is a diagram illustrating another visualizer display screen.

Referring to FIGS. 83 (*a*) and (*b*), a visualizer for generation and scroll display on upper LCD 22 of an object 301*a* in a snowball shape having a size in accordance with the sensed output level of the audio signal is shown here. Scroll display of a geographic feature showing a slope is provided behind object 301*a* in a snowball shape and such scroll display as object 301*a* in a snowball shape rolling down the slope is provided.

Comparing FIG. 83(*a*) with FIG. 83(*b*), a case that object 301*a* in a snowball shape in FIG. 83(*a*) is greater than object 301*a* in a snowball shape in FIG. 83(*b*) in accordance with the sensed output level of the audio signal is shown here.

As a size of object 301*a* in a snowball shape varies, the user can visually recognize variation of the output level of the audio signal in accordance with the size of object 301*a* in a snowball shape.

In addition, as object 301*a* in a snowball shape bounds at prescribed timing during scroll display of the geographic feature showing the slope, the size of object 301*a* in a snowball shape can further visually be recognized.

Figure 84:
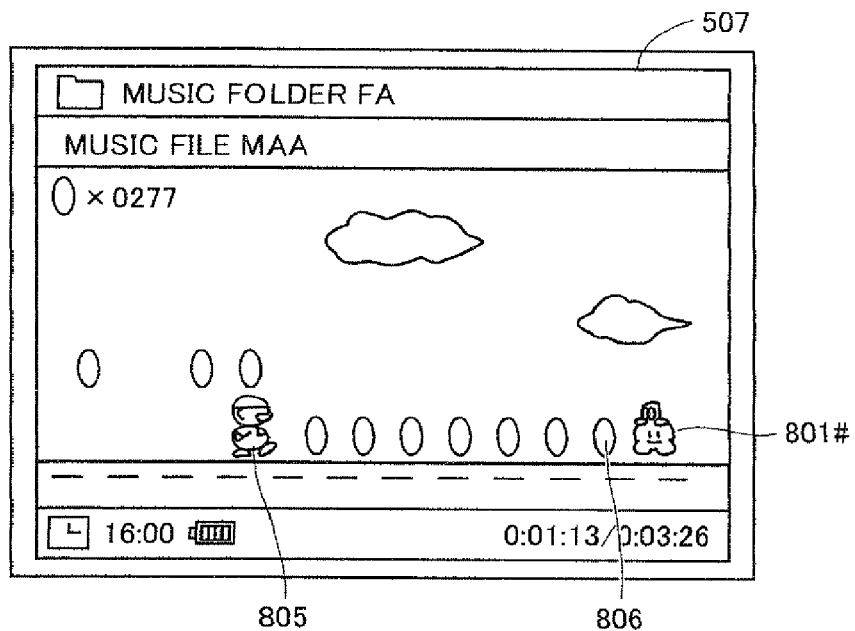
FIG. 84 is a diagram illustrating yet another visualizer display screen.

FIG. 84 is a diagram illustrating yet another visualizer display screen.

Referring to FIG. 84, a visualizer for generation and scroll display on upper LCD 22 of an object 301# in a prescribed character shape at a height in accordance with the sensed output level of the audio signal is shown here. In addition, setting is made such that scroll display of a background region of the screen from a right end of the screen to a left end of the screen is provided, and objects 606 in a coin shape are continuously arranged at prescribed intervals from the position of object 301# in a prescribed character shape and scroll display thereof from the right end of the screen to the left end of the screen is provided.

In addition, setting is made such that an object 605 in another prescribed character shape is displayed, and for example, the object can jump in the screen in response to a user's operation. Moreover, setting is made such that, when object 605 in a prescribed character shape is superimposed on object 606 in a coin shape, object 605 in a coin shape disappears and the number of times of superposition on object 605 in a coin shape is displayed in the upper left field of the screen.

Therefore, the user can visually recognize variation of the output level of the audio signal based on variation of the height of object 301#. In addition, as objects 606 in a coin shape are also continuously arranged in accordance with the height of object 301#, the user can visually recognize variation of the output level of the audio signal also based on the height of object 606 in a coin shape.

Namely, a display position of a third object (in the present embodiment, object 806 in a coin shape) is determined by the output level of the audio signal. Specifically, the third object is displayed at the height in accordance with the output level, at an end portion of a display area of a virtual space and thereafter scroll display of the third object in a direction toward an opposite end portion is provided. Then, in response to the user's operation, movement of a fourth object (in the present embodiment, object 805 in a prescribed character shape) is controlled. Prescribed game processing is then performed in accordance with positional relation between the third object and the fourth object. Thus, the output level can be checked during reproduction of music and the user can have fun based on his/her operation.

Further, as the user can operate object 605 in a prescribed character shape by providing an operation input. As object 606 in a coin shape disappears when object 605 is superimposed on object 606 in a coin shape, the user can recognize variation of the output level of the audio signal also based on his/her own operation input (pressing of a button).

In the present example, visualizer display processing in three patterns has been described, however, the pattern is not limited to three. A single pattern may be provided, or a function of visualizer display processing in a further greater number of patterns may also be provided.

For example, such setting that switching among three patterns of visualizer display processing is successively made in accordance with the number of times of touch with the touch pen of a position within a display range of visualizer switching icon 531 on the reproduction operation selection screen on lower LCD 12 shown in FIG. 81(*a*) can be made. For example, setting can be such that, by touching the position within the display range of visualizer switching icon 531 with the touch pen four times, the visualizer display processing ends and the screen in FIG. 65(*b*) is shown.

As described previously, in the present embodiment, the user can have fun by additionally producing the sound effect by performing the prescribed operation during reproduction of music based on the music files. In detection of the output level of the audio signal described above, not only the output of reproduction of music based on the music files but also the output of sound effect based on the user's operation are considered. Namely, the total output level of both of the audio signal based on the music files and the audio signal of the sound effect based on the user's operation is sensed as the output level of the audio signal described above. Thus, display contents on the visualizer are indirectly varied in response to the user's operation, and more specifically, a display position or an operation content of the object is varied.

<Headphone Output Processing>

Figure 85:
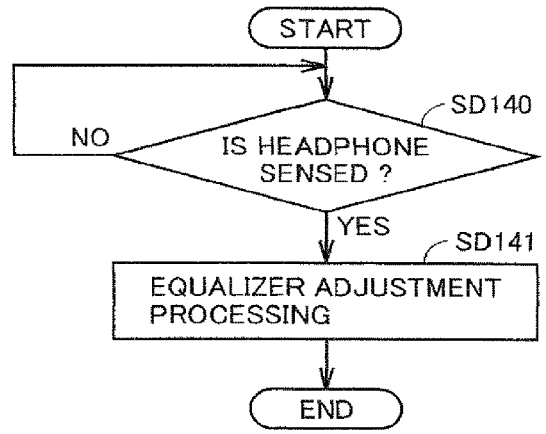
FIG. 85 is a diagram illustrating a flow when a headphone is sensed according to the present embodiment.

FIG. 85 is a diagram illustrating a flow in a case where the headphone is sensed according to the present embodiment. It is noted that headphone output processing is performed independently of other processing while the sound function is being performed.

Referring to FIG. 85, initially, whether the headphone is sensed or not is determined (step SD140). Specifically, I/F circuit 42 senses insertion of the plug of the headphone into the jack by sensing turn-on of a mechanical switch, for example, resulting from insertion of the plug of the headphone into jack 62 described in connection with FIG. 2 or an electrically conducting state resulting from insertion of the plug of the headphone into jack 62. Thereafter, I/F circuit 42 outputs the result of sensing to CPU 31, and CPU 31 determines attachment of the headphone upon receiving a signal indicating the result of sensing from I/F circuit 42.

When the headphone is sensed, CPU 31 then performs equalizer adjustment processing (step SD141).

The process then ends (end).

Comparing a case where the user wears the headphone to listen to the reproduced audio signal with a case where the user listens to the reproduced audio signal output from the speaker, wearing the headphone means covering of earholes. Accordingly, acoustic characteristics are significantly different from a case not wearing the headphone and hence the user may feel discomfort.

Therefore, in the present embodiment, when the headphone is sensed, equalization adjustment processing for adjusting a prescribed frequency band of audio data is performed so as not to produce an audio signal disagreeable to the user due to variation of acoustic characteristics.

Thus, even when the user listens to music data through the headphone, the audio signal agreeable to the user can be output. In addition, the volume of sound effect output in response to the user's operation of L button 14I and R button 14J can also be adjusted, or a type of sound effect described in connection with FIG. 80 can also be varied in accordance with sensing of the headphone.

Here, though a case where the equalization adjustment processing for adjusting a prescribed frequency band when the headphone is sensed is performed has been described, the processing is not particularly limited as such. When the headphone is sensed, the audio signal itself to be reproduced may be made different from the audio signal for reproduction from the speaker. For example, sound of high key that gives no uncomfortable feeling in reproduction from the speaker but sounds too high in listening through the headphone may be replaced with different sound of lower key, or sound accompanying noise in listening through the headphone may be replaced with different sound.

Alternatively, when the headphone is sensed, instead of changing the audio signal itself to be reproduced, the volume of the audio signal to be reproduced may be made different from the volume thereof in reproduction from the speaker. For example, an audio signal reproduced in balance without giving uncomfortable feeling in reproduction from the speaker but reproduced in poor volume balance in listening through the headphone may be adjusted by increasing or decreasing the volume thereof to attain balance.

<Sleep Processing>

Figure 86:
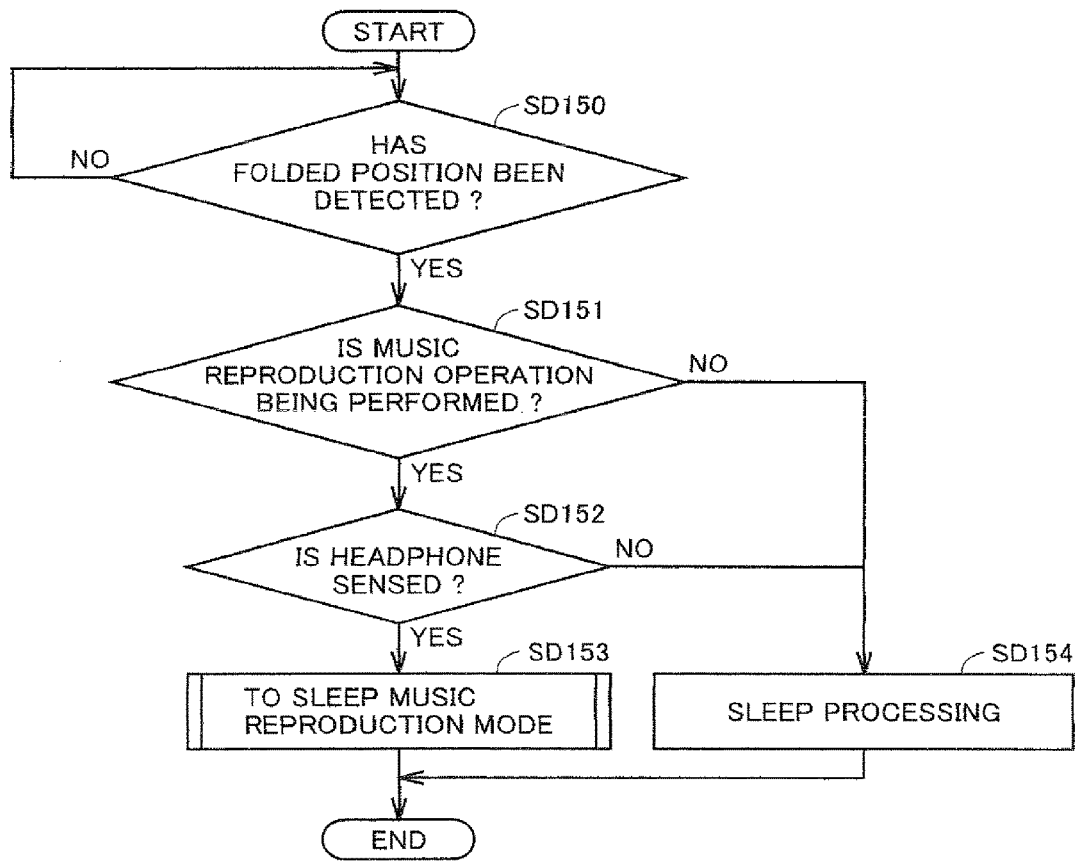
FIG. 86 is a flowchart illustrating sleep processing in a case where a game device 10 is folded to a folded position.

FIG. 86 is a flowchart illustrating sleep processing in a case where game device 10 is folded to a folded position.

Referring to FIG. 86, CPU 31 determines whether a folded position has been detected or not (step SD150). Specifically, whether a determination signal indicating the closed state has been input from folded position detection sensor 50 or not is determined. When it is determined that the determination signal indicating the closed state has been input from folded position detection sensor 50, that is, when the folded position is detected, CPU 31 then determines whether the music reproduction operation is being performed or not (step SD151). Specifically, CPU 31 determines whether or not the "start" icon is selected and the processing for reproducing the selected music file is being performed as described above.

Receiving the input of the determination signal indicating the closed state output from folded position detection sensor 50, for example, if game device 10 is operating, CPU 31 stops the operation and sets what is called a sleep state in which data of that state of operation is stored. On the other hand, receiving input of the determination signal indicating the opened state output from folded position detection sensor 50 after game device 10 enters the sleep state, CPU 31 performs processing for recovering from the sleep state to the original state based on the stored data of the state of operation.

When CPU 31 determines in step SD151 that the music reproduction operation is not being performed, CPU 31 performs sleep processing (step SD154). Namely, when other function is operated, the operation is stopped and the data of that state of operation is stored. Thus, when music is being reproduced through the speaker, music reproduction is stopped by folding game device 10 from the unfolded state to the folded state.

On the other hand, when CPU 31 determines in step SD151 that the music reproduction operation is being performed, CPU 31 then determines whether the headphone is sensed or not (step SD152). Specifically, CPU 31 determines whether a signal indicating a result of sensing involved with attachment of the headphone from I/F circuit 42 has been received or not as described above. On the other hand, as will be described later, when music is being reproduced through the headphone, reproduction of music is continued also after game device 10 is folded from the unfolded state to the folded state.

When CPU 31 determines in step SD152 that the headphone is not sensed, CPU 31 performs sleep processing (step SD154). Namely, when the music reproduction operation is being performed but the headphone is not sensed, CPU 31 stops the operation as in the case of other active functions and has the data of the state of operation stored.

On the other hand, when CPU 31 determines in step SD152 that the headphone is sensed, transition to a sleep music reproduction mode is made (step SD153).

Figure 87:
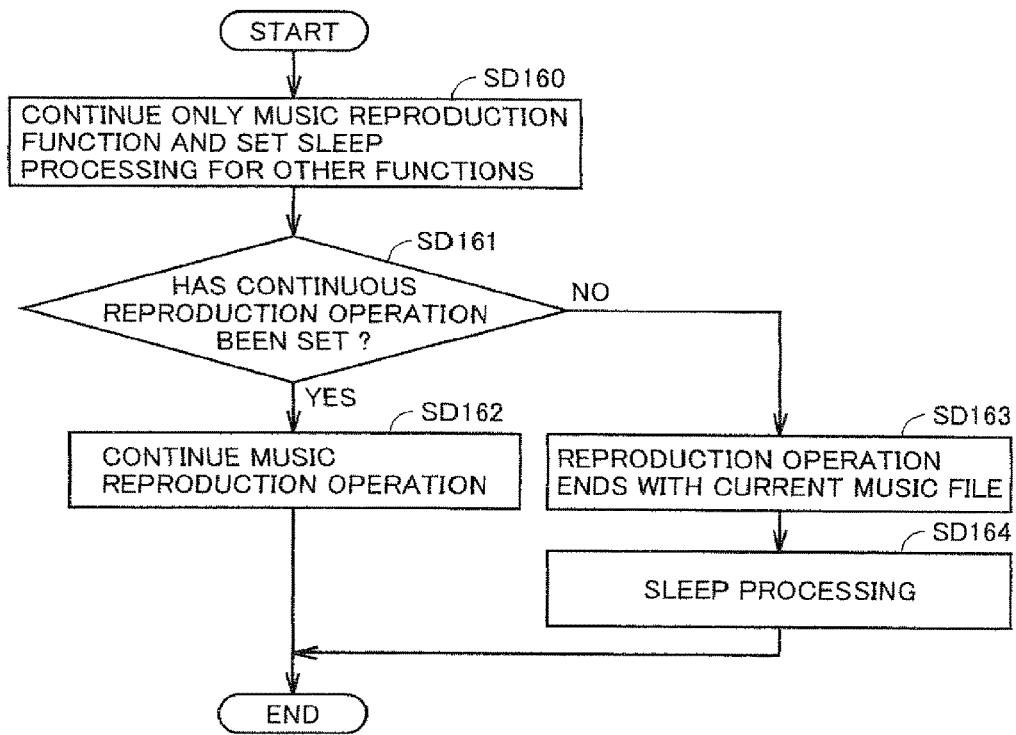
FIG. 87 is a flowchart illustrating sub routine processing in a sleep music reproduction mode.

FIG. 87 is a flowchart illustrating sub routine processing in the sleep music reproduction mode.

Referring to FIG. 87, CPU 31 continues only the music reproduction function and performs the sleep processing for other functions (step SD160). For example, display processing or the like is set to the sleep state.

Thereafter, CPU 31 determines whether a continuous reproduction operation has been set or not (step SD161). Specifically, it is determined whether the reproduction mode is set to the reproduction mode in which data being reproduced is repeatedly reproduced, to the reproduction mode in which data is sequentially reproduced and reproduction is repeated from the beginning when reproduction is completed, or to the reproduction mode in which only a set section is repeatedly reproduced, or whether or not the "random" folder is selected and executed.

When CPU 31 determines in step SD161 that the continuous reproduction operation has been set, CPU 31 continues the music reproduction operation (step SD162).

On the other hand, when CPU 31 determines in step SD161 that the continuous reproduction operation has not been set, the reproduction operation ends with the current music file (step SD163). Then, the sleep processing described above is performed (step SD164).

According to this method, when the user folds game device 10 and does not operate game device 10, the sleep processing is performed except for a case where the music reproduction operation is being performed. Therefore, this processing allows extension of a service life of a power supply of game device 10. In addition, when the user folds game device 10 during performance of the music reproduction function and when the headphone is sensed and the continuous reproduction operation is set, the music reproduction operation is continued.

In general, it is highly likely that the user carries game device 10 in the folded state in a bag or in a pocket or the like of clothing. Therefore, as it is less likely that the user operates game device 10 in such a folded state, the sleep processing is normally performed.

On the other hand, it would be convenient for the user if the function of the music reproduction operation can be performed while carrying game device 10 in the folded state although not operating game device 10.

Therefore, in spite of game device 10 being in the folded state, if the music reproduction operation is being performed, the headphone is sensed and the continuous reproduction operation is set, the music reproduction operation is continued, to thereby contribute to convenience of the user. In addition, when the continuous reproduction operation is not set, it can be determined that the user does not desire to continue the music reproduction operation. Therefore, after the reproduction operation of the current music file ends, normal sleep processing is performed, to thereby contribute to convenience of the user. In particular, as the normal sleep processing is performed after the reproduction operation of the current music file ends, the reproduction operation can end without giving uncomfortable feeling to the user who enjoys the music reproduction operation.

<Automatic Recording and Reproduction Processing>

In the automatic recording and reproduction processing, processing of two functions of an automatic recording mode and an automatic reproduction mode is performed independently of each other. As described in step SD2 in FIG. 66, the automatic recording and reproduction processing is started after sound selection screen 400 is displayed.

Figure 88:
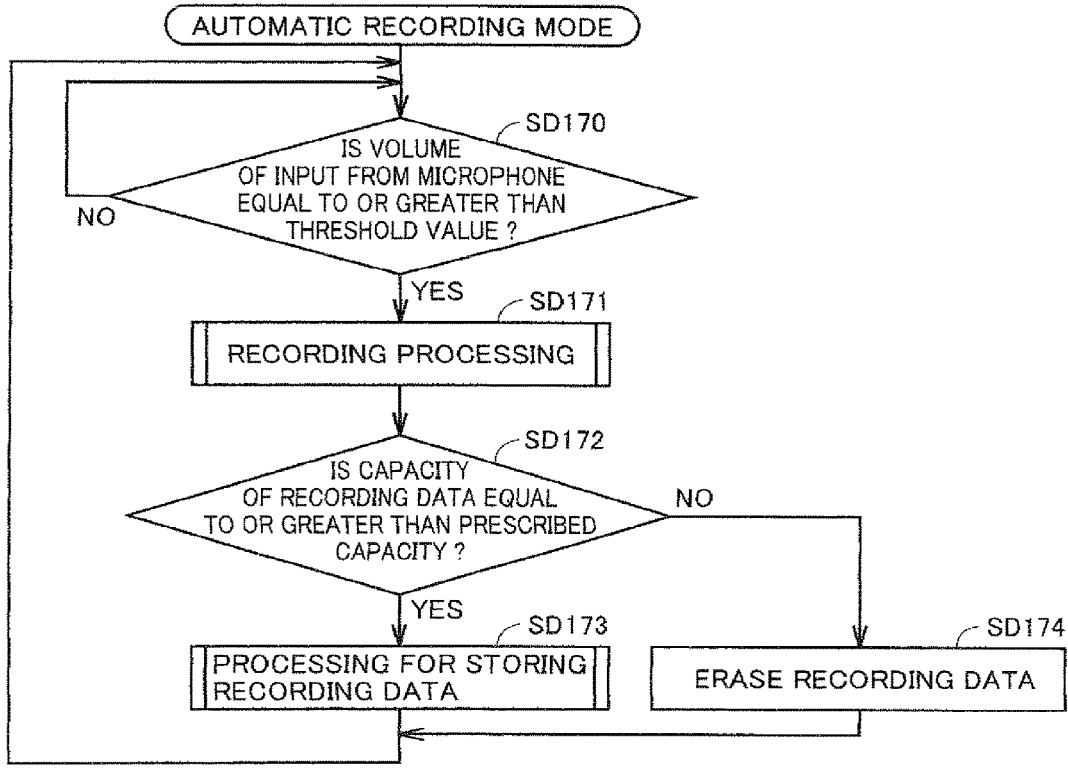
FIG. 88 is a flowchart illustrating an automatic recording mode according to the present embodiment.

FIG. 88 is a flowchart illustrating the automatic recording mode according to the present embodiment.

Referring to FIG. 88, whether the volume of input from microphone 43 is equal to or greater than a threshold value is determined (step SD170). Specifically, audio input control circuit 42*b* senses whether the volume of input from microphone 43 is equal to or greater than the threshold value. When the sensed volume of input from microphone 43 is equal to or greater than the threshold value, audio input control circuit 42*b* outputs the result of sensing to CPU 31.

When CPU 31 determines in step SD170 that the volume of input from microphone 43 is equal to or greater than the threshold value, CPU 31 performs the recording processing (step SD171). Specifically, CPU 31 performs the recording processing, upon receiving the input of the result of sensing from audio input control circuit 42*b* that the volume of input from microphone 43 is equal to or greater than the threshold value.

Figure 89:
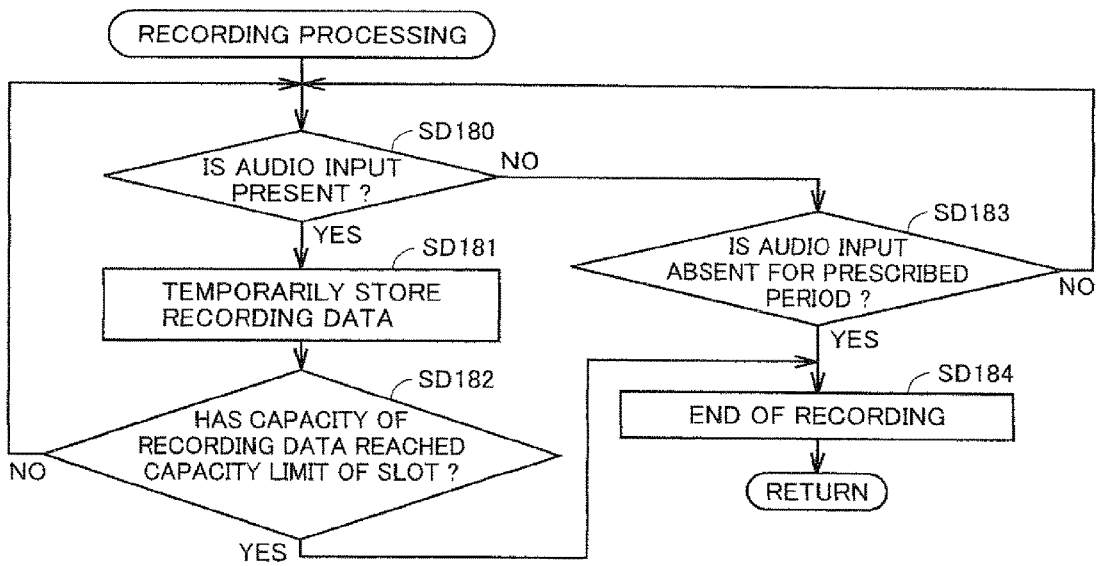
FIG. 89 is a flowchart illustrating sub routine processing of recording processing according to the present embodiment.

FIG. 89 is a flowchart illustrating sub routine processing of the recording processing according to the present embodiment.

Referring to FIG. 89, initially, CPU 31 determines whether audio input is present or not (step SD180). When CPU 31 determines that audio input is present, CPU 31 temporarily has the recording data input from audio input control circuit 42*b* stored (step SD181). Specifically, CPU 31 causes the main memory to temporarily store the recording data.

Thereafter, CPU 31 determines whether a capacity of the recording data has reached a capacity limit of a slot or not (step SD182). Here, the slot refers to a recording data storage area in memory 34 for storage, in which the recording data is stored as a recording data file. In the present example, it is assumed that a plurality of slots used for recording processing are provided in advance in memory 34 for storage. In the present example, for example, it is assumed that recording data of 10 seconds can be stored in one slot.

When CPU 31 determines in step SD182 that the capacity of the recording data has not reached the capacity limit of the slot, the processing in step SD180 and step SD181 is repeated and the recording data is temporarily stored.

When CPU 31 determines in step SD182 that the capacity of the recording data has reached the capacity limit of the slot, the process proceeds to step SD184 and the recording ends. Then, referring back to FIG. 88, the process proceeds to step SD172.

On the other hand, when CPU 31 determines in step SD180 that audio input is not present, the process then proceeds to step SD183.

In step SD183, CPU 31 determines whether or not audio input is absent for a prescribed period. For example, the prescribed period for determining absence of sound can be set to three seconds. This period is merely by way of example, and an appropriate period may be set.

When CPU 31 determines in step SD183 that audio input is absent for the prescribed period, recording ends (step SD184). Then, referring back to FIG. 88, the process proceeds to step SD172.

On the other hand, when it is not determined in step SD183 that audio input is absent for the prescribed period, that is, when the audio input is made again, the process again returns to step SD180 and proceeds to step SD181.

According to this recording processing, when audio input is present, the recording data is automatically stored until the capacity limit of the slot is reached, and when there is no longer audio input, the recording processing automatically ends.

Through a series of processing as above (SD180 to SD183), voice and sound is automatically recorded while sound selection screen 400 is displayed. Speech of the user while sound selection screen 400 is displayed (including unconscious utterance) is automatically recorded in the slot as the recording data so long as the capacity of the slot is available.

Referring again to FIG. 88, thereafter, CPU 31 determines whether the capacity of the recording data is equal to or greater than a prescribed capacity or not (step SD172). Specifically, CPU 31 determines whether the capacity of the recording data temporarily stored in the main memory is equal to or greater than the prescribed capacity or not. For example, the prescribed capacity can be set to a capacity not less than a minimum period of time that can be recognized by the user as the audio signal in reproduction. In other words, a capacity less than the prescribed capacity means a capacity to such an extent that the recording data cannot be recognized as the audio signal when the user reproduces the recording data.

When CPU 31 determines in step SD172 that the recording data of the prescribed capacity or greater is stored in the main memory, CPU 31 performs the processing for storing the recording data (step SD173). On the other hand, when CPU 31 determines in step SD172 that the recording data of the prescribed capacity or greater is not stored, the temporarily stored recording data is erased (step SD174), because an amount of stored data is too small as the recording data and such data is not recognizable. Here, the prescribed capacity is assumed as being smaller than the capacity limit of the slot. Therefore, the recording data of such a length that the user cannot recognize as the audio signal is automatically erased.

Figure 90:
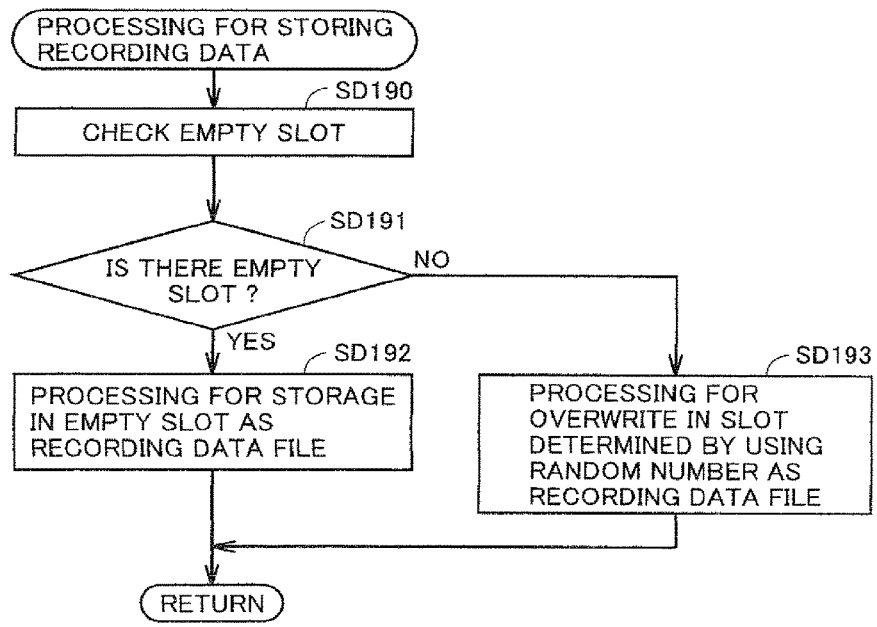
FIG. 90 is a flowchart illustrating sub routine processing of processing for storing recording data.

FIG. 90 is a flowchart illustrating sub routine processing of the processing for storing the recording data.

Referring to FIG. 90, initially, CPU 31 checks an empty slot (step SD190). Specifically, CPU 31 checks whether there is a slot not including the recording data, among a plurality of slots provided in advance in memory 34 for storage and serving as a plurality of recording data storage areas.

Then, CPU 31 determines whether there is an empty slot or not (step SD191).

When CPU 31 determines in step SD191 that there is an empty slot, the processing for storing the recording data in the empty slot as the recording data file is performed (step SD192). Specifically, CPU 31 causes memory 34 for storage to store the temporarily stored recording data as the recording data file through memory control circuit 33. Then, the process returns to the flow in FIG. 88 (return).

On the other hand, when CPU 31 determines in step SD191 that there is no empty slot, one slot is determined from among the plurality of slots through processing using a random number, and processing for overwriting the slot determined by using a random number with the recording data as the recording data file (step SD193). Then, the process returns to the flow in FIG. 30 (return).

As a result of this processing, one recording data file is stored in the slot.

On the other hand, when CPU 31 determines in step SD191 that the capacity of the recording data is not lower than a capacity limit, erasing processing for erasing an old recording data file is performed (step SD193). Then, the process again returns to step SD191, where it is determined whether the capacity of the recording data is lower than the capacity limit or not. The processing in step SD193 is repeated until it is determined that the capacity of the recording data is lower than the capacity limit. When the capacity of the recording data is lower than the capacity limit, processing for storage as the recording data file described above is performed. Therefore, the old recording data file is automatically updated to a new recording data file.

The automatic reproduction mode will now be described.

Figure 91:
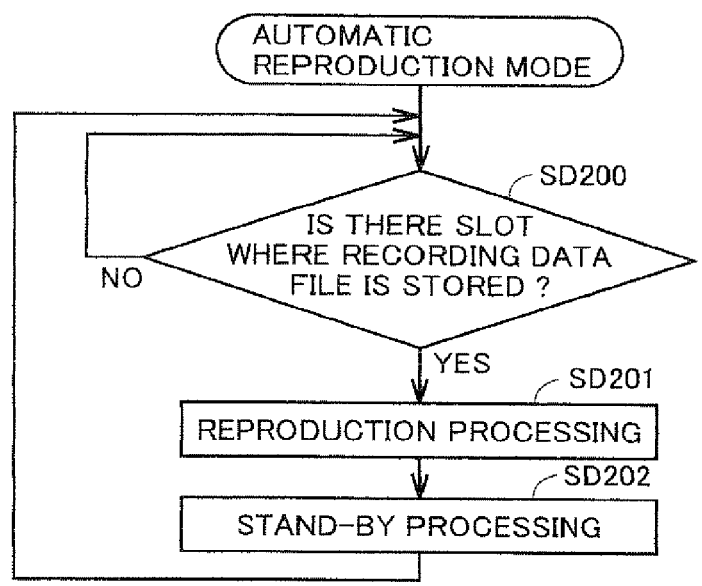
FIG. 91 is a flowchart of an automatic reproduction mode according to the present embodiment.

FIG. 91 is a flowchart of the automatic reproduction mode according to the present embodiment.

Referring to FIG. 91, CPU 31 determines whether there is a slot in which a recording data file is stored or not (step SD200). Specifically, CPU 31 determines whether or not the recording data files are present in a plurality of slots provided in advance in memory 34 for storage through memory control circuit 33.

When there is no recording data file in a slot in step SD200, CPU 31 repeats the processing in step SD200.

On the other hand, when CPU 31 determines in step SD200 that there is a recording data file in a slot, CPU 31 performs the processing for reproducing the recording data file (step SD201). Thereafter, CPU 31 performs stand-by processing (step SD202). Specifically, CPU 31 is in a stand-by state for a prescribed period of time and the process again returns to step SD200. The stand-by processing may be processing of being in a stand-by state for a certain prescribed period of time or for a random period of time.

Therefore, when there is a recording data file in a slot, CPU 31 repeats execution of the reproduction processing for a certain period of time or for a random period of time.

In addition, when it is determined that the recording data files are present in the plurality of slots in memory 34 for storage respectively, the processing for reproducing the recording data file stored in each slot is sequentially performed. In addition, during the reproduction processing, object 410 in a bird shape in FIG. 61 can be displayed in an animated manner. As a result of such display processing, the user can visually recognize execution of the reproduction processing based on the operation of object 410 in a bird shape.

As a result of this processing, when the user speaks loud enough for the volume of input from the microphone to exceed the threshold value while the sound selection screen in FIG. 61 is displayed, the audio signal representing the speech is stored in the slot as the recording data file based on the automatic recording mode. Based on the automatic reproduction mode, the audio signal stored in the slot as the recording data file is then automatically reproduced and the reproduction processing is repeated.

This function allows the user to create his/her own audio signal as the recording data file and to enjoy reproduction thereof.

The method of performing the recording processing or the recording and storing processing based on determination as to whether the capacity of the recording data has reached a prescribed capacity or not has been described above, however, such determination can be made, for example, based on a recording period of time without limited to the capacity, or such determination may be made based on another parameter.

<Setting Processing>

Figure 92:
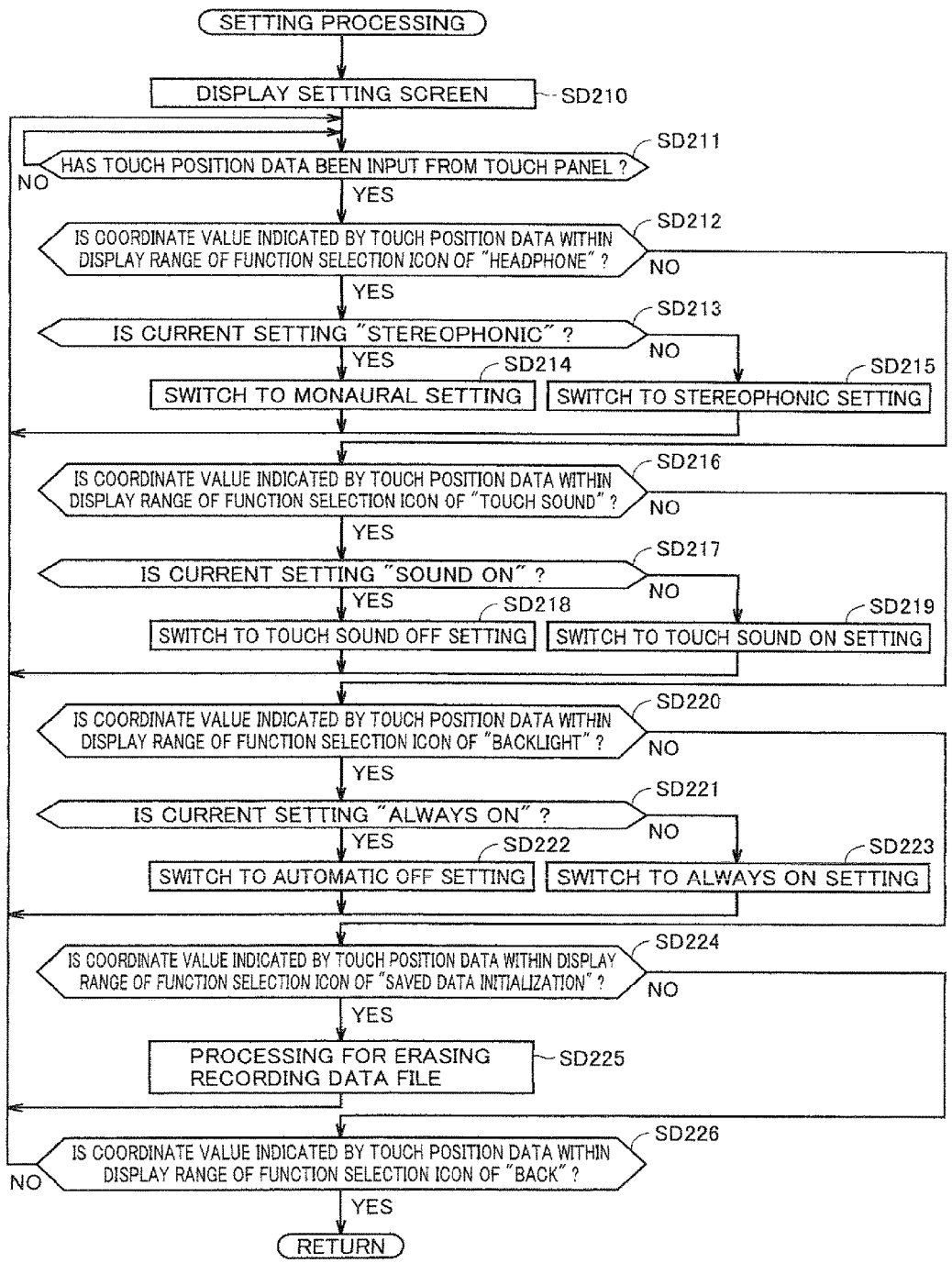
FIG. 92 is a flowchart illustrating sub routine processing of setting processing according to the present embodiment.

FIG. 92 is a flowchart illustrating sub routine processing of the setting processing according to the present embodiment.

Referring to FIG. 92, when CPU 31 determines that the coordinate value indicated by the touch position is within the display range of "setting" icon 408 in FIG. 61, CPU 31 has the setting screen displayed (step SD210).

Figure 93:
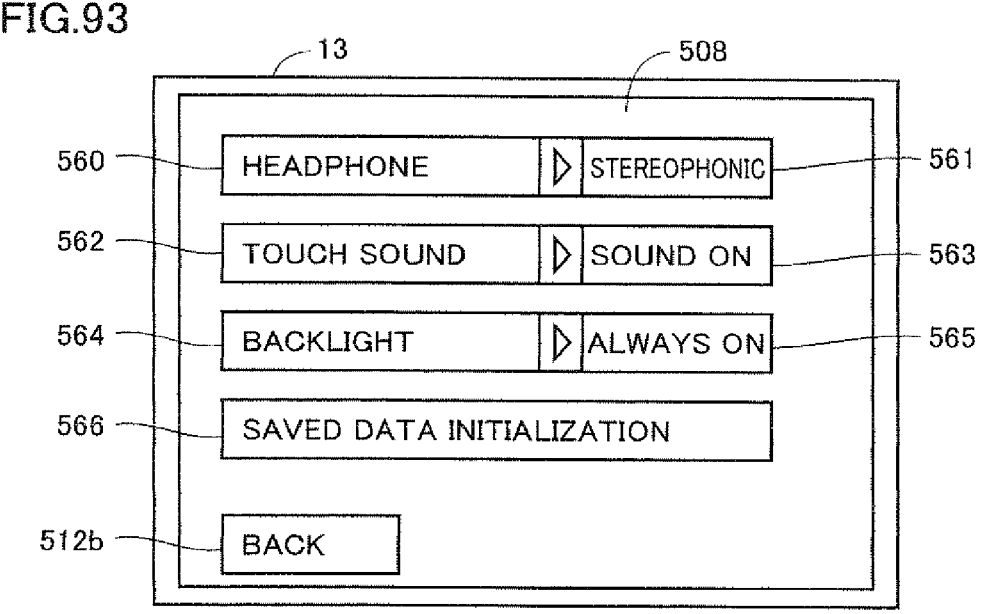
FIG. 93 is a diagram illustrating a setting screen according to the present embodiment.

FIG. 93 is a diagram illustrating a setting screen 508 according to the present embodiment.

Referring to FIG. 93, here, a "headphone" setting item 560, a "touch sound" setting item 562, and a "backlight" setting item 564 are provided. In addition, as "headphone" setting item 560, a selection function icon 561 for selecting and setting "stereophonic" or "monaural" is provided. Moreover, as "touch sound" setting item 562, a selection function icon 563 for selecting and setting "sound on" or "sound off" is provided. Further, as "backlight" setting item 564, a selection function icon 565 for selecting and setting "always on" or "automatically turned off" is provided. In addition, a "saved data initialization" icon 566 is provided, and by selecting this "saved data initialization" icon 566, the content in the recording data file in the automatic recording and reproduction processing, the content in the recording data file created in the microphone recording and reproduction mode which will be described later, or the music file content registered in "favorite" is erased. In addition, by selecting a "back" icon 512*b*, the screen returns to immediately preceding sound selection screen 400.

Referring again to FIG. 92, CPU 31 determines whether the touch position data has been input from touch panel 13 or not (step SD211).

When CPU 31 determines in step SD211 that the touch position data has been input from touch panel 13, CPU 31 determines whether the coordinate value indicated by the touch position data is within the display range of the function selection icon of "headphone" or not (step SD212).

When CPU 31 determines in step SD212 that the coordinate value indicated by the touch position data is within the display range of the function selection icon of "headphone", CPU 31 determines whether the current setting is "stereophonic" or not (step SD213).

When the current setting is "stereophonic" in step SD213, CPU 31 makes switching to monaural setting (step SD214).

On the other hand, when CPU 31 determines in step SD213 that the current setting is not "stereophonic", CPU 31 makes switching to stereophonic setting (step SD215).

In the "stereophonic" setting, while the headphone is connected, stereophonic audio output is provided. Namely, output for the right and output for the left are separately provided. On the other hand, in the "monaural" setting, while the headphone is connected, monaural audio output is provided, but while the headphone is not connected, stereophonic audio output is provided, regardless of this setting.

When CPU 31 determines in step SD212 that the coordinate value indicated by the touch position data is not within the display range of the function selection icon of "headphone", CPU 31 then determines whether the coordinate value indicated by the touch position data is within the display range of the function selection icon of "touch sound" or not (step SD216).

When CPU 31 determines in step SD216 that the coordinate value indicated by the touch position data is within the display range of the function selection icon of "touch sound", CPU 31 determines whether the current setting is "sound on" or not (step SD217).

When CPU 31 determines in step SD217 that the current setting is "sound on", CPU 31 makes switching to touch sound off setting (step SD218).

The process again returns to step SD211.

When CPU 31 determines in step SD217 that the current setting is not "sound on", CPU 31 makes switching to touch sound on setting (step SD219).

When CPU 31 determines in step SD216 that the coordinate value indicated by the touch position data is not within the display range of the function selection icon of "touch sound", CPU 31 then determines whether the coordinate value indicated by the touch position data is within the display range of the function selection icon of the "backlight function" or not (step SD220).

When CPU 31 determines in step SD220 that the coordinate value indicated by the touch position data is within the display range of the function selection icon of "backlight", CPU 31 determines whether the current setting is "always on" or not (step SD221).

When CPU 31 determines in step SD221 that the current setting is "always on", CPU 31 makes switching to automatic off setting (step SD222). As a result of switching to the automatic off setting, when it is determined that game device 10 is not operated for a certain period of time, the processing for automatically turning off the backlight is performed.

On the other hand, when CPU 31 determines in step SD221 that the current setting is not "always on", CPU 31 makes switching to always on setting (step SD223). Then, the process returns to step SD211.

On the other hand, when CPU 31 determines in step SD220 that the coordinate value indicated by the touch position data is not within the display range of the function selection icon of "backlight", CPU 31 determines whether the coordinate value indicated by the touch position data is within the display range of the function selection icon of "saved data initialization" or not (step SD224).

When CPU 31 determines in step SD224 that the coordinate value indicated by the touch position data is within the display range of the function selection icon of "saved data initialization", CPU 31 performs processing for erasing the recording data file and the contents registered in "favorite" (step SD225). Namely, the processing or the like for erasing the recording data file stored in data memory 34 for storage is performed.

When CPU 31 determines in step SD224 that the coordinate value indicated by the touch position data is not within the display range of the function selection icon of "saved data initialization," CPU 31 determines whether the coordinate value indicated by the touch position data is within the display range of the function selection icon of "back" or not.

When CPU 31 determines in step SD226 that the coordinate value indicated by the touch position data is within the display range of the function selection icon of "back", the screen returns to immediately preceding sound selection screen 400.

As a result of this setting processing, for example with regard to the reproduction processing when the headphone for one ear is attached, the stereophonic setting can be switched to the monaural setting as desired by the user. As a result of such switching setting, appropriate reproduction processing can be selected in accordance with the type of the headphone. Naturally, in the case of the headphone for both ears, switching to the monaural setting can also be made.

<Microphone Recording and Reproduction Mode>

The microphone recording and reproduction mode will now be described.

Figure 94:
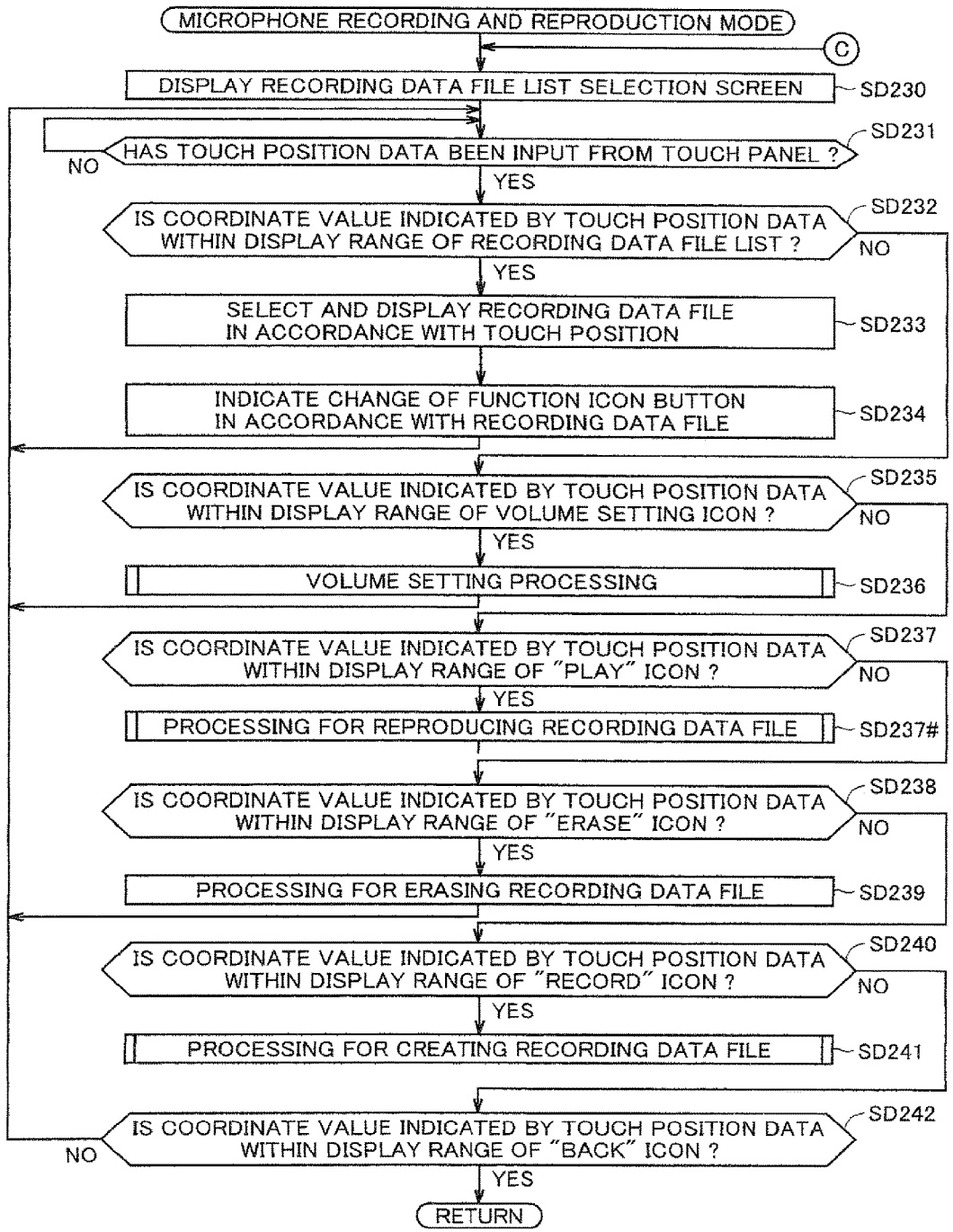
FIG. 94 is a flowchart illustrating sub routine processing in a microphone recording and reproduction mode.

FIG. 94 is a flowchart illustrating sub routine processing in the microphone recording and reproduction mode.

Referring to FIG. 94, when transition to the microphone recording and reproduction mode is made, initially, CPU 31 has a recording data file list selection screen for play with sound recorded through the microphone displayed (step SD230).

Figure 95:
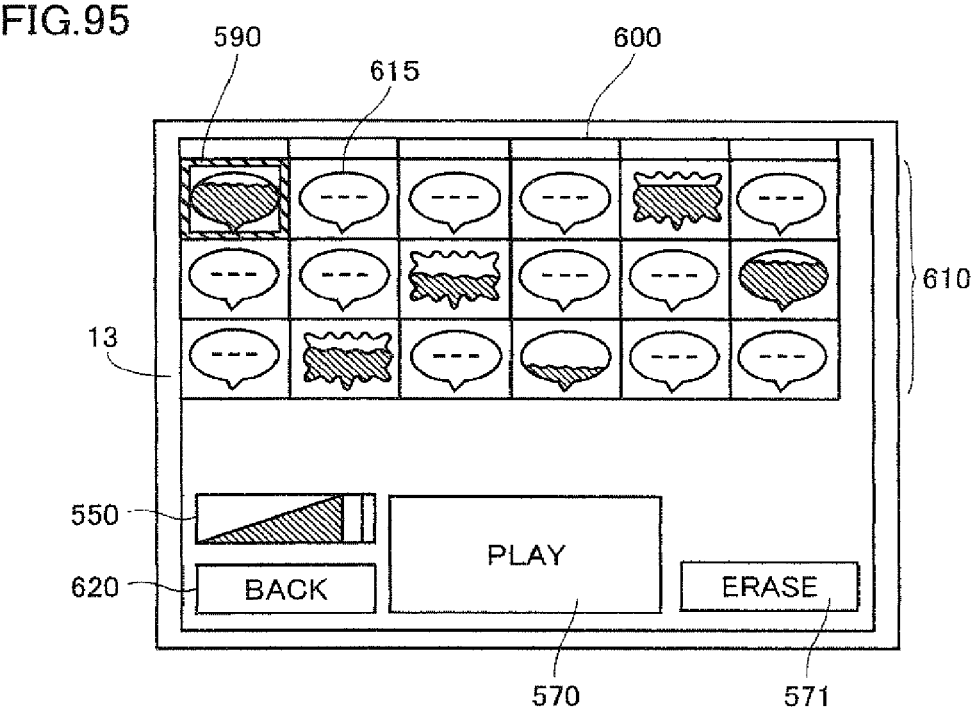
FIG. 95 is a diagram illustrating a recording data file list selection screen according to the present embodiment.

FIG. 95 is a diagram illustrating a recording data file list selection screen 600 according to the present embodiment.

Referring to FIG. 95, a case where recording data file list selection screen 600 is displayed on the screen of lower LCD 12 is shown.

The user can select any recording data file from a recording data file list by touching the screen on lower LCD 12 with touch pen 27 etc. As will be described later, it is assumed that the recording data file is set to a display color selectively designated by the user. Here, each recording data file in the recording data file list corresponds to each one of the plurality of slots provided in advance in memory 34 for storage for use in the recording processing.

For example, it is assumed that a cursor 590 selects a recording data file displayed at the top left in a recording data file list 610 on recording data file list selection screen 600. For example, by touching a recording data file included in recording data file list 610 with touch pen 27 etc., cursor 590 moves to the touched recording data file and the recording data file designated with cursor 590 is in a selected state.

In addition, it is assumed that, by touching any recording data file on the screen and moving this recording data file to a position of any other recording data file while maintaining the touched state, that is, maintaining the selected state of the recording data file designated with cursor 590 (performing slide operation), positions of these recording data files are interchanged.

Here, for example, a recording data file 615 is assumed as a file storing no recording data, which is also applicable to other files. On the other hand, recording data files other than aforementioned are assumed as files storing recording data. In the present example, for example, it is assumed that one file can record an audio signal for approximately 10 seconds.

In addition, the user can set the volume at which output is provided from the speaker or the like by designating volume setting icon 550 with touch pen 27 etc. Since this processing is as described above, detailed description thereof will not be repeated.

Moreover, the user can return to sound selection screen 400 which is the preceding screen, by selecting a "back" icon 620.

Further, by selecting a recording data file in recording data file list selection screen 600 and selecting a "play" icon 570, the reproduction processing is started and a recording data reproduction operation selection screen 301 is displayed.

On the other hand, it is assumed that, if a file in which no recording data is stored is selected from recording data file list selection screen 600, "play" icon 570 is changed to a "record" icon 570#. Then, by selecting this "record" icon 570#, a recording start screen 602 which will be described later is displayed.

In addition, by selecting an "erase" icon 571 with touch pen 27 etc., the currently selected recording data file can be erased and a file in which no recording data is stored can be set.

In addition, regarding a manner of display of the recording data file, a data amount of the recording data included in each file relative to the total capacity is displayed as a water level. Based on such a manner of display, the user can sensuously recognize the amount of data of the recording data file. In addition, in recording data file list 610, a recording data file different in shape is shown. For example, when a modification and edition function by using tone adjustment icon 542 or the like which will be described later is performed and "overwrite" is selected, that is, when change to different recording data is made, display processing is performed such that the shape of the recording data file is changed in accordance with modification and edition.

As a result of this manner of display, the user can intuitively recognize that a recording data file is a modified and edited file, which contributes to convenience of the user.

FIG. 96 is a diagram illustrating recording data reproduction operation selection screen 601 according to the embodiment of the present invention.

FIG. 96(*a*) shows a case that recording data reproduction operation selection screen 601 is displayed on lower LCD 12.

Specifically, the user can perform the function of the operation with music being modified, in the reproduction operation or the like of the recording data based on selection with the touch pen etc.

Here, a case where speed and key adjustment icon 541, tone adjustment icon 542, reproduction mode switching icon 517, and an "overwrite" icon 586 are provided as the selection function icon is shown.

The user can perform the function to change the reproduction speed or the key by selecting speed and key adjustment icon 541 described above.

In addition, the user can perform the function for modification and edition to another tone by modulating a frequency of the reproduction signal or by performing filtering processing or the like based on selection of tone adjustment icon 542. Specifically, the tone adjustment icon described in connection with FIG. 79 may be provided or another tone adjustment icon may be provided.

In addition, the user can cause the recording data file being reproduced to pause, by pressing a pause command icon 580 serving as the reproduction operation command icon. Here, display of pause command icon 580 is changed to display of a play command icon 582#. Moreover, a reverse play command icon 580 is also provided as the reproduction operation command icon. When reverse play command icon 580 is selected, reverse reproduction processing is performed. Here, display of reverse play command icon 580 is changed to display of a pause command icon 580#. Two icons of the play command and the reverse play command are displayed as such command icons, and the selected icon is switched to the pause command icon. Therefore, the user can switch between the reproduction operation and the reverse reproduction operation with one action by using touch pen 27 etc.

Specifically, in a reproduction interface for music data (here, music data will be described by way of example, however, a video data may be applicable), two command icon areas are provided (a first command icon area and a second command icon area), any of the reverse play command icon and the pause command icon is displayed in a switched manner in the first command icon area, and any of the play command icon and the pause command icon is displayed in a switched manner in the second command icon area.

More specifically, the manner of display is as follows.

In stop state: The reverse play command icon is displayed in the first command icon area and the play command icon is displayed in the second command icon area.

In play state: The reverse play command icon is displayed in the first command icon area and the pause command icon is displayed in the second command icon area.

In reverse play state: The pause command icon is displayed in the first command icon area and the play command icon is displayed in the second command icon area.

Play command icon: When touched, forward play of audio data is started.

Reverse play command icon: When touched, reverse play of audio data is started.

Pause command icon: When touched, reproduction of audio data is caused to pause.

Though the pause command icon indicating pause has been described in the present example, a stop command icon indicating stop instead of pause may be employed.

Thus, transition to any of play, reverse play and stop can be made by using two command icon areas in any state of stop, play and reverse play.

Speaking more generally, in an information processing device that can take three states (a first state, a second state, and a third state), two button areas are provided, and when the information processing device is currently in the first state, a button for transition to the second state and a button for transition to the third state are displayed (i). When the button for transition from the (i) state to the second state is operated to make transition to the second state, the button for transition to the second state is changed to a button for transition to the first state, and the button for transition to the first state and the button for transition to the third state are displayed (ii). In addition, when the button for transition from the (i) state to the third state is operated to make transition to the third state, the button for transition to the third state is changed to the button for transition to the first state, and the button for transition to the second state and the button for transition to the first state are displayed (iii). Moreover, when the button for transition from the (ii) state to the first state is operated to make transition to the first state, the state returns to the (i) state. Further, when the button for transition from the (iii) state to the first state is operated to make transition to the first state, the state returns to the (i) state. In addition, when the button for transition from the (ii) state to the third state is operated to make transition to the third state, the button for transition to the first state is changed to the button for transition to the second state, the button for transition to the third state is changed to the button for transition to the first state, and the button for transition to the second state and the button for transition to the first state are displayed. In addition, when the button for transition from the (iii) state to the second state is operated to make transition to the second state, the button for transition to the second state is changed to the button for transition to the first state, and the button for transition to the first state is changed to the button for transition to the third state.

Thus, two button areas can be used to efficiently make transition to any of the three states.

Further, the user can make switching among the reproduction modes in the recording data file list by pressing reproduction mode switching icon 517. Specifically, the reproduction mode in which data being reproduced is repeatedly reproduced, the reproduction mode in which data is sequentially reproduced and reproduction is repeated from the beginning when reproduction is completed, the reproduction mode in which data is sequentially reproduced and reproduction is stopped when reproduction is completed, the reproduction mode in which random reproduction is performed, and the reproduction mode in which only a set section is repeatedly reproduced can sequentially be switched and executed.

In addition, by pressing "overwrite" icon 586, for example, the user can overwrite for storage, the recording data file with a recording data file modified and edited through filtering processing or the like based on selection of a tone adjustment icon 588.

In addition, FIG. 96(*b*) shows a case where recording data file list 610 displayed on the screen of lower LCD 12 in FIG. 95 is now displayed on the screen of upper LCD 22 as a recording data file selection list screen 601#. The recording data file displayed on recording data file list 610# can then be selected by operating direction input button 14A. Namely, after the recording data file is selected with the touch pen etc. (by pressing play) on the screen of lower LCD 12 in FIG. 95, on the screen of lower LCD 12 in FIG. 96(*a*), the processing for the reproduction operation of the recording data file selected with the touch pen etc. is selected on the recording data reproduction operation selection screen with the touch pen etc. and on the screen of upper LCD 22, the recording data file can be selected with direction input button 14A.

For example, by using direction input button 14A to select the recording data file and pressing any of operation buttons 14B to 14E, the recording data file being reproduced is switched to the selected recording data file and the reproduction operation thereof can be performed.

Therefore, the processing in reproduction operation selection screen 601 on lower LCD 12 and the processing in recording data file selection list screen 601# on upper LCD 22 can be performed in parallel, which contributes to convenience of the user.

In addition, by pressing "overwrite" icon 586, for example, the user can overwrite for storage, the recording data file with a recording data file modified and edited through filtering processing or the like based on selection of a tone adjustment icon 588.

Specifically, in an information processing device having two screens (or two display areas), contact detection means (in the present embodiment, a touch panel) is provided for at least one screen (in the present embodiment, lower LCD 12). Then, an icon group (a first icon group; in the embodiment, a group of icons 615 showing respective recording data files) showing a plurality of choices is displayed on one screen, and selection of any icon is permitted through the contact detection means. After any icon is selected from among the plurality of icons by using the contact detection means, display of the first icon group is moved to the other screen (in the present embodiment, upper LCD 22) and another icon group (a second icon group; in the embodiment, 541 and 542) is displayed on one screen and selection of any icon from this second icon group is permitted through the contact detection means. Even after the first icon group has moved to the other screen, one icon can be selected from the first icon group by using a key switch (which is a direction key, and in the embodiment, a cross-shaped key 14A). Thus, selection from the first icon group and selection from the second icon group can be made in parallel. For example, first selection may be made with the use of the first icon group and selection relating to the icon selected in the first selection may be made with the use of the second icon group (in the present embodiment, data to be processed is selected in the first selection and processing content for the selected data is selected in the second selection). Here, even after transition to a condition for the second selection is made after the first selection from the first icon group, selection from the first icon group can be changed by operating the key switch and hence the first selection can be redone in parallel after transition to the condition for the second selection, which contributes to improved convenience.

Referring again to FIG. 94, CPU 31 determines whether the touch position data has been input from touch panel 13 or not (step SD231).

When CPU 31 determines in step SD231 that the touch position data has been input from touch panel 13, CPU 31 then determines whether the coordinate value indicated by the touch position data is within the display range of recording data file list 610 or not (step SD232).

When CPU 31 determines in step SD232 that the coordinate value indicated by the touch position data is within the display range of recording data file list 610, the recording data file is selected and displayed in accordance with the touch position (step SD233).

Then, CPU 31 changes a function icon button in accordance with the recording data file and has the resultant function icon button displayed (step SD234). The process then again returns to step SD231. Specifically, when the cursor selects and indicates a recording data file, "play" icon 570 is displayed. When the cursor selects and indicates a file in which nothing is recorded, "record" icon 570# is displayed.

When CPU 31 determines in step SD232 that the coordinate value indicated by the touch position data is not within the display range of recording file list 610, CPU 31 then determines whether the coordinate value indicated by the touch position data is within the display range of volume setting icon 550 or not (step SD235).

When CPU 31 determines in step SD235 that the coordinate value indicated by the touch position data is within the display range of volume setting icon 550, CPU 31 performs the volume setting processing (step SD236). As the volume setting processing has been described above, detailed description thereof will not be repeated.

On the other hand, when CPU 31 determines in step SD235 that the coordinate value indicated by the touch position data is not within the display range of volume setting icon 550, CPU 31 then determines whether the coordinate value indicated by the touch position data is within the display range of "play" icon 570 or not (step SD237).

When CPU 31 determines in step SD237 that the coordinate value indicated by the touch position data is within the display range of "play" icon 570, CPU 31 performs the processing for reproducing a recording data file (step SD237#). The processing for reproducing the recording data file will be described later.

On the other hand, when CPU 31 determines in step SD237 that the coordinate value indicated by the touch position data is not within the display range of "play" icon 570, CPU 31 then determines whether the coordinate value indicated by the touch position data is within the display range of "erase" icon 571 or not (step SD238).

When CPU 31 determines in step SD238 that the coordinate value indicated by the touch position data is within the display range of "erase" icon 571, CPU 31 performs the processing for erasing the recording data file (step SD239).

When CPU 31 determines in step SD238 that the coordinate value indicated by the touch position data is not within the display range of "erase" icon 571, CPU 31 then determines whether the coordinate value indicated by the touch position data is within the display range of "record" icon 570# or not (step SD240).

When CPU 31 determines in step SD240 that the coordinate value indicated by the touch position data is within the display range of "record" icon 570#, CPU 31 performs processing for creating the recording data file (step SD241). The processing for creating the recording data file will be described later.

When CPU 31 determines in step SD240 that the coordinate value indicated by the touch position data is not within the display range of "record" icon 570#, CPU 31 then determines whether the coordinate value indicated by the touch position data is within the display range of "back" icon 620 or not (step SD242).

When CPU 31 determines in step SD242 that the coordinate value indicated by the touch position data is not within the display range of "back" icon 620, the process again proceeds to step SD231.

On the other hand, when CPU 31 determines in step SD242 that the coordinate value indicated by the touch position data is within the display range of "back" icon 620, sound selection screen 400 shown in FIG. 61 is displayed.

Figure 97:
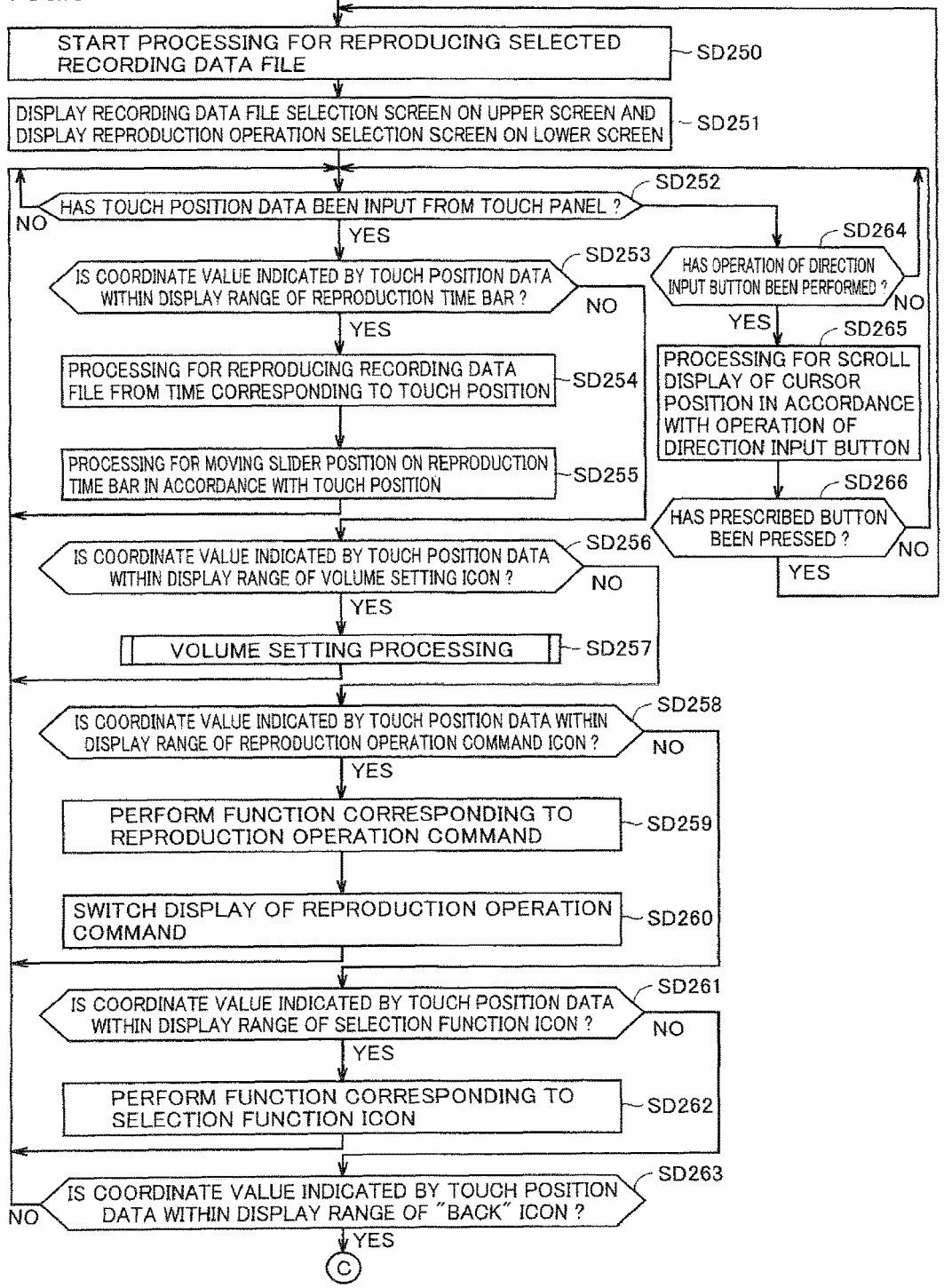
FIG. 97 is a diagram illustrating sub routine processing of processing for reproducing a recording data file.

FIG. 97 is a diagram illustrating sub routine processing of the processing for reproducing the recording data file.

Referring to FIG. 97, when CPU 31 determines in step SD237 that the coordinate value indicated by the touch position data is within the display range of the "play" icon, CPU 31 then starts the processing for reproducing the selected recording data file (step SD250).

Thereafter, CPU 31 causes upper LCD 22 to display recording data file selection list screen 601# and lower LCD 12 to display reproduction operation selection screen 601 (step SD251).

Thereafter, CPU 31 determines whether the touch position data has been input from touch panel 13 or not (step SD252).

When CPU 31 determines in step SD252 that the touch position data has been input from touch panel 13, CPU 31 then determines whether the coordinate value indicated by the touch position data is within the display range of a reproduction time bar 551 or not (step SD253).

When CPU 31 determines in step SD252 that the touch position data has not been input from touch panel 13, CPU 31 then determines whether the operation of direction input button 14A has been performed or not (step SD264).

When CPU 31 determines in step SD264 that the operation of direction input button 14A has been performed, CPU 31 performs the processing for scroll display of the cursor position indicating the selected recording data file in recording data file selection list screen 601# in accordance with the operation of direction input button 14A (step SD265).

On the other hand, when CPU 31 determines in step SD264 that the operation of direction input button 14A has not been performed, the process again returns to step SD252.

Then, CPU 31 determines whether a prescribed button has been pressed or not (step SD266).

When the prescribed button has been pressed in step SD266, CPU 31 starts reproduction of the recording data file selected by the cursor position (step SD250).

On the other hand, when the prescribed button has not been pressed in step SD266, the process again returns to step SD252. Here, it is assumed that the prescribed button is set to any of operation buttons 14B to 14E.

On the other hand, when CPU 31 determines in step S252 that the touch position data has been input from touch panel 13, CPU 31 then determines whether the coordinate value indicated by the touch position data is within the display range of reproduction time bar 551 or not (step SD253).

When CPU 31 determines in step SD253 that the coordinate value indicated by the touch position data is within the display range of reproduction time bar 251, CPU 31 performs the processing for reproducing the recording data file from the time corresponding to the touch position (step SD254).

In step SD254, CPU 31 then performs the processing for moving the slider position on reproduction time bar 251 in accordance with the touch position (step SD255).

When CPU 31 determines in step SD253 that the coordinate value indicated by the touch position data is not within the display range of reproduction time bar 251, CPU 31 then determines whether the coordinate value indicated by the touch position data is within the display range of volume setting icon 550 or not (step SD256).

When CPU 31 determines in step SD256 that the coordinate value indicated by the touch position data is within the display range of volume setting icon 550, CPU 31 performs the volume setting processing (step SD257). As the volume setting processing has been described above, detailed description thereof will not be repeated.

When CPU 31 determines in step SD256 that the coordinate value indicated by the touch position data is not within the display range of volume setting icon 550, CPU 31 then determines whether the coordinate value indicated by the touch position data is within the display range of the reproduction operation command icon or not (step SD258).

When CPU 31 determines in step SD258 that the coordinate value indicated by the touch position data is within the display range of the reproduction operation command icon, CPU 31 performs the function corresponding to the reproduction operation command (step SD259).

Thereafter, display of the reproduction operation command is switched (step SD260).

Then, the process again returns to step SD252.

When CPU 31 determines in step SD258 that the coordinate value indicated by the touch position data is not within the display range of the reproduction operation command icon, CPU 31 then determines whether the coordinate value indicated by the touch position data is within the display range of the selection function icon or not (step SD261).

When CPU 31 determines in step SD261 that the coordinate value indicated by the touch position data is within the display range of the selection function icon, CPU 31 performs the function corresponding to the selection function icon (step SD262).

When CPU 31 determines in step SD261 that the coordinate value indicated by the touch position data is not within the display range of the selection function icon, CPU 31 determines whether the coordinate value indicated by the touch position is within the display range of "back" icon 513.

When CPU 31 determines in step SD263 that the coordinate value indicated by the touch position data is within the display range of "back" icon 513, recording data file list selection screen 600 which is the preceding screen is displayed (step SD230).

On the other hand, when CPU 31 determines in step SD263 that the coordinate value indicated by the touch position is not within the display range of "back" icon 513, the process returns to step SD252.

Figure 98:
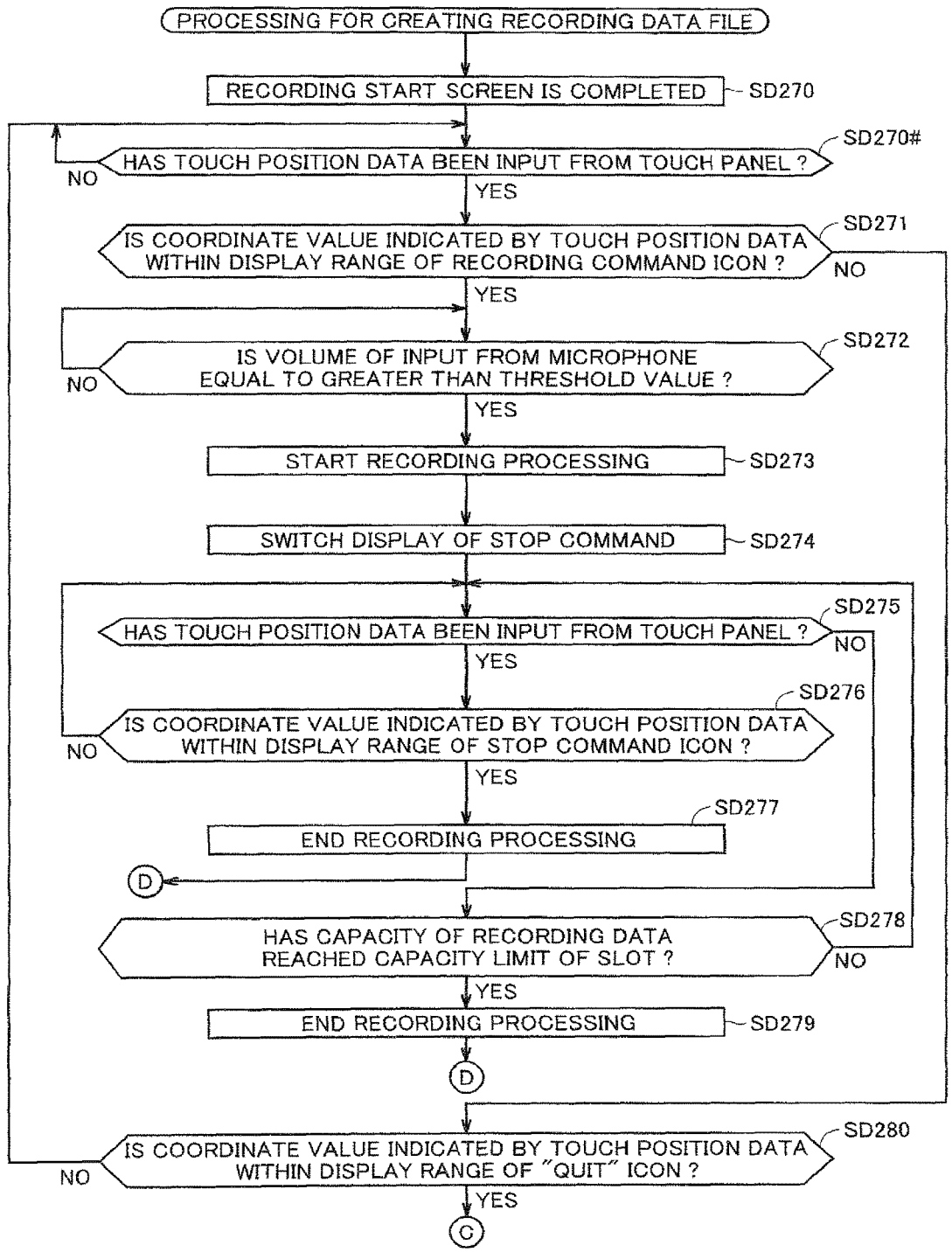
FIG. 98 is a flowchart illustrating sub routine processing (No. 1) of processing for creating a recording data file.
Figure 100:
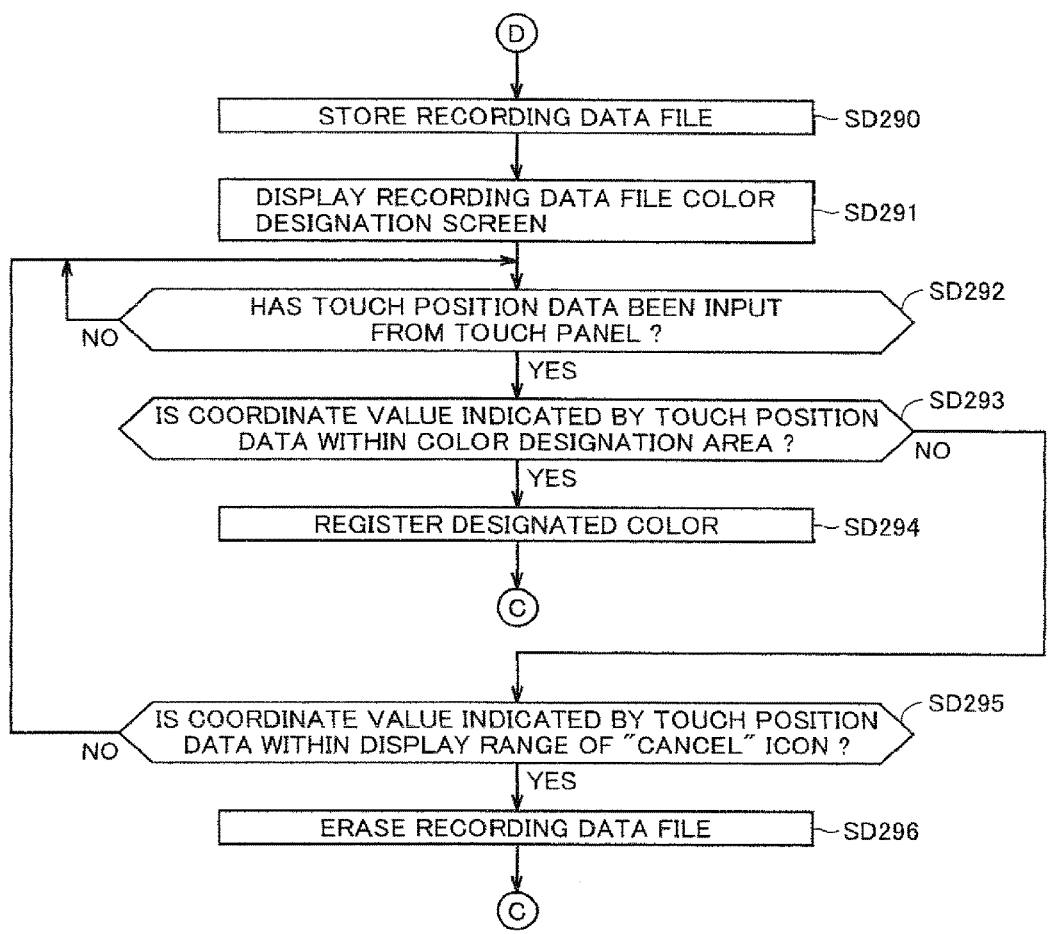
FIG. 100 is a flowchart illustrating sub routine processing (No. 2) of processing for creating a recording data file.

FIGS. 98 and 100 are flowcharts illustrating sub routine processing of the processing for creating a recording data file.

As described above, it is assumed that a plurality of slots used for processing for recording in memory 34 for storage are provided in advance in the present embodiment.

Referring to FIG. 98, initially, CPU 31 has recording start screen 602 displayed.

Figure 99:
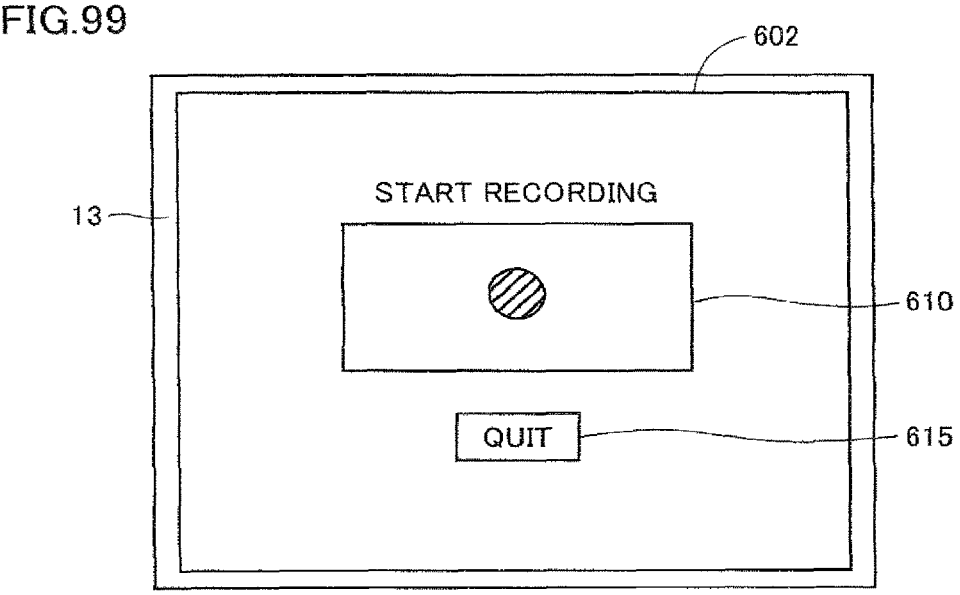
FIG. 99 is a diagram illustrating a recording start screen according to the present embodiment.

FIG. 99 is a diagram illustrating recording start screen 602 according to the present embodiment (step SD270).

Referring to FIG. 99, a recording command icon 610 is provided in recording start screen 602. In addition, a "quit" icon 615 is provided. By pressing recording command icon 610, recording is started. In addition, it is assumed that, after recording is started, display of recording command icon 610 is changed to display of a stop command icon 610#. By pressing stop command icon 610#, recording is stopped. In addition, by pressing "quit" icon 615, it is assumed that the screen returns to recording data file list selection screen 600 which is the preceding screen.

Referring again to FIG. 98, CPU 31 determines whether the touch position data has been input from touch panel 13 or not (step SD270#).

Thereafter, when CPU 31 determines that the touch position data has been input from touch panel 13, CPU 31 then determines whether the coordinate value indicated by the touch position data is within the display range of the recording command icon or not (step SD271).

When CPU 31 determines in step SD271 that the coordinate value indicated by the touch position data is within the display range of recording command icon 610, CPU 31 then determines whether the volume of input from the microphone is equal to or greater than the threshold value or not (step SD272).

When it is determined that the volume of input from the microphone is equal to or greater than the threshold value, CPU 31 then starts the recording processing (step SD273).

Thereafter, CPU 31 makes switching of display of the recording command (step SD274). Specifically, stop command icon 610# is displayed.

Thereafter, CPU 31 determines whether the touch position data has been input from touch panel 13 or not (step SD275).

When CPU 31 determines that the touch position data has been input from touch panel 13, CPU 31 determines whether the coordinate value indicated by the touch position data is within the display range of stop command icon 610# or not (step SD276).

When CPU 31 determines in step SD276 that the coordinate value indicated by the touch position data is within the display range of stop command icon 610#, the recording processing ends (step SD277) and the process proceeds to "D".

Referring to FIG. 100, when the recording processing ends in step SD277, CPU 31 then stores the recording data file (step SD290). Specifically, CPU 31 causes data memory 34 for storage to store the recording data file through memory control circuit 33.

Thereafter, CPU 31 has a recording data file color designation screen displayed (step SD291).

Figure 101:
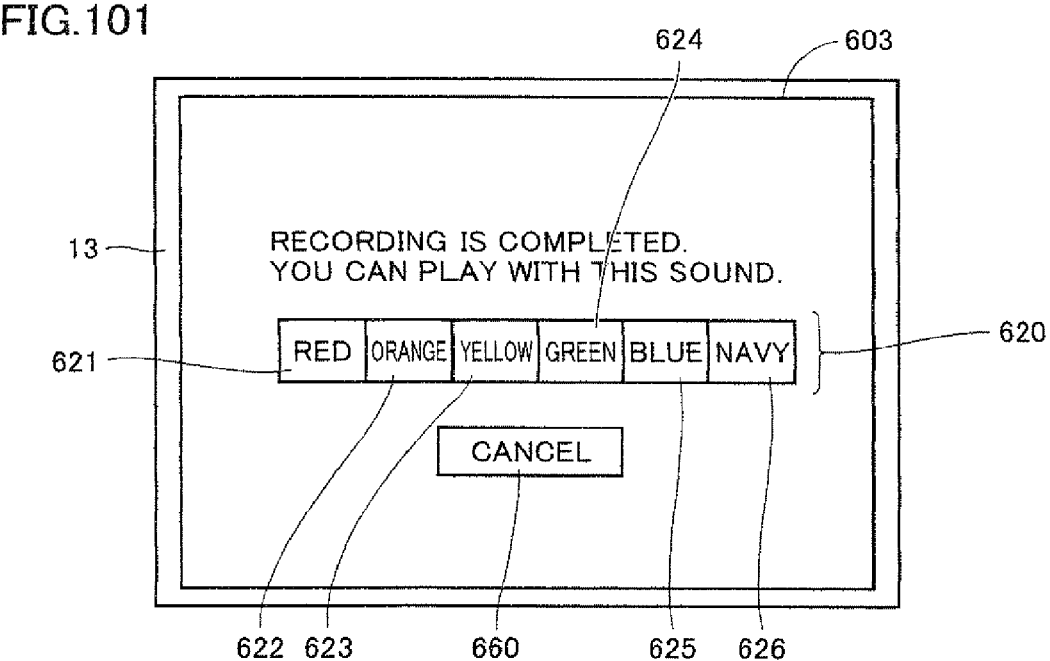
FIG. 101 is a diagram illustrating a recording data file color designation screen according to the present embodiment.

FIG. 101 is a diagram illustrating a recording data file color designation screen 603 according to the present embodiment.

Referring to FIG. 101, a case where a message "Recording is completed. You can play with this sound." is displayed on recording data file color designation screen 603 according to the present embodiment is shown. A color designation area 620 is provided and color designation selection icons 621 to 626 indicating red, orange, yellow, green, blue, and navy, respectively are provided. The user can designate any color designation icon by touching the icon with touch pen 27 etc. A display color of the recording data file corresponding to the designated slot is registered in this designated color. In addition, by pressing a "cancel" icon 630, the recording data file is erased and the screen returns to recording data file list selection screen 600.

Referring again to FIG. 100, CPU 31 determines whether the touch position data has been input from touch panel 13 or not (step SD292).

When CPU 31 determines in step SD292 that the touch position data has been input from touch panel 13, CPU 31 then determines whether the coordinate value indicated by the touch position data is within the color designation area or not (step SD293).

When CPU 31 determines in step SD293 that the coordinate value indicated by the touch position data is within the color designation area, the designated display color is registered (step SD294). Then, CPU 31 has recording data file list selection screen 600 displayed. Here, the selected recording data file is displayed in the designated display color.

On the other hand, when CPU 31 determines in step SD293 that the coordinate value indicated by the touch position data is not within the color designation area, CPU 31 then determines whether the coordinate value indicated by the touch position data is within the display range of "cancel" icon 630 or not (step SD295).

When CPU 31 determines in step SD295 that the coordinate value indicated by the touch position data is not within the display range of "cancel" icon 630, the process returns to step SD292.

On the other hand, when CPU 31 determines in step SD295 that the coordinate value indicated by the touch position data is within the display range of "cancel" icon 630, the recording data file corresponding to the designated slot is erased (step SD296).

Then, CPU 31 has recording data file list selection screen 600 displayed. Here, the selected file is displayed as a file in which no recording data is stored.

Referring again to FIG. 98, when CPU 31 determines in step SD276 that the coordinate value indicated by the touch position data is not within the display range of stop command icon 610#, the process returns to step SD275.

When the touch position data has not been input from touch panel 13 in step SD275, CPU 31 determines whether the capacity of the recording data has reached the capacity limit of the slot or not (step SD278).

When CPU 31 determines in step SD278 that the capacity of the recording data has not reached the capacity limit of the slot, the process again returns to step SD275.

When CPU 31 determines in step SD278 that the capacity of the recording data has not reached the capacity limit of the slot, the process again returns to step SD275.

Then, when CPU 31 determines in step SD278 that the capacity of the recording data has reached the capacity limit of the slot, the recording processing ends (step SD279). Then, the process proceeds to step SD290 in FIG. 100. The subsequent processing is as described above.

On the other hand, when CPU 31 determines in step SD271 that the coordinate value indicated by the touch position data is not within the display range of recording command icon 610, CPU 31 then determines whether the coordinate value indicated by the touch position data is within the display range of "quit" icon 615 or not.

When CPU 31 determines in step SD280 that the coordinate value indicated by the touch position data is within the display range of "quit" icon 615, CPU 31 has recording data file list selection screen 600 as described in connection with FIG. 95 displayed.

On the other hand, when CPU 31 determines in step SD280 that the coordinate value indicated by the touch position data is not within the display range of "quit" icon 615, the process proceeds to step SD270#.

As a result of this processing, the user can create a recording data file freely recorded by the user through the microphone in the main body and reproduce the created recording data file. In addition, the function to display the created recording data file by selecting recording data selection icon 544 described in connection with FIG. 65 and to output the recording data file recorded in a similar manner as sound effect from the speaker can also be performed.

In the present embodiment described above, for example, a case where the slot storing the recording data file is provided in memory 34 for storage embedded in game device 10 has been described. Storage of the recording data file, however, is not limited to storage in memory 34 for storage, and for example, the recording data file may be stored in a memory card such as an SD card in accordance with a user's operation instruction.

[10. Storage Medium Storing Program]

Description above has been provided on the premise that various application programs to be executed are stored in any of at least data memory 34 for storage, memory card 28, and memory card 29. A more preferred embodiment of an application program stored in each storage medium will be exemplified hereinafter.

Figure 103:
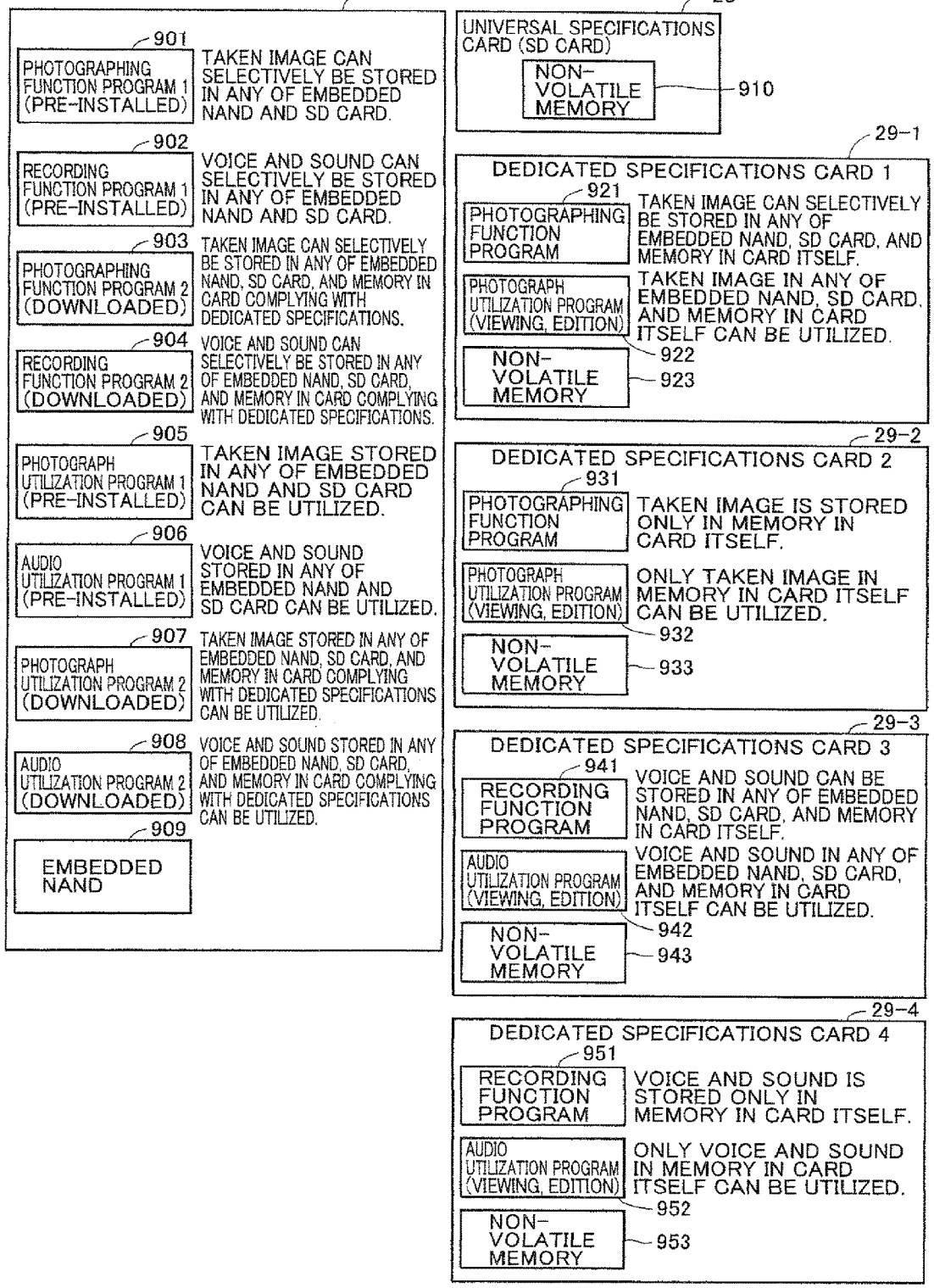
FIG. 103 is a diagram for illustrating a storage medium that can be used in the game device according to the present embodiment.

FIG. 103 is a diagram for illustrating a storage medium that can be used with game device 10 according to the present embodiment.

Referring to FIG. 103, data memory 34 for storage embedded in game device 10 is provided with a program area and a data area separately for each other. Typically, a first photographing function program 901 (for example, photographing function program 52 or photographing application program 53 described previously), a first recording function program 902 (for example, sound application program 57 described previously), a second photographing function program 903 (which is a program that has not yet been described so far, for example, a program similar to photographing application program 53 described previously that allows storage of taken images also in a memory in an attached card complying with dedicated specifications in a photographing mode and allows display of taken images stored in the memory in the attached card complying with dedicated specifications), a second recording function program 904 (which is a program that has not yet been described so far, for example, a program similar to sound application program 57 described previously that allows storage of audio data also in a memory in an attached card complying with dedicated specifications and allows utilization of audio data stored in the memory in the attached card complying with dedicated specifications), a first photograph utilization program 905 (which is a program that has not yet been described so far, for example, a program having an edition function (only the edition function in the photographing mode described previously) and a photograph viewing function (the photograph display mode described previously) in photographing application program 53 described previously), a first audio utilization program 906 (which is a program that has not yet been described so far, for example, a program having functions of sound application program 57 described previously with the recording function being deleted therefrom), a second photograph utilization program 907 (which is a program that has not yet been described so far, for example, a program that has only the photograph display mode of photographing application program 53 described previously and in addition allows display of taken images stored in a memory in an attached card complying with dedicated specifications), and a second audio utilization program 907 (which is a program that has not yet been described so far, for example, a program having functions of sound application program 57 described previously with the recording function being deleted therefrom, that allows reproduction or edition of the audio data stored in the memory in the attached card complying with dedicated specifications) can be stored in the program area.

It is assumed that first photographing function program 901, first recording function program 902, first photograph utilization program 905, and first audio utilization program 906 among these programs are stored in advance (preinstalled) in data memory 34 for storage of game device 10.

In contrast, second photographing function program 903, second recording function program 904, second photograph utilization program 907, and second audio utilization program 907 are downloaded from a not-shown distribution server through wireless communication module 38, local communication module 39, or other communication means.

In addition, a data area 909 can store in a non-volatile manner, image pick-up data obtained by first or second photographing function program 901 or 903 and/or audio data obtained by first or second recording function program 902 or 904 or the like. It is noted that image pick-up data obtained by the first photographing function program and image pick-up data obtained by the second photographing function program may be stored in the same area without distinction, so that both of them can be utilized. Alternatively, the audio data obtained by the first recording function program and the audio data obtained by the second recording function program may be stored in the same area without distinction, so that both of them can be utilized.

For better understanding, FIG. 103 shows an "embedded NAND" representing a NAND-type flash memory typically implementing data memory 34 for storage. Naturally, memory 34 for storage may be implemented by a non-volatile memory other than the NAND-type flash memory.

In addition, memory card 28 (typically an SD card) implemented by a universal specifications card complying with universal specifications can be attached to game device 10 according to the present embodiment through memory card interface 36 (FIG. 18). Memory card 28 can store various types of data in a non-volatile manner. Namely, memory card 28 is provided with a data area 910.

Moreover, any of various memory cards 29-1 to 29-4 implemented by a dedicated specifications card complying with dedicated specifications can selectively be attached to game device 10 according to the present embodiment through memory card interface 37 (FIG. 18). Each of memory cards 29-1 to 29-4 is provided with a program area and a data area separately from each other.

More specifically, it is assumed that memory card 28-1 stores a photographing function program 921 (a program having a function similar to that of photographing function program 2 described previously, but different in specific contents thereof) and a photograph utilization program 922 (a program having a function similar to that of the second photograph utilization program described previously, but different in specific contents thereof). In addition, memory card 29-1 is provided with a data area 923 where image pick-up data and/or audio data can be stored in a non-volatile manner.

Similarly, it is assumed that memory card 29-2 stores a photographing function program 931 (a program having a function similar to that of photographing function program 2 described previously, but different in specific contents thereof; storage destination of taken images being limited to a non-volatile memory 933 in the card itself) and a photograph utilization program 932 (a program having a function similar to that of photograph utilization program 2 described previously, but different in specific contents thereof; photographs that can be utilized being limited to taken images stored in non-volatile memory 933 in the card itself). In addition, memory card 28-2 is provided with a data area 933 where image pick-up data and/or audio data can be stored in a non-volatile manner.

In addition, it is assumed that memory card 29-3 stores a recording function program 941 (a program having a function similar to that of recording function program 2 described previously, but different in specific contents thereof) and an audio utilization program 942 (a program having a function similar to that of audio utilization program 2 described previously, but different in specific contents thereof). Moreover, memory card 28-3 is provided with a data area 943 where image pick-up data and/or audio data can be stored in a non-volatile manner.

Similarly, it is assumed that memory card 28-4 stores a recording function program 951 (a program having a function similar to that of recording function program 2 described previously, but different in specific contents thereof; storage destination of recorded audio data being limited to a non-volatile memory 953 in the card itself) and an audio utilization program 952 (a program having a function similar to that of audio utilization program 2 described previously, but different in specific contents thereof; audio data that can be utilized being limited to audio data stored in non-volatile memory 933 in the card itself). Moreover, memory card 28-4 is provided with a data area 953 where image pick-up data and/or audio data can be stored in a non-volatile manner.

Programs stored in respective storage media are different from each other in a provided function in a part or in its entirety, for example, even though a program is a photographing function program providing the same photographing function.

For example, first photographing function program 901 pre-installed in the main body of game device 10 and second photographing function program 903 stored in game device 10 as a result of downloading are different from each other in a variety of choices of storage destination of image data obtained in photographing. Namely, according to first photographing function program 901, the obtained image pick-up data can selectively be stored in any of embedded data memory 34 for storage (data area 909, embedded NAND) and memory card 28 (SD card). On the other hand, according to second photographing function program 903, the obtained image pick-up data can selectively be stored in any of embedded data memory 34 for storage (data area 909, embedded NAND), memory card 28 (SD card), and memory card 29 attached to game device 10 (card complying with dedicated specifications). Namely, second photographing function program 903 provides more sophisticated processing than first photographing function program 901, in terms of a variety of choices of storage destination of image pick-up data.

The processing as shown in FIG. 30 above is performed as a result of execution of any photographing function program by CPU 31. Difference in a function between similar photographing function programs leads to the different number of button images for selecting a storage destination shown in FIG. 31.

Similarly, according to first recording function program 902, the obtained audio data can selectively be stored in any of embedded data memory 34 for storage (data area 909, embedded NAND) and memory card 28 (SD card). On the other hand, according to second recording function program 904, the obtained audio data can selectively be stored in any of embedded data memory 34 for storage (data area 909, embedded NAND), memory card 28 (SD card), and memory card 29 attached to game device 10 (card complying with dedicated specifications). Namely, second photographing recording program 904 provides more sophisticated processing than first recording function program 902, in terms of a variety of choices of storage destination of image pick-up data. It is noted that the processing as shown in FIG. 30 above is implemented as a result of execution of the recording function program by CPU 31.

It is noted that the processing as shown in FIG. 98 above is implemented as a result of execution of any recording function program by CPU 31. Difference in a function between similar recording function programs leads to difference in a variety of choices of a storage destination of a recording data file, as shown in step SD290 in FIG. 100.

In addition, according to first photograph utilization program 905, image pick-up data stored in any of embedded data memory 34 for storage (data area 909, embedded NAND) and memory card 28 (SD card) can selectively be utilized. On the other hand, according to second photograph utilization program 907, image pick-up data stored in any of embedded data memory 34 for storage (data area 909, embedded NAND), memory card 28 (SD card), and memory card 29 attached to game device 10 (card complying with dedicated specifications) can selectively be utilized. Namely, second photograph utilization program 907 provides more sophisticated processing than first photograph utilization program 905, in terms of a variety of choices of a storage medium from which image pick-up data can be read and utilized.

It is noted that the processing as shown in FIG. 32 above is implemented as a result of execution of any photograph utilization program by CPU 31. Namely, image pick-up data that has already been obtained can be viewed (displayed) or the image pick-up data can be subjected to various types of edition. Difference in a function between similar photograph utilization programs leads to the different number of button images for allowing selection of a source of reading shown in FIG. 31.

Similarly, according to first audio utilization program 906, audio data stored in any of embedded data memory 34 for storage (data area 909, embedded NAND) and memory card 28 (SD card) can selectively be utilized. On the other hand, according to second audio utilizing program 908, audio data stored in any of embedded data memory 34 for storage (data area 909, embedded NAND), memory card 28 (SD card), and memory card 29 attached to game device 10 (card complying with dedicated specifications) can selectively be utilized. Namely, second audio utilization program 908 provides more sophisticated processing than first audio utilization program 906, in terms of a variety of choices of a storage medium from which audio data can be read and utilized.

It is noted that the processing as shown in FIG. 97 above is implemented as a result of execution of any audio utilization program by CPU 31. Difference in a function between similar audio utilization programs leads to difference in a variety of choices of a source from which audio data to be reproduced is read.

Photographing function program 921 stored in memory card 29-1 provides a function similar to that of second photographing function program 903 stored in data memory 34 for storage. Namely, according to photographing function program 921, obtained image pick-up data can selectively be stored in any of data memory 34 for storage embedded in the main body of game device 10 (data area 909, embedded NAND), memory card 28 (SD card), and memory card 29-1 itself (data area 923). Namely, photographing function program 921 provides more sophisticated processing than first photographing function program 901 stored in data memory 34 for storage embedded in the main body of game device 10, in terms of a variety of choices of a storage destination of image pick-up data.

In contrast, photographing function program 931 stored in memory card 29-2 is restricted in a function that it can provide, as compared with photographing function program 921. Namely, according to photographing function program 931, obtained image pick-up data can be stored only in memory card 29-2 itself (data area 933).

In addition, photograph utilization program 922 stored in memory card 29-1 provides a function similar to that of second photograph utilization program 907 stored in data memory 34 for storage. Namely, according to photograph utilization program 922, image pick-up data stored in any of data memory 34 for storage embedded in the main body of game device 10 (data area 909, embedded NAND), memory card 28 (SD card), and memory card 29-1 itself (data area 923) can selectively be utilized. Namely, photograph utilization program 922 provides more sophisticated processing than first photograph utilization program 905 stored in data memory 34 for storage embedded in the main body of game device 10, in terms of a variety of choices of a storage medium from which image pick-up data can be read and utilized.

In contrast, photograph utilization program 932 stored in memory card 29-2 is restricted in a function that it can provide, as compared with photograph utilization program 922. Namely, according to photograph utilization program 932, image pick-up data stored in memory card 29-2 itself (data area 933) can only be utilized.

Similarly, recording function program 941 stored in memory card 29-3 provides a function similar to that of second recording function program 904 stored in data memory 34 for storage. Namely, according to recording function program 941, obtained audio data can selectively be stored in any of data memory 34 for storage embedded in the main body of game device 10 (data area 909, embedded NAND), memory card 28 (SD card), and memory card 29-3 itself (data area 943). Namely, recording function program 941 provides more sophisticated processing than first recording function program 902 stored in data memory 34 for storage embedded in the main body of game device 10, in terms of a variety of choices of a storage destination of audio data.

In contrast, recording function program 951 stored in memory card 29-4 is restricted in a function that it can provide, as compared with recording function program 941. Namely, according to recording function program 951, obtained audio data can be stored only in memory card 29-4 itself (data area 953).

In addition, audio utilization program 942 stored in memory card 29-3 provides a function similar to that of second audio utilization program 908 stored in data memory 34 for storage. Namely, according to audio utilization program 942, image pick-up data stored in any of data memory 34 for storage embedded in the main body of game device 10 (data area 909, embedded NAND), memory card 28 (SD card), and memory card 29-3 itself (data area 943) can selectively be utilized. Namely, audio utilization program 942 provides more sophisticated processing than first audio utilization program 906 stored in data memory 34 for storage embedded in the main body of game device 10, in terms of a variety of choices of a storage medium from which audio data can be read and utilized.

In contrast, audio utilization program 952 stored in memory card 29-4 is restricted in a function that it can provide, as compared with audio utilization program 942. Namely, according to audio utilization program 942, audio data stored in memory card 29-4 itself (data area 953) can only be utilized.

In game device 100 according to the present embodiment, reading and execution of an application stored in memory cards 29-1 to 29-4 that are memory cards complying with dedicated specifications is permitted, however, reading and execution of an application stored in memory card 28 which is a memory card complying with universal specifications is prohibited.

Thus, game device 100 according to the present embodiment can execute various applications stored in various types of storage media. Therefore, a degree of freedom of a method of marketing or distributing an application program can be enhanced. For example, an application program capable of executing only a basic function may be pre-installed in data memory 34 for storage embedded in game device 10 and an application program may be marketed in such a manner that an application program capable of executing a more sophisticated function is downloaded or provided in a form of a card complying with dedicated specifications.

[11. Function and Effect of Present Embodiment and Other Features]

The present invention is implemented as embodiments as described above, however, the present invention essentially includes the following aspects. In the description below, for better understanding of the present invention, correspondence with the embodiments described above is shown, however, reference numerals, supplemental explanation and the like in parentheses are not intended to limit the present invention in any manner.

<First Aspect>

According to the first aspect of the present invention, a portable image pick-up device (10) including a first housing (lower housing 11), a second housing (upper housing 21), a first image pick-up portion (outer camera 25), a first display portion (lower LCD 12), touch coordinate detection means (touch panel 13), first display control means (CPU 31 performing step SB6), and change means (CPU 31 performing step SB5) is provided. The second housing is foldably connected to the first housing. The first image pick-up portion is provided in an outer surface of the second housing when folded. The first display portion has a display screen in an inner surface of the first housing when folded. The touch coordinate detection means detects touch coordinates on the display screen of the first display portion. The first display control means causes the first display portion to display a live image currently picked-up by the first image pick-up portion. The change means changes the live image based on an input to the touch coordinate detection means.

It is noted that the above phrase "changes the live image based on an input to the touch coordinate detection means" typically includes the following examples, but not limited thereto, and includes combining a prescribed image with a live image by providing a touch input to the live image (typically, at a position based on a touch input) or performing prescribed image conversion processing on a live image (typically, performing image conversion processing on a position or an area based on a touch input).

Drawing an image handwritten by a touch input on a live image

Combining a stamp image at a touched position with a live image

Performing image processing for distorting an image at a touched position or in a touched area on a live image Performing processing for changing color at a touched position or in a touched area on a live image According to this aspect, the following first problem can be solved.

(First Problem)

In the portable phone described in Japanese Patent Laying-Open No. 2006-311224 (Patent Document 1), an image being picked-up by the camera (a live image; an image which is a picked-up image output from the camera and displayed as a moving image in real-time) is displayed on a display screen provided in a housing on which the camera is mounted. This is because, since a photographing direction of the camera is opposite to a direction in which the live image is displayed, the live image is displayed such that a user can view the live image in the same direction as a direction of viewing a real view, and thus it is easy for the user to recognize where the user is photographing in the real view. In the portable phone described in Japanese Patent Laying-Open No. 2006-311224 (Patent Document 1), however, it is impossible to perform an edition operation on the live image.

Here, the edition operation on the live image is an operation for modifying the live image, such as superimposing on the live image an image prepared in advance and referred to as a stamp image or a seal image and an image handwritten by a user, and the like. Examples of devices capable of such an edition operation include those in Japanese Patent Laying-Open No. 04-156791 (Patent Document 5), Japanese Patent Laying-Open No. 06-276478 (Patent Document 6), Japanese Patent Laying-Open No. 01-297986 (Patent Document 7), Japanese Patent Laying-Open No. 2002-125176 (Patent Document 8), and Japanese Patent Laying-Open No. 2004-320091 (Patent Document 9).

For example, in the image pick-up device described in Japanese Patent Laying-Open No. 04-156791 (Patent Document 5), an input to a still image or a live image can be made through a touch panel. In this image pick-up device, however, since a screen for displaying a live image is located on a back side of a camera lens (see FIG. 1 of Japanese Patent Laying-Open No. 04-156791), it is difficult to place the image pick-up device with the touch panel facing upward, and a user cannot perform an edition operation (a touch input operation to the touch panel) in a stable manner.

Further, in an audio and image recording/displaying device described in Japanese Patent Laying-Open No. 06-276478 (Patent Document 6), a mouse is used as an input device for adding a handwritten image to a live image displayed on a display portion. Thus, it is impossible to perform an intuitive edition operation to directly touch a live image. In addition, when the audio and image recording/displaying device above is placed, a photographing direction of a camera cannot be changed in an up-down direction, and hence a degree of freedom of photographing is limited when the audio and video recording/displaying device is placed.

Further, according to a device described in Japanese Patent Laying-Open No. 01-297986 (Patent Document 7), an image created by a user with a digitizer can be superimposed on a picked-up image. In the device above, however, the user merely creates in advance an image with the digitizer and superimposes the created image on a picked-up image, and the user cannot perform an edition operation on a live image. In addition, the digitizer is provided separately from a camera (see FIG. 1 of Japanese Patent Laying-Open No. 01-297986) or integrally with the camera (see FIGS. 5 and 6 of Japanese Patent Laying-Open No. 01-297986). Thus, when the digitizer is provided separately from the camera, the device is suitable for use in a placed state. On the other hand, in using the device while holding the same, both of two devices (the camera and the digitizer) should be held, which leads to difficulty in operating the device. When the digitizer is provided integrally with the camera, since a display screen is arranged perpendicular to a surface on which the device is placed as in Japanese Patent Laying-Open No. 04-156791 (Patent Document 5) and Japanese Patent Laying-Open No. 06-276478 (Patent Document 6) above, an operation of the digitizer is difficult.

Devices disclosed in Japanese Patent Laying-Open No. 2002-125176 (Patent Document 8) and Japanese Patent Laying-Open No. 2004-320091 (Patent Document 9) are stationary devices, and two manners of use including holding the device and placing the device are not taken into consideration.

(Function and Effect According to First Aspect)

According to the first aspect, in order to address the first problem above, a portable image pick-up device with which it is easy to perform an edition operation on a live image can be provided.

Namely, according to the first aspect, a camera is provided in an upper housing (the second housing) of a foldable portable image pick-up device, and a live image being picked-up by the camera is displayed on a screen provided in a lower housing (the first housing). By using a touch panel provided on the screen, a user can perform an edition operation directly on the live image. According to the feature above, since a photographing direction of the camera can be changed independently of a surface on which an edition operation on a live image is performed (a surface of the touch panel), the touch panel can be arranged at such an angle as facilitating the user's operation in either holding or placing the image pick-up device for use. Namely, an edition operation on a live image is facilitated. In other words, even when the touch panel is arranged at such an angle as facilitating the user's operation, the photographing direction of the camera can freely be adjusted and hence photographing can easily be performed.

According to a more preferred aspect of the first aspect, the portable image pick-up device may further include a second display portion (upper LCD 22), storage means (data memory 34 for storage), storing means (CPU 31 performing step SB9), and second display control means (CPU 31 performing step SB10). The second display portion has a display screen in an inner surface of the second housing when folded. The storing means causes the storage means to store the live image that has been changed by the change means as a stored image in accordance with a prescribed operation. The second display control means causes the second display portion to display the stored image.

According to this aspect, by displaying a picked-up image on a display screen facing in a direction opposite to the photographing direction of the camera, a stored image that has already been taken can be presented to the user together with a live image.

According to a more preferred aspect of the first aspect, in the third invention, the second display control means may cause the second display portion to display a stored image stored in response to the prescribed operation, in accordance with the prescribed operation being performed.

According to this aspect, when the user performs a photographing operation, an image obtained by the photographing operation is displayed on the second display portion immediately after the photographing operation. Therefore, (though the photographing direction does not correspond to a direction in which a live image is displayed,) by causing the photographing direction of the camera to correspond to a direction in which a taken image is displayed, the picked-up image can be presented to the user so that the user easily recognizes the photographing direction.

According to a more preferred aspect of the first aspect, the first image pick-up portion may be arranged in an area of the outer surface of the second housing corresponding to non-screen areas of the inner surface of the second housing provided on both right and left sides of the second display portion, on a side more distant from a lower side of the second housing than a center thereof in an up-down direction.

According to this aspect, by arranging the first image pick-up portion on an upper side of the upper housing (the second housing), when the portable image pick-up device is held for use, an image of a hand of the user holding the lower housing can be prevented from being picked-up. In addition, when the portable image pick-up device is placed for use, since a distance from a surface on which the portable image pick-up device is placed to the first image pick-up portion is increased, an image of the surface on which the portable image pick-up device is placed can be prevented from being picked-up. Further, by arranging the camera in a non-screen area of the upper housing, a space of the non-screen area is effectively used and the device can be reduced in size.

According to a more preferred aspect of the first aspect, a prescribed image for performing the photographing operation may be displayed on the first display portion. Here, the portable image pick-up device further includes storage means (data memory 34 for storage) and storing means (CPU 31 performing step SB9). The storing means causes the storage means to store the live image that has been changed by the change means as a stored image, in accordance with an operation to designate the prescribed image through coordinate input means.

According to this aspect, a photographing operation can be performed by operating the touch panel. In other words, since an edition operation and a photographing operation can both be performed through the touch panel, it becomes extremely easy for the user to perform the photographing operation after the edition operation.

According to a more preferred aspect of the first aspect, the portable image pick-up device may further include an operation button (button 14I and/or 14J), storage means (data memory 34 for storage) and storing means (CPU 31 performing step SB9). The operation button is provided at least at one of right and left ends of an upper side of the first housing. The storing means causes the storage means to store the live image that has been changed by the change means as a stored image in accordance with an operation of the operation button.

According to this aspect, the user can perform a photographing operation by pressing the operation button with a hand holding the portable image pick-up device. In other words, since the user can perform a photographing operation while holding the portable image pick-up device, the user can easily perform a photographing operation.

According to a more preferred aspect of the first aspect, the operation button may be provided at a left end of the upper side of the first housing as viewed from the inner surface of the first housing.

According to this aspect, while holding the portable image pick-up device with a left hand and performing an edition operation on a live image with a right hand, the user can perform a photographing operation by pressing the operation button with the left hand. Therefore, the user can quickly perform a photographing operation with the left hand while performing an edition operation with the right hand when holding the portable image pick-up device, and hence the user can easily perform an edition operation and a photographing operation.

According to a more preferred aspect of the first aspect, the operation button may be provided at each of the right and left ends of the upper side of the first housing.

According to this aspect, either a right-handed user or a left-handed user can easily perform an edition operation and a photographing operation.

According to a more preferred aspect of the first aspect, the portable image pick-up device may further include a second image pick-up portion (inner camera 23) provided in an inner surface of the second housing. Here, the first display control means causes the first display portion to display a live image currently picked-up by the first image pick-up portion or the second image pick-up portion.

According to this aspect, by providing the image pick-up means also in the inner surface of the second housing, photographing can be performed also in a direction opposite to a photographing direction of the first image pick-up portion.

According to a more preferred aspect of the first aspect, the portable image pick-up device may further include an operation button (button 14I and/or 14J), storage means (data memory 34 for storage) and storing means (CPU 31 performing step SB9). The operation button is provided at at least one of right and left ends of an upper side of the first housing. The storing means causes the storage means to store the live image that has been changed by the change means as a stored image in accordance with an operation of the operation button. The first housing has a first shaft portion (11A) provided to project from the inner surface of the first housing in a direction perpendicular thereto. The second housing has a second shaft portion (21A) pivotably connected to the first shaft portion. The second image pick-up portion is arranged in the second shaft portion.

According to this aspect, by providing the second image pick-up portion in the shaft portion (the second shaft portion), a space for the device is saved. Further, since the second shaft portion is located on the inner surface of the first housing, when the two housings are folded, the second image pick-up portion faces the first housing. Thus, when the portable image pick-up device is closed, the second image pick-up portion is covered with the inner surface of the first housing and not exposed to the outside, thereby protecting the second image pick-up portion.

According to an alternative aspect of the first aspect, a program executed by a computer of a portable image pick-up device for achieving the functions in the invention described above may also be provided. The program provides a program executed by a computer of a portable image pick-up device including the first housing above, the second housing above, the first image pick-up portion above, the first display portion above, and the touch coordinate detection means above, and causes the computer to execute a first display control step (SB6) and a change step (SB5). In the first display control step, the computer causes the first display portion to display a live image currently picked-up by the first image pick-up portion. In the change step, the computer changes the live image based on an input to the touch coordinate detection means.

<Second Aspect>

According to the second aspect of the present invention, an image pick-up device including a first housing (lower housing 11), a second housing (upper housing 21), a first display portion (lower LCD 12), a first image pick-up portion (outer camera 25), a plurality of operation buttons (buttons 14A to 14E), and a touch panel (13) is provided. The first housing has a horizontally long shape. The second housing has a horizontally long shape, and a long side thereof is connected to an upper long side of the first housing such that the first and second housings are foldable. The first display portion has a display screen provided in an inner surface thereof, which is a surface located inside when the first and second housings are folded. The first image pick-up portion is provided in an outer surface of the second housing which is a surface located outside when the first and second housings are folded, and arranged at an end portion opposite to a connection portion where the second housing is connected to the first housing. The plurality of operation buttons are provided on the inner surface of the first housing, on opposing sides of the display screen in a longitudinal direction of the first housing. The touch panel is provided on the display screen.

According to this aspect, the following second problem can be solved.

(Second Problem)

In the image pick-up device disclosed in Japanese Patent Laying-Open No. 2006-311224 (Patent Document 1), the vertically long housings are arranged lengthwise and connected to each other. Thus, a width of the image pick-up device is too small for a user to firmly hold the image pick-up device with both hands. Further, since the display screen is provided across the entire surface of each housing, when the user holds the image pick-up device either lengthwise or sideways, fingers are located on the screen, thereby deteriorating visibility of the screen and operability of the touch panel. On the other hand, when the user holds the image pick-up device such that the fingers are not located on the screen, the user has to hold the image pick-up device at back surfaces and side surfaces of the housings, and hence cannot firmly hold the image pick-up device. Further, since the information equipment disclosed in Japanese Patent Laying-Open No. 2001-142564 (Patent Document 4) is a notebook personal computer, it is assumed that the notebook personal computer is used in a placed state in image pick-up, and the notebook personal computer cannot be held with hands for use in image pick-up.

As described above, the image pick-up devices disclosed in Japanese Patent Laying-Open No. 2006-311224 (Patent Document 1) and Japanese Patent Laying-Open No. 2001-142564 (Patent Document 4) respectively cannot firmly be held by the user while maintaining visibility of the screen and operability of the touch panel in image pick-up. Thus, there is a problem that hand movement is highly likely in image pick-up. Further, since the image pick-up device cannot firmly be held in image pick-up, an operation in image pick-up has been difficult.

(Function and Effect According to Second Aspect)

According to the second aspect, in order to address the second problem above, an image pick-up device that can firmly be held by the user while maintaining visibility of the display screen and operability of the touch panel in image pick-up can be provided.

Namely, according to the second aspect, when the user holds the image pick-up device sideways, the user can firmly hold the image pick-up device by holding portions of the first housing on opposing sides of the display screen (portions on which the operation buttons are provided). Here, hands of the user are located on the operation buttons, not on the display screen. Thus, the display screen is not covered with hands and hidden, and visibility of the display screen can be maintained. In other words, an image pick-up device that can firmly be held by the user while maintaining visibility of the display screen in image pick-up can be achieved.

In addition, according to the second aspect, the display portion and the touch panel are provided in the first housing held by the user. Therefore, even when the image pick-up device is held for use or even when the image pick-up device is placed on a desk or the like for use, an operation of the touch panel is easy (as compared to the case where the touch panel is provided in the second housing).

According to a more preferred aspect of the second aspect, the image pick-up device may further include a second display portion (upper LCD 22) of which display screen is provided in an inner surface of the second housing located inside when the first and second housings are folded. Here, non-display-screen areas (B1 and B2) having a width as large as that of areas (A1 and A2) on the inner surface of the first housing on which the plurality of operation buttons are provided are provided on the inner surface of the second housing, on opposing sides of the second display portion.

According to a more preferred aspect of the second aspect, the second housing may have a width as large as that of the first housing. In this case, the display screen of the first display portion and a display screen of the second display portion have the same width, and they are provided in the same position with regard to the longitudinal direction.

According to a more preferred aspect of the second aspect, the image pick-up device may further include a speaker provided inside the non-display-screen area of the second housing.

According to each aspect above, since the image pick-up device includes two display screens, more information can be displayed. Further, according to the configuration in which non-display-screen areas are provided on opposing sides of the display screen on the second housing ((1-2) above), even when the user rotates the image pick-up device by 90° from a state where the image pick-up device is held sideways to hold the image pick-up device lengthwise, the user can firmly hold the image pick-up device. In other words, when the user holds the image pick-up device lengthwise, the user can support the areas of the first housing on which the operation buttons are provided and the non-display-screen areas with thumbs and can support a back surface of each housing in which the display screen is provided with index fingers to little fingers. Thus, while the user can firmly hold the image pick-up device, the thumbs are not located on the display screen, and visibility of the display screen does not deteriorate. Further, according to the feature of (4) above, by arranging the speaker inside the non-display-screen area of the second housing, the inside space of the second housing can effectively be used and the image pick-up device can be made smaller in size.

According to a more preferred aspect of the second aspect, the second display portion may display an image picked-up by the first image pick-up portion in real time. Here, the first display portion displays an operation screen for performing an operation to the image pick-up device (see FIG. 42).

According to this aspect, the display screen on which the picked-up real-time image is displayed and the first image pick-up portion for picking up an image are both provided in the second housing. Thus, if the image pick-up direction of the first image pick-up portion is changed, an orientation of the display screen is changed accordingly. Thus, the user can intuitively and easily grasp the image pick-up direction.

In addition, according to this aspect, since the operation screen is displayed on the display screen provided in the first housing held by the user, the operation screen is displayed on the display screen in the vicinity of input means (the touch panel and the operation buttons). Therefore, the user can easily perform an operation while looking at the operation screen.

According to a more preferred aspect of the second aspect, when a real-time image picked-up by the first image pick-up portion is displayed on the second display portion, the first display portion may display an image for providing an input to the touch panel as the operation screen. Thus, an operation to the image pick-up device can easily be performed through the touch panel.

According to a more preferred aspect of the second aspect, the first display portion may display an image for editing a picked-up image. Thus, the user can easily perform edition processing through the touch panel.

According to a more preferred aspect of the second aspect, the image pick-up device may further include a second image pick-up portion (inner camera 23) provided in an inner surface of the second housing located inside when the first and second housings are folded, and provided on a side closer to a coupling portion of the first and second housings than a screen of the second display portion. Thus, the user can pick up images in two different directions without changing a manner of holding the image pick-up device. Further, when photographing is performed using the second image pick-up portion, as in the case of the first image pick-up portion, the image pick-up direction can easily be changed by adjusting an angle of the second housing, and the image pick-up direction of the image pick-up portion can easily be changed without providing a special mechanism. Further, since the second image pick-up portion is not exposed to the outside when the housings are folded, the second image pick-up portion can be protected by folding the housings.

According to a more preferred aspect of the second aspect, the image pick-up device may further include an image pick-up instruction button (button 14J) arranged at a right end of the upper long side of the first housing for giving an instruction to store a picked-up image. Thus, while holding the first housing, the user can easily press the photographing instruction button with an index finger.

According to a more preferred aspect of the second aspect, the image pick-up device may further include two image pick-up instruction buttons (buttons 14J and 14I) arranged at opposing ends of the upper long side of the first housing respectively, for giving an instruction to store a picked-up image. Thus, while holding the first housing, either a right-handed user or a left-handed user can easily press the photographing instruction button with an index finger.

According to a more preferred aspect of the second aspect, weight of the first housing and parts provided in the first housing may be greater than that of the second housing and parts provided in the second housing.

According to a more preferred aspect of the second aspect, at least a battery, a circuit board on which electronic parts are mounted, and a connector for removable connection of a storage medium may be provided in the first housing.

According to the two aspects above, when the image pick-up device is placed on a desk or the like, the image pick-up device is less likely to fall down. Further, by making the first housing held by the user heavier than the second housing, stability when the image pick-up device is held can be increased and hand movement in image pick-up can be prevented.

According to a more preferred aspect of the second aspect, the second housing can be fixed at an angle smaller than 180° with respect to the first housing. Thus, by setting the angle between the housings to be slightly smaller than 180°, the outer surfaces of the housings fit to a shape of a hand, and hence it becomes easier to hold the image pick-up device.

<Third Aspect>

According to the third aspect of the present invention, a foldable image pick-up device including a first image pick-up portion (camera 23 or 25), a first housing (lower housing 11), a second housing (upper housing 21), and a coupling portion (shaft portions 11A and 21A) is provided. The coupling portion foldably couples the first housing and the second housing to each other. Further, the image pick-up device includes at least one photographing button (buttons 14J and 14I) for giving an instruction to record an image picked-up by the first image pick-up portion. At least one photographing button is provided on a side surface of the first housing, assuming an inner surface of the first housing when folded as a front surface, on a side where the second housing is located when the first housing and the second housing are opened.

According to this aspect, the following third problem can be solved.

(Third Problem)

In the portable phone disclosed in Japanese Patent Laying-Open No. 2003-333149 (Patent Document 10), when a user performs photographing, a manner of operation in which the user presses a first shutter button with a thumb while holding the lower second housing with one hand is assumed. In other words, the user presses the first shutter button with the thumb while touching the inner surface of the second housing with a thumb and an outer surface of the second housing with other fingers (so as to sandwich the second housing between the thumb and other fingers). In such a manner of operation, since the thumb should be released from the second housing when pressing the first shutter button, the second housing cannot firmly be held. Thus, it is difficult to press the first shutter button, and hand movement may occur when the first shutter button is pressed. Thus, the conventional foldable image pick-up device suffers from a problem that it is difficult to perform a photographing operation by pressing the shutter button.

(Function and Effect According to Third Aspect)

According to the third aspect, in order to address the third problem above, operability in the photographing operation can be improved.

Namely, according to the third aspect, by providing the photographing button on the side surface of the first housing on a side where the first housing is coupled to the second housing, the user can press the photographing button with an index finger while holding the first housing by touching the inner surface of the first housing with a thumb and an outer surface of the first housing with a middle finger or the like (see FIGS. 9 and 10). Thus, since the user can press the photographing button while firmly holding the first housing, the button is easily pressed in a photographing operation, and hand movement is less likely. Thus, according to the feature of (2-1) above, operability in the photographing operation in the foldable image pick-up device can be improved.

In addition, according to the third aspect, since the photographing button is provided on the side surface of the first housing, the photographing operation can be performed even in a state where the image pick-up device is placed with its outer surface of the first housing facing downward. As the image pick-up portion is provided in the second housing, the user can freely change a photographing direction even in a state where the image pick-up device is placed.

According to a more preferred aspect of the third aspect, the first image pick-up portion may be provided in an outer surface of the second housing when folded.

According to this aspect, since the first image pick-up portion is provided in the second housing, the image pick-up direction can readily be changed by changing an angle of the second housing with respect to the first housing. Further, since the first image pick-up portion is provided in the outer surface of the second housing, photographing in a direction the same as the line-of-sight of the user can be carried out.

According to a more preferred aspect of the third aspect, the first image pick-up portion may be arranged in the outer surface of the second housing, on a side more distant from the coupling portion than a center thereof in an up-down direction. Here, the first housing and the second housing are vertically coupled to each other, and a direction in which the first housing and the second housing are coupled to each other is defined as the up-down direction. Further, a direction of a shaft by which the first housing and the second housing are coupled to each other is defined as a left-right direction. For example, when the first housing has a horizontally long shape, a longitudinal direction of the first housing may be defined as a left-right direction.

Since the user presses the photographing button provided on the side surface of the first housing with an index finger as described above, the index finger may be located within an image pick-up range of the first image pick-up portion, depending on a position of the first image pick-up portion. In contrast, according to the feature of (2-3) above, since the first image pick-up portion is located on a side distant from the connection portion with the first housing, the index finger can be prevented from being located within the image pick-up range of the first image pick-up portion.

According to a more preferred aspect of the third aspect, in the image pick-up device, first and second buttons may be provided on left and right ends of the side surface respectively, as at least one photographing button.

According to this aspect, since the photographing buttons are provided on the left and right ends of the side surface of the first housing respectively, the user can easily press the photographing button even when the user holds the image pick-up device with either a right hand or a left hand. Thus, according to the feature of (2-4) above, the user can easily perform the photographing operation regardless of handedness.

According to a more preferred aspect of the third aspect, the image pick-up device may further include a second image pick-up portion (inner camera 23). The second image pick-up portion is provided substantially at a center in a left-right direction of a device main surface (the operation surface) formed by the inner surface of the first housing and an inner surface of the second housing when the image pick-up device is opened.

According to this aspect, since the second image pick-up portion is provided on the device main surface, image pick-up in a direction toward the user by the second image pick-up portion can be carried out. Further, since the second image pick-up portion is provided substantially at the center of the device main surface in the left-right direction, the user can easily adjust the image pick-up device to an appropriate position in the left-right direction, for example, in photographing the user himself/herself.

According to a more preferred aspect of the third aspect, the image pick-up device may further include a plurality of operation buttons (buttons 14A to 14F). The plurality of operation buttons are provided on the inner surface of the first housing, on a right side and a left side of the second image pick-up portion.

According to this aspect, by providing the operation buttons on the inner surface of the first housing, the user can hold the image pick-up device while touching the operation buttons with thumbs. Since the operation buttons are provided on the outer side of the second image pick-up portion (in the left-right direction), the thumbs of the user come in contact at positions on the outer side of the second image pick-up portion. Thus, according to the feature of (2-6) above, a possibility that the thumbs are located within an image pick-up range of the second image pick-up portion can be lowered (naturally, without particularly making the user aware of such a fact).

According to a more preferred aspect of the third aspect, the image pick-up device may further include a display portion (lower LCD 12) and a plurality of operation buttons (buttons 14A to 14F). The display portion has a display screen substantially at a center of the inner surface of the first housing in a left-right direction. The plurality of operation buttons are provided on the inner surface of the first housing, on a left side and a right side of the display screen.

According to this aspect, by providing the operation buttons on the inner surface of the first housing, the user can hold the image pick-up device while touching the operation buttons with thumbs. Here, since the operation buttons are provided on the left and right sides of the display portion, the thumbs of the user come in contact at positions on the outer side of the display portion. Thus, according to the feature of (2-7) above, the thumbs are prevented from entering the display screen of the display portion and disturbing display (naturally, without particularly making the user aware of such a fact).

According to a more preferred aspect of the third aspect, the image pick-up device may further include a display portion (lower LCD 12), a coordinate input portion (touch panel 13), and a control unit (CPU 31). The display portion has a display screen provided in the inner surface of the first housing. The coordinate input portion is an input device through which coordinates on the display screen can be input. The control unit has a prescribed image displayed on the display screen, and causes recording of an image picked-up by the first image pick-up portion when an input in an area of the prescribed image is provided through coordinate input means.

According to this aspect, the user can perform a photographing operation through the coordinate input portion provided on the inner surface of the first housing. Thus, the user can easily perform a photographing operation even when the image pick-up device is placed, with the outer surface of the first housing facing downward. Thus, as a photographing operation using the coordinate input portion can be performed, it is unnecessary to operate the photographing button with an index finger and the photographing operation can easily be performed in various holding manners (for example, in a holding manner in which the second housing is located on a lower side).

According to a more preferred aspect of the third aspect, the control unit may have the prescribed image displayed substantially at a center of the first housing in a left-right direction.

According to this aspect, since the prescribed image to be touched when the user performs a photographing operation is displayed substantially at the center of the first housing, the user can easily perform an operation in operating the touch panel with either a right hand or a left hand. Thus, according to this aspect, even in performing a photographing operation in a state where the image pick-up device is placed with the outer surface of the first housing facing downward, the user can easily perform the photographing operation regardless of handedness.

According to a more preferred aspect of the third aspect, the first housing may have a length in a left-right direction not smaller than 100 mm and not larger than 150 mm and a length in an up-down direction not smaller than 60 mm and not larger than 90 mm.

According to this aspect, by setting a length of the first housing to an appropriate length, that is, by setting the length of the first housing in the left-right direction not smaller than 100 mm and not larger than 150 mm and the length of the first housing in the up-down direction not smaller than 60 mm and not larger than 90 mm, the image pick-up device can easily be held when it is held with either one hand or both hands. In other words, according to this aspect, difficulty in holding the image pick-up device with one hand because of its too long a length in the left-right direction or with both hands because of its too short a length in the left-right direction is not likely. Further, since the first housing has such a length in the up-down direction that the first housing fits into a palm, it is easy for the user to hold the image pick-up device in holding the image pick-up device with either one hand or both hands.

<Fourth Aspect>

According to the fourth aspect of the present invention, an image pick-up device including a first housing (lower housing 11), a second housing (upper housing 21), a first display portion (lower LCD 12), a second display portion (upper LCD 22), an image pick-up portion (inner camera 23), and an audio input portion (microphone 42) is provided. The second housing has a lower side connected to an upper side of the first housing such that the first and second housings are foldable. The first display portion has a display screen provided in an inner surface of the first housing when folded. The second display portion has a display screen provided in an inner surface of the second housing when folded. The image pick-up portion is provided in the inner surface of the second housing, between the display screen of the first display portion and the display screen of the second display portion. The audio input portion is provided in the inner surface of the second housing, between the display screen of the first display portion and the display screen of the second display portion.

According to this aspect, the following fourth problem can be solved.

(Fourth Problem)

As in the portable instruments described in Japanese Patent Laying-Open No. 2004-274304 (Patent Document 2), Japanese Patent Laying-Open No. 2005-184060 (Patent Document 11), and Japanese Patent Laying-Open No. 2007-201727 (Patent Document 12) above, in the structure in which a screen is provided in each of the inner surface and the outer surface of the housing, the user can look at only one screen at a time. Accordingly, an amount of information that can be presented to the user at a time is less. As a result, the user cannot obtain (view) sufficient information in image pick-up and audio input.

Meanwhile, in the telephones of Japanese Patent Laying-Open No. 2006-311224 (Patent Document 1) and Japanese Patent Laying-Open No. 09-247634 (Patent Document 13) above, as a user can look at two screens at a time, an amount of information that can be presented to the user at a time is large. In these telephones, however, since positions of the camera and the microphone are inappropriate, it is difficult to carry out image pick-up and audio input for the following reasons.

In the telephones of Japanese Patent Laying-Open No. 2006-311224 (Patent Document 1) and Japanese Patent Laying-Open No. 09-247634 (Patent Document 13) above, the camera and the microphone are provided in different housings and arranged at end portions of the telephone, respectively. Specifically, the camera is arranged at an end portion of one housing and the microphone is arranged at an end portion of the other housing. Accordingly, in the case where a folded angle is not 180°, an image pick-up direction of the camera and a direction in which the microphone collects sound are different from each other. Further, here, the direction in which the microphone collects sound and a direction in which a "screen of a housing provided with the camera" faces are different from each other. A foldable device is meaningfully used, for example, in such a manner that it is placed on a desk with a folding angle thereof being set to a desired angle. Here, the device is easily operated if setting is made such that a screen of an upper housing faces the user. In these prior telephones, however, in such a situation, the direction in which the microphone collects sound is different from a direction of a mouth of the user.

Further, in the telephones of Japanese Patent Laying-Open No. 2006-311224 (Patent Document 1) and Japanese Patent Laying-Open No. 09-247634 (Patent Document 13) above, the camera is provided at the end portion of the housing, and two screens are both present under the camera. Thus, in order to look at information displayed on each screen from a state where the line-of-sight is directed toward the camera, the line-of-sight should inevitably be moved downward, and particularly, an amount of movement of user's line-of-sight is great when information on a lower screen is viewed. Further, in order for the user to equally look at information displayed on two screens, user's line-of-sight is desirably moved with reference to a center between the two screens. In the telephone of Japanese Patent Laying-Open No. 2006-311224 (Patent Document 1) or Japanese Patent Laying-Open No. 09-247634 (Patent Document 13) above, however, such a line-of-sight direction and the photographing direction of the camera are different from each other.

(Function and Effect According to Fourth Aspect)

According to the fourth aspect, in order to address the fourth problem above, an image pick-up device with which it is easy for a user to carry out image pick-up and audio input can be provided.

Namely, according to the fourth aspect, since the image pick-up portion and the audio input portion are provided between the two screens, if the user faces the two screens in image pick-up and audio input, the camera and the microphone are located in front of the user. Therefore, the user can successfully achieve image pick-up and audio input while facing the two screens (without changing an orientation of user's face). Further, for example, in picking up an image of the user himself/herself with the camera, the user performs an image pick-up operation looking at the camera while looking at the screen. According to the feature of (3-1) above, since the camera is arranged between the two screens, the user can minimize a distance of movement of his or her line-of-sight between the camera and the screen in the image pick-up operation, and the image pick-up operation while looking at the two screens is facilitated. Further, according to the feature of (3-1) above, since the camera and the microphone are arranged substantially at the same position in the second housing, the user naturally turns his or her face to the microphone if the user faces the camera in image pick-up. Thus, user's voice can easily be collected by the audio input portion and sensed accurately.

According to a more preferred aspect of the fourth aspect, the image pick-up device may further include an operation button (buttons 14A to 14F) provided in the first housing.

According to this aspect, since the operation button and the microphone are provided in different housings, collection by the microphone of operation sound (noise) generated when the operation button is operated is less likely, and desired voice and sound can accurately be detected by the microphone. Further, according to the feature of (3-2) above, since the operation button is provided in the first housing, it is considered that the user holds the first housing in image pick-up. Thus, the user can easily change an image pick-up direction to a desired direction by turning the second housing to the desired direction without changing his or her position for holding the image pick-up device (without moving the first housing).

According to a more preferred aspect of the fourth aspect, the second housing may have, in its lower side, a shaft portion (21A) pivotably coupled to the upper side of the first housing. Here, the image pick-up portion and the audio input portion are arranged in the shaft portion.

According to this aspect, by arranging the image pick-up portion and the audio input portion in the shaft portion for achieving a foldable structure, a distance between the two screens can be shorter than in the case where the image pick-up portion and the audio input portion are arranged between the screen of the second display portion and the shaft portion. Thus, the two screens can be arranged closer to each other, and it becomes easier for the user to look at the two screens.

According to a more preferred aspect of the fourth aspect, may be provided substantially at a center of the second housing in a left-right direction.

According to a more preferred aspect of the fourth aspect, since the image pick-up portion and the audio input portion are arranged substantially at the center also in the left-right direction, it becomes easier for the user to achieve image pick-up and audio input.

According to a more preferred aspect of the fourth aspect, may be arranged substantially at a center in a left-right direction. Here, the audio input portion is arranged at a position displaced from a position of the image pick-up portion in the left-right direction.

According to a more preferred aspect of the fourth aspect, by arranging the image pick-up portion at the center in the left-right direction, for example, it becomes easier for the user to pick up an image of the user himself/herself such that he/she is located at a center of an image pick-up region. In addition, even if the audio input portion is arranged at a position slightly displaced from the center, it does not have a significant effect on detection accuracy. Further, according to this aspect, since the image pick-up portion and the audio input portion can be juxtaposed to each other in the left-right direction, a distance between the two screens can be shorter than in the case where the image pick-up portion and the audio input portion are juxtaposed to each other in an up-down direction. Thus, according to this aspect, the image pick-up portion and the audio input portion can be arranged such that it becomes easier to look at the two screens while ease of image pick-up and audio input is maintained.

According to a more preferred aspect of the fourth aspect, the image pick-up device may further include audio output portions (speakers) provided in the inner surface of the second housing, on opposing sides of the display screen of the second display portion in a left-right direction, respectively.

According to this aspect, when the user holds the image pick-up device so as to face the two screens, the audio output portions are arranged in positions corresponding to left and right ears (in positions on both left and right sides of user's face), respectively. Thus, a stereo effect can effectively be obtained.

According to a more preferred aspect of the fourth aspect, a first housing (lower housing 11), a second housing (upper housing 21), a first display portion (lower LCD 12), a second display portion (upper LCD 22), an image pick-up portion (inner camera 23), and an audio output portion (speaker) are provided. The second housing has a lower side connected to an upper side of the first housing such that the first and second housings are foldable. The first display portion has a display screen provided in an inner surface of the first housing when folded. The second display portion has a display screen provided in an inner surface of the second housing when folded. The image pick-up portion is provided in the inner surface of the second housing, between the screen of the first display portion and the screen of the second display portion. The audio output portions are provided in the inner surface of the second housing, on opposing sides of the display screen of the second display portion in a left-right direction, respectively.

According to this aspect, as in the preceding aspect, when the user holds the image pick-up device so as to face the two screens, a stereo effect can effectively be obtained. Further, as in the first invention, when the user faces the two screens, the camera is located in front of the user. Thus, the user can successfully pick up an image while facing the two screens (without changing an orientation of user's face).

According to a more preferred aspect of the fourth aspect, a first housing (lower housing 11), a second housing (upper housing 21), a first display portion (lower LCD 12), a second display portion (upper LCD 22), and an image pick-up portion (inner camera 23) are included. The second housing has a lower side connected to an upper side of the first housing such that the first and second housings are foldable. The first display portion has a display screen provided in an inner surface of the first housing when folded. The second display portion has a display screen provided in an inner surface of the second housing when folded. The image pick-up portion is provided in a central portion in the left-right direction, and between the display screen of the first display portion and the display screen of the second display portion when the first housing and the second housing are opened. According to this aspect, by providing the camera at the center between the two screens, movement of the user's line-of-sight from a state where the user looks at the camera, for obtaining information displayed on the upper screen and information displayed on the lower screen, can be minimized. Further, even when the user looks at the information on any of the upper screen and the lower screen, a difference between the photographing direction of the camera and the user's line-of-sight is small, and an image of the user facing the camera can be taken.

According to a more preferred aspect of the fourth aspect, an audio input portion (microphone 42) provided in the central portion in the left-right direction and between the display screen of the first display portion and the display screen of the second display portion when the first housing and the second housing are opened may further be included.

According to this aspect, since the camera and the microphone are arranged substantially at the same position in the second housing, the user naturally turns his or her face to the microphone if the user faces the camera in image pick-up. Thus, user's voice can easily be collected by the audio input portion and sensed accurately.

According to a more preferred aspect of the fourth aspect, may be provided at a center in the left-right direction and between the display screen of the first display portion and the display screen of the second display portion when the first housing and the second housing are opened. Here, the audio input portion is provided in proximity to the image pick-up portion.

According to this aspect, the image pick-up portion and the audio input portion can be arranged such that it becomes easier to look at the two screens while ease of image pick-up and audio input is maintained.

According to an aspect similar to the fourth aspect of the present invention, an image pick-up device is structured to be capable of transformation between a first form in which a first housing and a second housing are stacked on each other and a second form in which the first housing and the second housing are opened. The image pick-up device includes at least one photographing button provided on a side surface of the first housing with an inner surface thereof in the first form being assumed as a front surface, on a side where the second housing is located in the second form, for giving an instruction to record an image picked-up by an image pick-up portion.

According to a more preferred aspect of the fourth aspect, a second image pick-up portion may be provided substantially at a center in a left-right direction of a device main surface in the second form. Here, the image pick-up device further includes a plurality of operation buttons provided on an inner surface of the first housing in the first form, on the left side and the right side relative to the second image pick-up portion.

According to a more preferred aspect of the fourth aspect, a display screen may be provided substantially at a center in the left-right direction of the inner surface of the first housing in the first form. Here, the image pick-up device further includes operation buttons provided on the inner surface of the first housing, on the left side and the right side of the display screen.

<Fifth Aspect>

According to the fifth aspect of the present invention, a launch program (61) executed by a computer (CPU 31) of an information processing device (10) including image pick-up means (cameras 23 and 25), capable of storing a plurality of application programs (53 to 56), and storing in advance a prescribed photographing application program (53) for performing photographing with the image pick-up means as the application program, is provided. The launch program is a program for selectively launching an application program desired by a user from among the plurality of application programs above. The launch program causes the computer to function as: first launch operation acceptance means (CPU 31 performing steps SA6 and SA11; hereinafter, steps are indicated only with step numbers); first launch means (SA12); photographing processing means (SA10); photographing enabling operation acceptance means (SA6, SA9); photographing operation acceptance means (SA24, SA25); second launch operation acceptance means (SA24, SA28); and second launch means (SA30). The first launch operation acceptance means accepts a first launch operation for selectively launching the plurality of application programs. The first launch means launches an application program selected in the first launch operation from among the plurality of application programs when the first launch operation is performed. The photographing processing means performs photographing processing for storing an image picked-up by the image pick-up means in storage means in the information processing device in accordance with a prescribed photographing operation. The photographing enabling operation acceptance means accepts a photographing enabling operation for causing a photographing enabled state in which the photographing processing by the photographing processing means can be performed in accordance with the photographing operation in a launch acceptance state of accepting the first launch operation. The photographing operation acceptance means accepts the photographing operation when the photographing enabling operation is performed. The second launch operation acceptance means accepts a second launch operation for launching the photographing application program in the photographing enabled state. The second launch means launches the photographing application program when the second launch operation is performed.

According to this aspect, the fifth problem below can be solved.

(Fifth Problem)

The first and second application programs above executable in the information processing device described in "'Chotto Shot Camera Instruction Manual' published by Sony Computer Entertainment Inc. on Nov. 2, 2006" (Non-Patent Document 1) above have different functions (although having also common functions). Therefore, in a state where the user performs photographing by executing any one of the application programs, a case where a user desires (or needs) to use a function attained only by the other application program is assumed. Here, in order to use the desired function, the user has to perform a troublesome operation of ending execution of one of the application programs above, thereafter selecting the other application program in a menu screen or the like, and launching the other application program.

(Function and Effect According to Fifth Aspect)

According to the fifth aspect, in order to address the fifth problem above, a user-friendly information processing device capable of performing a plurality of types of photographing functions with a simple operation can be provided.

According to the fifth aspect, in the launch acceptance state, the user can launch a selected application program by performing the first launch operation, and can perform the photographing processing by the photographing processing means by performing the photographing enabling operation. Therefore, even in the launch acceptance state for launching the application program, the user can easily and quickly activate a function of the photographing processing means. In addition, in the photographing enabled state, the photographing application program can be launched by performing the second launch operation. Therefore, even during the photographing processing by the photographing processing means, the user can easily and quickly launch the photographing application program by performing the second launch operation. In other words, according to the present embodiment, when the user desires to use a function (of the photographing application program) not provided by the photographing processing means during use of a photographing function of the photographing processing means, the user can easily and quickly use the function by performing the second launch operation. As described above, according to the first invention, both a photographing function of the photographing processing means and a photographing function of the photographing application program can be performed with a simple operation, and a user-friendly information processing device can be provided.

Further, according to the fifth aspect, during performance of the photographing function by the photographing processing means, the photographing application program can directly be launched. In other words, since the other photographing function (the photographing function attained by the photographing application program) can easily be activated from one photographing function (the photographing function attained by the photographing processing means), the user can be led to use the other function through use of one function.

According to a more preferred aspect of the fifth aspect, a manner of operation of the photographing enabling operation may be different from that of the first launch operation.

According to this aspect, the photographing function attained by the photographing processing means can easily be performed by an operation different from the first launch operation for launching the selected application program.

According to a more preferred aspect of the fifth aspect, the photographing processing means may have only a part of a photographing function enabled as a result of execution of the photographing application program.

According to this aspect, the photographing function of the photographing processing means which is a relatively simple function can quickly be activated from the launch acceptance state, and the photographing application program having more functions can immediately be launched during performance of the photographing function of the photographing processing means. Here, the user can be caused to use the information processing device in such an order that the information processing device is initially operated based on the photographing function of the photographing processing means which is the simple function and then various photographing functions are utilized based on the photographing application program having more functions. By using the information processing device in such an order, the user can use the information processing device in a manner gradually getting used to the operation of the information processing device.

According to a more preferred aspect of the fifth aspect, the launch program above may further cause the computer to function as image display means (SA5) for causing display means of the information processing device to display the picked-up image (stored image) stored in the storage means in the launch acceptance state (FIG. 23).

According to this aspect, an image taken in the past is displayed in the launch acceptance state. Therefore, by taking a picture of which display is desired, the user can customize a screen (menu screen) in the launch acceptance state for each user (for each information processing device). Further, a user who touches (uses) the information processing device for the first time can be made aware that the information processing device has the photographing function.

According to a more preferred aspect of the fifth aspect, the image display means may automatically change at prescribed timing, a picked-up image to be displayed on the display means among a plurality of picked-up images stored in the storage means.

According to this aspect, by changing content of a displayed image at prescribed timing, variation in the menu screen is produced and the user can be prevented from getting bored.

In a more preferred aspect of the fifth aspect, the image display means may change a picked-up image to be displayed on the display means, at timing of launch of the information processing device.

According to this aspect, an image displayed in the launch acceptance state is changed each time the information processing device is started up. Thus, the user has things to look forward to (about "which image will be displayed") at the time of start-up. Further, from the viewpoint of the supplier of the information processing device, by giving the user such things to look forward to, the user can be prompted to start up the information processing device (that is, to use the information processing device).

According to a more preferred aspect of the fifth aspect, the image display means may cause the display means of the information processing device to display in the launch acceptance state a picked-up image last stored in an immediately preceding photographing enabled state.

According to this aspect, an image taken in the photographing enabled state is displayed in the launch acceptance state immediately after the end of that photographing enabled state. Therefore, in the launch acceptance state, the user can check an image last taken in the photographing enabled state.

According to a more preferred aspect of the fifth aspect, the launch program above further causes the computer to function as first transition means (SA21) and second transition means (SA4). The first transition means ends the launch acceptance state and causes transition to the photographing enabled state in accordance with the photographing enabling operation. The second transition means ends the photographing enabled state and causes transition to the launch acceptance state in accordance with a prescribed operation in the photographing enabled state.

According to this aspect, since the photographing operation is not accepted in the launch acceptance state, the user does not accidentally perform the photographing operation in the launch acceptance state. Further, since the launch acceptance state has ended in the photographing enabled state, display for causing the user to perform the first launch operation (for example, display of an image indicating an application program) is unnecessary. Therefore, a display area can effectively be used, for example, by displaying a picked-up image on the screen of the display device. Further, by not allowing acceptance of the first launch operation in the photographing enabled state, an operation in the photographing enabled state can be simplified and an operation is easier for the user.

According to a more preferred aspect of the fifth aspect, in the second transition means, the prescribed operation above may be the photographing operation.

According to this aspect, when the photographing operation is performed in the photographing enabled state, the photographing enabled state ends (after the photographing processing is performed). In other words, once the user performs the photographing operation in the photographing enabled state, the state of the information processing device returns to the launch acceptance state. Accordingly, even a novice user who has not read an instruction manual or the like can naturally return to the launch acceptance state by performing the photographing operation. Therefore, a state where "the user does not know how to return from the photographing enabled state to the launch acceptance state" can be prevented and a user-friendly information processing device can be provided.

According to this aspect, since the state of the information processing device makes transition from the photographing enabled state to the launch acceptance state after the photographing operation, an image representing a result of photographing cannot be displayed in the photographing enabled state. Here, when the invention according to the previous aspect and the invention according to the present aspect are combined, the image representing the result of photographing that could not be displayed in the photographing enabled state can be shown to the user in the launch acceptance state immediately after the photographing enabled state, which is particularly effective.

According to a more preferred aspect of the fifth aspect, the photographing enabling operation may be performed by performing an operation the same as the photographing operation.

According to this aspect, since the photographing enabling operation and the photographing operation are performed by performing the same operation, a series of operations for making transition to the photographing enabled state and further performing photographing can be performed by performing one type of operation, and thus the series of operations can easily be performed. Further, when the invention according to the previous aspect and the invention according to the present aspect are combined, transition from the launch acceptance state to the photographing enabled state and transition from the photographing enabled state to the launch acceptance state can be made by performing the same operation. Therefore, even if the user accidentally performs the photographing enabling operation or performs the photographing enabling operation without fully understanding a manner of operation to cause transition to the photographing enabled state, the user can return to the original state (the launch acceptance state) by performing the same operation again. Thus, a state where "the user does not know how to return from the photographing enabled state to the launch acceptance state" can be prevented and a user-friendly information processing device can be provided.

According to a more preferred aspect of the fifth aspect, the photographing enabling operation and the photographing operation may be an operation to press a prescribed button.

According to this aspect, the user can perform the photographing enabling operation and the photographing operation with a simple operation. Therefore, the photographing function of the photographing processing means can be activated with the simple operation and a picked-up image can be stored with the simple operation.

According to a more preferred aspect of the fifth aspect, the information processing device may include coordinate input means (touch panel 13) through which a coordinate position on a screen of a display device (lower LCD 12) can be input. Here, the first launch operation acceptance means causes display on the screen of at least a plurality of images (icon images 71a to 71c) among images corresponding to the plurality of application programs respectively, changes a displayed image in accordance with an operation to scroll the screen, and accepts as the first launch operation, an input to a position of the displayed image through the coordinate input means. The first launch means launches an application program corresponding to an icon image indicated by the input accepted by the first launch operation acceptance means. The second launch operation acceptance means causes display of an image (72) indicating the photographing application program at a prescribed position on the screen, and accepts as the second launch operation, an input to the prescribed position through the coordinate input means. The second launch means launches the photographing application program in accordance with the input accepted by the second launch operation acceptance means.

According to this aspect, in the launch acceptance state, by performing an operation to select a position of one image from among a plurality of images indicating respective application programs through the coordinate input means, the application program can be launched. In the photographing enabled state, by performing an operation to designate a prescribed position at which an image indicating a photographing application is displayed through the coordinate input means, the photographing application program can be launched. Further, in the launch acceptance state, for facilitating selection from images indicating the plurality of application programs respectively, a displayed image (an application program) is changed by performing a scroll operation. Thus, for launching a desired application program in the launch acceptance state, the user may have to perform an operation to scroll the screen and an operation to designate an image. On the other hand, in the photographing enabled state, since an image indicating the photographing application program is always displayed at a prescribed position, the user can always easily launch the photographing application program by performing only an operation to designate the image.

According to a more preferred aspect of the fifth aspect, when the second launch operation is performed, the second launch means may cause the computer to execute the photographing application program, using at least a part of information set in the photographing processing by the photographing processing means as an argument to be passed to the photographing application program.

According to this aspect, setting in the photographing processing by the photographing processing means is reflected also in processing based on the photographing application program. Thus, when transition from the photographing processing by the photographing processing means to the processing based on the photographing application program is made, the user can similarly perform an operation and there is no need to change the setting. Thus, according to the thirteenth invention, a further user-friendly information processing device can be provided.

According to a more preferred aspect of the fifth aspect, the program above may further cause the computer to function as first-time start-up determination means (SA1) and photographing leading means (SA2). The first-time start-up determination means determines whether the information processing device is started up for the first time or not before acceptance of the first launch operation after start-up of the information processing device. When it is determined that the information processing device is started up for the first time, the photographing leading means sets a state of the information processing device to the photographing enabled state or provides display allowing the user to select whether or not to set the photographing enabled state.

According to this aspect, when the information processing device is started up for the first time, the user can initially be caused to actually experience the photographing operation, so that a novice user can get used to the photographing operation. Further, when the invention according to the previous aspect and the invention according to the present aspect are combined, it is the photographing processing by the photographing processing means having a relatively simple function that is performed when the information processing device is started up for the first time. Therefore, since the user performs the photographing operation only with a simple function when the information processing device is started up for the first time, the user can relatively easily perform the photographing operation even when he/she operates the information processing device for the first time.

According to a more preferred aspect of the fifth aspect, the photographing application program may have a function to perform processing for storing the picked-up image in the storage means and a function to view a picked-up image stored as a result of the photographing processing of the photographing processing means or of the processing based on the photographing application program.

According to this aspect, by using the photographing application program, the user can view an image taken based on any of the photographing function of the photographing processing means and the photographing application program.

According to a more preferred aspect of the fifth aspect, the photographing processing means and the photographing application program may be capable of performing a function common to a function of the photographing processing means and a function enabled as a result of execution of the photographing application program, in response to the same operation by the user.

According to this aspect, since the user can perform the same operation for the same function even when a program executed for photographing is changed, a user-friendly operation system can be provided.

According to a more preferred aspect of the fifth aspect, the launch program may include a launch function program (51) for launching the application program and a photographing function program (52) for causing the computer to function as the photographing processing means. Here, the photographing function program has a data size smaller than that of the photographing application program.

According to this aspect, by setting the photographing function program having a smaller data size as a program that can be launched in the launch acceptance state, a program for photographing can quickly be launched in the launch acceptance state.

According to a more preferred aspect of the fifth aspect, the launch program may include a launch function program (51) for launching the application program and a photographing function program (52) for causing the computer to function as the photographing processing means. Here, the launch program above may further cause the computer to function as read means (SA4) for reading, at timing of execution of the launch function program, the photographing function program along with the launch function program in prescribed storage means for storing a program executed by the computer, after start-up of the information processing device.

According to this aspect, by reading the launch function program and the photographing function program together, the photographing function program can quickly be launched in the launch acceptance state.

According to an alternative aspect of the fifth aspect of the present invention, an information processing device including each means in the aspects above may be provided.

<Sixth Aspect>

According to the sixth aspect of the present invention, an image communication system including a plurality of image communication devices (1) each having image storage means (28, 32, 34) for storing prescribed images, and allowing transmission and reception of the prescribed images among the plurality of image communication devices is provided. An image communication device (10*t*) serving to transmit an image among the plurality of image communication devices further includes transmitter information transmission control means (CPU 31 performing step SC63; hereinafter steps are indicated only with step numbers). The transmitter information transmission control means transmits as transmitter information (transmitter data) indicating a transmitter, its own identification information to other unspecified image communication devices. An image communication device (10*r*) serving to receive an image among the plurality of image communication devices further includes transmitter information reception means (SC84), selection means (SC85), and destination information transmission control means (SC86, SC92). The transmitter information reception means receives the transmitter information. The selection means provides display indicating the transmitter (Nt1 to Nt3) on display means (12) based on the received transmitter information, and allows a user to select whether or not to receive an image from the image communication device that has transmitted the transmitter information. The destination information transmission control means transmits as destination information (receiver data) indicating a destination, its own identification information to the image communication device selected by the selection means as the transmitter from which an image is to be received. The image communication device serving to transmit an image further includes destination information reception control means (SC64), destination determination means (SC64, SC65), and image transmission means (SC69). The destination information reception control means receives the destination information. The destination determination means determines the image communication device to serve as the destination based on the received destination information. The image transmission means transmits at least one of images stored in the image storage means to the destination determined by the destination determination means. The image communication device serving to receive an image further includes image reception means (SC90) and image storage control means (SC90). The image reception means receives an image transmitted by the image transmission means. The image storage control means causes the image storage means to store the image received by the image reception means. Transmission of the transmitter information from the transmitter information transmission control means to other unspecified image communication devices includes, for example, transmission of the transmitter information without specifying a destination and transmission of the transmitter information to an unidentified image communication device in accordance with a request therefrom.

According to this aspect, the following sixth problem can be solved.

(Sixth Problem)

The electronic camera disclosed in Japanese Patent Laying-Open No. 10-341388 (Patent Document 14) communicates through infrared, and therefore the transmission-end electronic camera and the reception-end electronic camera should be arranged to face each other. Further, when a plurality of transmission-end electronic cameras are present in a communication range of the reception-end electronic camera, the reception-end electronic camera is not allowed to select a camera from among the plurality of transmission-end electronic cameras.

(Function and Effect According to Sixth Aspect)

According to the sixth aspect, in order to address the sixth problem above, an image communication system, an image communication device, and an image communication program allowing a user to receive an image from a desired transmission-end device when images are transmitted and received among devices are provided.

According to the sixth aspect of the present invention, the image communication device serving to receive an image is allowed to select whether or not to receive an image depending on a transmitter, thereby preventing reception of an image from an unintended transmitter. On the other hand, the image communication device serving to transmit an image can invite receivers to which an image is to be distributed, without specifying in advance a device to receive an image, and distribute the image.

According to a more preferred aspect of the sixth aspect, the transmitter information reception means is capable of receiving a plurality of pieces of transmitter information transmitted to the unspecified image communication devices. The selection means provides display of each piece of transmitter information in accordance with each piece of received transmitter information on the display means, and causes a user to select any transmitter information.

According to this aspect, the image communication device serving to receive an image is allowed to select a transmitter from which image data is to be received from among a plurality of transmitters. For example, when a plurality of image communication devices serving as transmitters are present, the image communication device serving to receive an image is allowed to select an image communication device desired by a user from among the plurality of image communication devices, and to receive an image.

Figure 51:
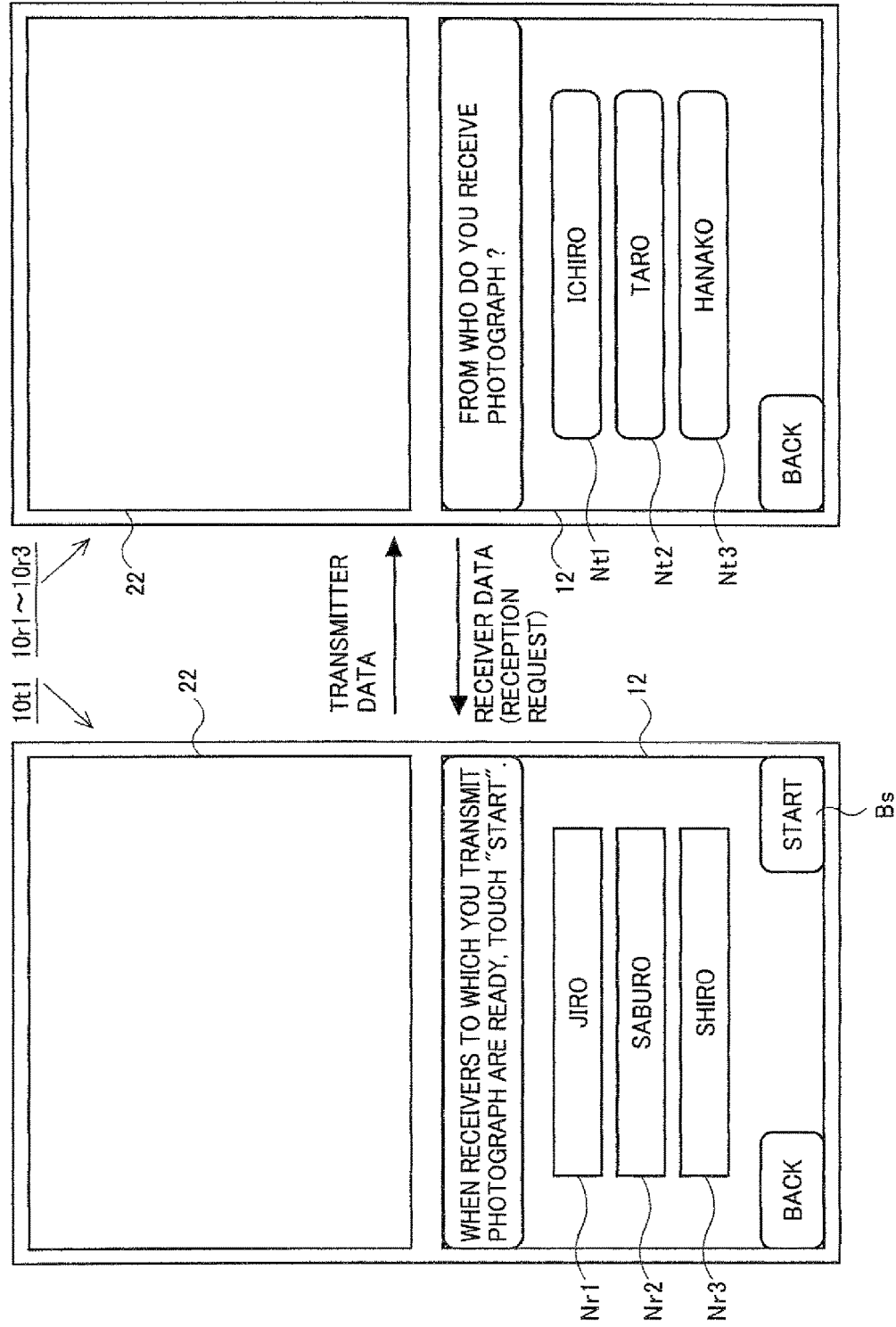
FIG. 51 is a diagram showing exemplary screen display displayed in a second stage, on the transmission-end game device according to the present embodiment and the reception-end game device according to the present embodiment.

According to a more preferred aspect of the sixth aspect, the image communication device serving to transmit an image further includes transmitter display control means (SC65, FIG. 51). The transmitter display control means causes display means (12) of the image communication device serving to transmit an image to provide indication indicating the image communication device (Nr1 to Nr3) requesting image transmission, based on the destination information received from the image communication device serving to receive an image.

According to this aspect, a user of the image communication device serving to transmit an image can know the destination image communication device to which an image is to be transmitted.

According to a more preferred aspect of the sixth aspect, the transmitter information includes transmitter user information (Dc) that can be set by a user of the image communication device serving to transmit an image. The selection means causes the display means of the image communication device serving to receive an image to display the transmitter user information included in the transmitter information as information indicating the image communication device transmitting the transmitter information.

According to this aspect, a user of the image communication device serving to transmit an image can express its characteristic, and the image communication device serving to receive the image also can easily identify the image communication device serving to transmit the image.

According to a more preferred aspect of the sixth aspect, the destination information includes destination user information (Dc) that can be set by a user of the image communication device serving to receive an image, and the transmitter display control means causes the display means of the image communication device serving to transmit an image to display the transmitter user information included in the destination information as notification indicating the image communication device requesting image transmission.

According to this aspect, a user of the image communication device serving to receive an image can express its characteristic, and the image communication device serving to transmit an image also can easily identify the image communication device serving to receive an image.

According to a more preferred aspect of the sixth aspect, the image communication device serving to transmit an image further includes image selection means (SC66) for selecting an image to be transmitted to the image communication device that has transmitted the destination information, in accordance with a user's operation, after reception of the destination information. The image transmission means transmits the image selected by the image selection means to the image communication device that has transmitted the destination information.

According to this aspect, an image desired by a user of the image communication device serving to transmit an image can be selected and transmitted. Further, after the image communication device serving to receive an image and the image communication device serving to transmit an image are determined, an image to be transmitted from the image communication device serving to transmit an image to the image communication device is selected, so that the image communication device serving to transmit the image can change a type and the number of images to be transmitted to the image communication device serving to receive an image.

According to a more preferred aspect, the image selection means includes image-to-be-transmitted display control means (FIG. 52). The image-to-be-transmitted display control means urges a user to select an image to be transmitted to the image communication device serving to receive an image, from among images stored in the image storage means, as images to be transmitted to the image communication device serving to receive an image, by displaying these images on the display means of the image communication device serving to transmit an image.

According to this aspect, the display means displays images stored as images to be transmitted, so that selection of an image by a user of the image communication device serving to transmit an image is facilitated.

According to a more preferred aspect, the image storage means of the image communication device serving to transmit an image includes embedded storage means (34) and removable storage means (28). The embedded storage means is embedded in a main body of the image communication device. The removable storage means is removably attached to the main body of the image communication device. The image selection means includes storage destination selection means (SC50). The storage destination selection means selects any one of the embedded storage means and the removable storage means. The image selection means selects an image to be transmitted to the image communication device serving to receive an image from among images stored in the storage means selected by the storage destination selection means, in accordance with a user's operation.

According to this aspect, an image to be transmitted can be limited to an image stored in predetermined storage means.

According to a more preferred aspect of the sixth aspect, the image communication device serving to receive an image further includes determination means and image transmission continuation request transmission means. The determination means determines, after the image reception means receives an image transmitted from the image communication device serving to transmit an image, whether or not to further receive an image from the image communication device serving to transmit an image. The image transmission continuation request transmission means transmits an image transmission continuation request to the image communication device serving to transmit an image that has been selected by the selection means, when the determination means determines further reception of an image. Receiving the image transmission continuation request, the image transmission means transmits an image to the image communication device that has transmitted the image transmission continuation request.

According to this aspect, the image communication device serving to transmit an image can transmit images in a stepwise fashion to the image communication device serving to receive an image.

According to a more preferred aspect of the sixth aspect, the image communication device serving to transmit an image further includes image selection means. After receiving the image transmission continuation request, the image selection means selects an image to be transmitted to the image communication device that has transmitted the image transmission continuation request, in accordance with a user's operation. Receiving the image transmission continuation request, the image transmission means transmits the image selected by the image selection means to the image communication device that has transmitted the image transmission continuation request.

According to this aspect, an image to be transmitted can be selected and transmitted each time a request is issued from the reception end.

According to a more preferred aspect of the sixth aspect, the image communication device serving to transmit an image further includes limitation means. The limitation means limits the number of images to be transmitted at a time by the image transmission means.

According to this aspect, as images in number not larger than a prescribed number are transmitted at a time from the image communication device serving as a transmitter, the reception-end device can receive images while confirming the number of received images and determine whether or not to continue reception based on the number of received images.

According to a more preferred aspect, the determination means determines whether or not to further receive an image from the image communication device serving to transmit an image, in accordance with a user's operation. The image communication device serving to receive an image further includes reception end notification means. The reception end notification means transmits reception end notification to the image communication device selected by the selection means when the determination means determines not to receive an image. The image transmission means transmits, each time the image transmission continuation request is received, an image only to the image communication device that has transmitted the image transmission continuation request, except for the image communication device that has transmitted the reception end notification.

According to this aspect, each image communication device serving to receive an image can leave a group of devices to which the image communication device serving to transmit an image transmits an image, at timing desired by a user.

According to a more preferred aspect, the image communication device serving to receive an image further includes remaining capacity monitoring means. The remaining capacity monitoring means monitors a remaining storage capacity of the image storage means for additionally storing the image. The reception end notification means transmits the reception end notification to the image communication device selected by the selection means when the remaining storage capacity is equal to or smaller than a prescribed capacity.

According to this aspect, the image communication device serving to receive an image can automatically leave a group of devices to which the image communication device serving to transmit an image transmits an image, based on a capacity for storing image data.

According to a more preferred aspect of the sixth aspect, the image storage means of the image communication device serving to receive an image further includes embedded storage means and removable storage means. The embedded storage means is embedded in a main body of the image communication device. The removable storage means is removably attached to the main body of the image communication device. The image communication device serving to receive an image further includes storage means determination means (SC50). The storage means determination means determines in advance any one of the embedded storage means and the removable storage means as storage means for storing the received image. The image storage control means causes the storage means determined by the storage means determination means to store an image transmitted from the image communication device serving to transmit an image.

According to this aspect, received image data can be stored only in a predetermined storage means.

According to a more preferred aspect of the sixth aspect, the image communication device further includes image pick-up means and photographing means. The photographing means causes the image storage means to store an image picked-up by the image pick-up means, in accordance with a user's prescribed operation. The image transmission means transmits the image stored in the image storage means by means of the photographing means.

According to this aspect, an image picked-up by the image communication device can be transmitted and received.

According to a more preferred aspect of the sixth aspect, an image communication device (10r) for receiving an image from another image communication device is provided. The image communication device includes: storage means; transmitter information reception means; selection means; destination information transmission control means; image reception means; and image storage control means. The transmitter information reception means receives from another image communication device, identification information of another image communication device as transmitter information indicating a transmitter. The selection means causes display means to provide display indicating the transmitter based on the received transmitter information, and allows a user to select whether or not to receive an image from the image communication device that has transmitted the transmitter information. The destination information transmission control means transmits as destination information indicating a destination, its own identification information to the image communication device selected by the selection means as the transmitter from which an image is to be received. The image reception means receives an image transmitted by the image communication device to which the destination information has been transmitted. The image storage control means causes the storage means to store the image received by the image reception means.

According to a more preferred aspect of the sixth aspect, an image communication device (10t) for transmitting an image to another image communication device is provided. The image communication device includes: image storage means; transmitter information transmission control means; destination information reception control means; destination determination means; and image transmission means. The image storage means stores a prescribed image. The transmitter information transmission control means transmits as transmitter information indicating a transmitter, its own identification information to other unspecified image communication devices. The destination information reception control means receives as destination information indicating a destination, identification information of another image communication device from another image communication device. The destination determination means determines an image communication device to serve as the destination based on the received destination information. The image transmission means transmits at least one of images stored in the image storage means to the destination determined by the destination determination means.

According to a more preferred aspect of the sixth aspect, an image communication device (1) for receiving an image from another image communication device or transmitting an image to another image communication device is provided. The image communication device includes image storage means; and transmission/reception selection means (SC51). The image storage means stores a prescribed image. The transmission/reception selection means selects any of reception of an image from another image communication device and transmission of an image to another image communication device. When the transmission/reception selection means selects reception of an image from another image communication device, the image communication device further includes: transmitter information reception means; selection means; destination information transmission control means; image reception means; and image storage control means. The transmitter information reception means receives identification information of another image communication device from another image communication device as transmitter information indicating a transmitter. The selection means causes display means to provide display indicating the transmitter based on the received transmitter information, and allows a user to select whether or not to receive an image from the image communication device that has transmitted the transmitter information. The destination information transmission control means transmits as destination information indicating a destination, its own identification information to the image communication device selected by the selection means as the transmitter from which an image is to be received. The image reception means receives an image transmitted from the image communication device to which the destination information has been transmitted. The image storage control means causes the image storage means to store the image received by the image reception means. When the transmission/reception selection means selects transmission of an image to another image communication device, the image communication device further includes: transmitter information transmission control means; destination information reception control means; destination determination means; and image transmission means. The transmitter information transmission control means transmits as transmitter information indicating a transmitter, its own identification information to other unspecified image communication devices. The destination information reception control means receives identification information of another image communication device from another image communication device as the destination information indicating the destination. The destination determination means determines an image communication device to serve as the destination, based on the received destination information. The image transmission means transmits at least one of images stored in the image storage means to the destination determined by the destination determination means.

According to a more preferred aspect of the sixth aspect, an image communication program executed by a computer (31) of a device for receiving an image from another image communication device is provided. The image communication program causes the computer to function as: transmitter information reception means; selection means; destination information transmission control means; image reception means; and image storage control means. The transmitter information reception means receives identification information of another image communication device from another image communication device as transmitter information indicating a transmitter. The selection means causes display means to provide display indicating the transmitter based on the received transmitter information, and allows a user to select whether or not to receive an image from the image communication device that has transmitted the transmitter information. The destination information transmission control means transmits as destination information indicating a destination, its own identification information to the image communication device selected by the selection means as the transmitter from which an image is to be received. The image reception means receives an image transmitted by the image communication device to which the destination information has been transmitted. The image storage control means causes a storage device to store the image received by the image reception means.

According to a more preferred aspect of the sixth aspect, an image communication program executed by a computer of a device for receiving an image from another image communication device or transmitting an image to another image communication device is provided. A prescribed image is stored in a storage device of the device. The image communication program causes the computer to function as transmission/reception selection means. The transmission/reception selection means selects any of reception of an image from another image communication device and transmission of an image to another image communication device. When the transmission/reception selection means selects reception of an image from another image communication device, the image communication program causes the computer to further function as: transmitter information reception means; selection means; destination information transmission control means; image reception means; and image storage control means. The transmitter information reception means receives identification information of another image communication device from another image communication device as transmitter information indicating a transmitter. The selection means causes display means to provide display indicating the transmitter based on the received transmitter information, and allows a user to select whether or not to receive an image from the image communication device that has transmitted the transmitter information. The destination information transmission control means transmits as destination information indicating a destination, its own identification information to the image communication device selected by the selection means as the transmitter from which an image is to be received. The image reception means receives an image transmitted from the image communication device to which the destination information has been transmitted. The image storage control means causes the image storage means to store the image received by the image reception means. When the transmission/reception selection means selects transmission of an image to another image communication device, the image communication program causes the computer to further function as: transmitter information transmission control means; destination information reception control means; destination determination means; and image transmission means. The transmitter information transmission control means transmits as the transmitter information indicating the transmitter, its own identification information to other unspecified image communication devices. The destination information reception control means receives identification information of another image communication device from another image communication device as the destination information indicating the destination. The destination determination means determines the image communication device to serve as the destination, based on the received destination information. The image transmission means transmits at least one of images stored in the image storage means to the destination determined by the destination determination means.

In addition, according to the image communication device and the image communication program according to an aspect similar to the sixth aspect of the present invention, the same effect as in the image communication system described above can be achieved.

<Seventh Aspect>

According to the seventh aspect of the present invention, an information processing program executed in a computer (1) setting a value of at least one parameter based on an input from an input device (13) is provided. The information processing program causes the computer (1) to function as: first change operation accepting means (SD110) for accepting an operation of change from a position in accordance with a current value of the parameter within a prescribed display area (250) in a prescribed screen (500, 501, 502, 503); first update means (SD114, SD115) for gradually updating the parameter from the current value based on the operation of change accepted by the first change operation accepting means; second change operation accepting means (SD111) for accepting an operation of change to a position in accordance with a desired value of the parameter within the prescribed display area; and second update means (SD112, SD115) for updating the parameter from the current value to the desired value based on the operation of change accepted by the second change operation accepting means. In addition, the second update means updates the parameter from the current value to the desired value (SD115) when the desired value is smaller than the current value of the parameter (SD111, SD112) and the second update means does not update the parameter from the current value to the desired value (SD113) when the desired value is greater than the current value of the parameter (SD111, SD113).

According to this aspect, the following seventh problem can be solved.

(Seventh Problem)

In a general media player, the user cannot know only from appearance, the highest volume in a volume adjustment portion and association between the volume adjustment portion and the volume. Further, even when the volume is the same, how sound is heard varies depending on variation in an ambient environment, and it is difficult to immediately change the volume to a user's desired volume.

In this regard, if the volume cannot immediately be changed to the user's desired volume, in particular, if the volume is higher than the user's desired volume, the user and a person around the user may feel uncomfortable, that is, stress may be imposed.

(Function and Effect According to Seventh Aspect)

According to the seventh aspect, in order to address the seventh problem above, an information processing program and an information processing device implementing a user interface suitable for a user's operation in an operation to change setting of a parameter are provided.

According to the seventh aspect of the present invention, when a slider operation which is an operation of change from the position in accordance with the current value is accepted through the input device (13), the parameter is gradually updated in accordance with a slider position. On the other hand, when the operation of change to the position in accordance with the desired value is accepted through the input device (13), the parameter is updated from the current value to the desired value if the desired value is smaller than the current value of the parameter, and the parameter is not updated from the current value to the desired value if the desired value is greater than the current value of the parameter.

Therefore, the user can change the parameter through a series of operations of the input device (13). Specifically, the parameter can gradually be changed from the current value to a greater value or a smaller value. On the other hand, a change operation input for abruptly increasing the parameter from the current value to a greater value is prohibited. Thus, by prohibiting the change operation for abruptly increasing the parameter value to a greater value in the operation to change setting of the parameter, stress imposed on a user or the like due to abrupt change in the parameter caused by an erroneous operation is suppressed and the user interface suitable for a user's operation can be implemented.

In addition, according to an aspect similar to the seventh aspect of the present invention, an information processing program executed in a computer setting a value of at least one parameter based on an input from an input device (13) is provided. The information processing program causes the computer (10) to function as: slider display means (SD32, SD70, SD91) for displaying a slider (252) indicating a current value of the parameter within a prescribed display area (550) in a prescribed screen (500, 501, 502, 503); first movement operation accepting means (SD110, SD114) for accepting a continuous operation of movement from a position of the slider (552) in accordance with the current value of the parameter; second movement operation accepting means (SD110, SD111) for accepting an operation of movement to a position of the slider (552) in accordance with a desired value of the parameter within the prescribed display area; and update means (SD115) for updating the parameter to a value in accordance with a position of the slider (552) resulting from movement in accordance with the accepted operation of movement. The second movement operation accepting means accepts the operation of movement to a desired position of the slider (552) (SD112) when the slider moves in a direction of decrease from the current value of the parameter and the second movement operation accepting means does not accept the operation of movement to the desired position of the slider (SD113) when the slider moves in a direction of increase from the current value of the parameter.

According to this similar aspect, when the continuous operation of movement from the position of the slider (552) in accordance with the current value or an operation of movement to the position of the slider in accordance with the desired value is accepted through the input device (13), the parameter is updated to the value in accordance with the position of the slider (552) resulting from movement. When the operation to move the slider (552) through the input device (13) is such that the slider moves in a direction of decrease from the current value, the operation of movement to the desired position is accepted, whereas when the operation to move the slider (552) through the input device (13) is such that the slider moves in a direction of increase from the current value, the operation of movement to the desired position is not accepted.

Therefore, the user can change the parameter through a series of operations of the input device (13). Specifically, by continuously moving the slider, the parameter can gradually be changed from the current value to a greater value or a smaller value. On the other hand, when the slider is operated to move to the position in accordance with the desired value, an operation of movement in a direction of increase from the current value of the parameter is prohibited. Thus, by prohibiting the operation of movement to abruptly increase the parameter value to a greater value in the operation to change setting of the parameter, stress imposed on the user or the like due to abrupt change in the parameter caused by an erroneous operation is suppressed and the user interface suitable for a user's operation can be implemented.

According to a more preferred aspect of the seventh aspect, the input device is a pointing device (27). According to this aspect, as the user provides input to an arbitrary position on a touch panel by using a touch pen (27), user's operability in selection is improved.

According to a more preferred aspect of the seventh aspect, means for updating the parameter from the current value to the desired value based on the operation of change to a position corresponding to the desired information processing value gradually updates the parameter from the current value. According to this aspect, when the parameter is updated from the current value to the desired value as well, the parameter is gradually updated, so that variation of the parameter can be smooth and hence natural.

According to a more preferred aspect of the seventh aspect, the computer sets values of a plurality of types of parameters based on the input from the input device (13). The values of the plurality of types of parameters are associated with arbitrary positions within the prescribed display area, respectively.

According to this aspect, as association with the plurality of types of parameters is established, setting of the parameter through the input device can be made in a simplified manner.

In particular, the prescribed display area is a multi-dimensional area in accordance with the number of types of parameters set by the computer. Thus, as the parameter is displayed in a dimension in accordance with the number of types of parameters, the position of each parameter can readily be recognized.

According to a more preferred aspect of the seventh aspect, the parameter corresponds to a volume level of sound output from an output device of the computer. According to this aspect, abrupt increase in volume from the current volume, which leads to uncomfortable feeling, that is, stress imposed on the user and a person around the user, can be suppressed.

According to a more preferred aspect of the seventh aspect, the parameter corresponds to duration of a file reproduced in the computer. According to this aspect, start of reproduction from a position where reproduction has not yet been carried out is avoided and having the user feel uncomfortable can be suppressed.

According to another aspect similar to the seventh aspect of the present invention, an information processing device (10) setting a value of at least one parameter based on an input from an input device (13) is provided. The information processing device (10) includes: first change operation accepting means (552, SD110, SD114) for accepting an operation of change from a position in accordance with a current value of the parameter, within a prescribed display area (550) in a prescribed screen (500, 501, 502, 503); first update means (SD114, SD115) for gradually updating the parameter from the current value based on the operation of change accepted by the first change operation accepting means; second change operation accepting means (554, 555) for accepting an operation of change to a position in accordance with a desired value of the parameter within the prescribed display area; and second update means (SD111, SD112, SD115) for updating the parameter from the current value to the desired value based on the operation of change accepted by the second change operation accepting means. The second update means updates the parameter from the current value to the desired value when the desired value is smaller than the current value of the parameter (554) and the second update means does not update the parameter from the current value to the desired value when the desired value is greater than the current value of the parameter (555) (SD113).

According to yet another aspect similar to the seventh aspect of the present invention, an information processing device setting a value of at least one parameter based on an input from an input device (13) is provided. The information processing device (10) includes: slider display means (SD32, SD70, SD91) for displaying a slider (552) indicating a current value of the parameter within a prescribed display area (550) in a prescribed screen (500, 501, 502, 503); first movement operation accepting means (SD110, SD114) for accepting a continuous operation of movement from a position of the slider (552) in accordance with the current value of the parameter; second movement operation accepting means (SD110, SD111) for accepting an operation of movement to a position of the slider (552) in accordance with a desired value of the parameter within the prescribed display area; and update means (SD115) for updating the parameter to a value in accordance with a position of the slider (552) resulting from movement in accordance with the accepted operation of movement. The second movement operation accepting means accepts the operation of movement to a desired position of the slider (552) when the slider moves in a direction of decrease from the current value of the parameter (554, SD112) and the second movement operation accepting means does not accept the operation of movement to the desired position of the slider when the slider moves in a direction of increase from the current value of the parameter (555, SD113).

<Eighth Aspect>

According to the eighth aspect of the present invention, an information processing program executed in a computer representing an information processing device (10) capable of reproducing music data in which an upper member (21) and a lower member (11) are coupled to each other to allow opening and closing is provided. The information processing program causes the computer to function as music reproduction means (SD90) for reproducing music data, opening and closing detection means (SD150) for detecting an opened or closed state of the upper member and the lower member, and sleep means (SD153, SD154) for continuing reproduction of the music data by the music reproduction means when transition from the opened state to the closed state of the upper member and the lower member is detected by the opening and closing detection means and connection with prescribed external output equipment is detected while the music data is being reproduced by the music reproduction means, continuing reproduction of the music data by the music reproduction means when connection with prescribed external output equipment is detected, and stopping reproduction of the music data by the music reproduction means when connection with prescribed external output equipment is not detected.

According to this aspect, the following eighth problem can be solved.

(Eighth Problem)

Japanese Patent Laying-Open No. 2003-216289 (Patent Document 1) shows a computer device implemented as a notebook PC which is a portable terminal device, in which when the notebook PC is closed (in a closed state), sleep processing is performed to set a sleep state where operation such as display is stopped. On the other hand, this document shows the feature that setting from a sleep state to an active state is made when the notebook PC is again opened (in an opened state).

In addition, this document discloses such a technique that, even in performing the sleep processing, when the notebook PC is connected to a reproduction device performing reproduction processing of music data through a USB cable, an active state is partially set in order to transmit necessary data from the notebook PC to the reproduction device through the USB cable.

Therefore, even when the sleep processing is performed, the sleep processing is not performed for a partial function relating to reproduction processing of the music data.

In an information terminal device in Japanese Patent Laying-Open No. 2003-216289 (Patent Document 1), however, reproduction processing of the music data in the information processing device has not been considered and it has not been possible to perform reproduction processing convenient for a user.

(Function and Effect According to Eighth Aspect)

According to the eighth aspect, in order to address the eighth problem above, an information processing program and an information processing device performing processing convenient for a user in reproduction of music data are provided.

According to the eighth aspect of the present invention, when the user closes the upper member and the lower member of the information processing device coupled to allow opening and closing, transition from the opened state to the closed state of the upper member and the lower member is detected. When connection with prescribed external output equipment is detected, reproduction of the music data is continued. When connection with prescribed external output equipment is not detected, reproduction is stopped.

As shown in a typical embodiment, when the user closes the upper member and the lower member from the opened state and connection of prescribed external output equipment (typically, a headphone) is detected, a reproduction function is continued and hence an audio signal is output from the headphone. Therefore, as the audio signal is not output from a speaker or the like of the device, the user and a person around the user do not feel uncomfortable. In addition, the reproduction function is continued while connection with the headphone is detected, and otherwise, i.e., when connection with the headphone is not detected, the sleep state where the reproduction function is stopped is set, which is convenient for the user who has been expecting transition to the sleep state where reproduction is stopped by closing the device.

According to a more preferred aspect of the eighth aspect, this information program further causes the computer to function as continuous reproduction accepting means (517, SD161) for accepting a setting instruction indicating continuous reproduction of music data. When the opening and closing detection means detects transition from the opened state to the closed state of the upper member and the lower member and the setting instruction is accepted, the music reproduction means carries out continuous reproduction of the music data (SD162), and when the setting instruction is not accepted, the music reproduction means stops reproduction of the music data (SD163) at the timing of end of reproduction of the music data that is currently being carried out.

According to this aspect, when the user provides input of the setting instruction indicating continuous reproduction of the music data and transition from the opened state to the closed state of the upper member and the lower member is detected, reproduction of the music data is continuously carried out. When input of the setting instruction is not provided, reproduction of the music data is stopped at the timing of end of reproduction of the music data that is currently being carried out.

As shown in a typical embodiment, when the user selects "reproduction mode" switching icon 517 to select a reproduction mode of repeated reproduction, that is, the reproduction mode in which reproduction of the music data is continuously carried out, reproduction of the music data is continued. When the user selects a reproduction mode other than that, reproduction is stopped at the timing of end of reproduction of the music data that is currently being carried out. Thus, as whether to continue reproduction or not is determined based on the setting instruction indicating continuous reproduction provided by the user, reproduction as intended by the user can be carried out. In addition, as reproduction is stopped at the timing of end of reproduction of the music data that is currently being carried out, reproduction can end without having the user feel uncomfortable.

According to a more preferred aspect of the eighth aspect, this information processing program further causes the computer to function as reproduction setting accepting means (561, SD212, SD213) for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction (SD214, SD215).

According to this aspect, the reproduction setting means for accepting a setting instruction to switch between stereophonic reproduction and monaural reproduction in reproduction of the music data functions, and when connection with prescribed external output equipment is detected, stereophonic reproduction or monaural reproduction is carried out in accordance with the setting instruction.

As shown in a typical embodiment, when the user selects function selection icon 561 of "headphone" in reproduction through external output equipment (typically, a headphone) and switches to the headphone, reproduction processing appropriate for a type of the headphone can be selected.

According to a more preferred aspect of the eighth aspect, this information processing program further causes the computer to function as adjustment means (SD141) for adjusting a prescribed frequency band of music data to be reproduced by the music reproduction means when connection with prescribed external output equipment is detected (SD140).

According to this aspect, when connection with external output equipment (typically, a headphone) is detected, the adjustment means for adjusting a prescribed frequency band of music data to be reproduced functions.

As shown in a typical embodiment, equalization processing is performed when the user attaches external output equipment (typically, a headphone), so that reproduction can be carried out without having the user feel uncomfortable by adjusting a prescribed frequency band even when acoustic characteristics are significantly changed owing to attachment of the headphone.

According to a more preferred aspect of the eighth aspect, this information processing program further causes the computer to function as adjustment means for adjusting a prescribed tone of music data to be reproduced by the music reproduction means when connection with prescribed external output equipment is detected.

According to this aspect, when connection with external output equipment (typically, a headphone) is detected, the adjustment means for adjusting a prescribed tone of music data to be reproduced functions.

As shown in a typical embodiment, when the user attaches external output equipment (typically, a headphone), reproduction can be carried out without having the user feel uncomfortable, for example, in such a manner that sound of high key that gives no uncomfortable feeling in reproduction from the speaker but sounds too high in listening through the headphone is replaced with different sound of lower key, or sound accompanying noise in listening through the headphone is replaced with different sound.

According to a more preferred aspect of the eighth aspect, this information processing program further causes the computer to function as adjustment means for adjusting a volume of music data to be reproduced by the music reproduction means when connection with prescribed external output equipment is detected.

According to this aspect, when connection with external output equipment (typically, a headphone) is detected, the adjustment means for adjusting a volume of music data to be reproduced functions.

As shown in a typical embodiment, when the user attaches external output equipment (typically, a headphone), reproduction can be carried out without having the user feel uncomfortable, for example, in such a manner that an audio signal reproduced in balance without giving uncomfortable feeling in reproduction from the speaker but reproduced in poor volume balance in listening through the headphone is adjusted by increasing or decreasing the volume thereof to attain balance.

According to a more preferred aspect of the eighth aspect, sleep means stops at least a part of a display function when the opening and closing detection means detects transition from the opened state to the closed state of the upper member and the lower member.

According to this aspect, when transition from the opened state to the closed state of the upper member and the lower member is detected, at least a part of the display function is stopped.

As shown in a typical embodiment, when the user sets the upper member and the lower member from the opened state to the closed state, a sleep state where an unnecessary function is stopped by stopping at least a part of the display function is set and hence power consumption can be lowered.

According to another aspect of the eighth aspect, an information processing program executed in a computer representing an information processing device capable of reproducing music data causes a computer to function as music reproduction means for reproducing music data and reproduction setting accepting means for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction.

According to this aspect, reproduction setting means for accepting a setting instruction to switch between stereophonic reproduction and monaural reproduction in reproduction of the music data functions, and when connection with prescribed external output equipment is detected, stereophonic reproduction or monaural reproduction is carried out in accordance with the setting instruction.

As shown in a typical embodiment, when the user selects function selection icon 561 of "headphone" in reproduction through external output equipment (typically, a headphone) and switches to the headphone, reproduction processing appropriate for a type of the headphone can be selected.

According to yet another aspect of the eighth aspect, an information processing device (10) capable of reproducing music data in which an upper member (21) and a lower member (11) are coupled to each other to allow opening and closing includes music reproduction means (SD90) for reproducing music data, opening and closing detection means (SD150) for detecting an opened or closed state of the upper member and the lower member, and sleep means (SD153, SD154) for continuing reproduction of the music data by the music reproduction means when transition from the opened state to the closed state of the upper member and the lower member is detected by the opening and closing detection means and connection with prescribed external output equipment is detected while the music data is being reproduced by the music reproduction means, continuing reproduction of the music data by the music reproduction means when connection with prescribed external output equipment is detected, and stopping reproduction of the music data by the music reproduction means when connection with prescribed external output equipment is not detected.

According to this yet another aspect, an information processing device capable of reproducing music data includes music reproduction means for reproducing music data and reproduction setting accepting means (SD261, SD212, SD213) for accepting a setting instruction to switch between stereophonic reproduction and monaural reproduction in reproduction of music data by the music reproduction means. When the setting instruction is accepted and connection with prescribed external output equipment is detected, the music reproduction means carries out reproduction in accordance with the setting instruction, and when connection with prescribed external output equipment is not detected, the music reproduction means carries out stereophonic reproduction (SD214, SD215).

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

We claim:

1. A system including at least one first multifunction device and at least one second multifunction device,
   the first multifunction device comprising:
   a camera;
   a display controller;
   memory configured to store user-configurable first user name information and a picture captured by the camera; and
   communication circuitry configured to wirelessly transmit the first user name information to unspecified devices, and the second multifunction device comprising:
   communication circuitry configured to wirelessly receive the first user name information;
   a display controller configured to control display of a user name based on the received first user name information; and
   a user interface configured to receive, while the user name is displayed, a user-supplied request for picture reception,
   wherein the communication circuitry of the first multifunction device is configured to transmit the stored picture to the second multifunction device based on the picture reception request and the communication circuitry of the second multifunction device is configured to receive the transmitted picture,
   wherein the communication circuitry of the first multifunction device is configured to receive second user name information from the second multifunction device to which the picture reception request is supplied and the display controller of the first multifunction device is configured to control display of one or more user names based on the received second user name information, and
   wherein the communication circuitry of the first multifunction device is configured to transmit data representing the stored picture along with the first user name information, the display controller of the second multifunction device is configured to control display of the data representing the picture and the user name, and the user interface of the second multifunction device is configured to receive the picture reception request while the data representing the picture and the user name are displayed.

2. The system according to claim 1, wherein the first multifunction device further comprises a display and the display controller of the first multifunction device is configured to control display of status information about transmitting the picture on the display of the first device.

3. The system according to claim 1, wherein the second multifunction device further comprises a display and the display controller of the second multifunction device is configured to control display of status information about receiving the picture on the display of the second multifunction device.

4. The system according to claim 1, wherein the user interface of the second multifunction device comprises a touchscreen display, the display controller is configured to control display of the name on the touchscreen display, and the picture reception request comprises an input to the touchscreen display.

5. The system according to claim 1, wherein the memory of the first multifunction device is configured to store multiple pictures captured by the camera, the first multifunction device further comprises a user interface configured to receive at least one user-supplied picture selection input for selecting a stored picture, and the communication circuitry of the first multifunction device is configured to transmit the at least one selected picture.

6. The system according to claim 5, wherein the user interface of the first multifunction device comprises a touchscreen display configured to display multiple selection items, each selection item corresponding to one of the pictures stored in the memory of the first multifunction device, and wherein each of the at least one picture selection inputs comprises a touch input to the touchscreen display for selecting a corresponding one of the selection items.

7. The system according to claim 6, wherein each selection item comprises a thumbnail of the corresponding picture.

8. The system according to claim 7, wherein the selection items are arranged in an array.

9. The system according to claim 6, wherein the display of selection items is scrollable in response to a scroll input to the touchscreen display.

10. The system according to claim 1, wherein the communication circuitry of the first multifunction device and the communication circuitry of the second multifunction device are configured for near-field wireless communication.

11. The system according to claim 1, wherein the first multifunction device and the multifunction second device are each portable.

12. The system according to claim 1, wherein the communication circuitry of the first multifunction device and the communication circuitry of the second multifunction device are configured to allow direct communication between the first and second multifunction devices.

13. The system according to claim 1, wherein the first multifunction device is configured to search for other multifunction devices and the second multifunction device is a multifunction device found during the search, and wherein communication circuitry of the first multifunction device transmits the stored picture to those ones of the second multifunction devices found during the search, to which a picture reception request is supplied.

14. The system according to claim 13, wherein the communication circuitry of the first multifunction device is configured to broadcast data during the search.

15. The system according to claim 13, wherein the communication circuitry of the first multifunction device is configured to receive broadcast data during the search.

16. The system according to claim 1, wherein the first multifunction device further comprises a user interface configured to enable selecting of at least one of the displayed names and the communication circuitry of the first multifunction device is configured to transmit the stored picture to each second multifunction device associated with a selected name.

17. A system comprising a first multifunction device and a second multifunction device,
the first multifunction device comprising:
a camera;
a touchscreen display;
memory configured to store user-configurable first user name information and a picture captured by the camera;
communication circuitry configured to wirelessly transmit the first user name information to unspecified devices; and
processing circuitry, and
the second multifunction device comprising:
communication circuitry configured to wirelessly receive the first user name information;
a touchscreen display; and
processing circuitry configured to control the touchscreen display to display a user name based on the received first user name information and to receive, while the user name is displayed, a user-supplied request for picture reception,
wherein the communication circuitry of the first multifunction device is configured to transmit the stored picture to the second multifunction device based on the picture reception request and the communication circuitry of the second multifunction device is configured to receive the transmitted picture,
wherein the communication circuitry of the first multifunction device is configured to receive second user name information from the second multifunction device to which a picture reception request is supplied and the processing circuitry of the first multifunction device is configured to control display of a user name on the touchscreen display of the first multifunction device based on the received second user name information, and
wherein the communication circuitry of the first multifunction device is configured to transmit data representing the stored picture along with the first user name information and the processing circuitry of the second multifunction device is configured to control display of the data representing the picture and the user name and to receive the picture reception request while the data representing the picture and the user name are displayed.

18. A system including at least a portable first multifunction device and a second portable multifunction device,
the first portable multifunction device comprising:
a camera;
a touchscreen display;
memory configured to store user-configurable first user name information and a picture captured by the camera;
near-field communication circuitry configured to transmit the first user name information to unspecified portable multifunction devices; and
processing circuitry, and
the second portable multifunction device comprising:
near-field communication circuitry configured to receive the first user name information;
a touchscreen display; and
processing circuitry configured to control display of a user name based on the received first user name information and to receive, while the user name is displayed, a user-supplied request for picture reception,
wherein the near-field communication circuitry of the second portable multifunction device is configured to transmit a reception request to the first portable multifunction device based on the picture reception request, the near-field communication circuitry of the first portable multifunction device is configured to receive the reception request and to transmit the stored picture to the second portable multifunction device based on the reception request, and the near-field communication circuitry of the second portable multifunction device is configured to receive the transmitted picture,
wherein the near-field communication circuitry of the second portable multifunction device to which the reception request is supplied is configured to transmit second user name information to the first portable multifunction device in addition to the reception request, the near field communication circuitry of the first portable multifunction device is configured to receive the second user name information from the second portable multifunction device, and the processing circuitry of the first portable multifunction device is configured to control display of a user name on the touchscreen display of the first portable multifunction device based on the received second user name information, and
wherein the near-field communication circuitry of the first portable multifunction device is configured to transmit data representing the stored picture along with the first user name information and the processing circuitry of the second portable multifunction device is configured to control display on the touchscreen display of the second portable multifunction device of the data representing the picture and the user name and to receive the picture reception request while the data representing the picture and the user name are displayed on the touchscreen display of the second portable multifunction device.

19. A system comprising a first multifunction device and at least one second multifunction device,
the first multifunction device comprising:
a camera;
memory configured to store user-configurable first user name information and one or more pictures captured by the camera;
communication circuitry configured for local wireless communication;
a touchscreen display; and
processing circuitry operatively coupled to the camera, the memory, the communication circuitry, and the touchscreen display, the processing circuitry configured to control the communication circuitry to transmit the first user name information to unspecified multifunction devices, and
each second multifunction device comprising:
communication circuitry configured for local wireless communication;
a touchscreen display; and
processing circuitry operatively coupled to the communication circuitry and the touchscreen display, the processing circuitry configured to control the communication circuitry to receive the first user name information from the first multifunction device, controlling the touchscreen display to display a user name based on the received first user name information, and controlling the communication circuitry to transmit a picture reception request to the first multifunction device in response to a user-supplied input to the touchscreen display while the user name is displayed,
wherein the communication circuitry of the first multifunction device is configured to receive the picture reception request and the processing circuitry of first multifunction device is configured to control the communication circuitry of the first multifunction device to transmit a stored picture to the second multifunction device based on the received picture reception request,
wherein the communication circuitry of the second multifunction device is configured to receive the transmitted picture,
wherein the communication circuitry of the first multifunction device is configured to receive second user name information from each second multifunction device to which a picture reception request is supplied and the processing circuitry of the first multifunction device is configured to control display of one or more user names based on the received second user name information on the touchscreen display of the first multifunction device, and wherein the communication circuitry of the first multifunction device is configured to transmit data representing the stored picture along with the first user name information, the processing circuitry of the second multifunction device is configured to control display of the data representing the picture and the user name and to receive the picture reception request while the data representing the picture and the user name are displayed.

20. The system according to claim 19, wherein the processing circuitry of the first multifunction device is configured to control display on the touchscreen display of the first multifunction device of status information about transmitting the picture.

21. The system according to claim 19, wherein the processing circuitry of the second multifunction device is configured to control display on the touchscreen display of the second multifunction device of status information about receiving the picture.

22. A multifunction device comprising:
a camera;
memory configured to store user-configurable first user name information and one or more pictures captured by the camera;
wireless communication circuitry configured for local wireless communication;
a touchscreen display; and
processing circuitry operatively coupled to the camera, the memory, the wireless communication circuitry, and the touchscreen display, the processing circuitry being configured to control the multifunction device to perform operations comprising:
transmitting, via the wireless communication circuitry, the first user name information to unspecified multifunction devices;
receiving, from each of one or more other multifunction devices to which a picture reception request is supplied based on receiving the transmitted user name information, via the wireless communication circuitry, a reception request and user-configurable second user name information;
displaying one or more user names on the touchscreen display based on the second user name information;
receiving input for selecting at least one of the displayed user names; and
transmitting the stored picture to each other device associated with a selected user name,
wherein the processing circuitry is configured control the multifunction device to transmit data representing a stored picture along with the first user name information.

23. The device according to claim 22, further comprising:
a speaker, wherein
the memory is further configured to store audio data, and
the processing circuitry is further configured to control the multifunction device to playback audio data selected from the memory and control output of the played-back audio data via the speaker.

* * * * *